US011536988B2

(12) United States Patent
Howell et al.

(10) Patent No.: US 11,536,988 B2
(45) Date of Patent: Dec. 27, 2022

(54) EYEWEAR SUPPORTING EMBEDDED ELECTRONIC COMPONENTS FOR AUDIO SUPPORT

(71) Applicant: IngenioSpec, LLC, San Jose, CA (US)

(72) Inventors: Thomas A. Howell, San Jose, CA (US); David Chao, Saratoga, CA (US); C. Douglass Thomas, Saratoga, CA (US); Peter P. Tong, Mountain View, CA (US)

(73) Assignee: IngenioSpec, LLC, San Jose, CA (US)

(*) Notice: Subject to any disclaimer, the term of this patent is extended or adjusted under 35 U.S.C. 154(b) by 81 days.

(21) Appl. No.: 16/821,810

(22) Filed: Mar. 17, 2020

(65) Prior Publication Data

US 2020/0218094 A1 Jul. 9, 2020

Related U.S. Application Data

(63) Continuation of application No. 16/574,254, filed on Sep. 18, 2019, now Pat. No. 11,204,512, which is a
(Continued)

(51) Int. Cl.
*G02C 11/00* (2006.01)
*G02C 5/00* (2006.01)
(Continued)

(52) U.S. Cl.
CPC .............. *G02C 11/10* (2013.01); *G02C 5/001* (2013.01); *G02C 5/14* (2013.01); *G02C 11/06* (2013.01)

(58) Field of Classification Search
CPC .......... G02C 1/00; G02C 11/10; G02C 11/06; G02C 5/001; G02C 5/02; G02C 5/14;
(Continued)

(56) References Cited

U.S. PATENT DOCUMENTS 320,558 A 6/1885 Hull
669,949 A 3/1901 Underwood
(Continued)

FOREIGN PATENT DOCUMENTS

CA 2 487 391 12/2003
CN 88203065 11/1988
(Continued)

OTHER PUBLICATIONS

English translation of JP 2005167902, machine translated on Jan. 7, 2022 (Year: 2005).*
(Continued)

*Primary Examiner* — Jie Lei

(57) ABSTRACT

Techniques for providing eyewear with electrical components are disclosed. The electrical components can provide electrical technology to eyewear (e.g., eyeglasses) without having to substantially compromise aesthetic design principles of the eyewear. The electrical components can operate independently or together with other electrical components provided elsewhere. The eyewear with electronic components can, for example, provide audio output, audio enhancements, or event-related audio content.

101 Claims, 92 Drawing Sheets

Related U.S. Application Data continuation of application No. 16/049,120, filed on Jul. 30, 2018, now Pat. No. 11,243,416, which is a continuation of application No. 15/375,423, filed on Dec. 12, 2016, now Pat. No. 10,061,144, which is a continuation of application No. 14/557,409, filed on Dec. 1, 2014, now Pat. No. 9,547,184, which is a continuation of application No. 13/955,336, filed on Jul. 31, 2013, now Pat. No. 8,905,542, which is a continuation of application No. 13/085,402, filed on Apr. 12, 2011, now Pat. No. 8,500,271, which is a continuation of application No. 11/183,269, filed on Jul. 15, 2005, now Pat. No. 7,922,321, which is a continuation-in-part of application No. 10/964,011, filed on Oct. 12, 2004, now Pat. No. 7,192,136.

(60) Provisional application No. 60/647,826, filed on Jan. 31, 2005, provisional application No. 60/647,836, filed on Jan. 31, 2005, provisional application No. 60/620,238, filed on Oct. 18, 2004, provisional application No. 60/618,107, filed on Oct. 12, 2004, provisional application No. 60/605,191, filed on Aug. 28, 2004, provisional application No. 60/592,045, filed on Jul. 28, 2004, provisional application No. 60/583,169, filed on Jun. 26, 2004, provisional application No. 60/562,798, filed on Apr. 15, 2004, provisional application No. 60/527,565, filed on Dec. 8, 2003, provisional application No. 60/509,631, filed on Oct. 9, 2003.

(51) Int. Cl.
*G02C 11/06* (2006.01)
*G02C 5/14* (2006.01)

(58) Field of Classification Search
CPC .......... G02C 5/22; G02C 5/146; G02B 27/01; G02B 27/017; G02B 27/0176
USPC .... 351/158, 41, 111, 121, 123, 124; 359/13, 359/629–633; 381/381, 327, 328, 370, 381/380
See application file for complete search history.

(56) References Cited

U.S. PATENT DOCUMENTS

| | | | |
|---|---|---|---|
| 1,255,265 | A | 2/1918 | Zachara |
| 1,917,745 | A | 7/1933 | Weiss |
| 2,249,572 | A | 7/1941 | Lieber |
| 2,638,532 | A | 5/1953 | Brady |
| 2,794,085 | A | 5/1957 | Angelis |
| 2,818,511 | A | 12/1957 | Ullery et al. |
| 2,830,132 | A | 4/1958 | Borg |
| 2,874,230 | A | 2/1959 | Carlson |
| 2,904,670 | A | 9/1959 | Calmes |
| 3,060,308 | A | 10/1962 | Fortuna |
| 3,597,054 | A | 8/1971 | Winter |
| 3,710,115 | A | 1/1973 | Jubb |
| 3,858,001 | A | 12/1974 | Bonne |
| 3,883,701 | A | 5/1975 | Delorenzo |
| 4,165,487 | A | 8/1979 | Corderman |
| 4,254,451 | A | 3/1981 | Cochran, Jr. |
| 4,283,127 | A | 8/1981 | Rosenwinkel et al. |
| 4,322,585 | A | 3/1982 | Liautaud |
| 4,348,664 | A | 9/1982 | Boschetti et al. |
| 4,389,217 | A | 6/1983 | Baughman et al. |
| 4,526,473 | A | 7/1985 | Zahn, III |
| 4,535,244 | A | 8/1985 | Burnham |
| 4,608,492 | A | 8/1986 | Burnham |
| 4,683,587 | A | 7/1987 | Silverman |
| 4,751,691 | A | 6/1988 | Perera |
| 4,757,714 | A | 7/1988 | Purdy et al. |
| 4,773,095 | A | 9/1988 | Zwicker et al. |
| 4,806,011 | A | 2/1989 | Bettinger |
| 4,822,160 | A | 4/1989 | Tsai |
| 4,822,161 | A | 4/1989 | Jimmy |
| 4,851,686 | A | 7/1989 | Pearson |
| 4,856,086 | A | 8/1989 | McCullough |
| 4,859,047 | A | 8/1989 | Badewitz |
| 4,882,769 | A | 11/1989 | Gallimore |
| 4,904,078 | A | 2/1990 | Gorike |
| 4,942,629 | A | 7/1990 | Stadlmann |
| 4,962,469 | A | 10/1990 | Ono et al. |
| 4,967,268 | A | 10/1990 | Lipton et al. |
| 4,985,632 | A | 1/1991 | Bianco et al. |
| 5,008,548 | A | 4/1991 | Gat |
| 5,015,086 | A | 5/1991 | Okaue et al. |
| 5,020,150 | A | 5/1991 | Shannon |
| 5,026,151 | A | 6/1991 | Waltuck et al. |
| 5,036,311 | A | 7/1991 | Moran et al. |
| 5,050,150 | A | 9/1991 | Ikeda |
| 5,064,410 | A | 11/1991 | Frenkel et al. |
| 5,093,576 | A | 3/1992 | Edmond et al. |
| 5,106,179 | A | 4/1992 | Kamaya et al. |
| 5,144,344 | A | 9/1992 | Takahashi et al. |
| 5,148,023 | A | 9/1992 | Hayashi et al. |
| 5,151,600 | A | 9/1992 | Black |
| 5,161,250 | A | 11/1992 | Ianna et al. |
| 5,172,256 | A | 12/1992 | Sethofer et al. |
| 5,264,877 | A | 11/1993 | Hussey |
| 5,306,917 | A | 4/1994 | Black et al. |
| 5,353,378 | A | 10/1994 | Hoffman et al. |
| 5,359,370 | A | 10/1994 | Mugnier |
| 5,359,444 | A | 10/1994 | Piosenka et al. |
| 5,367,345 | A | 11/1994 | da Silva |
| 5,379,464 | A | 1/1995 | Schleger et al. |
| 5,382,986 | A | 1/1995 | Black et al. |
| 5,394,005 | A | 2/1995 | Brown et al. |
| 5,452,026 | A | 9/1995 | Marcy, III |
| 5,452,480 | A | 9/1995 | Ryden |
| 5,455,637 | A | 10/1995 | Kallman et al. |
| 5,455,640 | A | 10/1995 | Gertsikov |
| 5,457,751 | A | 10/1995 | Such |
| 5,463,428 | A | 10/1995 | Lipton et al. |
| 5,475,798 | A | 12/1995 | Handlos |
| 5,500,532 | A | 3/1996 | Kozicki |
| D369,167 | S | 4/1996 | Hanson et al. |
| 5,510,961 | A | 4/1996 | Peng |
| 5,513,384 | A | 4/1996 | Brennan et al. |
| 5,533,130 | A | 7/1996 | Staton |
| 5,541,641 | A | 7/1996 | Shimada |
| 5,581,090 | A | 12/1996 | Goudjil |
| 5,585,871 | A | 12/1996 | Linden |
| 5,589,398 | A | 12/1996 | Krause et al. |
| 5,590,417 | A | 12/1996 | Rydbeck |
| 5,606,743 | A | 2/1997 | Vogt et al. |
| 5,608,808 | A | 3/1997 | da Silva |
| 5,634,201 | A | 5/1997 | Mooring |
| 5,671,035 | A | 9/1997 | Barnes |
| 5,686,727 | A | 11/1997 | Reenstra et al. |
| 5,694,475 | A | 12/1997 | Boyden |
| 5,715,323 | A | 2/1998 | Walker |
| 5,737,436 | A | 4/1998 | Boyden et al. |
| 5,777,715 | A | 7/1998 | Kruegle et al. |
| 5,818,381 | A | 10/1998 | Williams |
| 5,835,185 | A | 11/1998 | Kallman et al. |
| 5,900,720 | A | 5/1999 | Kallman et al. |
| 5,903,395 | A | 5/1999 | Rallison et al. |
| 5,923,398 | A | 7/1999 | Goldman |
| 5,941,837 | A | 8/1999 | Amano et al. |
| 5,946,071 | A | 8/1999 | Feldman |
| 5,949,516 | A | 9/1999 | McCurdy |
| 5,966,746 | A | 10/1999 | Reedy et al. |
| 5,980,037 | A | 11/1999 | Conway |
| 5,988,812 | A | 11/1999 | Wingate |
| 5,991,085 | A | 11/1999 | Rallison et al. |
| 5,992,996 | A | 11/1999 | Sawyer |
| 5,995,592 | A | 11/1999 | Shirai et al. |
| 6,010,216 | A | 1/2000 | Jesiek |
| 6,013,919 | A | 1/2000 | Schneider et al. |

(56) References Cited

U.S. PATENT DOCUMENTS

| | | | |
|---|---|---|---|
| 6,028,627 A | 2/2000 | Helmsderfer | |
| 6,046,455 A | 4/2000 | Ribi et al. | |
| 6,060,321 A | 5/2000 | Hovorka | |
| 6,061,580 A | 5/2000 | Altschul et al. | |
| 6,091,546 A | 7/2000 | Spitzer | |
| 6,091,832 A | 7/2000 | Shurman et al. | |
| 6,115,177 A | 9/2000 | Vossler | |
| 6,132,681 A | 10/2000 | Faran et al. | |
| 6,145,983 A | 11/2000 | Schiffer | |
| 6,154,552 A | 11/2000 | Koroljow et al. | |
| 6,176,576 B1 | 1/2001 | Green et al. | |
| 6,225,897 B1 | 5/2001 | Doyle et al. | |
| 6,231,181 B1 | 5/2001 | Swab | |
| 6,236,969 B1 | 5/2001 | Ruppert et al. | |
| 6,243,578 B1 | 6/2001 | Koike | |
| 6,259,367 B1 | 7/2001 | Klein | |
| 6,270,466 B1 | 8/2001 | Weinstein et al. | |
| 6,292,213 B1 | 9/2001 | Jones | |
| 6,292,685 B1 | 9/2001 | Pompei | |
| 6,301,050 B1 | 10/2001 | DeLeon | |
| 6,301,367 B1 | 10/2001 | Boyden et al. | |
| 6,307,526 B1 | 10/2001 | Mann | |
| 6,343,858 B1 | 2/2002 | Zelman | |
| 6,346,929 B1 | 2/2002 | Fukushima et al. | |
| 6,349,001 B1 * | 2/2002 | Spitzer ................ | G02B 27/017 359/618 |
| 6,349,422 B1 | 2/2002 | Schleger et al. | |
| 6,409,335 B1 | 6/2002 | Lipawsky | |
| 6,409,338 B1 | 6/2002 | Jewell | |
| 6,426,719 B1 | 7/2002 | Nagareda et al. | |
| 6,431,705 B1 | 8/2002 | Linden | |
| 6,474,816 B2 | 11/2002 | Butler et al. | |
| 6,478,736 B1 | 11/2002 | Mault | |
| 6,506,142 B2 | 1/2003 | Itoh et al. | |
| 6,511,175 B2 | 1/2003 | Hay et al. | |
| 6,513,532 B2 | 2/2003 | Mault et al. | |
| 6,517,203 B1 | 2/2003 | Blum et al. | |
| 6,539,336 B1 | 3/2003 | Vock et al. | |
| 6,542,081 B2 | 4/2003 | Torch | |
| 6,546,101 B1 | 4/2003 | Murray et al. | |
| 6,554,763 B1 | 4/2003 | Amano et al. | |
| 6,582,075 B1 | 6/2003 | Swab et al. | |
| 6,619,799 B1 | 9/2003 | Blum et al. | |
| 6,629,076 B1 | 9/2003 | Haken | |
| 6,717,737 B1 | 4/2004 | Haglund | |
| 6,729,726 B2 | 5/2004 | Miller et al. | |
| 6,736,759 B1 | 5/2004 | Stubbs et al. | |
| 6,764,194 B1 | 7/2004 | Cooper | |
| 6,769,767 B2 | 8/2004 | Swab et al. | |
| 6,771,423 B2 | 8/2004 | Geist | |
| 6,788,309 B1 | 9/2004 | Swan et al. | |
| 6,792,401 B1 | 9/2004 | Nigro et al. | |
| 6,816,314 B2 | 11/2004 | Shimizu et al. | |
| 6,824,265 B1 | 11/2004 | Harper | |
| 6,857,741 B2 | 2/2005 | Blum et al. | |
| 6,871,951 B2 | 3/2005 | Blum et al. | |
| 6,879,930 B2 | 4/2005 | Sinclair et al. | |
| 6,912,386 B1 | 6/2005 | Himberg et al. | |
| 6,929,365 B2 | 8/2005 | Swab et al. | |
| 6,932,090 B1 | 8/2005 | Reschke et al. | |
| 6,947,219 B1 | 9/2005 | Ou | |
| 7,004,582 B2 | 2/2006 | Jannard et al. | |
| 7,013,009 B2 | 3/2006 | Warren | |
| 7,023,594 B2 | 4/2006 | Blum et al. | |
| 7,030,902 B2 | 4/2006 | Jacobs | |
| 7,031,667 B2 | 4/2006 | Horiguchi | |
| 7,033,025 B2 | 4/2006 | Winterbotham | |
| 7,059,717 B2 | 6/2006 | Bloch | |
| 7,073,905 B2 | 7/2006 | Da Pra' | |
| 7,079,876 B2 | 7/2006 | Levy | |
| 7,123,215 B2 | 10/2006 | Nakada | |
| 7,192,136 B2 | 3/2007 | Howell et al. | |
| 7,255,437 B2 | 8/2007 | Howell et al. | |
| 7,265,358 B2 | 9/2007 | Fontaine | |
| 7,274,292 B2 | 9/2007 | Velhal et al. | |
| 7,289,767 B2 | 10/2007 | Lai | |
| 7,312,699 B2 | 12/2007 | Chornenky | |
| 7,331,666 B2 | 2/2008 | Swab et al. | |
| 7,376,238 B1 | 5/2008 | Rivas et al. | |
| 7,380,936 B2 | 6/2008 | Howell et al. | |
| 7,401,918 B2 | 7/2008 | Howell et al. | |
| 7,405,801 B2 | 7/2008 | Jacobs | |
| 7,429,965 B2 | 9/2008 | Weiner | |
| 7,438,409 B2 | 10/2008 | Jordan | |
| 7,438,410 B1 | 10/2008 | Howell et al. | |
| 7,445,332 B2 | 11/2008 | Jannard et al. | |
| 7,481,531 B2 | 1/2009 | Howell et al. | |
| 7,500,746 B1 | 3/2009 | Howell et al. | |
| 7,500,747 B2 | 3/2009 | Howell et al. | |
| 7,512,414 B2 | 3/2009 | Jannard et al. | |
| 7,517,083 B2 | 4/2009 | Blum et al. | |
| 7,527,374 B2 | 5/2009 | Chou | |
| 7,543,934 B2 | 6/2009 | Howell et al. | |
| 7,581,833 B2 | 9/2009 | Howell et al. | |
| 7,621,634 B2 | 11/2009 | Howell et al. | |
| 7,648,236 B1 | 1/2010 | Dobson | |
| 7,677,723 B2 | 3/2010 | Howell et al. | |
| 7,760,898 B2 | 7/2010 | Howell et al. | |
| 7,771,046 B2 | 8/2010 | Howell et al. | |
| 7,792,552 B2 | 9/2010 | Thomas et al. | |
| 7,806,525 B2 | 10/2010 | Howell et al. | |
| 7,922,321 B2 | 4/2011 | Howell et al. | |
| 7,976,159 B2 | 7/2011 | Jacobs et al. | |
| 8,109,629 B2 | 2/2012 | Howell et al. | |
| 8,142,015 B2 | 3/2012 | Paolino | |
| 8,174,569 B2 | 5/2012 | Tanijiri et al. | |
| 8,337,013 B2 | 12/2012 | Howell et al. | |
| 8,430,507 B2 | 4/2013 | Howell et al. | |
| 8,434,863 B2 | 5/2013 | Howell et al. | |
| 8,465,151 B2 | 6/2013 | Howell et al. | |
| 8,485,661 B2 | 7/2013 | Yoo et al. | |
| 8,500,271 B2 | 8/2013 | Howell et al. | |
| 8,770,742 B2 | 7/2014 | Howell et al. | |
| 8,905,542 B2 | 12/2014 | Howell et al. | |
| 9,033,493 B2 | 5/2015 | Howell et al. | |
| 9,244,292 B2 | 1/2016 | Swab et al. | |
| 9,400,390 B2 | 7/2016 | Osterhout et al. | |
| 9,405,135 B2 | 8/2016 | Sweis et al. | |
| 9,488,520 B2 | 11/2016 | Howell et al. | |
| 9,547,184 B2 | 1/2017 | Howell et al. | |
| 9,690,121 B2 | 6/2017 | Howell et al. | |
| 9,922,236 B2 | 3/2018 | Moore et al. | |
| 10,042,186 B2 | 8/2018 | Chao et al. | |
| 10,060,790 B2 | 8/2018 | Howell et al. | |
| 10,061,144 B2 | 8/2018 | Howell et al. | |
| 10,310,296 B2 | 6/2019 | Howell et al. | |
| 10,345,625 B2 | 7/2019 | Howell et al. | |
| 10,359,311 B2 | 7/2019 | Howell et al. | |
| 10,359,459 B1 | 7/2019 | Gorin | |
| 10,571,715 B2 | 2/2020 | Rizzo, III et al. | |
| 10,624,790 B2 | 4/2020 | Chao et al. | |
| 10,777,048 B2 | 9/2020 | Howell et al. | |
| 11,042,045 B2 | 6/2021 | Chao et al. | |
| 11,086,147 B2 | 8/2021 | Howell et al. | |
| 11,204,512 B2 | 12/2021 | Howell et al. | |
| 11,243,416 B2 | 2/2022 | Howell et al. | |
| 11,326,941 B2 | 5/2022 | Howell et al. | |
| 2001/0005230 A1 | 6/2001 | Ishikawa | |
| 2001/0028309 A1 | 10/2001 | Torch | |
| 2001/0050754 A1 | 12/2001 | Hay et al. | |
| 2002/0017997 A1 | 2/2002 | Felkowitz | |
| 2002/0021407 A1 | 2/2002 | Elliott | |
| 2002/0081982 A1 | 6/2002 | Schwartz et al. | |
| 2002/0084990 A1 | 7/2002 | Peterson, III | |
| 2002/0089639 A1 | 7/2002 | Starner et al. | |
| 2002/0090103 A1 | 7/2002 | Calisto, Jr. | |
| 2002/0098877 A1 | 7/2002 | Glezerman | |
| 2002/0101568 A1 | 8/2002 | Eberl et al. | |
| 2002/0109600 A1 | 8/2002 | Mault et al. | |
| 2002/0140899 A1 | 10/2002 | Blum et al. | |
| 2002/0159023 A1 | 10/2002 | Swab | |
| 2002/0197961 A1 | 12/2002 | Warren | |
| 2003/0018274 A1 | 1/2003 | Takahashi et al. | |
| 2003/0022690 A1 | 1/2003 | Beyda et al. | |

(56) References Cited

U.S. PATENT DOCUMENTS

2003/0032449 A1 2/2003 Giobbi
2003/0062046 A1 4/2003 Wiesmann et al.
2003/0065257 A1 4/2003 Mault et al.
2003/0067585 A1 4/2003 Miller et al.
2003/0068057 A1 4/2003 Miller et al.
2003/0083591 A1 5/2003 Edwards et al.
2003/0214630 A1 11/2003 Winterbotham
2003/0226978 A1 12/2003 Ribi et al.
2003/0231293 A1 12/2003 Blum et al.
2004/0000733 A1 1/2004 Swab et al.
2004/0029582 A1 2/2004 Swab et al.
2004/0059212 A1 3/2004 Abreu
2004/0063378 A1 4/2004 Nelson
2004/0096078 A1 5/2004 Lin
2004/0100384 A1 5/2004 Chen et al.
2004/0101178 A1 5/2004 Fedorovskaya et al.
2004/0104864 A1 6/2004 Nakada
2004/0128737 A1 7/2004 Gesten
2004/0150986 A1 8/2004 Chang
2004/0156012 A1 8/2004 Jannard et al.
2004/0157649 A1 8/2004 Jannard et al.
2004/0160571 A1 8/2004 Jannard
2004/0160572 A1 8/2004 Jannard
2004/0160573 A1 8/2004 Jannard et al.
2004/0197002 A1 10/2004 Atsumi et al.
2004/0227219 A1 11/2004 Su
2005/0036103 A1 2/2005 Bloch
2005/0067580 A1 3/2005 Fontaine
2005/0078274 A1 4/2005 Howell et al.
2005/0088365 A1 4/2005 Yamazaki et al.
2005/0201585 A1 9/2005 Jannard et al.
2005/0213026 A1 9/2005 Da Pra'
2005/0230596 A1 10/2005 Howell et al.
2005/0238194 A1 10/2005 Chornenky
2005/0239502 A1 10/2005 Swab et al.
2005/0248717 A1 11/2005 Howell et al.
2005/0248718 A1 11/2005 Howell et al.
2005/0248719 A1 11/2005 Howell et al.
2005/0264752 A1 12/2005 Howell et al.
2005/0278446 A1 12/2005 Bryant
2006/0001827 A1 1/2006 Howell et al.
2006/0003803 A1 1/2006 Thomas et al.
2006/0023158 A1 2/2006 Howell et al.
2006/0034478 A1 2/2006 Davenport
2006/0107822 A1 5/2006 Bowen
2006/0132382 A1 6/2006 Jannard
2007/0030442 A1 2/2007 Howell et al.
2007/0035830 A1 2/2007 Matveev et al.
2007/0046887 A1 3/2007 Howell et al.
2007/0055888 A1 3/2007 Miller et al.
2007/0098192 A1 5/2007 Sipkema
2007/0109491 A1 5/2007 Howell et al.
2007/0186330 A1 8/2007 Howell et al.
2007/0200927 A1 8/2007 Krenik
2007/0208531 A1 9/2007 Darley et al.
2007/0248238 A1 10/2007 Abreu et al.
2007/0270663 A1 11/2007 Ng et al.
2007/0271065 A1 11/2007 Gupta et al.
2007/0271116 A1 11/2007 Wysocki et al.
2007/0271387 A1 11/2007 Lydon et al.
2007/0279584 A1 12/2007 Howell et al.
2008/0062338 A1 3/2008 Herzog et al.
2008/0068559 A1 3/2008 Howell et al.
2008/0089545 A1 4/2008 Jannard et al.
2008/0100792 A1 5/2008 Blum et al.
2008/0144854 A1 6/2008 Abreu
2008/0151175 A1 6/2008 Gross
2008/0151179 A1 6/2008 Howell et al.
2008/0158506 A1 7/2008 Fuziak
2008/0211921 A1 9/2008 Sako et al.
2008/0218684 A1 9/2008 Howell et al.
2008/0262392 A1 10/2008 Ananny et al.
2008/0278678 A1 11/2008 Howell et al.
2009/0059159 A1 3/2009 Howell et al.
2009/0059381 A1 3/2009 Jannard
2009/0073375 A1 3/2009 Nakada
2009/0141233 A1 6/2009 Howell et al.
2009/0147215 A1 6/2009 Howell et al.
2009/0156128 A1 6/2009 Franson et al.
2009/0251660 A1 10/2009 Figler et al.
2009/0251661 A1 10/2009 Fuziak, Jr.
2009/0296044 A1 12/2009 Howell et al.
2010/0061579 A1 3/2010 Rickards et al.
2010/0079356 A1 4/2010 Hoellwarth
2010/0110368 A1 5/2010 Chaum
2010/0245754 A1 9/2010 Matsumoto et al.
2010/0296045 A1 11/2010 Agnoli et al.
2010/0309426 A1 12/2010 Howell et al.
2011/0102734 A1 5/2011 Howell et al.
2011/0164122 A1 7/2011 Hardacker
2011/0187990 A1 8/2011 Howell et al.
2011/0241976 A1 10/2011 Boger et al.
2011/0273365 A1 11/2011 West et al.
2012/0033061 A1 2/2012 Ko et al.
2012/0050668 A1 3/2012 Howell et al.
2012/0062357 A1 3/2012 Slamka
2012/0133885 A1 5/2012 Howell et al.
2012/0176580 A1 7/2012 Sonsino
2013/0072828 A1 3/2013 Sweis et al.
2013/0077175 A1 3/2013 Hotta et al.
2013/0143519 A1 6/2013 Doezema
2013/0172691 A1 7/2013 Tran
2013/0201440 A1 8/2013 Howell et al.
2013/0308089 A1 11/2013 Howell et al.
2014/0132913 A1 5/2014 Sweis et al.
2014/0176902 A1 6/2014 Sweis et al.
2014/0198293 A1 7/2014 Sweis et al.
2014/0226838 A1 8/2014 Wingate et al.
2014/0268008 A1 9/2014 Howell et al.
2014/0268013 A1 9/2014 Howell et al.
2014/0268017 A1 9/2014 Sweis et al.
2014/0361185 A1 12/2014 Howell et al.
2015/0085245 A1 3/2015 Howell et al.
2015/0230988 A1 8/2015 Chao et al.
2015/0253590 A1 9/2015 Howell et al.
2016/0246075 A9 8/2016 Howell et al.
2016/0302992 A1 10/2016 Sweis et al.
2017/0068117 A9 3/2017 Howell et al.
2017/0074721 A1 3/2017 Howell et al.
2017/0090219 A1 3/2017 Howell et al.
2017/0131575 A1 5/2017 Howell et al.
2017/0146829 A1 5/2017 Howell et al.
2017/0303187 A1 10/2017 Crouthamel et al.
2018/0122208 A1 5/2018 Peyrard
2018/0314079 A1 11/2018 Chao et al.
2018/0335650 A1 11/2018 Howell et al.
2018/0348050 A1 12/2018 Howell et al.
2019/0033622 A1 1/2019 Olgun et al.
2019/0033623 A1 1/2019 Howell et al.
2019/0187492 A1 6/2019 Howell et al.
2019/0272800 A1 9/2019 Tao et al.
2019/0278110 A1 9/2019 Howell et al.
2019/0285913 A1 9/2019 Howell et al.
2019/0310132 A1 10/2019 Howell et al.
2019/0318589 A1 10/2019 Howell et al.
2019/0369402 A1 12/2019 Woodman et al.
2019/0387351 A1 12/2019 Lyren et al.
2020/0012127 A1 1/2020 Howell et al.
2020/0364992 A1 11/2020 Howell et al.
2021/0026146 A1 1/2021 Harder et al.
2021/0271116 A1 9/2021 Howell et al.
2021/0364827 A9 11/2021 Howell et al.
2021/0364828 A1 11/2021 Howell et al.
2022/0011603 A1 1/2022 Howell et al.
2022/0054092 A1 2/2022 Howell et al.
2022/0178743 A1 6/2022 Howell et al.

FOREIGN PATENT DOCUMENTS

CN 89214222.7 3/1990
CN 90208199.3 11/1990
DE 10123226 A1 11/2002
EP 1134491 A2 9/2001
EP 1027626 B1 3/2016

(56) References Cited

FOREIGN PATENT DOCUMENTS

| | | | | |
|---|---|---|---|---|
| EP | 2290433 B1 | | 4/2016 | |
| FR | 2530039 A1 | | 1/1984 | |
| GB | 1467982 | | 3/1977 | |
| JP | 58-113912 | | 7/1983 | |
| JP | 58-113914 | | 7/1983 | |
| JP | 02-181722 | | 7/1990 | |
| JP | 09-017204 | | 1/1997 | |
| JP | 10-161072 | | 6/1998 | |
| JP | 2000-039595 | | 2/2000 | |
| JP | 2002 341059 A | | 11/2002 | |
| JP | 2005-151292 | | 6/2005 | |
| JP | 2005167902 | * | 6/2005 | .............. H04N 5/64 |
| TW | 484711 | | 6/2001 | |
| WO | WO 97/12205 A1 | | 4/1997 | |
| WO | WO 99/50706 A1 | | 10/1999 | |
| WO | WO 01/06298 A1 | | 1/2001 | |
| WO | WO 02/06881 A2 | | 1/2002 | |
| WO | WO 03/069394 A1 | | 8/2003 | |
| WO | WO 03/100368 A1 | | 12/2003 | |
| WO | WO 03/100503 A2 | | 12/2003 | |
| WO | WO 04/012477 A2 | | 2/2004 | |
| WO | WO 04/025554 A1 | | 3/2004 | |

OTHER PUBLICATIONS

Office Action for U.S. Appl. No. 16/049,120, dated Feb. 28, 2020.
Notice of Allowance for U.S. Appl. No. 16/049,120, dated Jun. 3, 2020.
Notice of Allowance for U.S. Appl. No. 16/049,120, dated Sep. 21, 2020.
Office Action for U.S. Appl. No. 16/127,957, dated Jun. 4, 2020.
Office Action for U.S. Appl. No. 16/127,957, dated Sep. 30, 2020.
Notice of Allowance for U.S. Appl. No. 16/127,957, dated Dec. 21, 2020.
Office Action for U.S. Appl. No. 16/183,969, dated Jun. 24, 2020.
Notice of Allowance for U.S. Appl. No. 16/182,969, dated Oct. 14, 2020.
Office Action for U.S. Appl. No. 16/429,181, dated Sep. 30, 2020.
Office Action for U.S. Appl. No. 16/424,018, dated Jun. 10, 2020.
Notice of Allowance for U.S. Appl. No. 16/424,018, dated Oct. 20, 2020.
Notice of Allowance for U.S. Appl. No. 16/049,120, dated Feb. 23, 2021.
Notice of Allowance for U.S. Appl. No. 16/049,120, dated Jun. 3, 2021.
Notice of Allowance for U.S. Appl. No. 16/574,254, dated Apr. 16, 2021.
Notice of Allowance for U.S. Appl. No. 16/574,254, dated Aug. 9, 2021.
Notice of Allowance for U.S. Appl. No. 16/182,969, dated Sep. 1, 2021.
Notice of Allowance for U.S. Appl. No. 16/429,181, dated Feb. 1, 2021.
Notice of Allowance for U.S. Appl. No. 16/429,181, dated Jun. 17, 2021.
Notice of Allowance for U.S. Appl. No. 16/429,181, dated Aug. 19, 2021.
Notice of Allowance for U.S. Appl. No. 16/424,018, dated Mar. 8, 2021.
Office Action for U.S. Appl. No. 16/424,018, dated May 13, 2021.
Office Action for U.S. Appl. No. 16/424,018, dated Sep. 3, 2021.
Notice of Allowance for U.S. Appl. No. 11/183,269, dated Dec. 10, 2010.
Office Action for U.S. Appl. No. 11/183,269, dated May 25, 2010.
Final Office Action for U.S. Appl. No. 11/183,269, dated Feb. 17, 2010.
Office Action for U.S. Appl. No. 11/183,269, dated Jun. 23, 2009.
Office Action for U.S. Appl. No. 11/183,269, dated Dec. 4, 2008.
Final Office Action for U.S. Appl. No. 11/183,269, dated Jun. 5, 2008.
Office Action for U.S. Appl. No. 11/183,269, dated Oct. 18, 2007.
Restriction Requirement for U.S. Appl. No. 11/183,269, dated Jun. 25, 2007.
Office Action for U.S. Appl. No. 13/085,402, dated Apr. 19, 2012.
Notice of Allowance for U.S. Appl. No. 13/085,402, dated Aug. 2, 2012.
Notice of Allowance for U.S. Appl. No. 13/085,402, dated Nov. 13, 2012.
Notice of Allowance for U.S. Appl. No. 13/085,402, dated Feb. 20, 2013.
Notice of Allowance for U.S. Appl. No. 13/085,402, dated Jun. 14, 2013.
Office Action for U.S. Appl. No. 13/955,336, dated Dec. 5, 2013.
Notice of Allowance for U.S. Appl. No. 13/955,336, dated Apr. 28, 2014.
Notice of Allowance for U.S. Appl. No. 13/955,336, dated Aug. 18, 2014.
Notice of Allowance for U.S. Appl. No. 13/955,336, dated Oct. 7, 2014.
Notice of Allowance for U.S. Appl. No. 13/955,336, dated Nov. 3, 2014.
Office Action for U.S. Appl. No. 14/557,409, dated Jun. 11, 2015.
Notice of Allowance for U.S. Appl. No. 14/557,409, dated Jan. 14, 2016.
Notice of Allowance for U.S. Appl. No. 14/557,409, dated Apr. 28, 2016.
Notice of Allowance for U.S. Appl. No. 14/557,409, dated Aug. 8, 2016.
Notice of Allowance for U.S. Appl. No. 14/557,409, dated Nov. 4, 2016.
Corrected Notice of Allowance for U.S. Appl. No. 14/557,409, dated Dec. 12, 2016.
Office Action for U.S. Appl. No. 15/375,423, dated Mar. 27, 2017.
Notice of Allowance for U.S. Appl. No. 15/375,423, dated Jul. 5, 2017.
Notice of Allowance for U.S. Appl. No. 15/375,423, dated Oct. 31, 2017.
Notice of Allowance for U.S. Appl. No. 15/375,423, dated Mar. 23, 2018.
Notice of Allowance for U.S. Appl. No. 15/375,423, dated Jul. 13, 2018.
Restriction Requirement for U.S. Appl. No. 11/580,222, dated Jun. 18, 2008.
Office Action for U.S. Appl. No. 11/580,222, dated Sep. 12, 2008.
Office Action for U.S. Appl. No. 11/580,222, dated Jan. 28, 2009.
Notice of Allowance for U.S. Appl. No. 11/580,222, dated Apr. 20, 2009.
U.S. Appl. No. 12/462,286, filed Jul. 31, 2009.
Restriction Requirement for U.S. Appl. No. 12/462,286, dated Sep. 17, 2010.
Office Action for U.S. Appl. No. 12/462,286, dated Jan. 13, 2011.
Notice of Allowance for U.S. Appl. No. 12/462,286, dated Jun. 24, 2011.
Notice of Allowance for U.S. Appl. No. 12/462,286, dated Nov. 22, 2011.
Office Action for U.S. Appl. No. 13/367,346, dated May 15, 2013.
Notice of Allowance for U.S. Appl. No. 13/367,346, dated Oct. 10, 2013.
Office Action for U.S. Appl. No. 13/367,346, dated Jan. 28, 2014.
Notice of Allowance for U.S. Appl. No. 13/367,346, dated Aug. 15, 2014.
Notice of Allowance for U.S. Appl. No. 13/367,346, dated Mar. 19, 2015.
Office Action for U.S. Appl. No. 14/715,501, dated Sep. 23, 2015.
Office Action for U.S. Appl. No. 14/715,501, dated Mar. 25, 2016.
Office Action for U.S. Appl. No. 14/715,501, dated Oct. 17, 2016.
Office Action for U.S. Appl. No. 14/715,501, dated Jul. 20, 2017.
Office Action for U.S. Appl. No. 14/715,501, dated Jan. 8, 2018.
Notice of Allowance for U.S. Appl. No. 14/715,501, dated May 9, 2018.
Notice of Allowance for U.S. Appl. No. 14/715,501, dated Sep. 11, 2018.
U.S. Appl. No. 12/806,312, filed Aug. 10, 2010.

(56) References Cited

OTHER PUBLICATIONS

Office Action for U.S. Appl. No. 12/806,312, dated Apr. 20, 2012.
Office Action for U.S. Appl. No. 12/806,312, dated Sep. 25, 2012.
Notice of Allowance for U.S. Appl. No. 12/806,312, dated Dec. 14, 2012.
Notice of Allowance for U.S. Appl. No. 12/806,312, dated Mar. 29, 2013.
U.S. Appl. No. 13/831,512, filed Mar. 14, 2013.
Office Action for U.S. Appl. No. 13/831,512, dated Jun. 4, 2013.
Office Action for U.S. Appl. No. 13/831,512, dated Feb. 24, 2014.
Office Action for U.S. Appl. No. 13/831,512, dated Jul. 2, 2014.
Office Action for U.S. Appl. No. 13/831,512, dated Jan. 21, 2015.
Office Action for U.S. Appl. No. 13/831,512, dated May 29, 2015.
Office Action for U.S. Appl. No. 13/831,512, dated Feb. 24, 2016.
Notice of Allowance for U.S. Appl. No. 13/831,512, dated Aug. 1, 2016.
Notice of Allowance for U.S. Appl. No. 13/831,512, dated Oct. 25, 2016.
Notice of Allowance for U.S. Appl. No. 13/831,512, dated Jan. 30, 2017.
Notice of Allowance for U.S. Appl. No. 13/831,512, dated Feb. 21, 2017.
Office Action for U.S. Appl. No. 15/396,428, dated Feb. 16, 2018.
Office Action for U.S. Appl. No. 15/396,428, dated Jun. 21, 2018.
Office Action for U.S. Appl. No. 15/409,723, dated Apr. 23, 2018.
Office Action for U.S. Appl. No. 15/409,723, dated Oct. 31, 2018.
Notice of Allowance for U.S. Appl. No. 11/183,256, dated Jan. 13, 2009.
Office Action for U.S. Appl. No. 11/183,256, dated Sep. 12, 2008.
Notice of Allowance for U.S. Appl. No. 11/183,256, dated Jul. 8, 2008.
Office Action for U.S. Appl. No. 11/183,256, dated Jan. 25, 2008.
Restriction Requirement for U.S. Appl. No. 11/183,256, dated Oct. 17, 2007.
Restriction Requirement for U.S. Appl. No. 11/183,256, dated Jun. 28, 2007.
Notice of Allowance for U.S. Appl. No. 11/546,685, dated Feb. 17, 2010.
Notice of Allowance for U.S. Appl. No. 11/546,685, dated Sep. 18, 2009.
Office Action for U.S. Appl. No. 11/546,685, dated Mar. 5, 2009.
Restriction Requirement for U.S. Appl. No. 11/546,685, dated Jan. 27, 2009.
U.S. Appl. No. 12/803,732, filed Jul. 1, 2010.
Notice of Allowance for U.S. Appl. No. 12/803,732, dated Sep. 1, 2011.
Notice of Allowance for U.S. Appl. No. 12/803,732, dated Nov. 15, 2011.
Notice of Allowance for U.S. Appl. No. 12/803,732, dated Jan. 30, 2012.
Notice of Allowance for U.S. Appl. No. 12/803,732, dated Apr. 17, 2012.
Notice of Allowance for U.S. Appl. No. 12/803,732, dated Jul. 5, 2012.
Notice of Allowance for U.S. Appl. No. 12/803,732, dated Oct. 19, 2012.
Notice of Allowance for U.S. Appl. No. 12/803,732, dated Feb. 13, 2013.
Office Action for U.S. Appl. No. 13/291,020, dated Jun. 4, 2012.
Office Action for U.S. Appl. No. 13/291,020, dated Apr. 23, 2012.
Notice of Allowance for U.S. Appl. No. 13/291,020, dated Aug. 2, 2012.
Notice of Allowance for U.S. Appl. No. 13/291,020, dated Nov. 2, 2012.
Notice of Allowance for U.S. Appl. No. 13/291,020, dated Feb. 11, 2013.
U.S. Appl. No. 13/831,419, filed Mar. 14, 2013.
Office Action for U.S. Appl. No. 13/831,419, dated Apr. 27, 2015.
Office Action for U.S. Appl. No. 13/831,419, dated Aug. 12, 2015.
Notice of Allowance for U.S. Appl. No. 13/831,419, dated Jan. 28, 2016.
Office Action for U.S. Appl. No. 13/831,419, dated Apr. 28, 2016.
Office Action for U.S. Appl. No. 13/831,419, dated Nov. 17, 2016.
Office Action for U.S. Appl. No. 13/831,419, dated Feb. 1, 2017.
Notice of Allowance for U.S. Appl. No. 13/831,419, dated Jun. 6, 2017.
Office Action for U.S. Appl. No. 13/831,419, dated Oct. 20, 2017.
Office Action for U.S. Appl. No. 13/831,419, dated Jun. 8, 2018.
U.S. Appl. No. 13/831,445, filed Mar. 14, 2013.
Office Action for U.S. Appl. No. 13/831,445, dated Feb. 20, 2015.
Notice of Allowance for U.S. Appl. No. 13/831,445, dated Oct. 21, 2016.
Notice of Allowance for U.S. Appl. No. 13/831,445, dated Jan. 9, 2017.
Corrected Notice of Allowance for U.S. Appl. No. 13/831,445, dated Jan. 23, 2017.
Notice of Allowance for U.S. Appl. No. 13/831,445, dated Apr. 25, 2017.
Office Action for U.S. Appl. No. 13/831,445, dated Feb. 6, 2018.
Notice of Allowance for U.S. Appl. No. 13/831,445, dated Aug. 8, 2018.
"±1.5g Dual Axis Micromachined Accelerometer", Freescale Semiconductor, Inc., Motorola Semiconductor Technical Data, MMA6260Q, Jun. 2004, pp. 1-7.
"APA Announces Shipment of the SunUV™ Personal UV Monitor", Press Release, Nov. 7, 2003, pp. 1-3.
"Camera Specs Take Candid Snaps", BBC News, Sep. 18, 2003, pp. 1-3.
"Cardo Wireless Attaching Clips and Wearing Headset", Cardo Systems, Inc., http://www.cardowireless.com/clips.php, downloaded Nov. 27, 2004, pp. 1-3.
"Environmental Health Criteria 14: Ultraviolet Radiation", International Programme on Chemical Safety, World Health Organization Geneva, 1979 http://www.ichem.org., pp. 1-102.
"Exclusive Media Event Marks Debut of OAKLEY THUMP: World's First Digital Audio Eyewear", Oakley Investor Relations, Press Release, Nov. 15, 2004, pp. 1-2.
"Eyetop", Product-Features, eyetop eyewear, eyetop belt worn, http://www.eyetop.net/products/eyetop/features.asp., downloaded Nov. 6, 2003, pp. 1-2.
"Heart Rate Monitors", http://www.healthgoods.com, downloaded Dec. 4, 2004.
"How is the UV Index Calculated", SunWise Program, U.S. Environmental Protection Agency, http://www.epa.gov/sunwise/uvcalc.html, downloaded Oct. 14, 2004, pp. 1-2.
"Industrial UV Measurements", APA Optics, Inc., http://www.apaoptics.com/uv/, downloaded Jul. 12, 2004, p. 1.
"Motorola and Oakley Introduce First Bluetooth Sunglasses-Cutting Edge RAZRWire Line Offers Consumers On-The-Go Connections", Motorola Mediacenter—Press Release, Feb. 14, 2005, pp. 1-2.
"Oakley Thump: Sunglasses Meet MP3 Player", with image, http://news.designtechnica.com/article4665.html, Jul. 13, 2004.
"Personal UV monitor," Optics.org, http://optics.org/articles/news/6/6/7/1 (downloaded Dec. 20, 2003), Jun. 9, 2000, pp. 1-2.
"SafeSun Personal Ultraviolet Light Meter", http://healthchecksystems.com/safesun.htm, downloaded Jul. 12, 2004, pp. 1-4.
"SafeSun Personal UV Meter", Introduction, Optix Tech Inc., http://www.safesun.com, downloaded Feb. 5, 2004, pp. 1-2.
SafeSun Personal UV Meter, features, Optix Tech Inc., http://www.safesun.com/features.html, downloaded May 1, 2004, pp. 1-2.
"Sharper Image—The FM Pedometer", e-Corporate Gifts.com, http://www.e-corporategifts.com/sr353.html, downloaded Jan. 22, 2005, pp. 1-2.
"Sun UV™ Personal UV Monitor", APA Optics, Inc., http://www.apaoptics.com/sunuv/uvfacts.html, downloaded Dec. 20, 2003, pp. 1-3.
"Ultraviolet Light and Sunglasses", Oberon's Frequently Asked Questions, http://www.oberoncompany.com/OBEnglish/FAQUV.html, downloaded Feb. 5, 2004, pp. 1-2.

(56) References Cited

OTHER PUBLICATIONS

"Ultraviolet Light Sensor", Barrett & Associates Engineering, http://www.barrettengineering.com/project_uvs.htm, downloaded Feb. 5, 2004, pp. 1-3.
"Ultraviolet Radiation (UVR)", Forum North, Ontario Ministry of Labour, http://www3.mb.sympatico.ca/~ericc/ULTRAVIOLET%20RADIATION.htm, downloaded Feb. 5, 2004, pp. 1-6.
"What Are Grippies?", Gripping Eyewear, Inc., http://www.grippingeyewear.com/whatare.html, downloaded Nov. 2, 2005.
"With Racing Heart", Skaloud et al., GPS World, Oct. 1, 2001, http://www.gpsworld.com/gpsworld/content/printContentPopup.jsp?id=1805, pp. 1-5.
Abrisa Product Information: Cold Mirrors, Abrisa, Jun. 2001, p. 1.
Abrisa Product Information: Commercial Hot Mirror, Abrisa, Jun. 2001, p. 1.
Alps Spectacle, Air Conduction Glass, Bone Conduction Glass, http://www.alps-inter.com/spec.htm, downloaded Dec. 10, 2003, pp. 1-2.
Altimeter and Compass Watches, http://store.yahoo.com/snowshack/altimeter-watches.html, downloaded May 3, 2004, pp. 1-2.
Bone Conduction Headgear HG16 Series, "Voiceducer," http://www.temco-j.co.jp/html/English/HG16.html, downloaded Dec. 10, 2003, pp. 1-3.
Carnoy, David, "The Ultimate MP3 Player for Athletes? Could be.", CNET Reviews, May 14, 2004, pp. 1-4.
Clifford, Michelle A., "Accelerometers Jump into the Consumer Goods Market", Sensors Online, http://www.sensorsmag.com, Aug. 2004.
Comfees.Com, Adjustable Sports Band Style No. 1243, http://shop.store.yahoo.com/comfees/adsportbansty.html, downloaded Apr. 18, 2003, pp. 1-2.
Cool Last Minute Gift Ideas!, UltimateFatBurner Reviews and Articles, http://www.ultimatefatburner.com/gift-ideas.html, downloaded May 10, 2005, pp. 1-3.
Dickie et al. "Eye Contact Sensing Glasses for Attention-Sensitive Wearable Video Blogging," Human Media Lab, Queen's University, Kingston, ON K7L 3N6, Canada, est. Apr. 2004, pp. 1-2.
Dixen, Brian, "ear-catching", Supertesten, Mobil, Apr. 2003 (estimated), pp. 37-41.
Global Solar UV Index, A Practical Guide, World Health Organization, 2002, pp. 1-28.
Grobart, Sam, "Digit-Sizing Your Computer Data", News Article, Sep. 2004, p. 1.
Life Monitor V1.1, Rhusoft Technologies Inc., http://www.rhusoft.com/lifemonitor/, Mar. 1, 2003, pp. 1-6.
Manes, Stephen, "Xtreme Cam", Forbes Magazine, Sep. 5, 2005, p. 96.
Mio, Physical, http://www.gophysical.com/, downloaded Jan. 27, 2004, 5 pages.
Monitoring Athletes Performance—2002 Winter Olympic News from KSL, Jan. 23, 2002, http://2002.ksl.com/news-3885i, pp. 1-3.
NIWA, "UV Index Information", http://www.niwa.cri.nz/services/uvozone/uvi-info, downloaded Jul. 15, 2004, pp. 1-2.
NuVision 60GX Steroscopic Wireless Glasses, Product Information, NuVision by MacNaughton, c. 1997, MacNaughton, Inc., pp. 1-2.
Pärkkä, Juha, et al., "A Wireless Wellness Monitor for Personal Weight Management", VTT Information Technology, Tampere, Finland, *Nov. 2000*, p. 1.
Pedometer, Model HJ-112, Omron Instruction Manual, Omron Healthcare, Inc., 2003, pp. 1-27.
PNY Announces Executive Attaché USB 2.0 Flash Drive and Pen Series, Press Release, PNY Technologies, Las Vegas, Jan. 8, 2004, pp. 1-2.
PNY Technologies, "Executive Attaché" http://www.pny.com/products/flash/execattache.asp downloaded Nov. 16, 2005.
Polar WM41 and 42 weight management monitor, http://www.simplysports/polar/weight_management/wm41-42.htm, downloaded Jan. 28, 2004, pp. 1-3.
Questions Answers, Pedometer.com, http://www.pedometer.com, downloaded May 5, 2005.
Razrwire, copyright Motorola, Inc., Jul. 2005, 1 page.
SafeSun Personal UV Meter, Scientific Data, Optix Tech Inc., http://www.safesun.com/scientific.html, downloaded May 1, 2004, pp. 1-3.
SafeSun Sensor, User's Manual, Optix Tech Inc., Jun. 1998, 2 pages.
SafeSun, Personal UV Meter, "Technical Specifications", Optix Tech Inc., http://www.safesun.com/technical.html, downloaded Jul. 12, 2004, pp. 1-2.
SafeSun, Personal UV Meter, Experiments, Optix Tech Inc., http://www.safesun.com/experiments.html, downloaded Feb. 5, 2004, pp. 1-2.
Shades of Fun, Blinking Light Glasses, http://www.shadesoffun.com/Nov/Novpgs-14.html, downloaded Jul. 9, 2005, pp. 1-4.
SportLine Fitness Pedometer—Model 360, UltimateFatBurner Superstore, http://www.ultimatefatburner-store.com/ac_004.html, downloaded May 10, 2005, pp. 1-2.
Steele, Bonnie G. et al., "Bodies in motion: Monitoring daily activity and exercise with motion sensors in people with chronic pulmonary disease", VA Research & Development, Journal of Rehabilitation Research & Development, vol. 40, No. 5, Sep./Oct. 2003, Supplement 2, pp. 45-58.
Stevens, Kathy, "Should I Use a Pedometer When I Walk?", Healtheon/WebMD, Apr. 14, 2000.
Sundgot, Jørgen "2nd-gen Motorola Bluetooth headset", InfoSync World, Mar. 1, 2003, http://www.infosync.no/news/2002/n/2841.html, pp. 1-2.
SunSensors, Segan Industries, Inc., http://www.segan-ind.com/sunsensor.htm, downloaded Feb. 5, 2004, pp. 1-3.
SunUV™, Personal UV Monitor User's Guide, APA Optics, Inc., 2003 pp. 1-52.
SunUV™, Personal UV Monitor, APA Optics, Inc., http://www.apaoptics.com/sunuv/models.html, downloaded Dec. 20, 2003.
Talking Pedometer, Sportline, Inc., *Jun. 2001* (Possibly earlier), 1 page.
The unofficial Elsa 3D Revelator page, Dec. 30, 1999, pp. 1-15.
Top Silicon PIN Photodiode, PD93-21C, Technical Data Sheet, Everlight Electronics Co., Ltd., 2004, pp. 1-9.
UV Light Meter, UVA and UVB measurement, UV-340, Instruction Manual, Lutron, *Jun. 2003* (estimated), pp. 1-5.
UV-Smart, UVA/B Monitor, Model EC-960-PW, Instruction Manual, Tanita Corporation of America, Inc., downloaded Nov. 16, 2001.
Vitaminder Personal Carb Counter, http://www.auravita.com/products/AURA/ORBU11420.asp. Downloaded Nov. 15, 2005, pp. 1-4.
Yamada et al. "Development of an eye-movement analyser possessing functions for wireless transmission and autocalibration," Med. Biol. Eng. Comput., No. 28, v.4, Jul. 28, 1990, http://link.springer.com/article/10.1007%2FBF02446149?LI=true, pp. 1-2.
Notice of Allowance for U.S. Appl. No. 16/049,120, dated Sep. 20, 2021.
Notice of Allowance for U.S. Appl. No. 16/429,181, dated Oct. 4, 2021.
Notice of Allowance for U.S. Appl. No. 16/424,018, dated Nov. 2, 2021.
Office Action for U.S. Appl. No. 17/484,080, dated Jan. 21, 2022.
Notice of Allowance for U.S. Appl. No. 16/182,969, dated Jan. 28, 2022.
Office Action for U.S. Appl. No. 16/429,181, dated Feb. 9, 2022.
Office Action for U.S. Appl. No. 16/424,018, dated Jan. 24, 2022.
Notice of Allowance for U.S. Appl. No. 17/484,080, dated May 31, 2022.
Notice of Allowance for U.S. Appl. No. 17/395,509, dated May 6, 2022.

* cited by examiner

EYEWEAR SUPPORTING EMBEDDED ELECTRONIC COMPONENTS FOR AUDIO SUPPORT

CROSS-REFERENCE TO RELATED APPLICATIONS

This application is a continuation of U.S. patent application Ser. No. 16/574,254, filed Sep. 18, 2019, and entitled "EYEWEAR SUPPORTING EMBEDDED AND TETHERED ELECTRONIC COMPONENTS," now U.S. Pat. No. 11,204,512, which is hereby incorporated herein by reference, which in turn is a continuation of U.S. patent application Ser. No. 16/049,120, filed Jul. 30, 2018, and entitled "EYEWEAR SUPPORTING EMBEDDED ELECTRONIC COMPONENTS," now U.S. Pat. No. 11,243,416 which is hereby incorporated herein by reference, which in turn is a continuation of U.S. patent application Ser. No. 15/375,423, filed Dec. 12, 2016, and entitled "EYEWEAR SUPPORTING EMBEDDED ELECTRONIC COMPONENTS," now U.S. Pat. No. 10,061,144, which is hereby incorporated herein by reference, which in turn is a continuation of U.S. patent application Ser. No. 14/557,409, filed Dec. 1, 2014, and entitled "EYEWEAR SUPPORTING EMBEDDED ELECTRONIC COMPONENTS," now U.S. Pat. No. 9,547,184, which is hereby incorporated herein by reference, which in turn is a continuation of U.S. patent application Ser. No. 13/955,336, filed Jul. 31, 2013, and entitled "EYEWEAR SUPPORTING BONE CONDUCTING SPEAKER," now U.S. Pat. No. 8,905,542, which is hereby incorporated herein by reference, which in turn is a continuation of U.S. patent application Ser. No. 13/085,402, filed Apr. 12, 2011, and entitled "EYEWEAR SUPPORTING AFTER-MARKET ELECTRICAL COMPONENTS," now U.S. Pat. No. 8,500,271, which is hereby incorporated by reference, which in turn is a continuation of U.S. patent application Ser. No. 11/183,269, filed Jul. 15, 2005, and entitled "EYEWEAR SUPPORTING AFTER-MARKET ELECTRICAL COMPONENTS," now U.S. Pat. No. 7,922,321, which is hereby incorporated herein by reference, which in turn is a continuation-in-part of U.S. patent application Ser. No. 10/964,011, filed Oct. 12, 2004, and entitled "TETHERED ELECTRICAL COMPONENTS FOR EYEGLASSES," now U.S. Pat. No. 7,192,136, which is hereby incorporated herein by reference, which in turn claims priority to each of: (i) U.S. Provisional Patent Application No. 60/509,631, filed Oct. 9, 2003, and entitled "TETHERED ELECTRICAL COMPONENTS FOR EYEGLASSES," which is hereby incorporated herein by reference; (ii) U.S. Provisional Patent Application No. 60/527,565, filed Dec. 8, 2003, and entitled "ADAPTABLE COMMUNICATION TECHNIQUES FOR ELECTRONIC DEVICES," which is hereby incorporated herein by reference; (iii) U.S. Provisional Patent Application No. 60/562,798, filed Apr. 15, 2004, entitled "EYEWEAR WITH ULTRAVIOLET DETECTION SYSTEM," and which is hereby incorporated herein by reference; (iv) U.S. Provisional Patent Application No. 60/583,169, filed Jun. 26, 2004, entitled "ELECTRICAL COMPONENTS FOR USE WITH EYEWEAR, AND METHODS THEREFOR," and which is hereby incorporated herein by reference; (v) U.S. Provisional Patent Application No. 60/592,045, filed Jul. 28, 2004, entitled "EYEGLASSES WITH A CLOCK OR OTHER ELECTRICAL COMPONENT," and which is hereby incorporated herein by reference; and (vi) U.S. Provisional Patent Application No. 60/605,191, filed Aug. 28, 2004, entitled "ELECTRICAL COMPONENTS FOR USE WITH EYEWEAR, AND METHODS THEREFOR," and which is hereby incorporated herein by reference.

This application, by way of U.S. patent application Ser. No. 11/183,269, also claims priority to each of: (i) U.S. Provisional Patent Application No. 60/592,045, filed Jul. 28, 2004, entitled "EYEGLASSES WITH A CLOCK OR OTHER ELECTRICAL COMPONENT," and which is hereby incorporated herein by reference; (ii) U.S. Provisional Patent Application No. 60/605,191, filed Aug. 28, 2004, entitled "ELECTRICAL COMPONENTS FOR USE WITH EYEWEAR, AND METHODS THEREFOR," and which is hereby incorporated herein by reference; (iii) U.S. Provisional Patent Application No. 60/618,107, filed Oct. 12, 2004, and entitled "TETHERED ELECTRICAL COMPONENTS FOR EYEGLASSES," which is hereby incorporated herein by reference; (iv) U.S. Provisional Patent Application No. 60/620,238, filed Oct. 18, 2004, entitled "EYEGLASSES WITH HEARING ENHANCED AND OTHER AUDIO SIGNAL-GENERATING CAPABILITIES," and which is hereby incorporated herein by reference; (v) U.S. Provisional Patent Application No. 60/647,836, filed Jan. 31, 2005, and entitled "EYEGLASSES WITH HEART RATE MONITOR," which is hereby incorporated herein by reference; and (vi) U.S. Provisional Patent Application No. 60/647,826, filed Jan. 31, 2005, and entitled "EYEWEAR WITH ELECTRICAL COMPONENTS," which is hereby incorporated herein by reference.

In addition, this application is related to each of: (i) U.S. patent application Ser. No. 10/822,218, filed Apr. 12, 2004, and entitled "EYEGLASSES FOR WIRELESS COMMUNICATIONS," now U.S. Pat. No. 7,792,552, which is hereby incorporated herein by reference; (ii) U.S. patent application Ser. No. 10/964,011, filed Oct. 12, 2004, and entitled "TETHERED ELECTRICAL COMPONENTS FOR EYEGLASSES," now U.S. Pat. No. 7,192,136, which is hereby incorporated herein by reference; (iii) U.S. patent application Ser. No. 11/006,343, filed Dec. 7, 2004, and entitled "ADAPTABLE COMMUNICATION TECHNIQUES FOR ELECTRONIC DEVICES," now U.S. Pat. No. 7,116,976, which is hereby incorporated herein by reference; (iv) U.S. patent application Ser. No. 11/078,855, filed Mar. 11, 2005, and entitled "EYEWEAR WITH RADIATION DETECTION SYSTEM," now U.S. Pat. No. 7,500,746, which is hereby incorporated herein by reference; (v) U.S. patent application Ser. No. 11/078,857, filed Mar. 11, 2005, and entitled "RADIATION MONITORING SYSTEM," which is hereby incorporated herein by reference; (vi) U.S. patent application Ser. No. 11/183,283, filed Jul. 15, 2005, and entitled "EVENT EYEGLASSES," which is hereby incorporated herein by reference; (vii) U.S. patent application Ser. No. 11/183,262, filed Jul. 15, 2005, and entitled "EYEGLASSES WITH HEARING ENHANCED AND OTHER AUDIO SIGNAL-GENERATING CAPABILITIES," now U.S. Pat. No. 7,760,898, which is hereby incorporated herein by reference; (viii) U.S. patent application Ser. No. 11/183,256, filed Jul. 15, 2005, and entitled "EYEGLASSES WITH ELECTRICAL COMPONENTS," now U.S. Pat. No. 7,500,747, which is hereby incorporated herein by reference; (ix) U.S. patent application Ser. No. 11/183,263, filed Jul. 15, 2005, and entitled "EYEGLASSES WITH A CLOCK OR OTHER ELECTRICAL COMPONENT," now U.S. Pat. No. 7,380,936, which is hereby incorporated herein by reference; and (x) U.S. patent application Ser. No. 11/183,276, filed Jul. 15, 2005, and entitled "EYEGLASSES WITH ACTIVITY MONITORING," now U.S. Pat. No. 7,255,437, which is hereby incorporated herein by reference.

BACKGROUND OF THE INVENTION

Traditionally, eyeglasses have not contained or made any use of electrical components. In recent years, attempts to include electrical components within eyeglasses have had limited success. Even incorporating a small electrical component, such as a microphone, into an eyeglass frame may not be a simple task because, for example, of the necessary electrical connections with the electrical component. Clearly, larger scale electrical components would be more difficult to be provided in or attached to eyeglass frames. Many eyeglasses frames tend to be very compact and lightweight and thus may not have a lot of space for electrical components. Moreover, since eyeglass frames are often fashionable items whose designs are important, there are substantial design tradeoffs involved with providing or attaching electrical components to eyeglass frames.

Accordingly, there remains a need for improved approaches to facilitate use of electrical components with eyeglasses.

SUMMARY

Generally speaking, the invention pertains to techniques for providing eyewear with electrical components. The electrical components can provide electrical technology to eyewear (e.g., eyeglasses) without having to substantially compromise aesthetic design principles of the eyewear. Often, the electrical components can be attached to the eyewear as an after-market enhancement. The electrical components can operate independently or together with other electrical components provided elsewhere.

The electrical components can support signal capturing, signal processing, signal transmission, signal display, signal storage and/or power provision. The signals can be, for example, analog or digital signals. The electrical components can, for example, be used to provide audio output and/or audio pick-up. The electrical components may include and/or control one or more sensors to monitor and/or signal the conditions of a user of the eyewear. The electrical components may also include and/or control one or more operation indicators to signal operational status of at least some other electrical components. In addition, the electrical components can be or pertain to a circuit board or module, which includes a plurality of electrical components.

The invention can be implemented in numerous ways, including a method, system, device, apparatus, and a computer readable medium. Several embodiments of the invention are discussed below.

In one embodiment, the one or more electrical components support audio capabilities allowing a user to hear audio output. In another embodiment, the one or more electrical components support communication capabilities allowing a user to communicate with a communication device in a hands-free manner.

Embodiments can also relate to tethered electrical components for eyeglasses. According to a number of embodiments of the invention, an apparatus having one or more external electrical components can be tethered, through a tethering mechanism, to one or more electrical components within or attached to a pair of eyeglasses. The one or more external electrical components being tethered by the tethering mechanism, such as a cable or a cord, may be referred to herein as the 'tethered electrical components.' While the one or more electrical components in or attached to the glasses can be referred to herein as 'eyeglass electrical components.'

Tethered electrical components, alone or in combination with eyeglass electrical components can be used for a variety of different applications and uses. Examples of applications and uses include a wireless communication system, a radiation monitoring system, a health monitoring system or a fitness monitoring system. In one embodiment, the tethered electrical components can support wireless communication capabilities allowing a user to communicate with a communication device in a wireless and hands-free manner. In another embodiment, the tethered electrical components can support radiation monitoring such as for monitoring ultraviolet or solar radiation for a wearer of eyeglasses. In still other embodiments, the tethered electrical components can support health or fitness monitoring for a wearer of eyeglasses.

The tethered electrical components can support signal capturing, signal processing, signal transmission, data acquisition, data processing, and/or data storage. For example, the tethered electrical components can, for example, include a power source and/or an electronic controller. The tethered electrical components may also include and/or control one or more operation indicators to signal operational status of the tethered electrical components. In addition, the tethered electrical components may also include and/or control one or more sensors to monitor and/or signal conditions of users.

In other embodiments, a pair of glasses can be provided with one or more embedded or partially embedded electrical components. In a number of the embodiments, with one or more electrical components in the glasses, the electrical components are much easier to operate. For example, you do not have to take an electronic device out from your pocket to use it. The electronic device may already be in your glasses, and you just have to turn it on.

In one embodiment, the electrical components in a pair of glasses can include a speaker and a connector, both at least partially embedded in the glasses. The connector can be a standard or a non-standard connector. The connector can be a male or a female connector. The connector can be at different location on the glasses. For example, the connector can be at the end of a temple of the glasses. The speaker is electrically coupled to the connector. The connection can be with a printed-circuit board in the glasses. The printed-circuit board can be a flexible or rigid printed-circuit board. With the connector, the glasses can access audio signals from an external device, such as a multimedia asset player.

In another embodiment, a pair of glasses can include a storage medium. The memory device can be coupled to another electronic instrument external to the glasses through one or more connectors at the glasses. Such a pair of glasses allows file storage in the glasses.

In yet another embodiment, a pair of glasses can include a speaker, a coder/decoder, a processor and a storage medium. The pair of glasses can serve as a multimedia asset player, such as a MP3 player. There can also be a connector at the glasses to facilitate the transfer of multimedia assets.

Instead of just receiving signals, in one embodiment, a pair of glasses can have a microphone and a wireless transceiver. The pair of glasses allows a user to engage in wireless communication.

In another embodiment, a pair of glasses with wireless coupling capabilities can include a preference indicator. The indicator allows a user to indicate the user's preference regarding, for example, what is being output by the glasses. There can be a radio embedded in the glasses. If the user provides her preference on, for example, the song being played, her preferences can be remotely tracked by a third party. There can be a multimedia asset player in the glasses, with the multimedia assets wirelessly received by the glasses. If the user provides her preference on the assets being played, these assets can be stored in a storage medium in the glasses for later consumption.

In yet another embodiment, there can be one or more knobs on the glasses, for controlling operations of electrical components in the glasses. The location and the number of knobs vary depending on the applications.

In a further embodiment, the glasses can include a camera. The camera can capture what the user sees. In other words, what the user sees can be what the user gets. Images captured can be stored at a remote site. This can be achieved, for example, by downloading the images to a storage device using a connector at the glasses. Or, if the glasses have wirelessly connection capabilities, the images can be wirelessly transmitted to the remote site. The glasses with a camera allow the user wearing the glasses to be remotely control.

In still another embodiment, a pair of glasses can include one or more sensors. There can be different types of sensors. For example, one sensor can be used to determine if the pair of glasses is being worn. Another sensor can be used to detect an environmental condition, such as the amount of ultraviolet radiation in the vicinity of the glasses. Yet another sensor can be used to detect a condition of the user.

Different embodiments of glasses that can be applied to multiple functions. With a user wearing such a pair of glasses, it would be more difficult for a third party to know the specific function or reason the user is wearing the glasses for. Regarding the locations of the electrical components for the multiple functions, different embodiments range from all of the components in the glasses to the glasses primarily functioning as a headset.

In one embodiment, a pair of glasses can be provided with hearing enhancement and other signal generating capabilities. Most people today do not desire to wear hearing aids or hearing enhancement devices. One major reason could be that they do not want to be perceived as being old. In this embodiment, a pair of glasses, with speakers, has hearing enhancement capabilities. With the speakers in the glasses, the speakers can be positioned in close proximity to the ears of the users. In addition to having hearing enhancement capabilities, the glasses also include at least one electrical component to generate other audio signals. For example, the glasses can play music. Such a hearing-enhanced device can remove the associated stigma of conventional hearing aids. A third party may not be able to tell whether the user is wearing the glasses to hear music or whether the user is wearing the glasses to have his hearing enhanced.

In one embodiment, a pair of glasses can include at least one speaker and typically two. Each speaker is in one of the temples of the glasses, closer to the corresponding hinge of that temple than the other end (the free end) of the temple. There can also be a tube extending from the speaker to guide sound generated by the speaker to the corresponding ear of the user. The tube can be rotated, such as from behind the temple to being downward at an angle towards the ear of the user. The two speakers can also be electrically connected by a conductor, with the conductor linking the speakers through the lens holders of the glasses. The glasses can include a microphone, which can be located close to one of the hinges of the glasses. In another embodiment, there can be two microphones. The one or more microphones can be directional for receiving signals in specific directions.

In another embodiment, to reduce the weight of the glasses and to enhance the ease of aesthetic design of the glasses, some of the hearing enhanced electronics are not in the glasses. Instead they are in a portable device carried by the user. The portable device is electronically coupled to the glasses wirelessly or through a wired connection.

In another embodiment, the glasses can include a wireless transceiver. In this embodiment, the microphone does not have to be at the glasses. The microphone can also be wirelessly coupled to the glasses and/or the portable device.

In another embodiment, the glasses can include a connector for at least one wire to be connected to the glasses. The connector can be at the free end of one of the temples of the glasses, or the connector can be at another location at the glasses. Different types of standard or non-standard connectors can be used. In the wired embodiment, the microphone also does not have to be at the glasses. The microphone can be mounted on the wire that connects the glasses to the portable device.

The glasses can have a number of hearing enhancing capabilities. In one embodiment, the hearing enhancement is for those with mild or medium hearing loss. In another embodiment, the hearing enhancement is for those with severe hearing loss.

One hearing enhancement functionality is frequency-dependent amplification. For example, higher frequencies are amplified more than lower frequencies; certain frequency bands are not amplified; or the frequencies to be amplified are tailored to the user.

To tailor the amplification to a user, hearing enhancement capabilities can be calibrated against the user. The calibration can be done by the user or by a third party. The calibration can be performed through a website, which guides the user through the process. The calibrated frequency hearing profile of the user can be stored. Such calibration can be performed periodically, such as once a year.

The glasses may also include at least one electrical component for power management. Hearing enhancement does not have to be fully functional at all times. In one embodiment, the hearing enhancement function is on demand. The enhancement can go into a sleep mode when there is no audio fluctuation beyond a certain threshold in the ambient environment. The amplification can also depend on the ambient noise level.

In other embodiments, the glasses can also have at least one electrical component to generate other audio signals. These other audio signals do not originate from signals captured by the microphone(s) in the glasses. These signals can originate from relatively private sources or public sources.

In one example of signals originating from private sources, the glasses can include the electrical components to operate as a phone. The glasses can pick up signals from a caller, and the speaker(s) in the glasses re-generate the audio signals of the caller. Again some of the electrical components of the phone can be in a portable device wired or wirelessly coupled to the glasses. There can be an indicator indicating an incoming call. The indicator could be a signal light.

Regarding processing an incoming call, in one embodiment, if the user wants to pick up the incoming call, the hearing enhancement mode can be deactivated. In another embodiment, one or more functionalities of the hearing enhancement mode can operate on the incoming call. There can also be noise cancellation functionalities, such as through two directional microphones, one pointing at the user's mouth, and the other pointing away.

In another example of signals originating from private sources, the glasses can include the electrical components to operate as a player. Again some of the electrical components of the player can be in a portable device wired or wirelessly coupled to the glasses. The player can be a MP3 or other multimedia asset player. The player can be a radio. The radio can be personalized to the user, for example, by being aware of the songs the user prefers. In one embodiment, when the user starts the player, the hearing enhancement mode can be deactivated. In another embodiment, different capabilities of the hearing enhancement mode operate on the signals from the player.

In yet another embodiment, the other audio signals are from public sources. For example, the glasses can be coupled to a conference microphone or a theater speaker wirelessly, and thus be capable of capturing and enhancing the signals from those sources. Again, the coupling can be through a portable device wired or wirelessly coupled to the glasses.

There can be one or more control knobs or switches at the glasses or at a portable device coupled to the glasses. Different types of switches are applicable for different applications.

Regarding power sources for the electrical components in the glasses, in one embodiment, the power sources, such as batteries, are in the glasses. In another embodiment, the power sources are located outside the glasses, but connected to the glasses through an adapter. In yet another embodiment, the power sources are in a portable device electrically connected to the glasses, and the power sources can be rechargeable.

A number of embodiments have been described with glasses having hearing enhanced and/or other audio signal generation capabilities. In one embodiment, the glasses function as a headset and are adaptable for different applications, such as hearing enhancement, communication (e.g. phone operation) and listening to audio signals (e.g. MP3 operation). When a person is using the headset, a third party again may not be able to tell whether the person is having his hearing enhanced, or listening to other audio signals generated.

Additional benefits of having glasses as headsets are that eyeglasses frames tend to be very compact and lightweight and thus have little space for electrical components. With at least a portion of the electrical components for a system, such as a hearing enhancement system, outside the glasses, additional weights required for the system on the glasses are reduced. Further, eyeglass frames are often fashionable items whose designs are important. By reducing the amount of electrical components, and in turn, space required in the glasses, design tradeoffs required due to having electrical components in the eyeglass frames are reduced.

In a first example of glasses functioning as a headset, the glasses can include a connector and two speakers, one at each temple, both speakers electrically connected through the glasses. The connector can be located at the free end of one of the temples. The connector can be used to receive stereo signals, such as from an MP3 player. Based on a headset-to-phone cord, the speakers in the headset can also be used to receive a phone call.

In a second example of the glasses functioning as a headset, the glasses can include two connectors. Each connector can be at one of the temple tips of the glasses, and each connector can be connected to the speaker at that temple. To send audio signals to the speakers, the two connectors can be tethered and connected together through a connector external to the glasses. The external connector can then operate as the connector in the first example. Regarding other embodiments, the speakers can be in the temples, such as closer to their corresponding lens holders than the free end of the temples. In another example, the speakers can be in the region of the temple tips. The speakers can be embedded in the glasses or can be external to the glasses on stubs or extensions. For speakers that are embedded in the glasses, each speaker can have a tube extending towards an ear to guide audio signals. At the end of each tube, there can be an ear bud for inserting into the ear. The tubes can be permanently attached to the glasses, or each can be attachable to the glasses. The tubes or the stubs can also be retractable and extendable, and the position of the tubes or the stubs can be adjustable.

In a number of embodiments, embodiments can pertain to eyewear having an activity monitoring capability. Activity, such as motion, steps or distance, can be measured by an activity detector. The measured activity can then be used in providing activity-related information to a user of the eyewear. Advantageously, the user of the eyewear is able to easily monitor their degree of activity, without the need to carry a separate electrical device.

In one embodiment, the activity monitoring is provided by a pedometer. A pedometer can also be referred to as a pedometer system herein.

In one embodiment, all components for activity monitoring can be integrated with eyewear (e.g., eyeglasses), such as a frame (e.g., a temple of the frame) of the eyewear. As an example, the eyewear normally includes a pair of temples, and the components for activity monitoring can be embedded within one or both of the temples. In one implementation, all components for activity monitoring are integrated into a single temple of the frame of the eyewear. As an example, these components can be formed together on a substrate. The substrate with the components mounted and interconnected can be referred to as a module. Embedding such a module into the eyewear can thus provide the eyewear with activity monitoring capability with minimal disturbance to design features of the eyewear.

In one embodiment, the eyewear includes an activity detector, electrical circuitry and an output device. The eyewear can also include one or both of a battery and a solar cell to provide power to the electrical circuitry and possibly other components. Further, the eyewear can also include one or more additional sensors. Still further, the eyewear can also include one or more of a being-worn indicator, a memory for data storage, one or more switches, and communication capabilities.

As a pair of glasses, one embodiment can include at least: a first lens holder having a first side and a second side; a second lens holder having a first side and a second side; a bridge element coupling the first side of the first lens holder to the second side of the second lens holder; a first temple pivotally secured to the second side of the first lens holder through a first joint; a second temple pivotally secured to the first side of the second lens holder through a second joint; and a pedometer system at least partially embedded in the glasses.

As a pair of glasses, another embodiment can include at least: an eyeglass frame having at least a pair of lens holders and a pair of temples; and a functional module including a plurality of electrical components that are electrically interconnected with a substrate. The eyeglass frame also includes a cavity for receiving the functional module.

As a pair of glasses, still another embodiment can include at least: a frame having at least a bridge and a pair of temples; and an activity monitor at least partially embedded in the frame and operable to measure activity associated with a user of the pair of glasses.

One embodiment can pertain to a pair of glasses that can provide, in an audio manner, information to a user. The user does not have to hold onto the glasses to hear the information. In other words, the information is provided in a hands-free manner. The information can be pre-recorded. In another embodiment, the information is transmitted to and received by the glasses. This allows the information to be dynamic. Though not necessary, the information can be directly relevant to an event attended by the user. There can also be a user input mechanism at the glasses to allow the user to provide user input, including user feedback.

In one embodiment, a pair of glasses has first and second lens holders for receiving lenses. Each of the lens holders has a first side and a second side. The pair of glasses has a bridge element that couples the first side of the first lens holder to the second side of the second lens holder. The pair of glasses also includes a first temple and a second temple. The temples can also be known as arms. The first temple is pivotally secured to the second side of the first lens holder through a joint, while the second temple is pivotally secured to the first side of the second lens holder through another joint. The pair of glasses can also include a speaker, which is powered by a power source, and the speaker can be turned on and off.

In another embodiment, each of the temples has a tapered profile that is wider when it is closer to its corresponding joint. Each lens holder can also have a shield at least at one of its edges. In one embodiment, the shields are shaped to generally conform to the profile of the face of the wearer. The surface areas on the temples or the shields can be used for promotion. For example, advertisements can be located on these areas.

A pair of glasses can deliver information through a speaker at the glasses to the person wearing the glasses. The information can be related to an event. The event can be organized (or sponsored) by a company. For example, an event can be a sporting contest, a trade show, a tour, etc. In another embodiment, an event can be viewed from the perspective of the person attending it. For example, an event can be buying a product from a store. When the person is at the store, the person is at the event.

The information available can be for entertainment, or for promotion of a product or a company. The information can be in different languages depending on the preference of the person. The information can be available for a limited duration of time. This duration of time can be set by an event. When the event is over, there can be no more information available. The duration can also be set by the power source running the electrical components in the glasses. The power source can be designed such that it is not replaceable by the user, or replacing the power source typically would break at least a portion of the glasses. So, when the power source is drained, no more information will be available to the user.

In one embodiment, a speaker at a pair of glasses cab be part of a radio, and the information is wirelessly received by the radio. In another embodiment, the speaker can be part of a player, with the information previously recorded and stored in a storage medium of the player. The previously recorded information can be stored in the glasses, or in a storage device attachable to the glasses.

In another embodiment, a pair of glasses can include an information input mechanism, which allows a user to provide inputs. The mechanism can be implemented by a switch at the glasses. The glasses can have a transceiver. The user inputs can be wirelessly transmitted to, for example, the company sponsoring the event that the user is attending. The company can use such glasses, for example, to obtain feedback from the audience of the event.

In one embodiment, a pair of glasses can be given away, such as for promotional purposes. The glasses can also be rented out during an event. Such glasses can be tracked with bar codes or RFID tags.

In yet another embodiment, a pair of glasses can function as a headset, and are wired or wirelessly coupled to a portable device. The portable device can also be carried by the user of the glasses. The portable device can provide more areas for user inputs and outputs.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

Embodiments of the invention are discussed below with reference to the above-noted figures. However, those skilled in the art will readily appreciate that the detailed description given herein with respect to these figures is for explanatory purposes as the invention extends beyond these limited embodiments.

DETAILED DESCRIPTION OF EMBODIMENTS OF THE INVENTION

The invention pertains to techniques for providing eyewear with electrical components. The electrical components can provide electrical technology to eyewear (e.g., eyeglasses) without having to substantially compromise aesthetic design principles of the eyewear. The electrical components can operate independently or together with other electrical components provided elsewhere. The eyewear with electronic components can, for example, provide audio output, audio enhancements, or event-related audio content.

One aspect of the invention relates to temple arrangements for use with eyeglasses. According to this aspect, a temple arrangement includes one or more electrical components. The one or more electrical components are attached to or at least partially embedded in the temple arrangement.

Another aspect of the invention relates to a temple adapter for use with eyeglasses. According to this aspect, a temple adapter includes one or more electrical components that are able to be mechanically (and optionally electrically) coupled to a temple (including a temple tip) of the eyeglasses.

The electrical components can support signal capturing, signal processing, signal transmission, signal display, signal storage and/or power provision. The signals can be, for example, analog or digital signals. The electrical components can, for example, be used to provide audio output and/or audio pick-up. The electrical components may include and/or control one or more sensors to monitor and/or signal the conditions of a user of the eyewear. The electrical components may also include and/or control one or more operation indicators to signal operational status of at least some other electrical components. In addition, the electrical components can be or pertain to a circuit board or module, which includes a plurality of electrical components.

In one embodiment, the one or more electrical components support audio capabilities allowing a user to hear audio output. In another embodiment, the one or more electrical components support communication capabilities allowing a user to communicate with a communication device in a hands-free manner.

Embodiments of different aspects of the invention are discussed below with reference to FIGS. 1-81(*c*). However, those skilled in the art will readily appreciate that the detailed description given herein with respect to these figures is for explanatory purposes as the invention extends beyond these limited embodiments.

Figure 1:
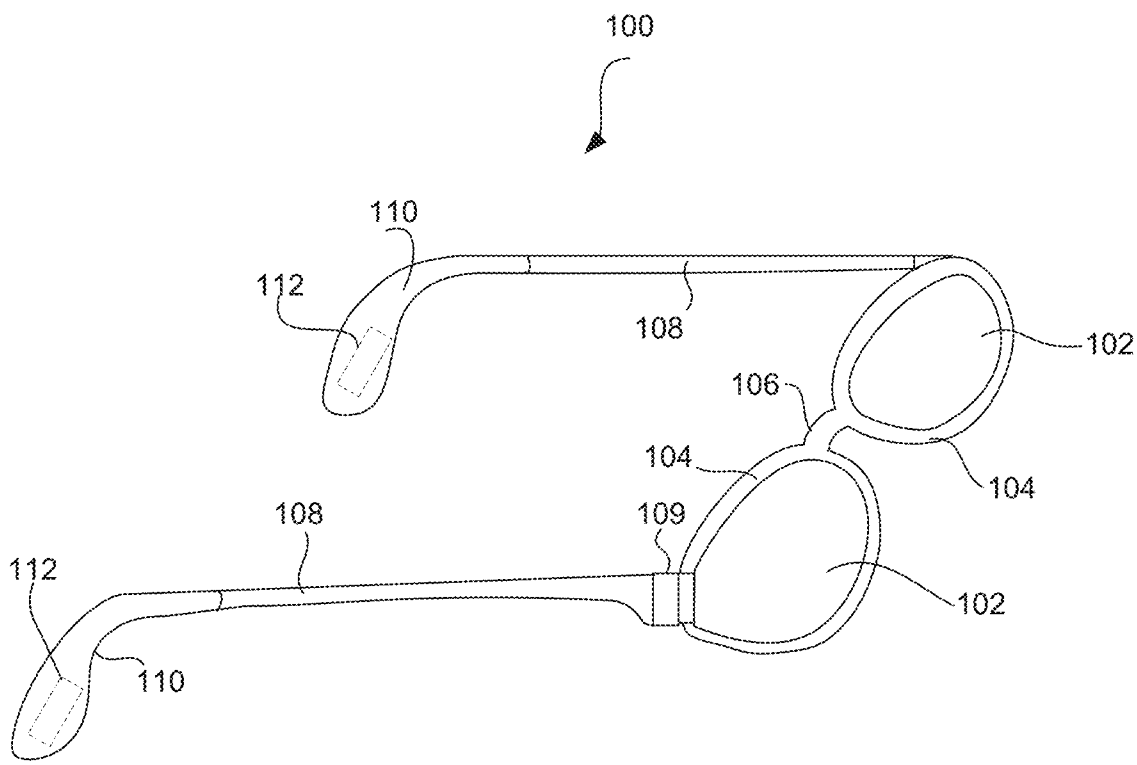
FIG. 1 is a perspective view of a pair of glasses according to one embodiment of the invention.

FIG. 1 is a perspective view of a pair of glasses 100 according to one embodiment of the invention. The glasses 100 include a frame and a pair of lenses 102. The frame has lens holders 104 that hold the lenses 102 in position. The frame also has a bridge 106. The glasses 100 further include a pair of temples (or arms) 108. The temples 108 are considered part of the frame. As shown in FIG. 1, each of the temples 108 is coupled to one of the lens holders 104 by a hinge 109. In one embodiment, the temples 108 can be removed from the frame (e.g., at the hinge 109).

In addition, temple arrangements 110 are attached to the temples 108. Here, one or both of the temples 108 can include a temple arrangement 110. A temple arrangement 110 can include one or more electrical components 112. In one embodiment, the temple arrangements 110 can be considered separate parts that can be attached to respective temples 108. Once attached, the temple arrangements 110 can be considered part of, or an extension to, the temples 108.

By having one or more electrical components 112 in one or more of the temple arrangements 110, electrical capabilities can be provided to the glasses 100 without burdensome impact to the design of other parts of the frames. Moreover, by providing electrical components in one or more of the temple arrangements 112, electrical capabilities can be added to eyeglasses in an after-market manner. Still further, by replacing temple arrangements, a user could alter the electrical capabilities of his eyeglasses.

In one embodiment, the glasses 100 do not have any other embedded electrical components, such as within the frame, except those in one or both of the temple arrangements 112. In another embodiment, the glasses 100 include one or more other electrical components embedded or attached to the frame of the glasses 100 and the components are electrically coupled to the one or more electrical components 112 in one or both of the temple arrangements 110.

In different embodiments, the glasses 100 can be, for example, a pair of sunglasses, fit-over glasses, prescription glasses, reading glasses, or safety glasses.

Figure 2:
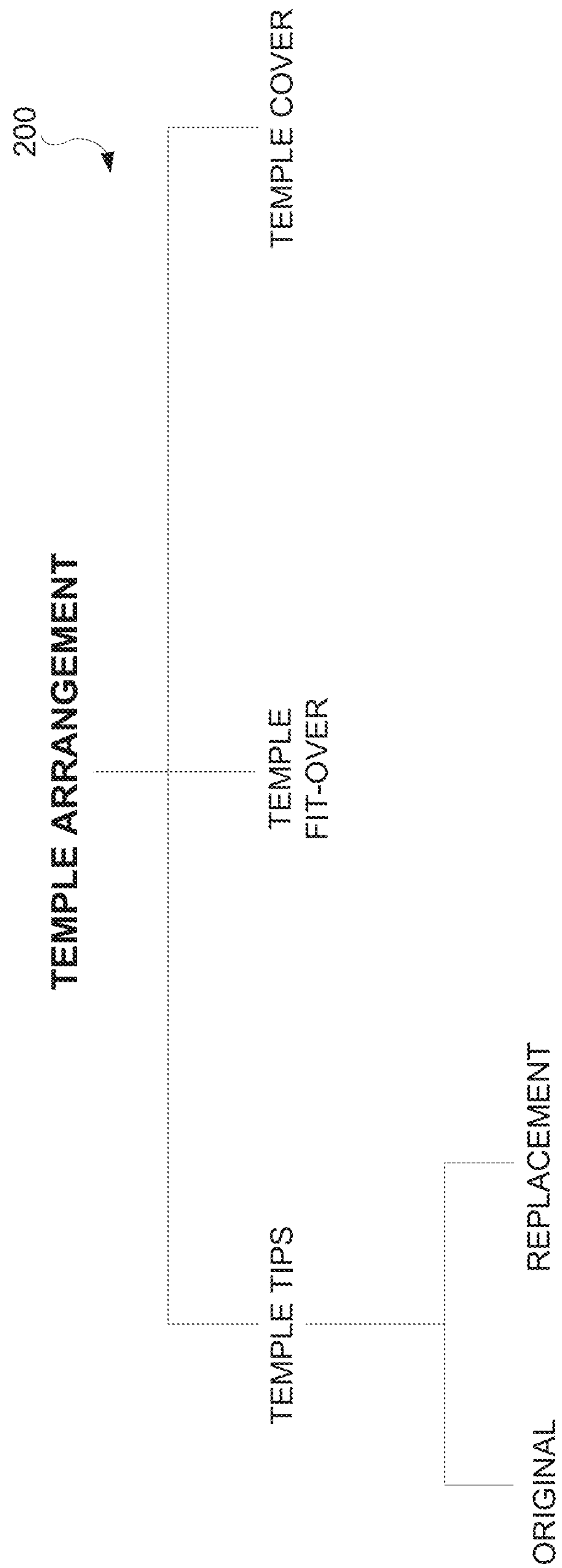
FIG. 2 illustrates a diagram of a number of different embodiments of temple arrangements according to the invention.

FIG. 2 illustrates a diagram of a number of different embodiments of temple arrangements 200 according to the invention. A temple arrangement 200 can be a temple tip, a temple fit-over, or a temple cover. In one embodiment, a temple tip is a structure that attaches to a rearward portion of a temple. In one embodiment, a temple tip can pertain to an enclosure that grabs onto a rearward portion of a temple. A temple tip is particularly common for wire frame eyeglass where the temple tip attaches to the rearward end of the temple and provides a surface suitable for positioning proximate to the user's ear. For example, FIG. 1 illustrates the temple arrangement 112 implemented as a temple tip.

In one embodiment, a temple tip is removable from its corresponding temple so that it can be replaced. The temple tip can be originally provided with the purchase of a pair of eyeglasses. Alternatively, the temple tip can be a replacement part that can be purchased separately and subsequently mounted onto a rearward portion of a temple of a pair of eyeglasses after removing any original temple tip. In another embodiment, a temple tip is permanently held onto the corresponding temple, for example, by an adhesive (e.g., epoxy, glue, etc.).

In one embodiment, a temple fit-over fits over at least a portion of the rearward end of a temple. If the rearward end of the temple has a temple tip, at least a portion of the temple tip can be fitted over by the temple fit-over. In one embodiment, a temple cover slides over and at least partially covers a portion of the rearward end of a temple. If the rearward end of the temple has a temple tip, at least a portion of the temple tip can be covered by the temple cover.

A temple cover is typically made of a material that is more flexible than a temple fit-over. For example, a temple cover can be made of a fabric or other materials, such as a sock or sleeve; while a temple fit-over can be made of plastic.

A temple arrangement 200 can be made of the same or different materials than the temple or other parts of the frame of the pair of eyeglasses. To illustrate, a pair of glasses with a metal frame can have non-metallic temple tips. A temple arrangement 200 can be of a color that is the same as, or similar to, or different from, that of the temple.

A temple arrangement 200 can be held onto a temple by frictional force. For example, if the temple arrangement 200 is a temple fit-over, it can be held onto an existing temple or temple tip by frictional force. Here, the temple fit-over is often removable. In another embodiment, the temple arrangement 200 can be permanently held onto its corresponding temple or temple tip. For example, the temple arrangement can be permanently held onto the corresponding temple or temple tip, for example, by an adhesive (e.g., epoxy, glue, etc.).

Depending on applications, a temple arrangement can be of different shapes. The shape can depend on the type of glasses. For example, a temple arrangement for fit-over glasses can be bigger than a temple arrangement for prescription glasses. The shape of the temple arrangement can also depend on applications for the electronic component(s) that are fully or partially embedded in the temple arrangement. Of course, aesthetic reasons can also influence shape (e.g., design, size, style) of a temple arrangement.

In one embodiment, the temple arrangement is a structure that has at least one electrical component attached thereto or at least partially embedded therein. In another embodiment, all of the electrical components to be provided with the temple arrangement are at least partially embedded in the temple arrangement.

Figure 3A:
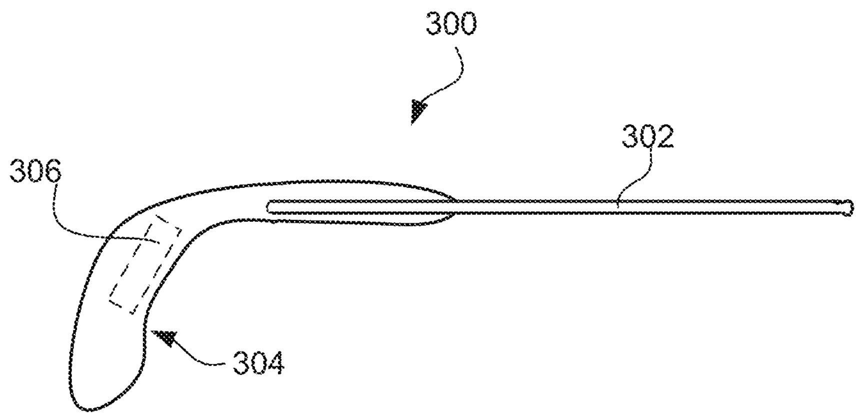
FIG. 3A is a diagram of a temple arrangement according to one embodiment of the invention.

FIG. 3A is a diagram of a portion 300 of a pair of eyeglasses according to one embodiment of the invention. The portion 300 includes a temple 302 that is associated with a pair of eyeglasses. Over the end of the temple 302 that is opposite the associated lens holder, a temple tip 304 is provided. The temple tip 304 can, for example, be held to the temple 302 by frictional forces and/or adhesive. The temple tip 304 includes at least one electrical component 306 that is at least partially embedded therein. A wide range of functionalities can be provided by the at least one electrical component 306. The temple tip 304 can be considered separate from or part of the temple 302. For example, when the temple tip 304 is not attached to the temple 302, the temple tip 304 is considered a separate part. As another example, when the temple tip 304 is attached to the temple 302, the temple tip 304 can be considered separate from or part of the temple 302.

The temple tip 304 can be manufactured and delivered to resellers or retailers and thereafter sold attached to eyeglasses. Alternatively, the temple tip 304 can be separately provided as an optional replacement temple tip for an original temple tip. Hence, after or during purchasing a pair of eyeglasses, upgrade of the eyeglasses can be had by replacing an existing temple tip with a replacement temple tip. The colors and shapes of the temple tip 304 can vary widely. In the after manufacturing environment, the reseller or retailer can be provided with a range of different colors and shapes so that a user can receive a replacement temple tip that reasonably matches the color and shape of the temple or that provides an altered appearance as desired by the user.

A number of embodiments have been described regarding one or more electrical components at least partially embedded in a pair of glasses. In one embodiment, one or more electrical components are at least partially embedded in a temple tip of a pair of glasses. Temple tips are relatively common for wire or metal frames which have wire or metal temples. The pair of glasses has a first and a second lens holders for receiving lenses. Each of the lens holders has a first side and a second side. The pair of glasses has a bridge element that couples the first side of the first lens holder to the second side of the second lens holder. The pair of glasses also includes a first temple and a second temple. The first temple is pivotally secured to the second side of the first lens holder through a joint, while the second temple is pivotally secured to the first side of the second lens holder through another joint. A temple typically has two ends, a first end and a second end. The first end can be the end that is pivotally secured to a lens holder through a joint, and the second end can be the other end of the temple. It is not uncommon that a temple includes a main body and an enclosure that grabs onto the main body of the temple. The second end is typically where the enclosure grabs onto the main body. The enclosure can be made of a different material than the main body of the temple. In one embodiment, such an enclosure is a temple tip, and there is an electrical component, partially or fully, embedded in the temple tip. There can also be a connector at the temple tip. In another embodiment, the temple tip can include a female connector. In still another embodiment, as a temple tip grabs onto the main body of the temple, a connector at the temple tip (such as a female connector) can make electrical contact with another connector (such as a male connector) at the main body of the temple. Typically, particularly before a pair of glasses has been extensively worn, the temple tip can be removed and re-inserted back on to the main body of the temple without much difficulty. Such a temple tip can be an after-market component, with different temple tips having different electrical components to serve different functions.

Besides a temple tip such as illustrated in FIG. 3A, a temple tip can also be effectively modified by a fit-over temple or temple cover.

Figure 3B:
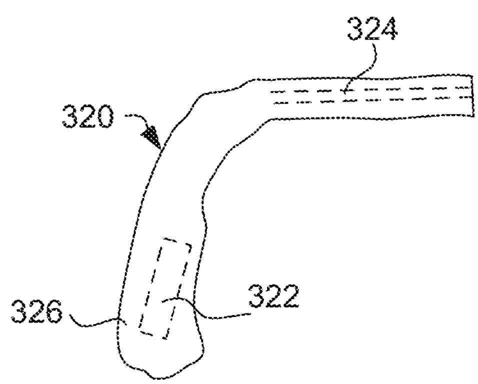
FIG. 3B is a diagram of a temple cover that at least partially covers a temple (e.g., temple and/or temple tip) according to one embodiment of the invention.

FIG. 3B is a diagram of a temple cover 320 that at least partially covers a temple (e.g., temple and/or temple tip) according to one embodiment of the invention. As an example, the temple cover 320 can be made of a fabric or other material, such as a sock or sleeve, that slides over and at least partially covers a temple or a temple tip. The temple cover 320 can include at least one electrical component 322 that is either attached thereto or at least partially embedded therein. The temple cover 320 can also include an opening 324 so as to receive a temple or a temple tip. In one embodiment, the temple cover 320 is placed over a substantial portion of a temple tip, and the opening 324 can extend to a far end 326 so as to receive all or a substantial part of the temple tip. The temple cover 320 can, for example, be held to a temple or a temple tip by frictional forces and/or adhesive.

Figure 3C:
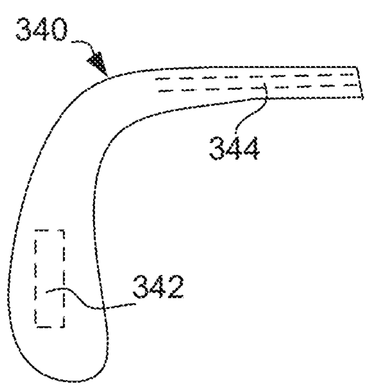
FIG. 3C is a diagram of a fit-over temple that at least partially fits over a temple (e.g., temple and/or temple tip) according to one embodiment of the invention.

FIG. 3C is a diagram of a fit-over temple 340 that at least partially fits over a temple (e.g., temple and/or temple tip) according to one embodiment of the invention. For example, the fit-over temple 340 can at least partially fit-over a temple tip. The fit-over temple 340 includes at least one electrical component 342 that is either attached thereto or at least partially embedded therein. The fit-over temple 340 can also include an opening 344 so as to receive a temple or a temple tip. The depth and/or width of the opening 344 within the fit-over temple 340 can vary depending on the extent to which it is being fit over a temple or a temple tip. The fit-over temple 340 can, for example, be held to a temple or temple tip by frictional forces and/or adhesive. As an example, the fit-over temple 340 can be plastic or other material. The colors and shapes of the fit-over temple 340 can have a lot of variations.

A wide range of functionalities can be provided by the at least one electrical component (e.g., electrical component 322 and 342). In the after manufacturing environment, the reseller or retailer can be provided with a range of different colors and shapes so that a user can receive a replacement temple cover or fit-over temple that reasonably matches the color and shape of the temple or that provides an altered appearance as desired by the user.

Figure 3D:
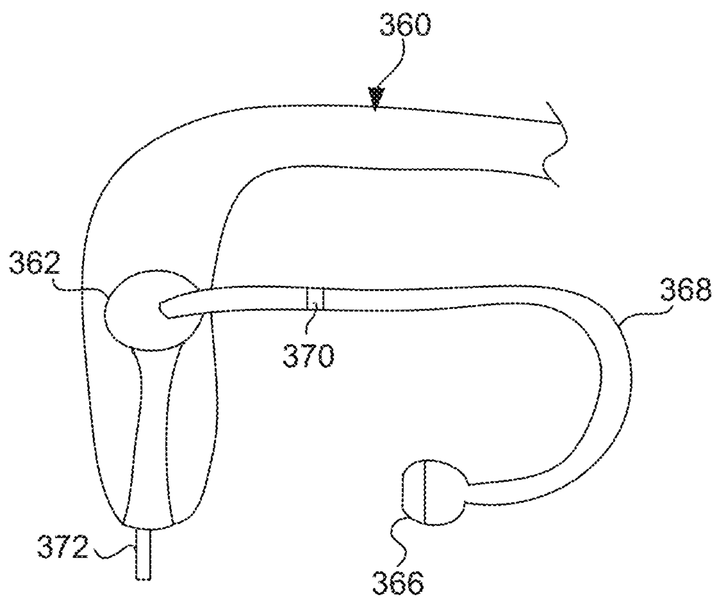
FIGS. 3D and 3E are diagrams of a temple arrangement according to another embodiment of the invention.
Figure 3E:
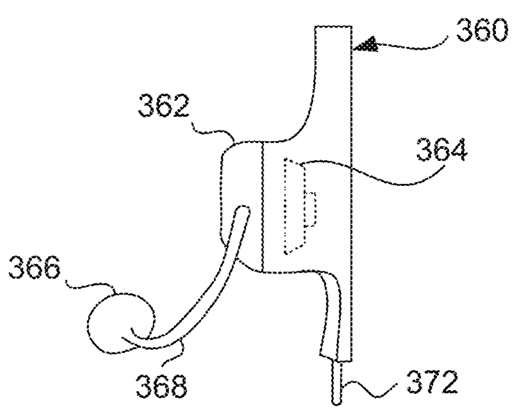

FIGS. 3D and 3E are diagrams of a temple arrangement 360 according to another embodiment of the invention. FIG. 3D is a side view of the temple arrangement 360, and FIG. 3E is a front view of the temple arrangement 360. In this embodiment, the temple arrangement 360 is a temple tip that can be attached to a temple (e.g., temple body) of a pair of eyeglasses. The temple arrangement 360 includes a speaker housing 362 allowing a speaker 364 to be at least partially embedded within the temple arrangement 360. An audio sound output by the speaker 364 is coupled to an ear plug 366 by way of the speaker housing 362 and a tube 368. Typically, the tube 368 is a flexible tube, such as a flexible plastic tube. A user of the eyeglasses having the temple arrangement 360 can place the ear plug 366 within her ear to facilitate coupling of the audio sound from the speaker 364 to the ear. The tube 368 can have a disconnection region 370 whereby at least a section of the tube 368 and the attached ear plug 366 can be removed from the temple arrangement 360, such as when audio output is not being listened to. The tube 368 and/or the speaker housing 362 can also be capable of rotating with respect to the temple arrangement 360 to facilitate ease of use. Still further, the temple arrangement 360 can include a connector 372, such as a male audio connector (e.g., 2.5 mm, stereo mini-phone connector). The connector 372 provides a means to electrically connect an external audio source to the speaker 364 within the temple arrangement 360. For example, at least one wire (not shown) that is internal to the temple arrangement 360 can be used to electrically connect the speaker 364 to the connector 372.

In one embodiment, an electrical component is a component of an electrical circuit or system, and the electrical circuit or system is for performing at least a desired, intended or predetermined function.

In one embodiment, a temple tip, fit-over temple or temple cover according to the invention can further include a connector or cable to facilitate electrical connection with the at least one electrical component that is either attached to a temple or a temple tip or at least partially embedded therein.

Figure 4:
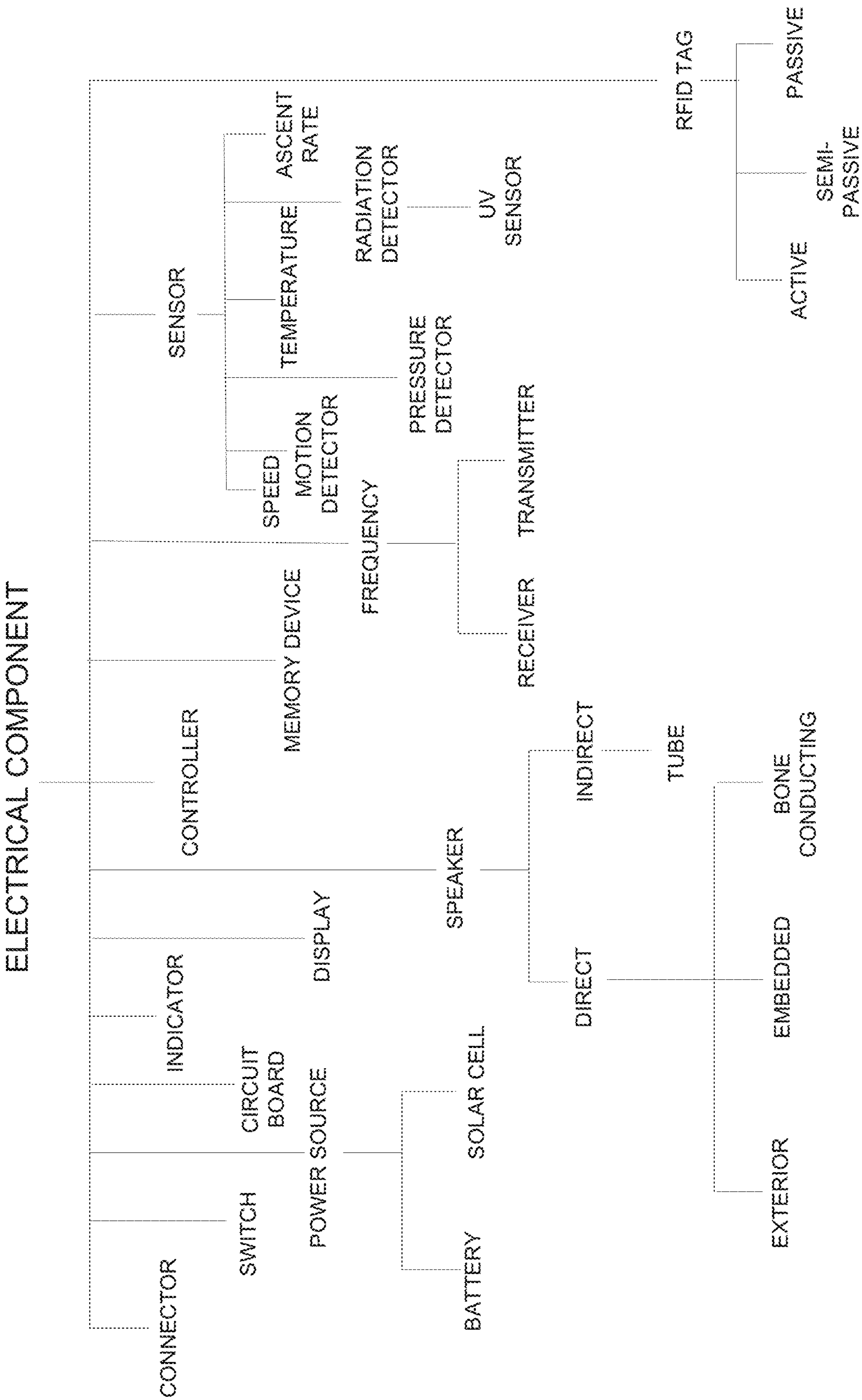
FIG. 4 shows examples of different electrical components according to the invention.

FIG. 4 shows examples of different electrical components according to the present invention. Different embodiments of temple arrangements or temple adapters according to the invention can use one or more of these different electrical components.

In one embodiment, the electrical component is an electrical connector. The connector can be a male connector located at a temple tip. In another embodiment, the connector can be a female connector at a temple tip. For example, as a temple tip grabs onto the main body of its corresponding temple, a female connector at the temple tip can make electrical contact with a male connector at the temple. Examples of different types of connectors have previously been described in the related patent applications, which have been incorporated by reference.

In one embodiment, the embedded electrical component is an electrical switch, such as one or more of those previously described in the related patent applications, which have been incorporated by reference.

In one embodiment, one electrical component can be a power source. The power source can be a battery, a solar cell or other type of power source.

In one embodiment, one electrical component can include a circuit board. The circuit board can be a rigid or a flexible circuit board.

In one embodiment, one electrical component can be an indicator. The indicator can be audio, visual, or physical (e.g., vibration). For example, the indicator can signal an event or condition to a user of the glasses.

In one embodiment, one electrical component can be a display, such as a LCD display.

In one embodiment, one electrical component can be a speaker. The speaker can provide an audio output for the benefit of the wearer of the glasses. The speaker can directly transmit sound to a user, such as a speaker mounted on an exterior surface of an eyeglass frame, or partially or fully embedded in an eyeglass frame, or a bone conducting type of speaker. Alternatively, the speaker can indirectly transmit sound to a user, such as through the use of a tube to deliver audio output proximate to a user's ear.

In one embodiment, one electrical component can be a controller. The controller can, for example, be a microprocessor.

In one embodiment, one electrical component can be a memory device. The memory device can be non-volatile memory, such as FLASH memory. The data stored in the memory device can be user data or data provided by other electrical components.

In one embodiment, one electrical component is a frequency receiver or a frequency transmitter. They can be in the radio frequency range.

In one embodiment, one electrical component can be a sensor. The sensor can be a temperature sensor. The temperature sensor can be used to sense the temperature of the wearer. In one embodiment, such a temperature sensor is in a temple tip. In measuring the temperature, the user can further press the temple tip towards his head to ensure better connection. One can also put the temple under one's tongue to measure body temperature.

In other different embodiments, one electrical component can be a motion detector, a speed sensor, a rate of ascent (or descent) detector, a pressure detector, or a detector for radiation, such as an ultraviolet (UV) detector.

In one embodiment, one electrical component is a radio frequency identification (RFID) tag. A RFID tag typically includes a memory chip and a radio antenna. The memory chip usually has a small storage capacity and thus does not include a large amount of information. A portion of such information can provide identifying information for the glasses. The memory chip may only have a few kilobytes, sufficient to encode information, such as a serial number, where and when the product (such as eyeglasses) was manufactured, and other relevant information.

The RFID tags can come in a number of configurations. For example, an active tag uses a battery-powered transponder to constantly emit signals which can carry information programmed into the memory chip. Active tags are more applicable to situations where readers are not close to the tags. A semi-passive tag likewise has a battery, but may not be activated until it receives a signal from a reader. They are more applicable to situations that do not need continuous connection and accessing. A passive tag has no battery; its antenna extracts power from a reader's radio wave signal to transmit the identifying information. Passive tags are typically relatively inexpensive, but may have to be within a few feet of a reader to extract power. The electrical component can be a passive RFID tag, or some other type of tag.

In one embodiment, one electrical component can be for locating the corresponding glasses. For example, the electrical component can produce a beeping tone when it receives a specific radio signal. A handheld device (such as a key chain accessory, can generate the specific radio signal (e.g., when a button is pushed). Through the beeping tone, one can locate the glasses.

Figure 5:
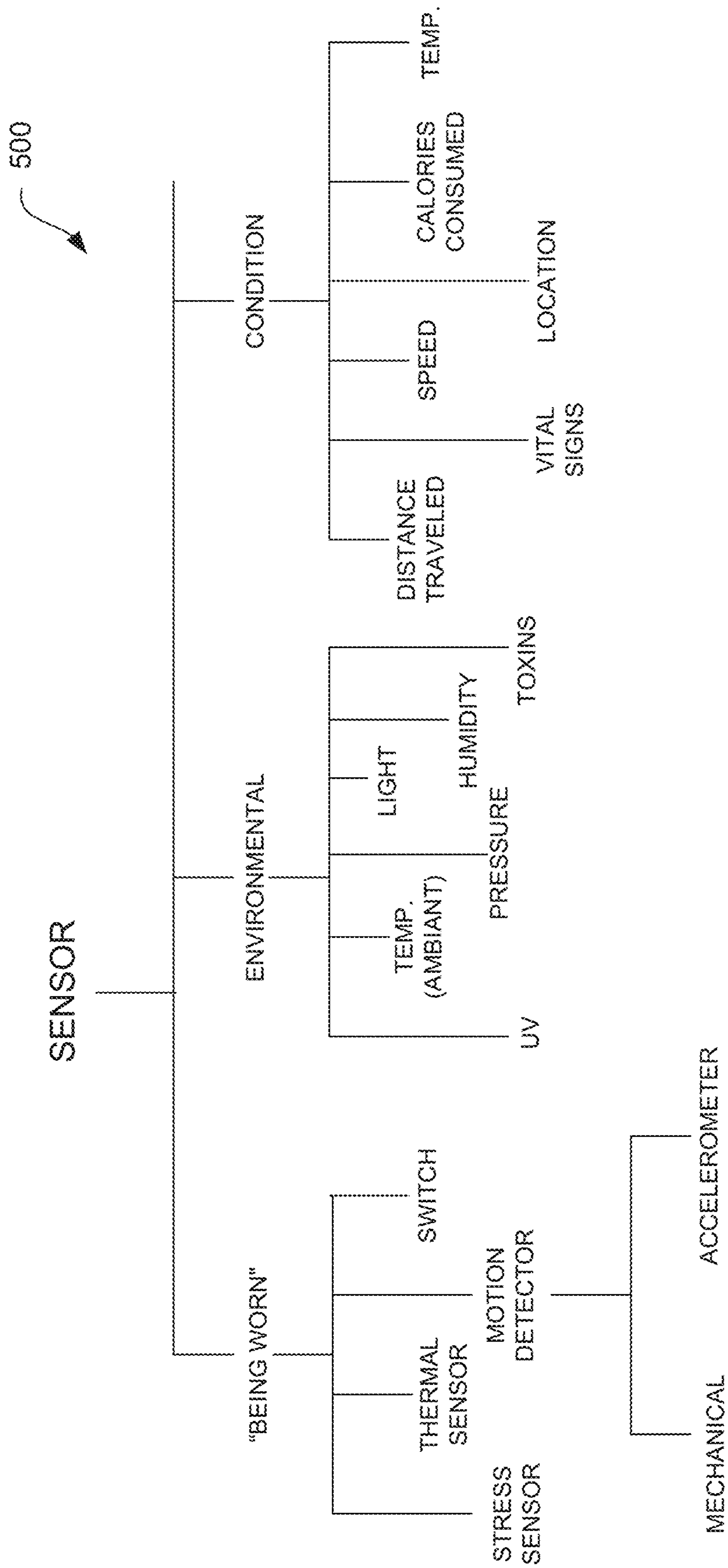
FIG. 5 is a chart that depicts examples of sensors suitable for use according to the invention.

As noted above, in one embodiment, the electrical component can be a sensor. More generally, a pair of glasses can include one or more sensors that can be used individually or in combination. FIG. 5 is a chart 500 that depicts examples of sensors suitable for use in or attached to the glasses.

In one embodiment, the sensor is a "being worn" sensor. The "being worn" sensor indicates whether the glasses are being worn by its user. The "being worn" operation can be performed using, for example, a thermal sensor, a motion detector, a stress sensor or a switch.

In one embodiment, a motion detector is used as a "being worn" sensor. A threshold can be set, such that if the amount of motion exceeds the threshold, the glasses are assumed to be worn. The motion detector can, for example, be achieved by a mechanical mechanism or an accelerometer.

In another embodiment, the "being worn" sensor includes two thermal sensors. One sensor can be at approximately the middle of a temple, such as in a region that touches the head of the user wearing the glasses. The other sensor can be at one end of the temple, the end that is close to its hinge. If the temperature differential between the two sensors is beyond a certain preset value, the glasses would be assumed to be worn. The differential is presumed to be caused by a person wearing the pair of glasses.

In yet another embodiment, the "being worn" sensor includes a stress sensor at the hinge of the temple. The assumption is that when the eyewear is worn, the hinge is typically slightly stretched because typically, the width of the head of the user is slightly wider than the width between the temples when the two temples are in the extended positions. If the value of the stress sensor is beyond a certain preset value, the glasses would be assumed to be worn.

In a further embodiment, the "being worn" sensor can be a switch. For example, at the hinge between a temple and its corresponding lens holder, there is a switch. When that temple is in its extended position, i.e., fully extended outwards, the switch is turned on. The switch can be a pin-type switch. When the temple is fully extended outwards, the pin is pressed. When both temples are fully extended outwards, in one embodiment, the glasses would be assumed to be worn by the user.

In one embodiment, another type of sensor is an environmental sensor. The environmental sensor can sense environmental conditions, such as one or more of radiation (e.g., ultraviolet radiation or light), temperature (e.g., ambient temperature), pressure, humidity and toxins (e.g., chemicals, etc.).

In another embodiment, another type of sensor is a condition sensor. The condition sensor can sense the conditions of the user of the glasses. Examples of condition sensors include sensing one or more of distance traveled, location, speed, calories consumed, temperature and vital signs associated with the user of the glasses. The distance traveled could represent the horizontal distance traveled or the vertical distance (i.e., elevation) traveled. The speed can be the rate of movement along the horizontal distance traveled and/or the vertical distance. In yet another embodiment, the condition sensor can indirectly sense emotional conditions of the user of the glasses.

The sensors can be provided in a redundant or fault-tolerant manner. For example, sensors can come in pairs in the glasses. When one malfunctions, the other one will take over its operation. In another embodiment, the sensor information can be processed in a differential manner to examine changes to the sensor information. The differential can be based on time. The sensors can by powered by a battery, solar energy, or kinetic energy. For reduced power consumption, the sensors can remain in a low-power state unless data is being acquired by the sensors. In yet another embodiment, two or more of the sensors can communicate with one another (wired or wirelessly) to exchange data or control information.

Figure 6:
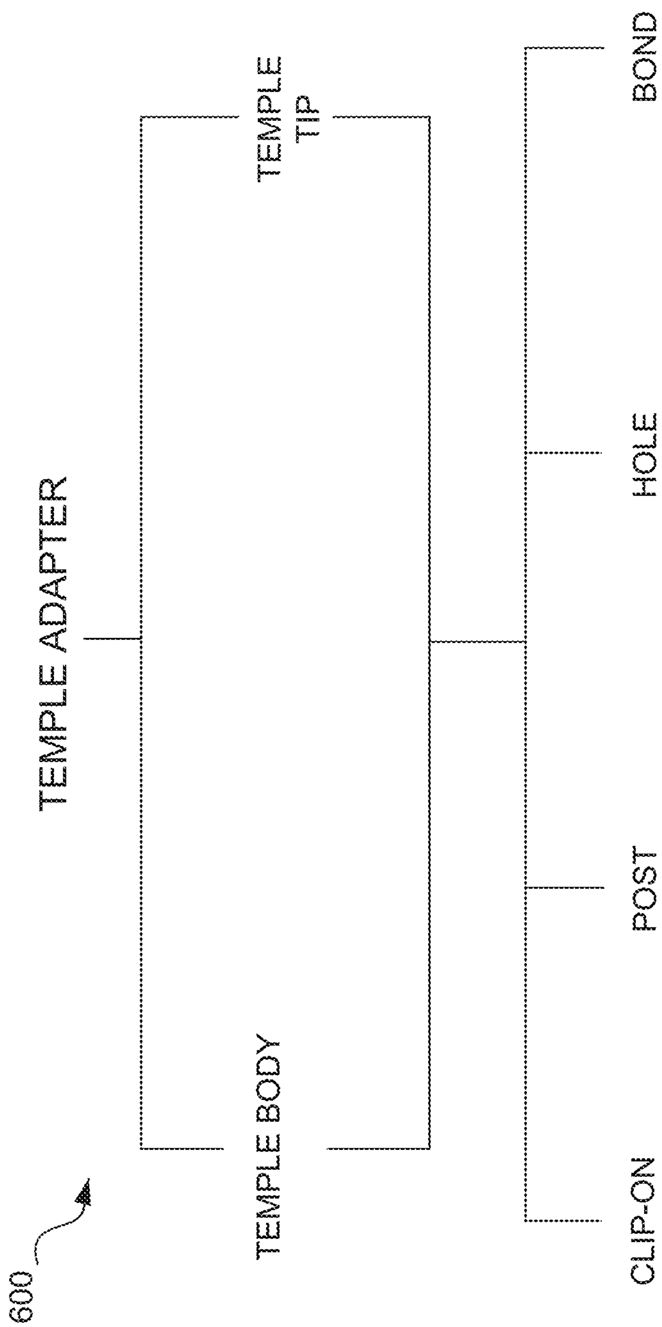
FIG. 6 illustrates a diagram of a number of different embodiments of temple adapters according to the invention.

FIG. 6 illustrates a diagram of a number of different embodiments of temple adapters 600 according to the invention. The temple adapters 600 serve to adapt a temple (i.e., a temple body or temple tip) of a pair of eyeglasses to provide for at least one electrical component. In one embodiment, a temple adapter can clip onto a temple body or a temple tip. In another embodiment, a temple adapter can mount to a post provided on a temple body or a temple tip. In still another embodiment, a temple adapter can mount to a hole provided in a temple body or a temple tip. In yet another embodiment, a temple adapter can be bonded (or adhered) to a temple body or a temple tip.

The temple adapter is particularly well suited to adapt a pair of eyeglasses with communication components, such as a speaker and/or a microphone. As an example, a standard pair of eyeglasses can be transformed into an operational headset by attaching a temple adapter to a temple body or temple tip of the pair of eyeglasses, wherein the temple adapter includes at least one speaker and at least one microphone.

The temple adapter can be rigid or malleable. The benefit of being malleable is that the particular geometric arrangement/assembly of the temple adapter can be altered by its user for better user comfort or operation.

In one embodiment, the temple adapter is a structure that has at least one electrical component attached thereto or at least partially embedded therein. In another embodiment, all of the electrical components to be provided with the temple adapter are at least partially embedded in the temple adapter.

Figure 7A:
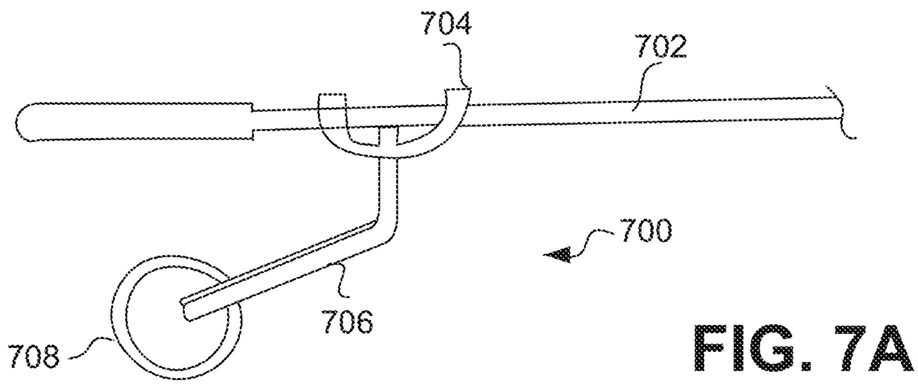
FIG. 7A is a diagram of a temple adapter according to one embodiment of the invention.

FIG. 7A is a diagram of a temple adapter 700 according to one embodiment of the invention. The temple adapter 700 attaches to a temple 702 (including any temple tip using a clip 704. The clip 704 can use force, such as an interference fit force or spring-induced force, to attach the temple adapter 700 to the temple 702. Besides the clip 704, the temple adapter 700 includes an angled arm 706 and an ear bud 708. The angled arm 706 can be malleable. When a pair of eyeglasses associated with the temple 702 is being worn by a user, the ear bud 708 can be placed in or near the user's ear canal. The ear bud 708 contains a speaker and receives electrical signals via a wire, such wire can be provided internal or external to the temple adapter 700 and can originate at the temple 702 or external to the temple 702.

Figure 7B:
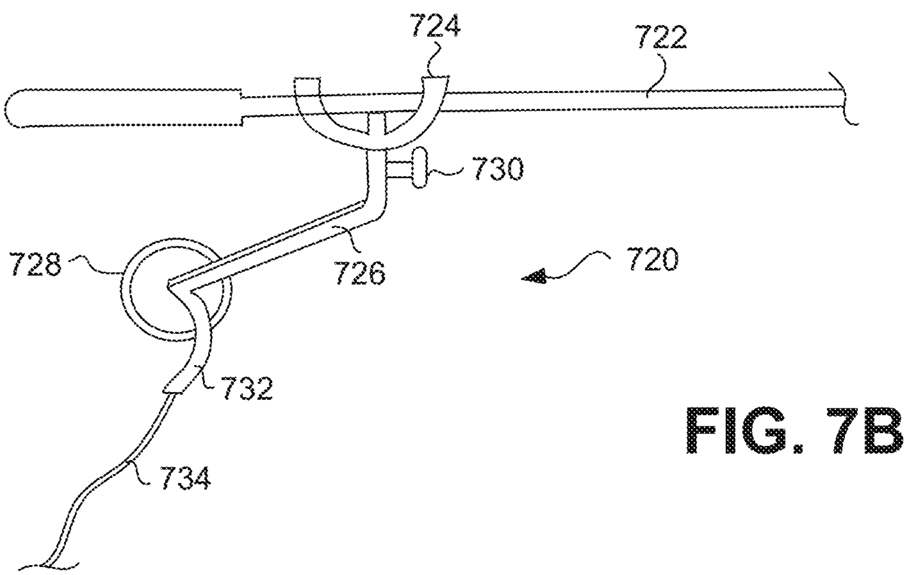
FIG. 7B is a diagram of a temple adapter according to another embodiment of the invention.

FIG. 7B is a diagram of a temple adapter 720 according to another embodiment of the invention. The temple adapter 720 attaches to a temple 722 (including any temple tip) using a clip 724. The clip 724 can use force, such as an interference fit force or spring-induced force, to hold the temple adapter 720 to the temple 722. Besides the clip 724, the temple adapter 720 includes an angled arm 726, an ear bud 728, a microphone 730, an extension arm 732 and a cord 734. In this embodiment, the cord 734 includes a wire that connects to the speaker within the ear bud 728 and another wire that connects to the microphone 730. There can be one or more conductors inside a given wire. For example, a wire might have one conductor serving as a signal line and another conductor serving as ground. Such wires can be provided internal to the extension arm 732 and the angled arm 726. The arm 732 can serve to guide the cord 734 away from the user's ear or rearward. The angled arm 726 can be malleable. The placement or position of the microphone 730 can vary with implementation. As shown in FIG. 7B, the microphone 730 is directed forward to a user's front when a pair of eyeglasses associated with the temple 722 are being worn. Alternatively, the microphone 730 could be directed outward away from the user's head when the pair of eyeglasses are being worn. When a pair of eyeglasses associated with the temple 722 is being worn by a user, the ear bud 728 can be placed in or near the user's ear canal. The ear bud 728 contains a speaker and receives electrical signals via a wire of the cord 734. The cord 734 can have another end (not shown) with a connector for coupling with an audio output device (e.g., radio, MP3 player) or a communication device (e.g., mobile phone).

Figure 8A:
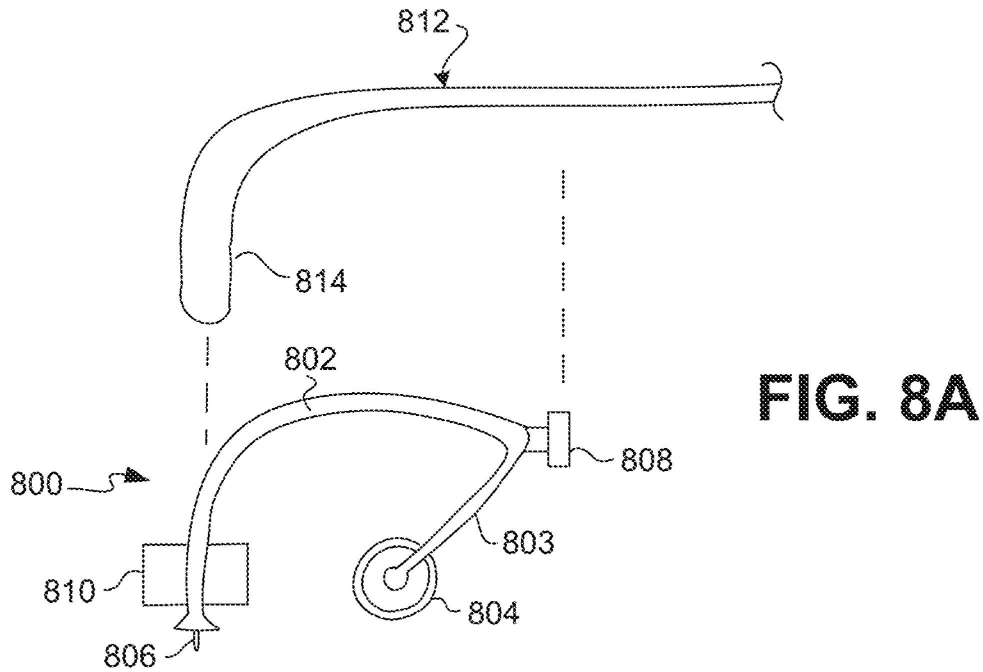
FIGS. 8A and 8B are diagrams of a temple adapter according to another embodiment of the invention.
Figure 8B:
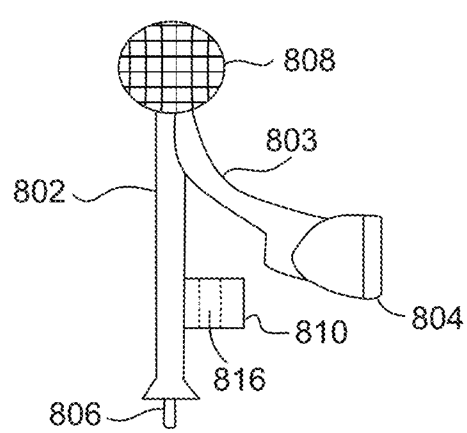

FIGS. 8A and 8B are diagrams of a temple adapter 800 according to another embodiment of the invention. FIG. 8A is a side view of the temple adapter 800, and FIG. 8B is a front view of the temple adapter 800. The temple adapter 800 has a support body 802 which has a support arm 803. An ear bud 804 is attached to an end of the support arm 803. A connector 806, such as a male audio connector, is attached to one end of the support body 802. A microphone 808 can be optionally provided and attached to the support body 802 or the support arm 803. Additionally, an elastic member 810 can be provided to facilitate attachment of the support body 802 to a temple 812 of a pair of eyeglasses. The temple 812 can have a tip region 814, which can be referred to as a temple tip. When the temple adapter 800 is attached to the tip region 814 of the temple 812, the tip region 814 is placed in or through an opening 816 in the elastic member 810, as shown, for example, in FIG. 8B. The temple adapter 800 is thereby held in place relative to the tip region 814. Additionally, although not shown, the support body 802 would carry a first internal wire from the connector 806 to the microphone 808, and the support body 802 and the support arm 803 would carry a second internal wire from the connector 806 to the ear bud 804.

Figure 9A:
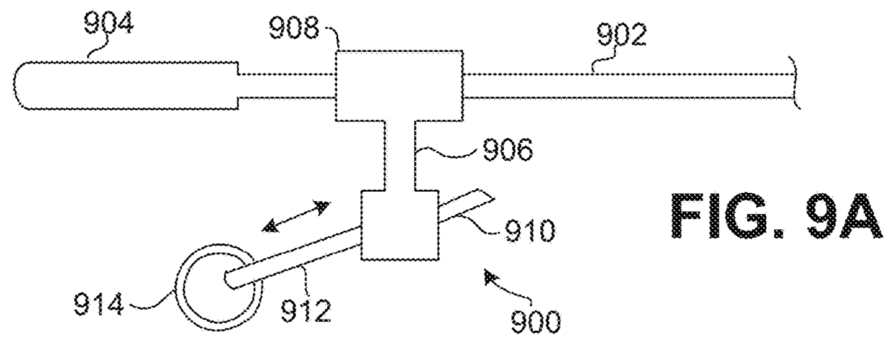
FIG. 9A is a diagram of a temple adapter according to one embodiment of the invention.

FIG. 9A is a diagram of a temple adapter 900 according to another embodiment of the invention. In FIG. 9A, a side-view of the temple adapter 900 is depicted. The temple adapter 900 attaches to a temple 902 of a pair of eyeglasses. The temple 902 can have a tip region 904, which can be referred to as a temple tip. The temple adapter 900 has a support member 906. A first end 908 of the support member 906 couples to the temple 902 of a pair of eyeglasses. In one embodiment, the first end 908 serves to attach the temple adapter 900 to the temple 902. For example, the first end 908 can provide a clip, clamp, post, or hole to provide or assist with the attachment. As another example, the first end 908 can alternatively or additionally use an adhesive, bonding or fastener (e.g., hook and loop system, e.g., Velcro) to provide or assist with the attachment. A second end 910 of the support member 906 provides an opening through which an arm 912 extends. One end of the arm 912 has an ear bud 914 attached thereto. The arm 912 can be angled and/or malleable. When a pair of eyeglasses associated with the temple 902 is being worn by a user, the ear bud 914 can be placed in or near the user's ear canal. The ear bud 914 contains a speaker and receives electrical signals via a wire, such wire can be provided internal or external to the temple adapter 900 and can originate at the temple 902 or external to the temple 902.

Figure 9B:
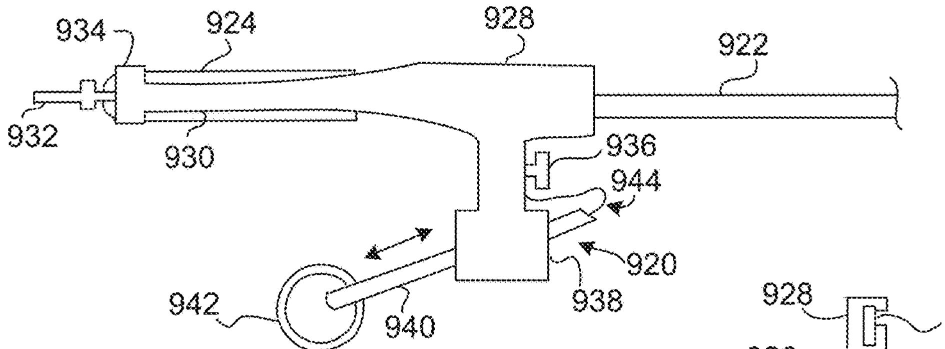
FIGS. 9B and 9C are diagrams of a temple adapter according to another embodiment of the invention.
Figure 9C:
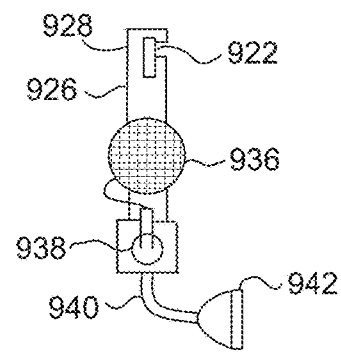

FIGS. 9B and 9C are diagrams of a temple adapter 920 according to still another embodiment of the invention. FIG. 9B is a side view of the temple adapter 920, and FIG. 9C is a front view of the temple adapter 920. The temple adapter 920 attaches to a temple 922 of a pair of eyeglasses. The temple 922 can have a tip region 924, which can be referred to as a temple tip. The temple adapter 920 has a support member 926. A first end 928 of the support member 926 couples to the temple 922 of a pair of eyeglasses. In one embodiment, the first end 928 serves to attach the temple adapter 920 to the temple 922. For example, the first end 928 can provide a clip, clamp, post, or hole to provide or assist with the attachment. As another example, the first end 928 can alternatively or additionally use an adhesive, bonding or fastener (e.g., hook and loop system, e.g., Velcro) to provide or assist with the attachment. The first end 928 also has a bracket 930 having a connector 932 at one end, and an elastic member 934 for coupling about the tip region 924. The connector 932, such as a male audio connector, is attached to one end of the bracket 930. A microphone 936 can be optionally provided and, for example, attached to the support body 926.

A second end 938 of the support member 926 provides an opening through which an arm 940 extends. One end of the arm 940 has an ear bud 942 attached thereto. The arm 940 can be angled and/or malleable. The arm 940 is also repositionable within the opening at the second end 938 so as to permit user adjustment. When a pair of eyeglasses associated with the temple 922 is being worn by a user, the ear bud 942 can be placed in or near the user's ear canal. The ear bud 942 contains a speaker and receives electrical signals via a wire, such wire can be provided internal or external to the temple adapter 920 and can originate at the temple 902 or external to the temple 902. In this embodiment, a wire 944 is shown as passing through the arm 940 to provide signals to the speaker within the ear bud 942. More particularly, in one embodiment, although not shown in FIGS. 9B and 9C, a first wire would connect the speaker within the ear bud 942 to the connector 932 (e.g., wire 944), and a second wire would connect the microphone 936 to the connector 932. Such wires can be internal or external, or partially internal and partially external, to the temple adapter 920.

Figure 9D:
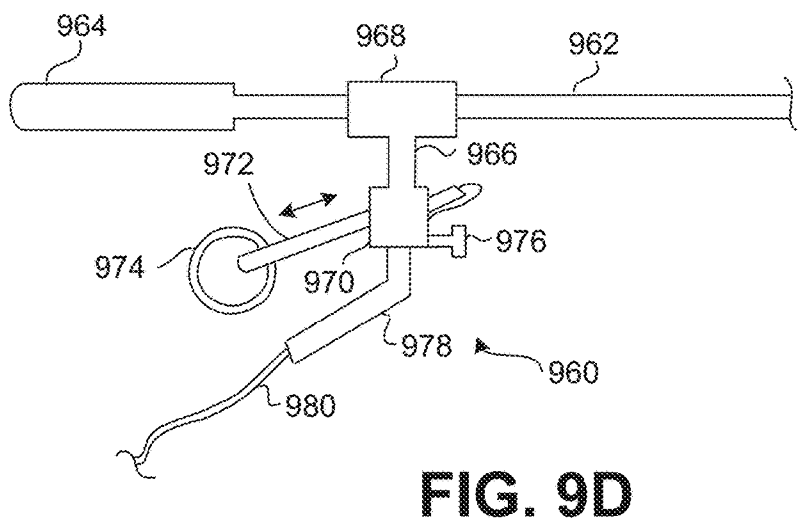
FIG. 9D is a diagram of a temple adapter according to still another embodiment of the invention.

FIG. 9D is a diagram of a temple adapter 960 according to still another embodiment of the invention. In FIG. 9D, a side-view of the temple adapter 960 is depicted. The temple adapter 960 attaches to a temple 962 of a pair of eyeglasses. The temple 962 can have a tip region 964, which can be referred to as a temple tip. The temple adapter 900 has a support member 966. A first end 968 of the support member 966 couples to the temple 962 of a pair of eyeglasses. In one embodiment, the first end 968 serves to attach the temple adapter 960 to the temple 962. For example, the first end 968 can provide a clip, clamp, post, or hole to provide or assist with the attachment. As another example, the first end 968 can alternatively or additionally use an adhesive, bonding or fastener (e.g., hook and loop system, e.g., Velcro) to provide or assist with the attachment. A second end 970 of the support member 906 provides an opening through which an arm 972 extends. One end of the arm 972 has an ear bud 974 attached thereto. The arm 972 can be angled and/or malleable. When a pair of eyeglasses associated with the temple 962 is being worn by a user, the ear bud 974 can be placed in or near the user's ear canal. The ear bud 974 contains a speaker and receives electrical signals via a wire, such wire can be provided internal or external to the temple adapter 960 and can originate at the temple 962 or external to the temple 962. Further, the temple adapter 960 can include a microphone 976. In this embodiment, the microphone 976 is attached to the support member 966. In addition, an arm 978 is used to support an end of a cable 980 that is coupled to the arm 978. The cable 980 can include at least one wire for the microphone 976 and one wire for the speaker within the ear bud 974.

To the extent that any of the embodiments of the temple adapters discussed above use a microphone, a tube can be optionally attached to the microphone to facilitate voice pick-up of the user. One end of the tube can be placed over the microphone, and the other end of the tube is then positioned closer to the user's mouth than is the microphone. With a temple adapter on both temples, each providing a microphone and speaker to a pair of eyeglasses, only one temple adapter would typically make use of such a tube. Alternatively, the tube and the microphone could be replaced by a boom microphone.

Figure 10A:
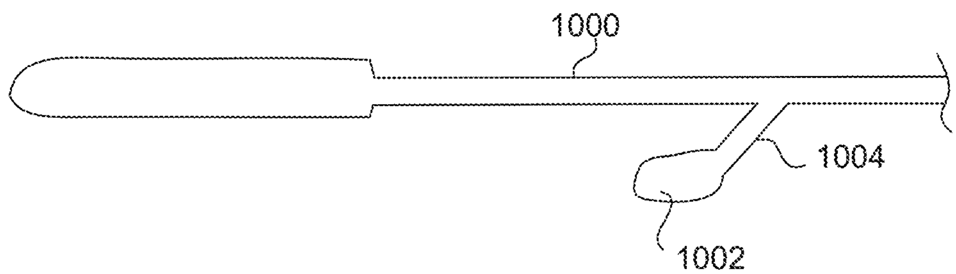
FIGS. 10A-10C are diagrams of a temple having a bone conducting element according to still other embodiments of the invention.
Figure 10B:
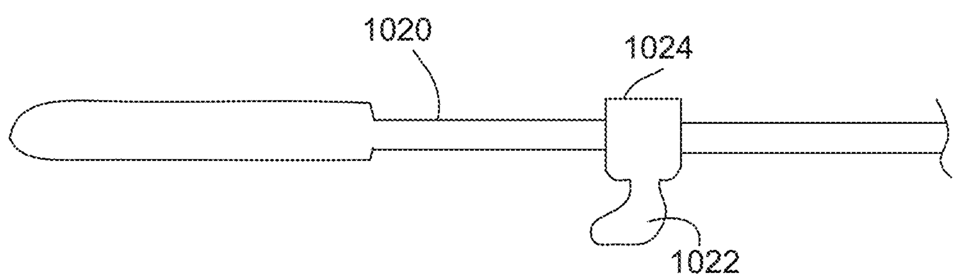
Figure 10C:
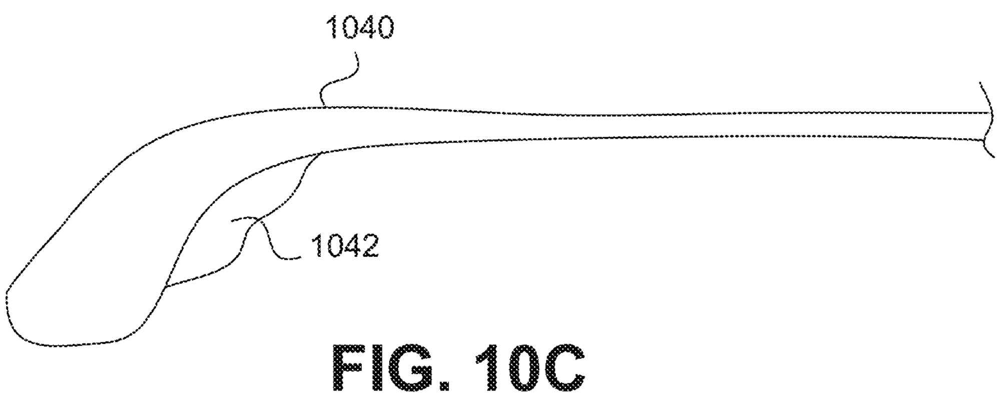

FIG. 10A-10C are diagrams of a temple having a bone conducting element according to still other embodiments of the invention. The bone conducting elements can replace a traditional speaker to provide audio output to a user. Although not shown, electrical signals would be internally or externally supplied to the bone conducting element.

FIG. 10A illustrates a temple 1000 for a pair of eyeglasses. The temple 1000 includes a bone conducting element 1002 that can provide audio sound to a user by coupling vibrations to at least one bone of the user's face. The bone conducting element 1002 is held relative to the temple 1000 by an arm 1004. Hence, in this embodiment, the temple 1000, the arm 1004 and the bone conducting element 1002 can all be integrally formed.

FIG. 10B illustrates a temple 1020 for a pair of eyeglasses. The temple 1020 includes a bone conducting element 1022 that can provide audio sound to a user by coupling vibrations to at least one bone of the user's face. The bone conducting element 1022 is held relative to the temple 1020 by a support 1024 that removably attaches to the temple 1020.

FIG. 10C illustrates a temple 1040 for a pair of eyeglasses. The temple 1040 includes a bone conducting element 1042 that can provide audio sound to a user by coupling vibrations to at least one bone of the user's head. In this embodiment, the bone conducting element 1042 is positioned in the vicinity of the user's ear, such as behind the user's ear. The placement of the bone conducting element 1042 in this embodiment can reduce impact to the design of the eyeglasses.

In one embodiment, the electrical components associated with a temple arrangement or a temple adapter is for enhancing the hearing of the person wearing the corresponding pair of glasses. There can be at least a microphone and a speaker in a temple arrangement or a temple adapter. The microphone can be close to an ear of the user when the glasses are worn by the user, and can be a directional microphone. The microphones can be a microphone in a temple adapter, such as the microphone 730 in FIG. 7B, 808 in FIG. 8A, 936 in FIG. 9B, or 976 in FIG. 9D. The microphones can be in a temple arrangement. The microphone in a temple arrangement can be attached to a temple tip, a temple fit-over or a temple cover. The microphones can be positioned to be in front of the user's ears so that the microphones will not be affected by the shadowing effect of the ears. The speaker can be inserted into the ear, as in some of the speakers previously described.

In another embodiment, there are two sets of microphones and speakers, such as in two temple arrangements or temple adapters. In the vicinity of each ear, there is a temple arrangement or temple adapter with its corresponding microphone and speaker. The microphones again can be directional, one pointing generally outwards in a position close to the left ear, and one pointing generally outwards in a position close to the right ear. Alternatively, the microphones can point forward.

The microphone and the speaker close to an ear do not have to be in very close proximity to each other, as in many hearing aids existing nowadays. They can be spaced apart by, such as, one to several inches, with the microphone being directional and pointing to the front and to either the left or the right of the user, and with the speaker pointing toward or inserted into the corresponding ear of the user. Such a distance apart can significantly reduce feedback effect of existing hearing aids. Another advantage of such a hearing enhancement device is that users may not need to be fitted into ears with ear molds. In any case, additional details on hearing enhancement are further described in the related applications that have been incorporated herein by reference, such as U.S. Provisional Patent Application No. 60/620,238, filed Oct. 18, 2004, and entitled "EYEGLASSES WITH HEARING ENHANCED AND OTHER AUDIO SIGNAL-GENERATING CAPABILITIES."

The various embodiments of the invention noted above, whether temple arrangement or temple adapter, can have a cable or cord attached or attachable thereto. The cable or cord has one or more conductors. The cable or cord can serve to provide electrical signals to or receive electrical signals from the temple arrangement or the temple adapter. In one embodiment, one end of a cable or cord attaches to a temple arrangement or temple adapter (either permanently or via a connector) and the other end of the cable or cord attaches (either permanently or via a connector) to an electronic device. As an example, the electronic device can be an audio output device (e.g., audio player) or a communication device (e.g., mobile telephone). In a first example, the cable or cord could provide a male audio (stereo) connector at one end, and a pair of female audio connectors at the opposite end, each being for use with a different temple. In a second example, the cable or cord could provide a set of connectors, such as a male mini-phone connector (2.5 mm) and a male audio (stereo) connector, at one end, and one or a pair of female phone connectors at the opposite end.

In one embodiment, the cable or cord can also have a switch coupled thereto so as to permit a user to switch modes. For example, if the temple arrangement or temple adapter provides a speaker and microphone to a pair of eyeglasses, a switch on a cable or cord that connects the temple arrangement or temple adapter to an electronic device could provide different switch positions for different electronic devices or different functional modes of operation of a single electronic device. As an example, if the electronic device is (or operates as) an audio player, a first switch position could be used. Alternatively, if the electronic device is (or operates as) a mobile telephone, a second switch position could be used. Additional discussion of suitable cables and cords is provided in the related applications that have been incorporated herein by reference.

Electrical components can form an electronic module. The electronic module can provide radiation monitoring, wireless communication, enhanced hearing, etc. A radiation monitoring system can be partially or fully contained in a temple arrangement or temple adapter associated with a temple of a pair of glasses. Typically, the temple arrangement or temple adapter can be removable from the temple.

In another embodiment, an electronic component in a temple arrangement or temple adapter interacts with another electronic component in another part (e.g., frame) of the glasses or in a device tethered to the glasses. For example, a temple of a pair of glasses holds one portion of an electronic circuit. That portion can include generic parts, such as a battery, that are applicable to different applications. Another portion of the electronic circuit is in a temple arrangement or temple adapter. This portion can be application specific, such as an electronic clock without a battery, or a temperature sensor.

In yet another embodiment, the electrical components can provide audio player capabilities. In such an embodiment, the electrical components can include audio file storage, an audio player and a battery. The electrical components may or may not include wireless communication circuitry.

Further, in an alternative embodiment, the output of an operation indicator can be audio. The audio output can be from one or more speakers associated with the frame of the eyeglasses. Such audio output can signal the user using natural language, voice synthesis, pre-recorded messages, etc.

In another embodiment, the electrical components can include a memory module. The memory module provides non-volatile data storage. For example, the memory module can be a portable (or removable) memory device (e.g., memory card). The memory module can, for example, store sensor information (which can be over an extended period of time). Such memory module can be remotely interrogated using wireless communication circuitry, or can be accessed through a wired connection with a tethered device.

In one embodiment, the electrical connection(s) can alternatively be used to allow information stored in the electrical components to be accessed or queried by a device. For example, when the electrical components include a memory module, the memory module can be accessed to read data (e.g., status information) stored therein.

As previously noted, the electrical components associated with a temple arrangement and/or a temple adapter can pertain to radiation monitoring circuitry. In such case, the electrical components within the temple arrangement or temple adapter alone or together with eyeglass electrical components can implement a radiation monitoring system. The radiation being monitored can, for example, pertain to one or more of UV, infrared and gamma radiation. In one embodiment, sunlight is considered as a type of radiation. In any case, additional details on radiation monitoring are further described in the related applications that have been incorporated herein by reference.

Also, the electrical components can pertain to health or fitness monitoring circuitry. In such case, the electrical components within the temple arrangement or the temple adapter alone or together with eyeglass electrical components can implement a health or fitness monitoring system. Additional details on health or fitness monitoring are further described in the related applications that have been incorporated herein by reference.

In yet another embodiment, an electronic component in a temple arrangement or a temple adapter of a frame of eyeglasses interacts with an electronic component of an apparatus tethered to the eyeglasses to perform an operation. For example, a temple arrangement or a temple adapter of a pair of eyeglasses holds one portion of an electronic system, and a tethered apparatus that tethers to the pair of eyeglasses includes another portion of the electronic system.

Power (e.g., external power source) can be coupled to the glasses through a connector. In one embodiment, a power source is embedded inside or inserted into the glasses. Different types of power sources are applicable. For example, the power source can be a battery, a fuel cell, a solar cell, or a re-chargeable battery. The rechargeable battery can be charged through a connector at the glasses.

Depending on the embodiment, electrical components of a camera can be in a pair of glasses, and/or a base tethered to the glasses, and/or a portable device tethered to the glasses or to the base. For example, memory can be in the base tethered to the glasses. The location of a lens can vary depending on the embodiment. In one embodiment, one location is at the bridge of the glasses, with the lens of the camera facing forward. In this situation, what the user sees is substantially what the captured image would be. In other words, in a general sense, what the user sees is what the user gets. With such an embodiment, it is relatively easy for a user to take pictures, hands-free. In another embodiment, another location for the lens are at a side portion adjacent to a lens holder, before the joint of the corresponding temple. Again, the lens of the camera faces forward. Some of the electrical components of the camera can be in that location, and other components in the temple. These components can be electrically connected through one of the joints, such as with a flexible pc board. In yet another embodiment, the lens can face sideways and outwards in a temple of a pair of glasses, towards the left or right side of the user.

Still further, the invention can provide a new approach to marketing accessories, namely, electrical accessories, for eyewear. According to one method for providing temple arrangements and/or temple adapters for use with a pair of glasses, the method can initially provide a plurality of temple arrangements and/or temple adapters for a customer. This enables the customer to browse and select at least one temple arrangement or temple adapter. Each of the temple arrangements or temple adapters can have one or more electrical components at least partially embedded therein, with different temple arrangements or temple adapters providing different electrical capabilities. Once a temple arrangement or temple adapters has been selected, the selected temple arrangement or temple adapters can be coupled to one of the corresponding temples of the eyewear (e.g., a pair of glasses). In the case where the selected temple arrangement is a temple tip, the selected temple tip is inserted onto (e.g., slid over) an end of the corresponding temple (after removing any previously installed temple tip if there was one). In the case where the selected temple adapter is to be coupled, the selected temple adapter can be attached to the corresponding temple. Thereafter, the customer can make use of the eyewear with its associated electrical capabilities provided by the temple arrangement or temple adapters.

In one embodiment, once a temple arrangement and/or a temple adapter is provided to a customer, the customer can test the electrical capabilities of the pair of glasses. If the customer does not like the current selected temple arrangement or temple adapter, the customer can repeat the process by selecting and testing another temple arrangement or temple adapter. Before providing the eyewear with the temple arrangement or temple adapter, the customer can be required to pay a purchase (or rental) price for at least the temple arrangement or the temple adapter. Thereafter, the customer can be permitted to return and replace the temple arrangement or temple adapter with another temple arrangement or temple adapter. Such returns or replacements can be available only for a limited period of time following their purchase.

The eyewear can contain lenses, either vision corrective lenses or non-corrective lenses. Examples of eyewear using corrective lenses include, for example, prescription glasses, bi-focal glasses, reading glasses, driving glasses, and progressive glasses. Examples of eyewear, using corrective or non-corrective lenses, are sunglasses, fit-over glasses, safety glasses, sports glasses, swim masks or goggles and ski goggles. The eyewear can also include wrap-around glasses (with wrap-around lenses), fit-over glasses, or auxiliary frames (which attach to existing frames). Still further, the eyewear can include a strap for glasses, such as a strap to hold glasses on one's head. The strap can include some or all of the components for monitoring radiation, such components can be attached or at least partially embedded in the strap.

The invention can also relate to tethered electrical components for eyeglasses. According to a number of embodiments of the invention, an apparatus having one or more external electrical components can be tethered, through a tethering mechanism, to one or more electrical components within or attached to a pair of eyeglasses. The one or more external electrical components being tethered by the tethering mechanism, such as a cable or a cord, may be referred to herein as the 'tethered electrical components.' While the one or more electrical components in or attached to the glasses can be referred to herein as 'eyeglass electrical components.'

Tethered electrical components, alone or in combination with eyeglass electrical components can be used for a variety of different applications and uses. Examples of applications and uses include a wireless communication system, a radiation monitoring system, a health monitoring system or a fitness monitoring system. In one embodiment, the tethered electrical components can support wireless communication capabilities allowing a user to communicate with a communication device in a wireless and hands-free manner. In another embodiment, the tethered electrical components can support radiation monitoring such as for monitoring ultraviolet or solar radiation for a wearer of eyeglasses. In still other embodiments, the tethered electrical components can support health or fitness monitoring for a wearer of eyeglasses.

The tethered electrical components can support signal capturing, signal processing, signal transmission, data acquisition, data processing, and/or data storage. For example, the tethered electrical components can, for example, include a power source and/or an electronic controller. The tethered electrical components may also include and/or control one or more operation indicators to signal operational status of the tethered electrical components. In addition, the tethered electrical components may also include and/or control one or more sensors to monitor and/or signal conditions of users.

Figure 11:
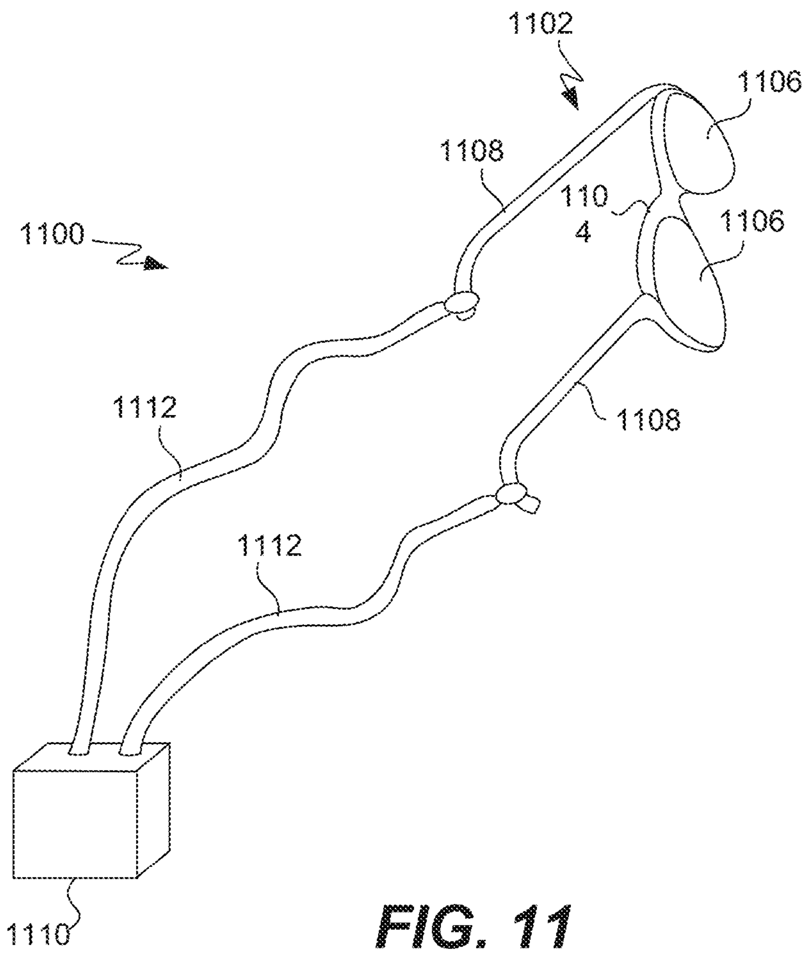
FIG. 11 is perspective diagram of an apparatus having tethered electrical components according to one embodiment of the invention.

FIG. 11 is a perspective diagram of an apparatus 1100 having tethered electrical components according to one embodiment of the invention. The apparatus 1100 is capable of affixing to a pair of eyeglasses 1102. The eyeglasses 1102 have a frame 1104 that supports a pair of lenses 1106. The frame 1104 typically also includes a pair of arms 1108. The arms 1108 are also known as temples. When the eyeglasses 1102 are being worn by a user, the arms 1108 are placed about the user's head and supported by the user's ears so as to stably hold the eyeglasses 1102 on the user's head.

In one embodiment, the apparatus 1100 include a base 1110 and at least one pair of cords 1112. Typically, there is a pair of cords 1112. The base 1110 contains electrical components. The cords 1112 can couple to the base 1110 and can also couple to the arms 1108 of the eyeglasses 1102. With the cords 1112 coupled to the arms 1108 of the glasses 1102, the cords 1112 can also permit the eyeglasses 1102 to dangle about the user's neck. At least one of the cords 1112 contains an electrical conductor to carry electrical signals from the base 1110 and through the at least one of the cords 1112. As shown in FIG. 11, the cords 1112 can connect to the arms 1108 of the eyeglasses 1102; hence, the electrical conductor can carry electrical signals between the base 1110 and at least one of the arms 1108 of the glasses 1102. The electrical conductor could be a shielded conductive wire provided internal to at least one of the cords 1112.

When referring to the cords 1112, it should be understood that the cords can be (i) two separate cords that each extends from the base 1110 to one of the arms 1108 of the eyeglasses 1102 (see FIG. 11), or (ii) a single cord that extends from the base 1110 and then separates into two ends that couple to the arms 1108 of the eyeglasses 1102. The cords 1112 can be made of a variety of different materials and may contain at least one electrical conductor. For example, the cords 1112 can be made of plastic, string, fabric, wire, etc.

In one embodiment, instead of two separate pieces, the cords are connected together and form a continuous piece. The continuous piece can be a strap, like an electric strap. One example of a strap is a sports strap that snugly attaches eyeglasses to a user's head, often for sport activities. The two ends of the strap are coupled to the arms of the glasses. The coupling can be based on mechanical connectors (e.g., snaps, clips), part of which may be integral with the arms of the glasses, and the other part integral with the straps. The coupling can be on the temples, and located close to their corresponding lens holders.

In general, the cord(s) can also be referred to as a lanyard. In one embodiment, the base is removably attached to the cord(s). In another embodiment, the base can be integral with the cord(s).

The electrical components within the base 1110 can vary in different embodiments. In one embodiment, the electrical components pertain to wireless communication circuitry, an antenna and/or a battery. In another embodiment, the electrical component pertains to radiation monitoring circuitry. In still another embodiment, the electrical component pertains to health or fitness monitoring.

Figure 12A:
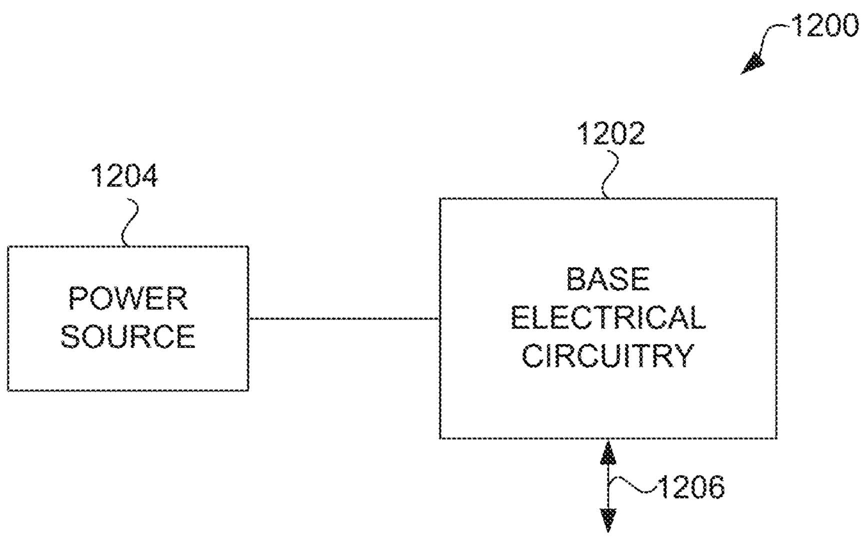
FIG. 12A is a block diagram of electrical components to be tethered to a pair of eyeglasses according to one embodiment of the invention.

FIG. 12A is a block diagram of electrical components 1200 according to one embodiment of the invention. The electrical components 1200 are, for example, suitable for use as the electrical components for the base 1110 of FIG. 11. The electrical components 1200 include base electrical circuitry 1202 and a power source 1204. The power source 1204 can, for example, be at least one battery (rechargeable or non-rechargeable) and/or at least one solar cell. In another embodiment, the power source is not in the base but instead in at least one of the cords, the eyeglass frame, or other electronic device that can electrically couple to the base. The base electrical circuitry 1202 varies with application and/or implementation. For example, the base electrical circuitry 1202 can include one or more of: controller, memory, communication interface, I/O port, sensor, output device (e.g., display), switch, and connector port.

The base electrical circuitry 1202 can also provide a link 1206 to other electrical circuitry in a wired or wireless manner. The wired interaction can utilize a cord coupled to an eyeglass frame, or can use a cable coupled to a portable electronic device. The wireless interaction can utilize different types of frequencies, such as radio frequencies, infrared frequencies or optical frequencies. The other electrical circuitry can, for example, be (i) within an eyeglass frame (e.g., coupled via a cord), (ii) worn by a user, (iii) within a portable electronic device (e.g., mobile telephone, media player, camera), or (iv) within a remote control device.

Figure 12B:
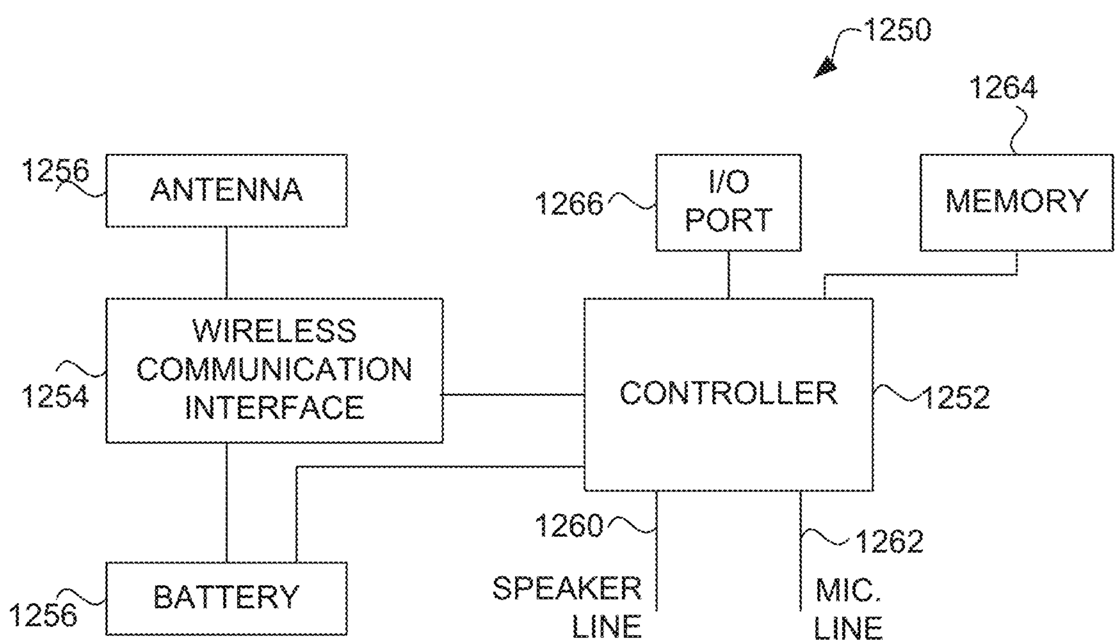
FIG. 12B is a block diagram of electrical components to be tethered to a pair of eyeglasses according to one embodiment of the invention.

FIG. 12B is a block diagram of electrical components 1250 according to one embodiment of the invention. The electrical components 1250 are, for example, suitable for use as the electrical components for the base 1110 of FIG. 11. The electrical components 1250 can also represent one representative, more specific embodiment of the electrical components 1200 shown in FIG. 12A wherein wireless communication is to be supported. The electrical components 1250 include a controller 1252, a wireless communication interface 1254, an antenna 1256, and a battery 1258. The controller 1252 can manage the overall operation of the electrical components 1250 and can output a speaker line 1260 and receive a microphone line 1262. The speaker line 1260 and the microphone line 1262 can be provided through at least one of the cords 1112. In one embodiment, at least one of the cords 1112 has a first electrical conductor that electrically connects to the speaker line 1260, and a second electrical conductor that electrically connects to the microphone line 1262.

The electrical components 1250 can further include a memory 1264 and an Input/Output (I/O) port 1266. The memory 1264 can store data for various purposes, such as programs, user preferences, and other data. The memory 1264 can provide volatile (e.g., random access memory) or non-volatile (e.g., read-only memory, FLASH, etc.) data storage. The memory 1264 can be implemented as semiconductor chips or a disk drive. The memory 1264 can also be portable from the base 1110, such as a memory card or removable disk drive. The I/O port 1266 enables the base to receive or send additional signals to/from the base. The additional signals can be sent or received in a wireless manner (e.g., infrared, radio frequency) or a wired manner (e.g., with the assistance of a conductor within at least one of the cords). These additional signals can be from a user or from other electrical devices. As one example, a switch or sensor could send data to the I/O port 1266. The switch can be user activated and, more generally, pertains to a user input. The switch, for example, could be provided to enable the user to signal other electrical components. As another example, a remote control can wirelessly send data to the I/O port 1266 (e.g., to control some operation of at least some of the electrical components). As still another example, the I/O port 1266 can send data to an output device, such as a light source, display device, etc.

At least one of the cords can be just a piece of flexible conductor encapsulated by a flexible insulator. Typically, a cord includes a number of electrical wires or conductors. There can be one or more electrical components in the base, and there can also be one or more electrical components in the cords. The different types of connectors in different embodiments can be located in the base. In one embodiment, a power source is an electrical component in the base tethered to a pair of glasses. In another embodiment, the glasses are tethered to a base that has a connector. The connector is connected to and draws power from an external electronic device. In this embodiment, electrical components in the glasses draw power from the external electronic device.

Figure 12C:
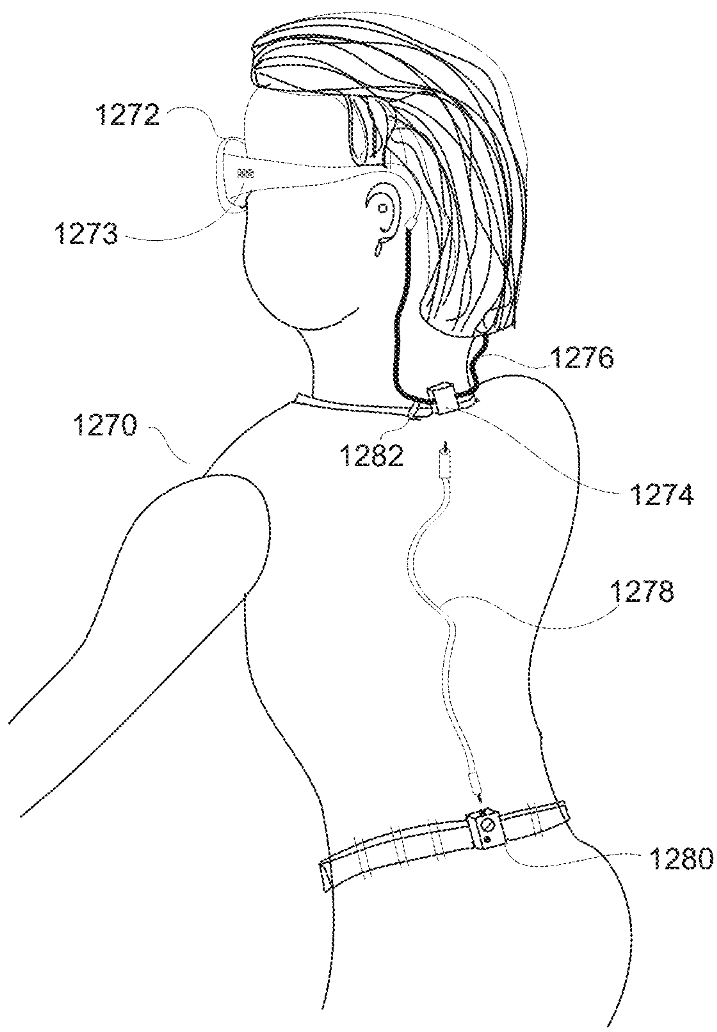
FIG. 12C shows an embodiment of the invention where a user is wearing a pair of glasses, which include electrical components, such as a speaker.

FIG. 12C shows an embodiment where a user 1270 is wearing a pair of glasses 1272, which include electrical components, such as a speaker 1273. There are also tethered electrical components in a base 1274, which is connected to the glasses 1272 through a cord 1276. In addition, there is a wire 1278 (or cable) connected between a connector at the base 1274 and a connector at a portable electronic device 1280. The portable device 1280 can be (a) a multimedia device, such as a MP3 player/recorder or a minidisk player, (b) a wireless communication device, such as a cell phone, or (c) a personal digital assistant, or other types of portable devices with computation, entertainment and/or communication capabilities.

In one embodiment, an attachment device 1282 is used to support the base 1274, the electrical components in the base 1274 and/or the cord 1276. For example, the attachment device 1282 can be a pin, clip or Velcro®, or other suitable mechanisms. The attachment device 1282 attaches at least a part of the base 1274 and/or the cord 1276 to the user's clothing. Alternatively or additionally, a similar attachment device can also serve to attach the wire 1278 to the user's clothing.

The cords 1112 as shown in FIG. 11 can couple to the frame 1104 of the eyeglasses 1102 in a variety of different ways. Additionally, one or more electrical components can be attached to or provided within the frame 1104 of the eyeglasses 1102—the eyeglass electrical components. In one embodiment, the eyeglass electrical components include a speaker and/or a microphone. In another embodiment, the eyeglass electrical components include a display device and/or a sensor.

FIGS. 13A-13D are diagrams of arrangements of a speaker and a microphone attached to an arm (i.e., temple) of a frame of a pair of eyeglasses according to a number of embodiments. In these arrangements, electrical components are attached to the eyeglasses so that the eyeglasses need not embed or otherwise include electrical components.

Figure 13A:
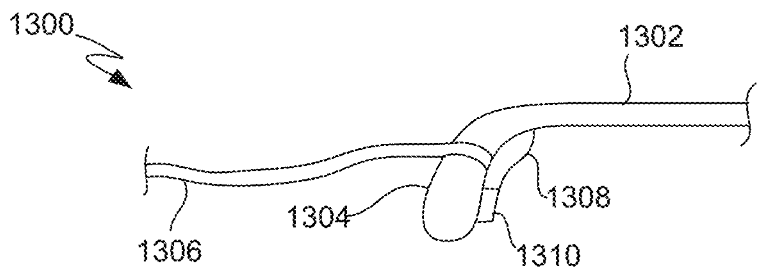
FIGS. 13A-13D are diagrams of arrangements of a speaker and a microphone provided proximate to an arm of a frame of a pair of eyeglasses according to different embodiments of the invention.

FIG. 13A is a diagram of an arrangement 1300 of a cord 1306 and eyeglass electrical components according to one embodiment. The cord 1306 couples to an end portion 1304 of an arm 1302 of a pair of eyeglasses. In one embodiment, the end portion 1304 can pertain to a temple tip or some portion thereof. One end of the cord 1306 is electrically and mechanically coupled to eyeglass electrical components, such as a speaker 1308 and a microphone 1310. The speaker 1308 and the microphone 1310 are also coupled to the end portion 1304 of the arm 1302. When the cord 1306 is coupled to the end portion 1304 of the arm 1302, the speaker 1308 and the microphone 1310 are also coupled against the end portion 1304 of the arm 1302.

Figure 13B:
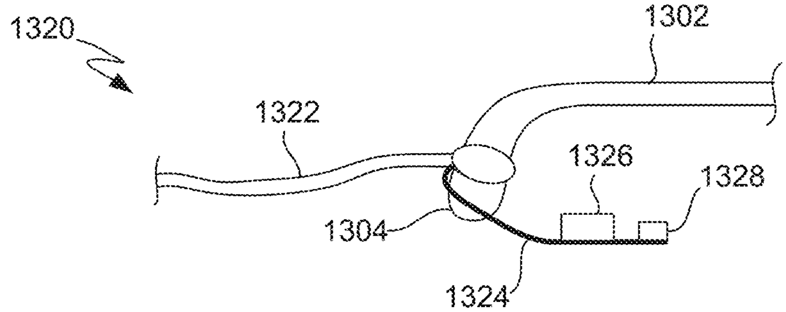

FIG. 13B is a diagram of an arrangement 1320 of a cord 1322 and eyeglass electrical components according to one embodiment. The cord 1322 couples to the end portion 1304 of the arm 1302 of a pair of eyeglasses. The end portion of the cord 1322 is coupled to eyeglass electrical components via an extension 1324. The eyeglass electrical components carried by the extension 1324 include, for example, a speaker 1326 and a microphone 1328. The extension 1324 facilitates positioning of the speaker 1326 and the microphone 1328 relative to the pair of eyeglasses or its user.

Figure 13C:
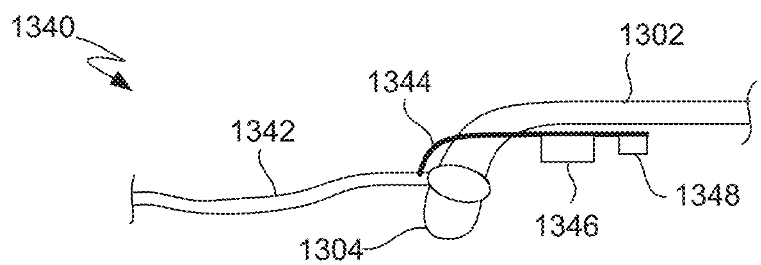

FIG. 13C is a diagram of an arrangement 1340 of a cord 1342 and eyeglass electrical components according to one embodiment. The cord 1342 couples to the end portion 1304 of the arm 1302 of a pair of eyeglasses. The end portion of the cord 1322 is coupled to eyeglass electrical components via an extension 1344. The eyeglass electrical components carried by the extension 1344 include, for example, a speaker 1346 and a microphone 1348. The extension 1344 facilitates positioning of the speaker 1346 and the microphone 1348 relative to the pair of eyeglasses or its user.

The arrangement 1340 is similar to the arrangement 1320 but the extension 1344 is positioned differently than the extension 1324. It should be noted that that the extension 1324 illustrated in FIG. 13B and/or the extension 1344 illustrated in FIG. 13C can be rotatably attached to the end portion of the cord 1322. In one embodiment, the extension 1324 illustrated in FIG. 13B can rotate into the position of the extension 1344 illustrated in FIG. 13C and vice versa.

Figure 13D:
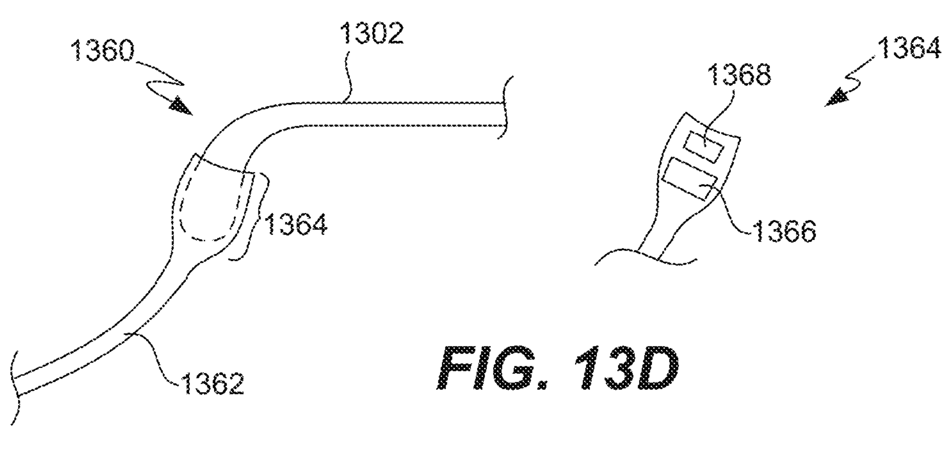

FIG. 13D is a diagram of an arrangement 1360 of a cord 1362 of eyeglass electrical components according to one embodiment. The cord 1362 has an elastic end 1364 that slides on an end portion of an arm 1302 of a pair of eyeglasses. Eyeglass electrical components, such as a speaker 1366 and a microphone 1368, can be affixed or integral to the elastic end 1364.

Figure 13E:
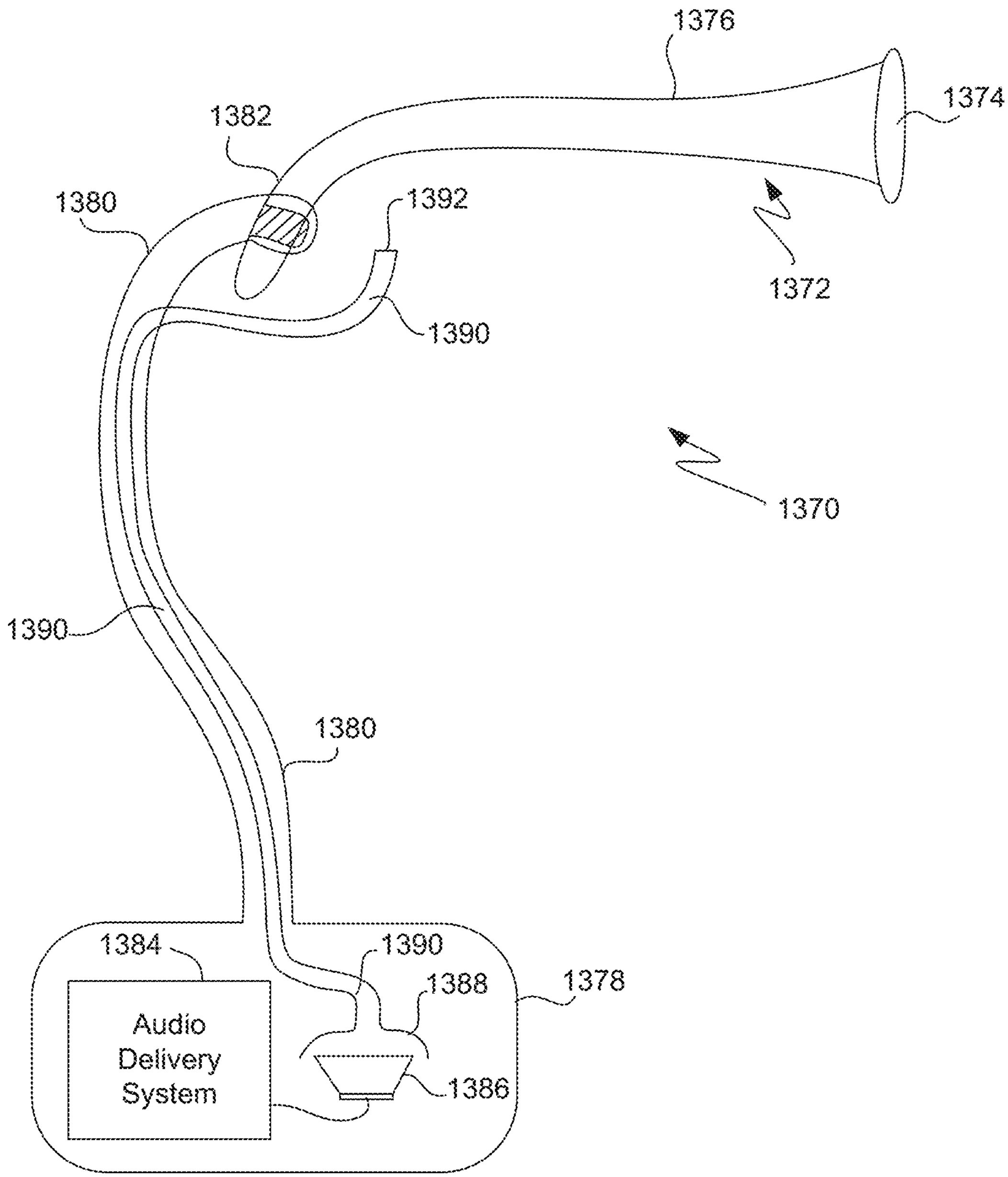
FIG. 13E is a diagram of an arrangement of a speaker in a base that provides audio output in the vicinity of an arm of a frame of a pair of eyeglasses according to another embodiment of the invention.

FIG. 13E is a diagram of an arrangement 1370 of a speaker in a base that provides audio output in the vicinity of an arm of a frame of a pair of eyeglasses according to another embodiment. In particular, the arrangement 1370 illustrates a pair of eyeglasses 1372 having at least one lens 1374 and at least one arm 1376. A base 1378 couples to the eyeglasses 1372 by way of a cord 1380. The cord 1380 can be integral with the base 1378 or attachable to the base 1378. The cord 1380 can attach to an end portion 1382 of the arm 1376. The base 1378 includes an audio delivery system 1384. The audio delivery system 1384 can, for example, pertain to a MP3 player, a RF receiver (e.g., a radio), or a mini-compact disc player. The audio delivery system 1384 outputs audio signals to a speaker 1386 which provides an audio output. The audio output from the speaker 1386 is directed by a funnel 1388 into a tube 1390 that extends from the funnel 1388 through the cord 1380. At an end 1392 of the tube 1390, the audio output is presented—namely, to a user of the eyeglasses 1372. Note the tube 1390 exits the cord 1380 in the vicinity of its end that attached to the eyeglasses 1372. As an example, the tube 1390 can be a plastic tube. At least the portion of the tube 1390 that is external to the cord 1380 can be malleable to allow user adjustment relative to the user's ear.

Figure 14A:
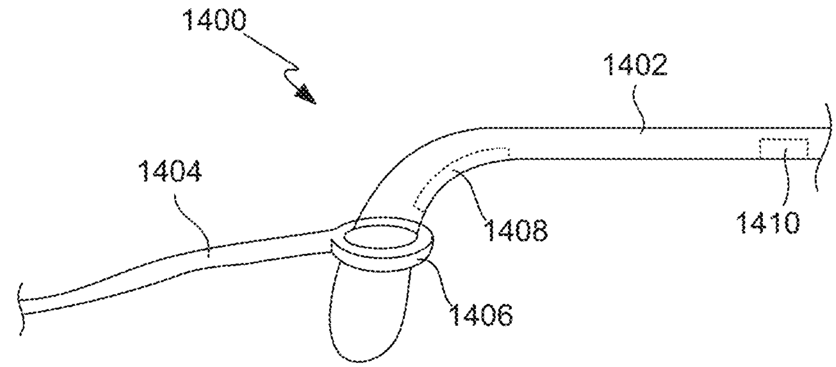
FIG. 14A is a diagram of an arrangement of an arm of a frame of a pair of eyeglasses and a cord of an apparatus having tethered electrical components according to one embodiment of the invention.

FIG. 14A is a diagram of an arrangement 1400 of an arm 1402 of a frame of a pair of eyeglasses and a cord 1404 of an apparatus having tethered electrical components according to one embodiment. The cord 1404 has a loop 1406. The loop 1406 can be used to secure the cord 1404 to the arm 1402. For example, the loop 1406 can be elastic. The arm 1402 includes eyeglass electrical components, such as a speaker 1408 and a microphone 1410, which are integral with the arm 1402. In one embodiment, the speaker 1408 and the microphone 1410 are housed within the arm 1402.

The cord 1404 contains at least one electrical conductor and the arm 1402 contains at least one electrical conductor. The securing of the cord 1404 to the arm 1402 not only physically secures the cord 1404 to the arm 1402 but also electrically connects the at least one electrical conductor within the cord 1404 to the at least one electrical conductor within the arm 1402. In this manner, electrical components within a base (e.g., base 1110) coupled to the cord 1404 can provide electrical signals to the speaker 1408 and the microphone 1410 within the arm 1402.

Figure 14B:
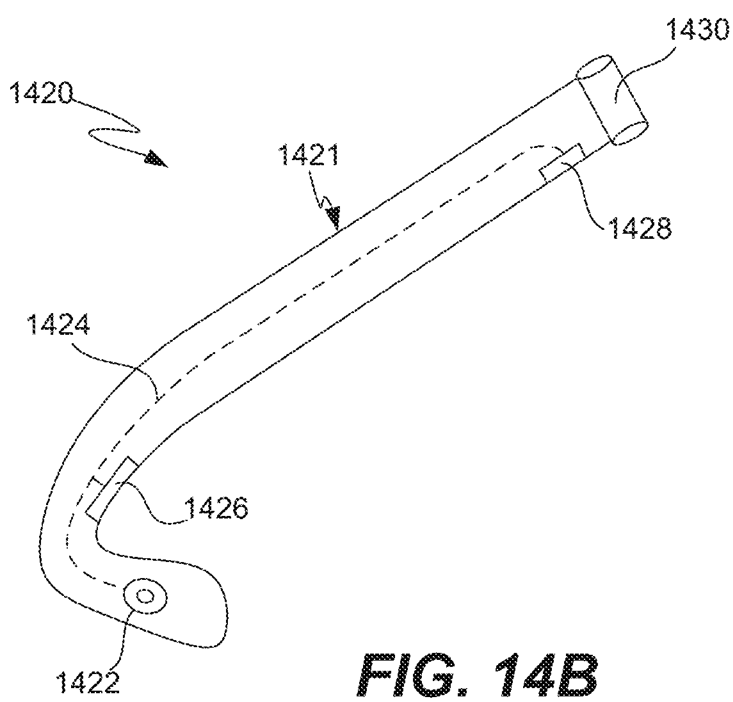
FIG. 14B is a diagram of an arrangement of an arm for a frame of a pair of eyeglasses with electrical components according to one embodiment of the invention.

FIG. 14B is a diagram of an arrangement 1420 of an arm 1421 for a frame of a pair of eyeglasses according to one embodiment. According to this arrangement 1420, the arm 1421 includes a connector port 1422, a conductor 1424 (e.g., wire), a speaker 1426, and a microphone 1428. The speaker 1426 and the microphone 1428 are eyeglass electrical components. In the present invention, a conductor is not considered an electrical component if the conductor's sole intended function is to provide electrical connections to two or more electrical components. As such, the conductor 1424 is not considered an electrical component. In one embodiment, a connector is also not considered an electrical component. The conductor 1424 is internal to the arm 1412, and the speaker 1426 and the microphone 1428 may also be internal to the arm 1412. The connector port 1422 can receive a counterpart connector connected to a cord (e.g., cord 1112), thereby electrically coupling a conductor within the cord to the conductor 1424 within the arm 1421. The arm 1421 can be used as a replacement arm so as to convert a standard pair of eyeglasses into a pair of eyeglasses that can exploit tethered electrical components, such as for wireless communications. In one implementation, the arm 1421 has a hinge portion 1430 to couple the arm 1421 to a frame of a pair of eyeglasses.

Figure 14C:
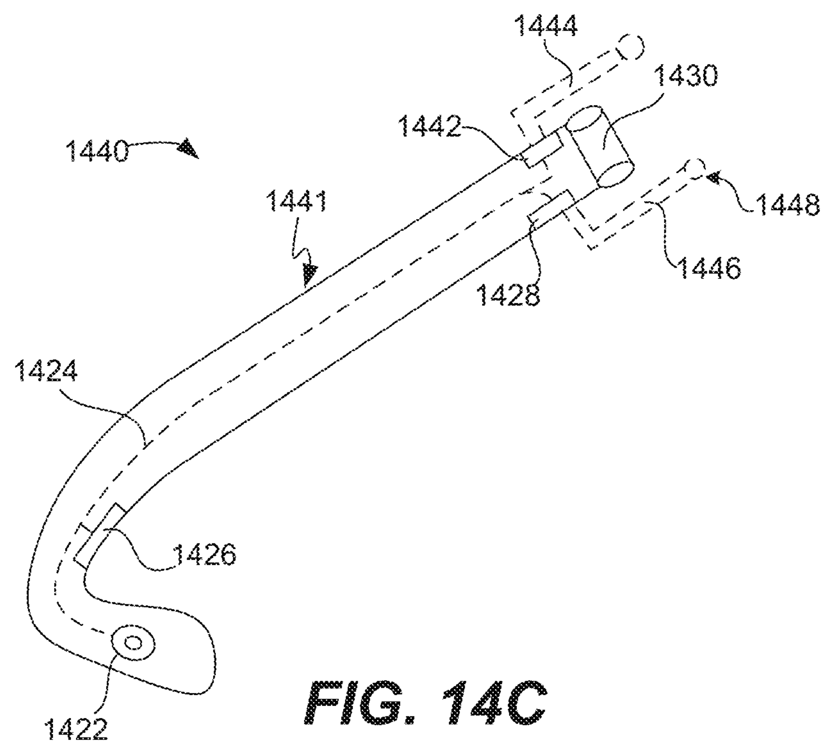
FIG. 14C is a diagram of an arrangement of an arm for a frame of a pair of eyeglasses with electrical components according to another embodiment of the invention.

FIG. 14C is a diagram of an arrangement 1440 of an arm 1441 for a frame of a pair of eyeglasses according to one embodiment. The arm 1441 is generally similar to the arm 1421 shown in FIG. 14B, but further includes additional eyeglass electrical components, such as a light source 1442. The light source 1442 can, for example, be a Light Emitting Diode (LED). The light source 1442 can provide ornamental lighting to the frame or can serve as an indicator light. The indicator light can provide various indications, such as, in use, operational status of electrical components, user's mood, user's health condition, etc. Optionally, the arrangement 1440 of the arm 1441 can also include an extension 1444 and/or an extension 1446. The extension 1444 can be used to direct light from the light source 1442 to a different location. The extension 1444 can be rotatable, malleable or retractable (e.g., folding out). In one embodiment, the extension 1444 can be a light pipe. The extension 1446 (e.g., a boom arm) can move the microphone 1428 to an end 1448 of the extension 1446, thereby closer to the mouth of the user. In another embodiment, the same extension 1444 or 1446 can include the light from the light source 1442 and the microphone 1428.

Figure 15A:
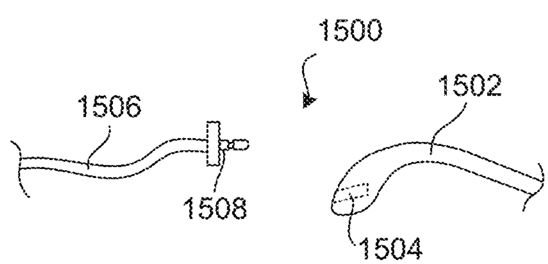
FIG. 15A is a diagram of a connection arrangement of an arm and a cord according to one embodiment of the invention.

FIG. 15A is a diagram of a connection arrangement 1500 of an arm 1502 of a pair of eyeglasses and a cord 1506 according to one embodiment. The cord 1506 is used to tether electrical components to the eyeglasses. The arm 1502 includes a receptacle 1504 (i.e., counterpart connector) for receiving a connector 1508 connected to the cord 1506. When the connector 1508 is engaged within the receptacle 1504, the cord 1506 is physically and/or electrically connected to the arm 1502. Alternatively, the cord 1506 can include the receptacle 1504 and the arm 1502 can include the connector 1508.

Figure 15B:
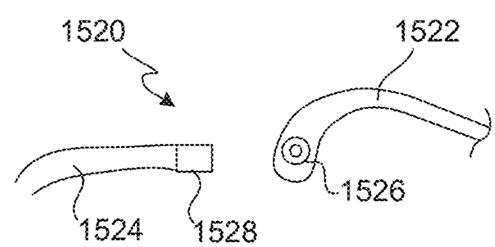
FIG. 15B is a diagram of a connection arrangement of an arm and a cord according to another embodiment of the invention.

FIG. 15B is a diagram of a connection arrangement 1520 of an arm 1522 of a pair of eyeglasses and a cord 1524 according to another embodiment. The cord 1524 is used to tether electrical components to the eyeglasses. The arm 1522 has a connector 1526 at an end region. The cord 1524 contains a connector 1528 at an end. The connectors 1526 and 1528 can couple together (i.e., connector pair) to provide physical and/or electrical connections between the arm 1522 and the cord 1524. In one implementation, the connector pair (connectors 1526 and 1528) provide rotatable coupling of the cord 1524 to the arm 1522. In one particular implementation, the connector pair can be a BNC or coaxial type connector.

Figure 15C:
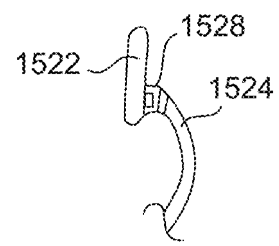
FIG. 15C is a side view of the connection arrangement of FIG. 15B according to one embodiment of the invention when the connector and the connector are coupled together.

FIG. 15C is a side view of the connection arrangement 1520 of FIG. 15B when the connector 1526 and the connector 1528 are coupled together. As a result, a conductor in the cord 1524 can be electrically coupled to an electrical component within the arm 1522. In one implementation, the connector 1528 couples to the cord 1524 in a flexible or rotatable manner, so as to permit relative movement between the cord 1514 and the arm 1522 once the connector 1526 and the connector 1528 are coupled together. For example, the flexible or rotatable coupling can be achieved by a swivel joint at or near the connectors 1526 and 1528.

Figure 16:
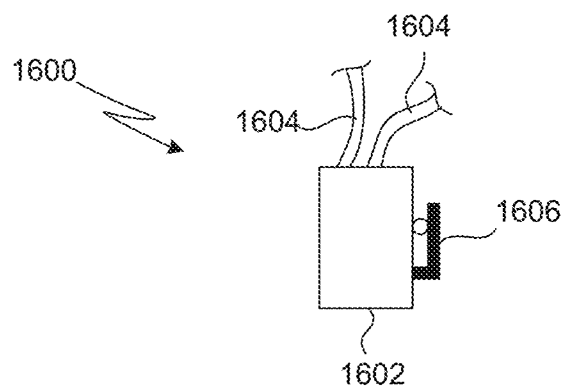
FIG. 16 is a side view of an apparatus having electrical components tethered to another device according to one embodiment of the invention.

FIG. 16 is a side view of an apparatus 1600 having electrical components tethered to another device (i.e., tethered electrical components) according to one embodiment of the invention. The apparatus 1600 has a base 1602, a pair of cords 1604, and a clip 1606. The clip 1606 is affixed to the base 1602. The base 1602 and the cords 1604 can represent any of the embodiments of the invention described herein. The clip 1606 is one embodiment of the attachment device 1282 discussed above with reference to FIG. 12C.

The apparatus 1600 having the clip 1606, as an example, can be used to hold the base 1602 against an article of clothing worn by the user. For instance, the article of clothing can be a shirt, sweater or jacket worn by the user. More specifically, the clip 1606 can hold the base 1602 to the collar of a shirt, sweater or jacket worn by the user. Alternatively, instead of a clip, the base 1602 can be held against an article of clothing by hook and loop technology (e.g., Velcro®), a pin, tape, a pocket, etc.

Figure 17:
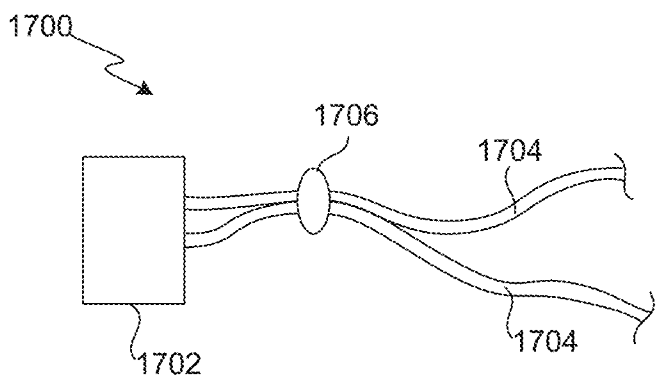
FIG. 17 is a side view of an apparatus having tethered electrical components according to another embodiment of the invention.

FIG. 17 is a side view of an apparatus 1700 having electrical components tethered to another device (i.e., tethered electrical components) according to another embodiment of the invention. The apparatus 1700 include a base 1702, a pair of cords 1704, and a ring 1706. At least one of the cords 1704 can include at least one electrical connector. The ring 1706 can be used by a user of the apparatus 1700 to tighten the cords 1704 about the head of the user when the apparatus 1700 is attached to a pair of eyeglasses being worn by the user. The base 1702 and the cords 1704 can represent any of the embodiments described herein. In one embodiment, the base 1702 is integrally formed with the ring 1706. In this embodiment, the base 1702 tends to be placed at the end of the cords 1704. However, the base 1702 need not be positioned at the end of the cords 1704. In still another embodiment, the base 1702 can include or connect to a ring, such that the base 1702 can slide along the cords 1704 as does a ring while maintaining connection with the at least one electrical connector of at least one of the cords 1704.

Figure 18:
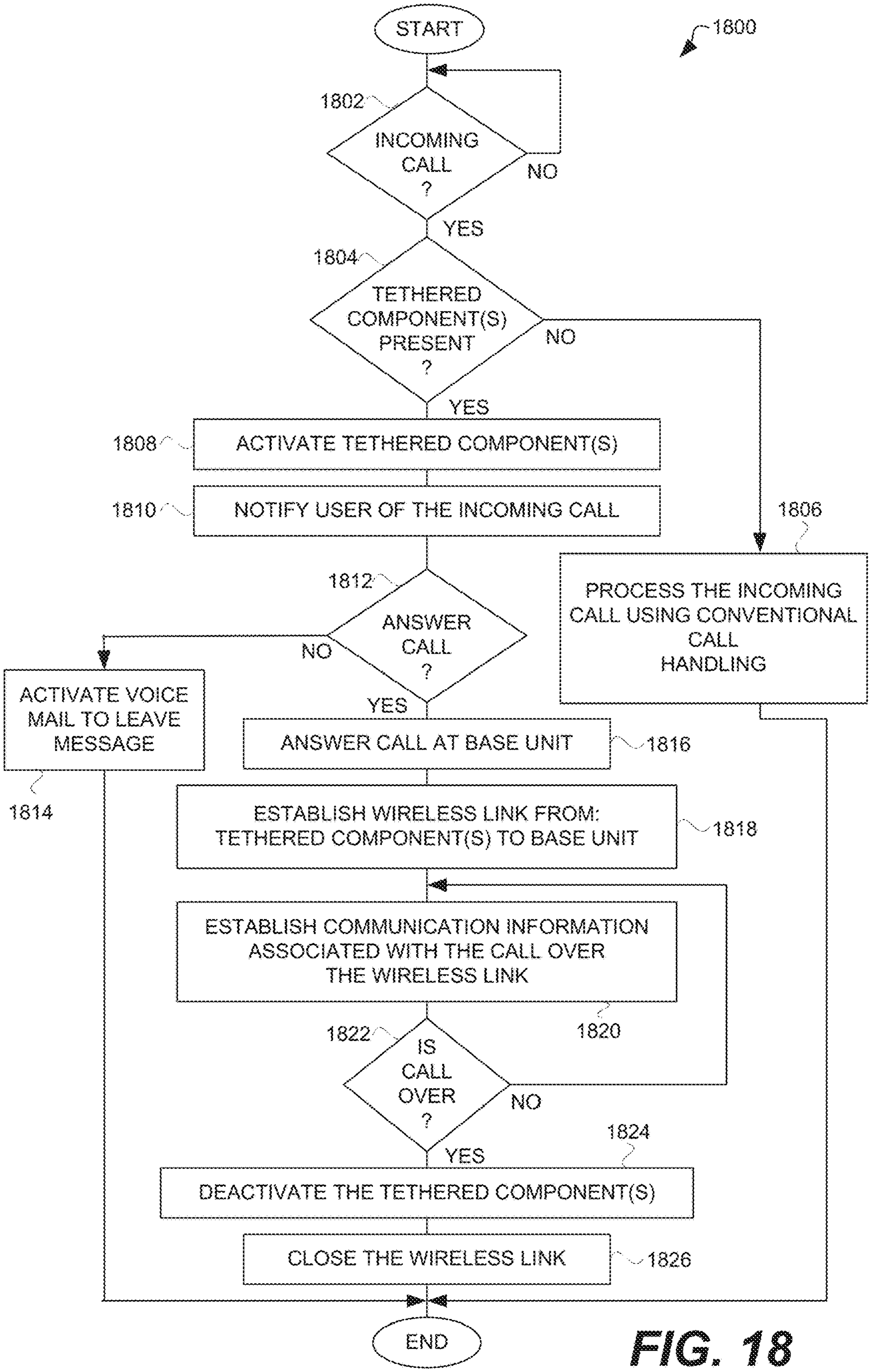
FIG. 18 is a flow diagram of call processing using tethered wireless communication components according to one embodiment of the invention.

FIG. 18 is a flow diagram of call processing 1800 using tethered wireless communication components according to one embodiment of the invention. The tethered wireless communication components interact with a communication device. The tethered wireless communication components can be the components within the base 1110 shown in FIG. 11, such as the electrical components 1250 shown in FIG. 12B. In this embodiment, the communication unit supports two-way communication, such as an audio conversation between two persons. For example, the communication unit can be a mobile telephone (e.g., cellular phone), a computer (desktop or portable), a cordless phone, a speaker phone, a voice-activated device, etc.

The call processing 1800 begins with a decision 1802 that determines whether a call is incoming. When the decision 1802 determines that a call is not incoming, then the call processing 1800 waits for such a call. Once the decision 1802 determines that a call is incoming, the decision 1804 determines whether tethered wireless communication components are present. When the decision 1804 determines that tethered wireless communication components are not present, then the incoming call is processed 1806 using conventional call handling. In this case, since tethered wireless communication components are not present, the communication unit proceeds to handle the call in a conventional manner without the benefit of tethered wireless communication components.

On the other hand, when the decision 1804 determines that tethered wireless communication components are present, then the tethered wireless communication components (tethered components) are activated 1808. Here, the wireless communications capability of the tethered components is activated (e.g., powered-up, enabled, or woken-up). The user of the tethered components is then notified 1810 of the incoming call. In one embodiment, the notification to the user of the incoming call can be achieved by an audio sound produced by the tethered components and output by a speaker. The speaker is electrically coupled to the tethered components, e.g., such as in the various embodiments noted above. Alternatively, the user of the communication unit could be notified by a vibration of the tethered components, vibration of the frame of the eyeglasses or a base tethered to the glasses, or a visual (e.g., light) indication provided by the eyeglasses or the tethered components. Alternatively, the communication unit could include a ringer that provides audio sound and/or vibration indication to signal an incoming call. Still another alternative is that the tethered components or the frame of the eyeglasses could provide a tactile action to the user so as to notify the user.

Next, a decision 1812 determines whether the incoming call has been answered. When the decision 1812 determines that the incoming call has not been answered, the communication unit can activate 1814 a voice message informing the caller to leave a message or instructing the caller as to the unavailability of the recipient.

On the other hand, when the decision 1812 determines that the incoming call is to be answered, the call can be answered 1816 at the communication unit. Then, a wireless link is established 1818 from the wireless tethered components to the communication unit. The wireless link is, for example, a radio communication link such as utilized with Bluetooth or WiFi networks. Thereafter, communication information associated with the call can be exchanged 1820 over the wireless link. Here, the communication unit receives the incoming call, and communicates wirelessly with the tethered components such that communication information is provided to the user via the tethered components. The user is accordingly able to communicate with the caller by way of the tethered components and, thus, in a hands-free manner.

A decision 1822 then determines whether the call is over (completed). When the decision 1822 determines that the call is not over, the call processing 1800 returns to repeat the operation 1820 and subsequent operations so that the call can continue. On the other hand, when the decision 1822 determines that the call is over, then the tethered components are deactivated 1824, and the wireless link and the call are ended 1826. The deactivation 1824 of the tethered components can place the tethered components in a reduced-power mode. For example, the deactivation 1824 can power-down, disable, or sleep the wireless communication capabilities (e.g., circuitry) of the tethered components. Following the operation 1826, as well as following the operations 1806 and 1814, the call processing 1800 for the particular call ends.

Although the communication unit utilized with the call processing performs two-way communications, other embodiments of the invention can utilize one-way communications (or at least substantially one-way communications). For example, a communication unit might produce, receive or play audio content such that the audio content is transmitted to the tethered components in a wireless manner. The tethered components then serve as a receiver for the audio content transmitted from the communication unit.

In one embodiment, the communication unit can be a communication device with which tethered components can communicate. The communication unit outputs audio to the tethered components in a wireless manner.

In another embodiment, the communication unit can also be incorporated into the tethered communication components. For example, the tethered components can functionally operate as a two-way communication device (e.g., a mobile telephone). Such tethered components (e.g., communication components) can then, for example, operate as a mobile telephone, and may operate through use of voice-activated commands.

Figure 19:
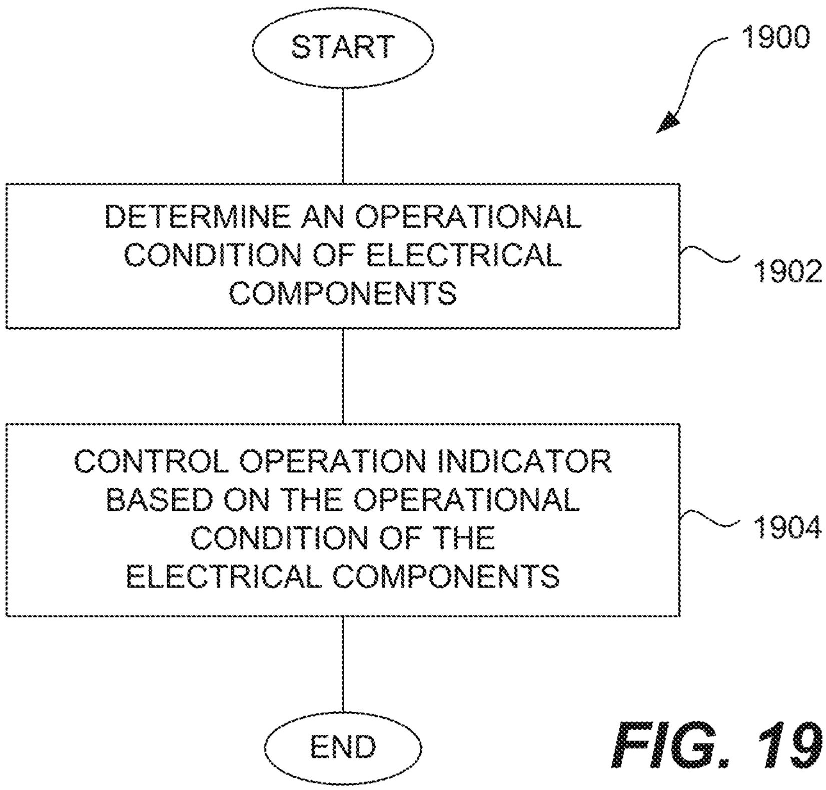
FIG. 19 is a flow diagram of operational condition processing using tethered electrical components according to one embodiment of the invention.

FIG. 19 is a flow diagram of operational condition processing 1900 according to one embodiment of the invention. The operational condition processing 1900 can, for example, be performed by an apparatus having at least one operation indicator as well as tethered electrical components and/or eyeglass electrical components for a pair of eyeglasses.

The operational condition processing 1900 initially determines 1902 an operational condition of the electrical components (e.g., tethered electrical components and/or the corresponding eyeglass electrical components). The operational condition can, for example, indicate whether a call is incoming, whether a call is ongoing, or whether the electrical component is in use. Next, at least one operation indicator of the electrical components is controlled 1904 based on the determined operational condition. The operation indicator can, for example, be a light source (e.g., light emitting diode). The at least one operation indicator can be positioned at a variety of different places of the eyeglasses or the tethered electrical components. In one embodiment, the tethered electrical components are tethered wireless communication components, and the operation indicator serves as an indicator to others that the user of the tethered electrical components is engaged in a call. In another embodiment, the indicator can signal to the wearer of the tethered electrical components that a call is incoming. Following the operation 1904, the operational condition processing 1900 is complete and ends.

Figure 20:
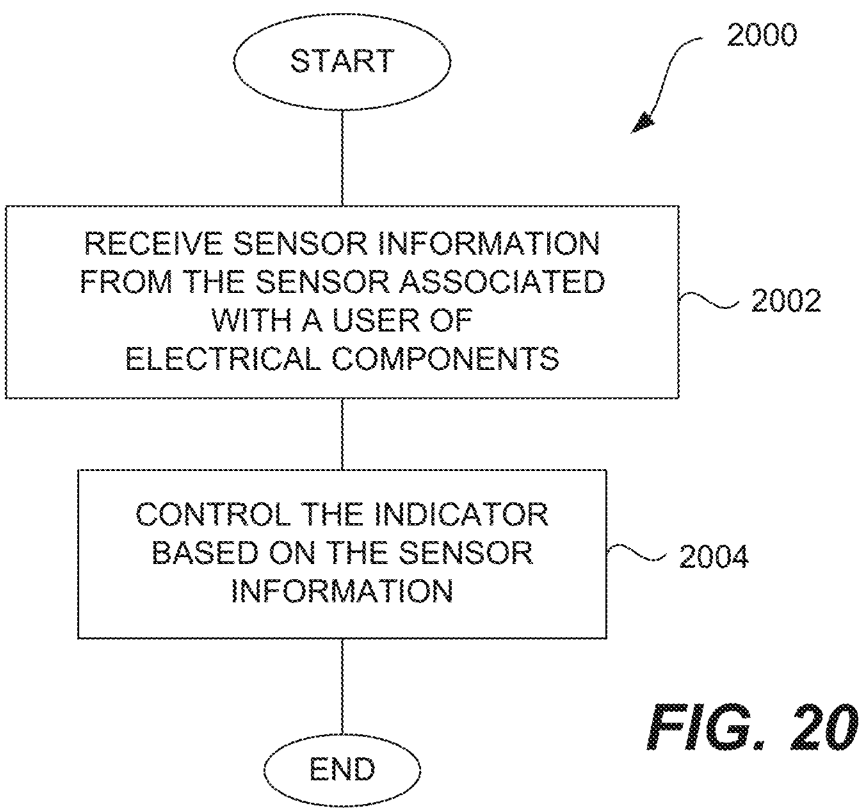
FIG. 20 is a flow diagram of sensor processing using tethered electrical components according to one embodiment of the invention.

FIG. 20 is a flow diagram of sensor processing 2000 according to one embodiment of the invention. The sensor processing 2000 can, for example, be performed by an apparatus having at least one sensor as well as tethered electrical components and/or eyeglass electrical components for a pair of eyeglasses. Optionally, the electrical components further include at least one operation indicator.

The sensor processing 2000 initially receives 2002 sensor information from the sensor. The sensor information is typically associated with the user of the eyeglasses. There can be different types of sensors. The sensors can be considered either eyeglass electrical components or tethered electrical components. For example, the sensor can be a temperature sensor configured to sense the temperature of the user. The sensor can be a humidity sensor configured to sense how much the user has been perspiring. The sensor can sense whether at least one of the user's eyes is open or not. The sensor can sense if the user is crying. The sensor can sense the direction the user is looking. In a general sense, the sensor information can, for example, pertain to physical and/or emotional conditions of the user.

At least one indicator can then be controlled 2004 based on the sensor information. The indicator can be considered either eyeglass electrical components or tethered electrical components. The indicator can, for example, be a light source or a liquid crystal display. Following the operation 2004, the sensor processing 2000 is complete and ends.

The indication provided by the indicator can serve various other purposes. As an example, the indication can represent physical or emotional status of the user of the eyeglasses or the tethered electrical components. For example, the indication can provide an indication of the health or mood of the user of the eyeglasses or the tethered electrical components (e.g., by use of different colored light).

Although the at least one sensor for acquiring the sensor information can be an eyeglass electrical component or a tethered electrical component, it should be noted that the sensor could also be remotely located from the eyeglasses or tethered electrical components, and could also communicate therewith in a wired or wireless manner. Wireless sensors can increase the type of sensor information that can be acquired and utilized.

In one embodiment, the sensor can be a position sensor that provides position information. The position sensor can, for example, be a GPS receiver that is able to fully or partially determine the position of the eyeglasses or its user. The position sensor can be integral with the tethered electrical components and thus, for example, provided in a base portion (e.g., base 1110). Alternatively, the position sensor can be provided within the frame (e.g., arm) of the eyeglasses as an eyeglass electrical component.

In one embodiment, the cord is a strap, such as an elastic strap. The strap can include or support one or more electrical components, such as a speaker or a microphone. In another embodiment, all of the electrical components are in or supported by the strap. In yet another embodiment, the strap includes at least one electrical connector to allow electrical components in or supported by the strap to couple to additional electrical components, such as in a base.

In another embodiment, the tethered electrical components can further include a memory module. The memory module can provide non-volatile data storage. For example, the memory module can be a portable (or removable) memory device (e.g., memory card). In one implementation, a base portion (e.g., base 1110) of a tethered apparatus can receive the memory module through, for example, a connector at the tethered apparatus. The memory module can, for example, store the sensor information, which can be over an extended period of time. Such memory module can be remotely interrogated using wireless communication circuitry, or can be accessed through a wired connection with tethered electrical components.

In yet another embodiment, tethered electrical components can further provide audio player capabilities. In such an embodiment, a base portion (e.g., base 1110) of a tethered apparatus can include an audio player and a battery. The base portion may or may not include wireless communication circuitry. The base portion can also include an audio file storage. The base can couple to one or more speakers through at least one cord.

Further, in an alternative embodiment, the output of an operation indicator (e.g., used with the sensor processing 2000) can be audio that is output to the one or more speakers associated with the tethered apparatus. Such audio output can signal the user using natural language, voice synthesis, pre-recorded messages, one or more audio beeps, etc.

In another embodiment, one or more electrical connections on a base portion (e.g., base 1110) of the tethered apparatus facilitate electrical connection with a battery charger. For example, when the power source for the tethered apparatus is a rechargeable battery, the ability to charge the battery without removing the battery from the base portion of the tethered apparatus is advantageous. Hence, in one embodiment, the base portion of the tethered apparatus includes at least one connector or conductive element (e.g., terminal, pin, pad, trace, etc.) so that electrical coupling between the rechargeable battery and the charger can be achieved. In this regard, the electrical connector or conductive element is provided on the base portion of the tethered apparatus and is electrically connected to the battery. In one embodiment, the placement of the electrical connector or conductive element on the base portion serves to allow the tethered apparatus to be placed within a charger and consequently have the electrical connector or conductive element be in electrical contact with a counterpart or corresponding electrical connector or conductive element of the charger. In another embodiment, the base portion can have a port that can couple (e.g., via a cable) with an Input/Output (I/O) port (e.g., USB port) of a computing device (e.g., computer) so as to provide power to charge the battery.

In still another embodiment, the charger can be considered a docking station, upon which the tethered apparatus or the eyeglasses is docked so that the battery within the tethered apparatus or the eyeglasses is able to be charged. Hence, the housing of the tethered apparatus or the eyeglasses can likewise include an electrical connector or conductive element that facilitates electrical connection to the docking station when docked.

In one embodiment, the electrical connection(s) can alternatively be used to allow information stored in the tethered electrical components or eyeglasses to be accessed or queried by a device. For example, when the tethered electrical components include a memory module, the memory module can be accessed to read data (e.g., status information) stored therein.

In yet still another embodiment, a base portion (e.g., base 1110) of the tethered apparatus can serve merely as a battery source for eyeglass electrical components. In other words, in this embodiment, the base need not include other types of circuitries such as wireless communication circuitry. In such an embodiment, the size of the base can be largely dependent on the battery size.

The tethered apparatus may be provided with an illuminated or transparent appearance. For example, at least a portion of the base and/or cords can be illuminated or substantially transparent. This can provide not only a unique design appearance but can also facilitate lighting of the tethered apparatus. For example, operation indicators that are light sources, can be completely internal to the base and/or cords and produce light in complex shapes, patterns, etc. through light pipes, fiber optics, LEDs, etc. Further, the tethered electrical components and/or eyeglass electrical components can have numerous light sources to display patterns, and the patterns can coordinate or be synchronous with audio sounds, etc.

In one embodiment the tethered apparatus can further include a solar panel. The solar panel has one or more solar cells that convert light into energy so as to power the electrical components and/or charge the battery for the tethered apparatus or the glasses.

In one embodiment, the eyeglass electrical components can include a switch or a Radio Frequency Identifier (RFID) element.

As previously noted, a base portion (e.g., base 1110) of the tethered apparatus can have electrical components pertaining to radiation monitoring circuitry. In such case, the electrical components within the base portion alone or together with eyeglass electrical components can implement a radiation monitoring system. The radiation being monitored can, for example, pertain to one or more of UV, infrared and gamma radiation. In one embodiment, sunlight is considered as a type of radiation. In any case, additional details on radiation monitoring are further described in the related applications that have been incorporated herein by reference.

Also, as previously noted, a base portion (e.g., base 1110) of the tethered apparatus can include electrical components pertaining to health or fitness monitoring circuitry. In such case, the electrical components within the base portion alone or together with eyeglass electrical components can implement a health or fitness monitoring system. Additional details on health or fitness monitoring are further described in the related applications that have been incorporated herein by reference.

In yet another embodiment, an electronic component in a temple arrangement of a frame of eyeglasses interacts with an electronic component of a tethered apparatus. For example, a temple arrangement of a pair of eyeglasses holds one portion of an electronic system, and a tethered apparatus that tethers to the pair of eyeglasses includes another portion of the electronic system. In one embodiment, a temple arrangement can be a temple tip, which is usually an enclosure that grabs onto the temple. In another embodiment, a temple arrangement is a temple cover or a temple fit-over. A temple cover slides over and at least partially covers a portion of a temple. If the end of the temple has a temple tip, at least a portion of the temple tip can be covered by the temple cover. A temple fit-over fits over at least a portion of the end of a temple. If the end of the temple has a temple tip, at least a portion of the temple tip is fitted over by the temple fit-over. A temple cover is typically made of a material that is more flexible than a temple fit-over. For example, a temple cover can be a fabric or other materials, such as a sock or sleeve; while a temple fit-over can be made of plastic.

For some glasses, particularly when a pair of glasses has not been extensively worn, a temple arrangement, such as a temple tip, can be relatively easily removed and re-inserted into the glasses. This implies that temple arrangements of different color and/or shape and/or having different electronic components can be applied to the same frame of a pair of glasses. Retailers or distributors can then provide after-market modification or enhancement to a pair of glasses, at the preference of their consumers. This, for example, can be done by replacing existing temple tips with replacement temple tips. Or, a consumer can identify the preferred temple arrangements to be purchased with the glasses.

The advantages of the invention are numerous. Different embodiments or implementations may yield one or more of the following advantages. One advantage of the invention is that electrical components can be provided integral with or attached to a temple arrangement or a temple adapter for use with a pair of eyeglasses. Another advantage of the invention is that after-market changes to electrical capabilities of eyeglasses can be relatively easily achieved Another advantage of the invention is that communication, computation, information capturing or sensing, and/or operational capabilities can be provided for eyeglasses without substantial interference to style or design choices of the glasses. Still another advantage of the invention is that wireless communications, radiation monitoring, fitness monitoring and/or health monitoring can be supported by the electrical components. Yet another advantage of the invention is the ability to provide hands-free wireless communications capability. Moreover, another advantage of the invention is that electrical components can be separated into two areas, one integral or attached to a pair of eyeglasses, and the other tethered to the pair of eyeglasses. Different components can be positioned in different areas depending on applications and/or aesthetical reasons. For example, power sources can be placed away from but tethered to the eyeglasses to reduce the weight of the eyeglasses. Another advantage of the invention is that additional functionality can be added to eyewear that a user already owns. Another advantage is that additional functionality can be added to eyewear when desired. Another advantage of the invention is the ability to provide hands-free wireless communications capability. Yet another advantage of the invention is that wireless communications, radiation monitoring, fitness monitoring and/or health monitoring can be supported by tethered electrical components. Still another advantage of the invention is that communication, computation, information capturing or sensing, and/or operational capabilities can be provided for eyeglasses without substantial interference to style or design choices, and thus without being apparent that the eyeglasses support such capabilities. Yet another advantage of the invention is that one or more operation indicators can be provided (as tethered electrical components or on or with eyeglasses) for functional reasons (e.g., to indicate operational condition of circuitry or to indicate condition of user), and/or for ornamental purposes also, such as light patterns. Still yet another advantage of the invention is that tethered electrical components for eyeglasses can also include one or more sensors, and can provide storage capabilities for sensor information.

Figure 21:
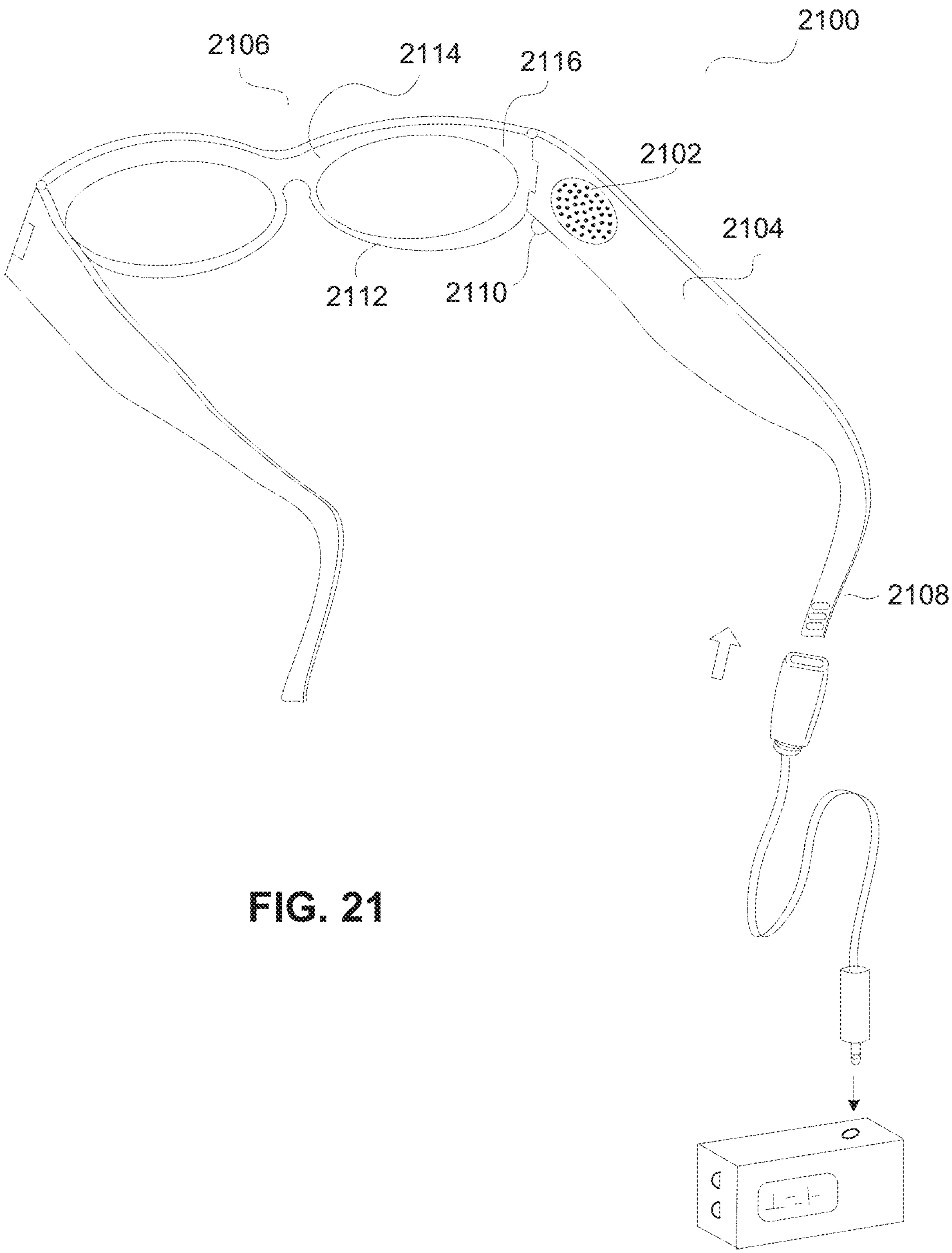
FIG. 21 shows one embodiment of the invention with a speaker in one of the temples of the glasses.

A number of embodiments according to the present invention regarding glasses with one or more electrical component partially or fully embedded, will be described. Many of them are applicable to different types of glasses, such as sunglasses, auxiliary frames, fit-over glasses, prescription glasses, safety glasses, swim masks, and goggles, such as ski goggles. In a number of embodiments, the frames of the glasses have more surface area than frames with minimal structure. For example, the temple regions of the glasses can have a taper profile. They are wider or broader when they are closer to the lens holders. Then they get narrower. In one embodiment, a wider or broader temple implies that the temple spans across a wider or broader area longitudinally down from the top of the head of the user. FIG. 21 shows an example of such an embodiment.

FIG. 21 shows one embodiment 2100 of the invention where there is a speaker 2102 at least partially embedded in one of the temples 2104 of the glasses 2106. The speaker 2102 is closer to one end of the temple 104 than the other end. The end of the temple that the speaker 2102 is closer to is the end that is in the vicinity of the lens holder or the hinge of the glasses 2106, instead of the end 2108 that is free. The speaker can be partially embedded in the glasses. For example, the mouth of the speaker, where sometimes there can be small holes on a cover, can be exposed.

In the embodiment shown in FIG. 21, the speaker 2102 outputs audio signals in the direction towards the user. In another embodiment, the speaker 2102 outputs audio signals in the direction away from the user. For example, the mouth of the speaker 2102 can be facing outwards away from the user.

There are different approaches to embed an electrical component into a pair of glasses. For example, the glasses can be made of plastic (e.g., plastic frames). One way to produce such frames is to first assemble electrical components onto a circuit board. The circuit board can be shaped to fit, for example, the temple of the glasses. The circuit board is placed into a mold. Then, hot, molten plastic is injected around the circuit board to form the temple piece of the glasses. To reduce weight, the wall of the glasses can be made relatively thin through injection molding techniques.

In another embodiment, the glasses have metallic frames. For example, the frames can be made of Titanium, which is a relatively light metal. Also, Titanium is relatively non-conductive and strong, and is quite immune to corrosion. Further, Titanium can be anodized or heat colored.

For glasses with metallic frames, to prevent circuits from being shorted or to reduce leakage current, one embodiment provides an insulating layer between the electrical components or circuit board and the metallic frames. One example of an insulting layer is a tape to encapsulate the electrical components. The tape is non-conducting so as to provide insulation and, to a certain degree, can also provide mechanical stiffness. One way to make such temples is to have two sheets of the metal die-stamped to form the two halves, or the two faces of the temple piece. A circuit board is made to fit into the space between the faces. Then, two die-cut pieces of insulator material (e.g., dielectric tape) can cover the top and the bottom surfaces of the circuit board. The board is then sandwiched between the faces to form the temple. In one example, the dielectric tape can be double-sided sticky tape, with one side sticking to the circuit board, and the other side sticking to the temple. An adhesive can be used to glue the two faces of the temple piece together.

In yet another embodiment, the frames are made of hard rubber. The frames can be manufactured in an approach similar to injection molding techniques, with circuit boards inserted into the mold along with the rubber at the time of molding.

Different types of speakers can be used, such as, standard, fixed-magnet/moving coil speakers; speakers with fixed-coil and a steel diaphragm; piezo-electric speakers; and electrostatic speakers.

Figure 22:
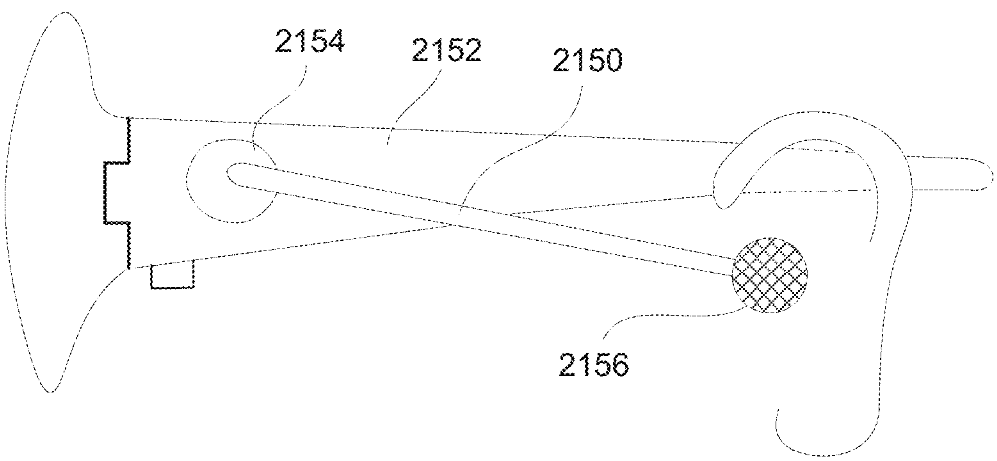
FIG. 22 shows a tube extending from a speaker at a temple of the glasses to guide sound to one of the ears of the user according to one embodiment of the invention.

In one embodiment, the glasses further include a tube, such as a plastic tube, extending from a speaker. The tube serves to guide sound generated by the speaker to one of the ears of the user. FIG. 22 shows an embodiment where a tube 2150 is located on the outside of a temple 2152. In another embodiment, the tube can be on the inside of a temple.

In one embodiment, the tube 2150 can be rotated, such as from behind the temple 2152 (if the tube is on the inside of the temple) to being downward at an angle towards one of the ears of the user, such as the position shown in FIG. 22. To increase flexibility, the tube can be attached to a rotating disk 2154, which allows rotation about the speaker.

In another embodiment, the tube is malleable. This allows the tube to be placed in different positions.

Figure 23:
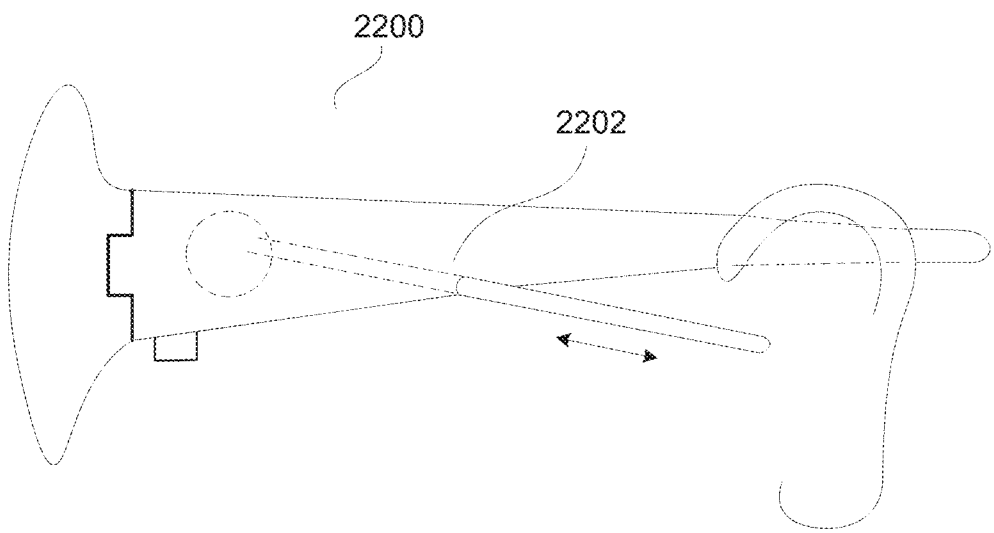
FIG. 23 shows a retractable tube extending from a speaker at a temple of the glasses according to one embodiment of the invention.

In one embodiment, the length of the tube is adjustable. FIG. 23 shows such an embodiment 2200 of a pair of glasses with a retractable tube 2202. In the figure, the tube is shown to be in its extended position.

To further enhance sound coupling, in one approach, there is a plug 2156 at the end of the tube for inserting into an ear of the user. The plug can be an ear bud. The plug can provide a cushion, foam rubber or other materials. Such materials give comfort and/or enhance sound coupling to the ear canal.

Figure 24:
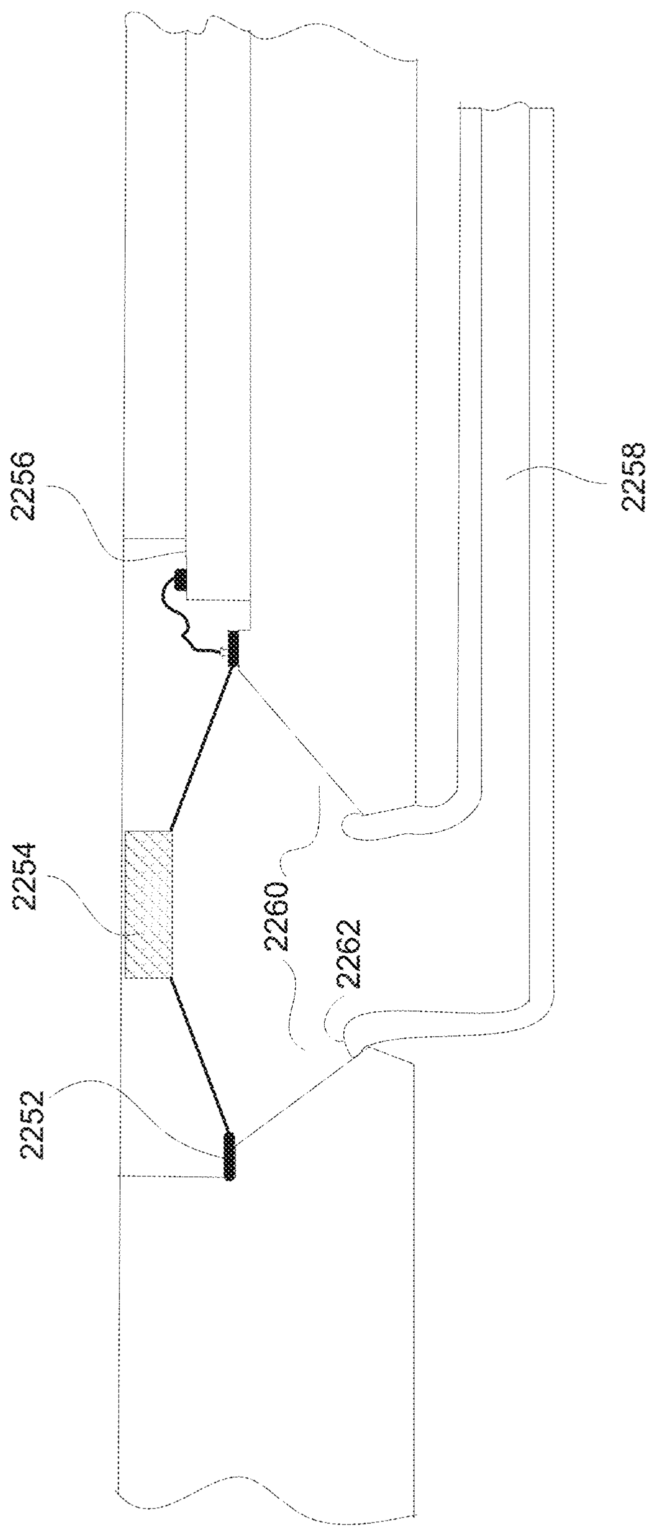
FIG. 24 shows a funnel at the output of a speaker in the glasses according to one embodiment of the invention.

In another approach, there is a funnel at the output of the speaker. FIG. 24 shows the cross section of such a funnel from a speaker at a temple region of the glasses. As shown in FIG. 24, the speaker 2254 sits on a speaker frame 2252, and the speaker 2254 is electrically connected to a circuit board 2256. As sound is generated from the speaker 2254, the sound propagates to a tube 2258 through a structure 2260 in the shape of a funnel. Such a structure helps guide the sound to the tube (i.e., improved sound coupling). Also, FIG. 24 shows the tube, which can be the tube 2150 shown in FIG. 22, mounted onto the temple region of the glasses with a circular lip 2262. Such a lip 2262 allows the tube 2258 to rotate relative to the glasses. In the embodiment shown in FIG. 24, the speaker 2254 is fully embedded in the glasses.

As an alternative to or in conjunction with the tube, the glasses can include a channel to likewise guide sound generated by the speaker to one of the ears of the user. For example, the channel can be formed within a temple. The temple also has an opening to output the sound towards the user's ear.

FIG. 21 shows one speaker at one of the temples. There can be more than one speaker at each temple. In one embodiment, there can also be at least one speaker at each temple. The two speakers can generate stereo effects.

In another embodiment, the glasses can provide four or more speakers to give a high fidelity sound or a surround sound effect. For example, each temple can include one speaker in front of the user's ear, and one speaker behind the user's ear. The different speakers can generate different portions or sections of the sound. Further, if a base (discussed below) or portable electronic device is coupled to the glasses, the base or portable electronic device can contain another speaker, such as a base or woofer speaker. Such embodiments enable the glasses to provide a personal high-fidelity sound or a surround-sound environment.

Electrical signals can be coupled to an electrical component, such as a speaker, in a pair of glasses through a number of mechanisms. In one embodiment, there is an electrical connector at least partially embedded in the glasses. In other words, at least a portion of the connector is inside the glasses. The connector is electrically coupled to the speaker (or other electrical component) by, for example, a conductor. The conductor can be on a printed-circuit board. In one embodiment, the conductor is also embedded in the glasses.

Figure 25:
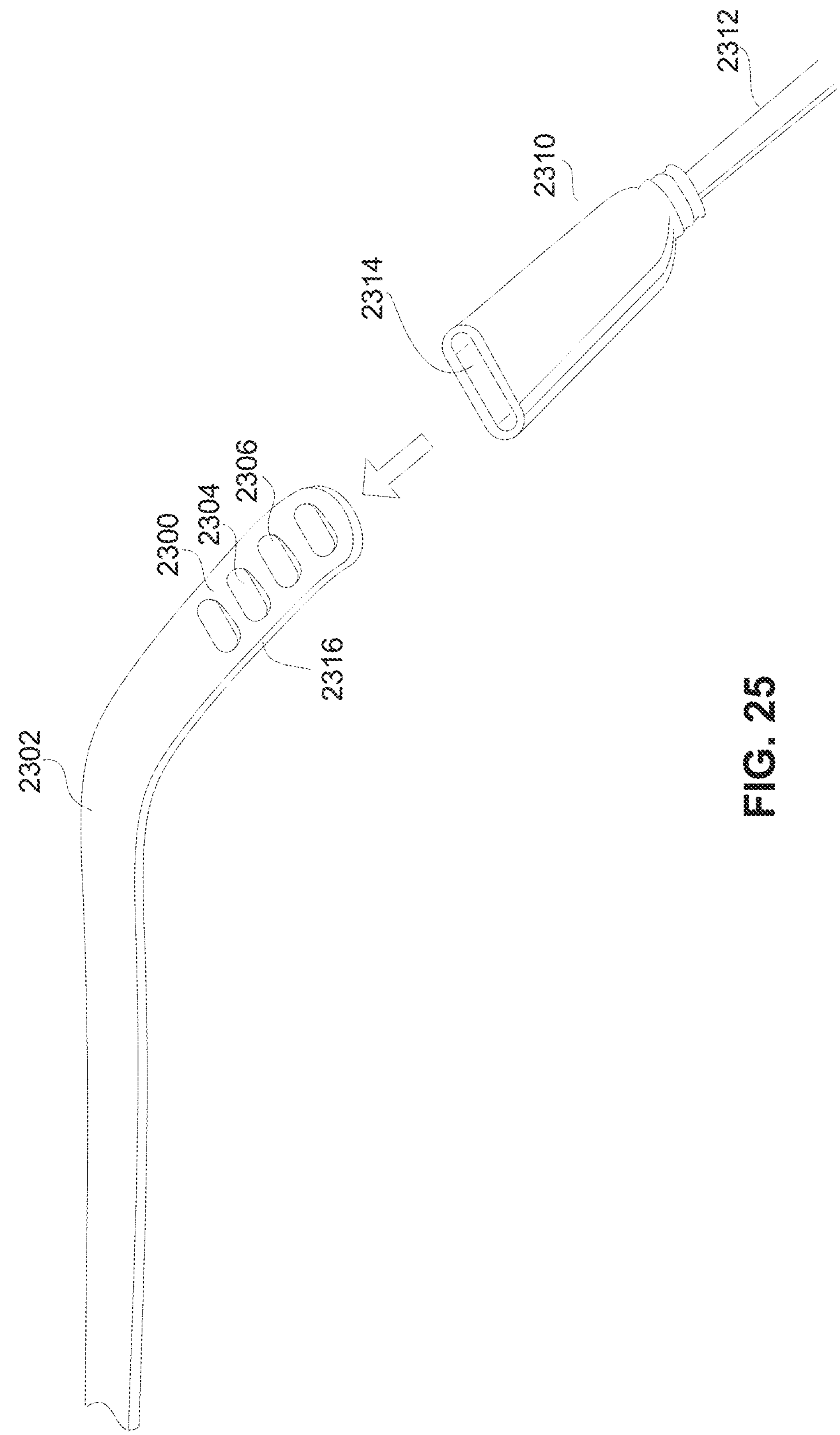
FIG. 25 shows a male connector at the end of a temple according to one embodiment of the invention.

Regarding connectors, FIG. 25 shows one embodiment where the connector is not a standard connector. The end 2108 of the temple 2104 of the glasses 2106 shown in FIG. 21 has a similar connector. In FIG. 25, the connector is a male plug or a male connector 2300 at the end of a temple 2302 of a pair of glasses. The connector 2300 is connected to the speaker through, for example, one or more wires embedded in the temple. Electrical signals external to the glasses can then be coupled to the speaker (or other electrical component) through the plug.

As shown in FIG. 25, the free end of the temple 2302 can have a relatively flat cross section. There can be one or more electrically-conductive contacts, such as 2304 and 2306, on one or both of the flat surfaces of the temple. In FIG. 25, four contacts are shown on one surface of the temple. The contacts, 2304 and 2306, can be metal pads or bumps.

In one embodiment, a non-standard connector can be made using printed-circuit board technologies. First, a printed-circuit board with printed conductors connected to metal contact bumps is produced. Then plastic is overmolded around the printed-circuit board, with the mold designed to shut off around the bumps or pads. The overmolded plastic can serve as the temple, and the pads would be left exposed. Thus, portions of the printed circuit board are covered by plastic, and areas with the bumps or pads are exposed for connection. These pads serve as the connectors for the glasses.

Regarding printed-circuit boards, there can be one or more circuit boards in the glasses. For example, there can be a circuit board in one of the temples of the glasses. Or, the circuits can be divided into two circuit boards, one in each temple of the glasses. The circuit boards can carry additional electrical components to be described below.

In one embodiment, the circuit boards are rigid. In another embodiment, the circuit boards are made of flexible materials, such as a polyimide sheet, like Kapton®. In one embodiment, the circuit board is configured or adapts to the shape of the temple in which it resides.

As shown in FIG. 25, the end of the temple 2302 serves as a male connector (plug) 2300. The non-standard male connector 2300 can be received by a non-standard female connector (plug) 2310. Typically, the female connector 2310 makes electrical and physical connection through grabbing around the male plug. The female connector 2310 can be connected to a cable 2312.

Figure 26A:
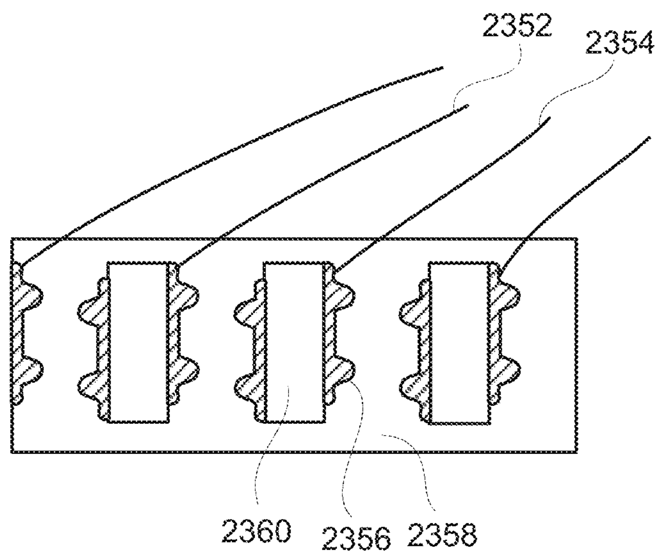
FIGS. 26A-26B illustrate a process to make a non-standard female plug couple to a male connector at a pair of glasses according to one embodiment of the invention.
Figure 26B:
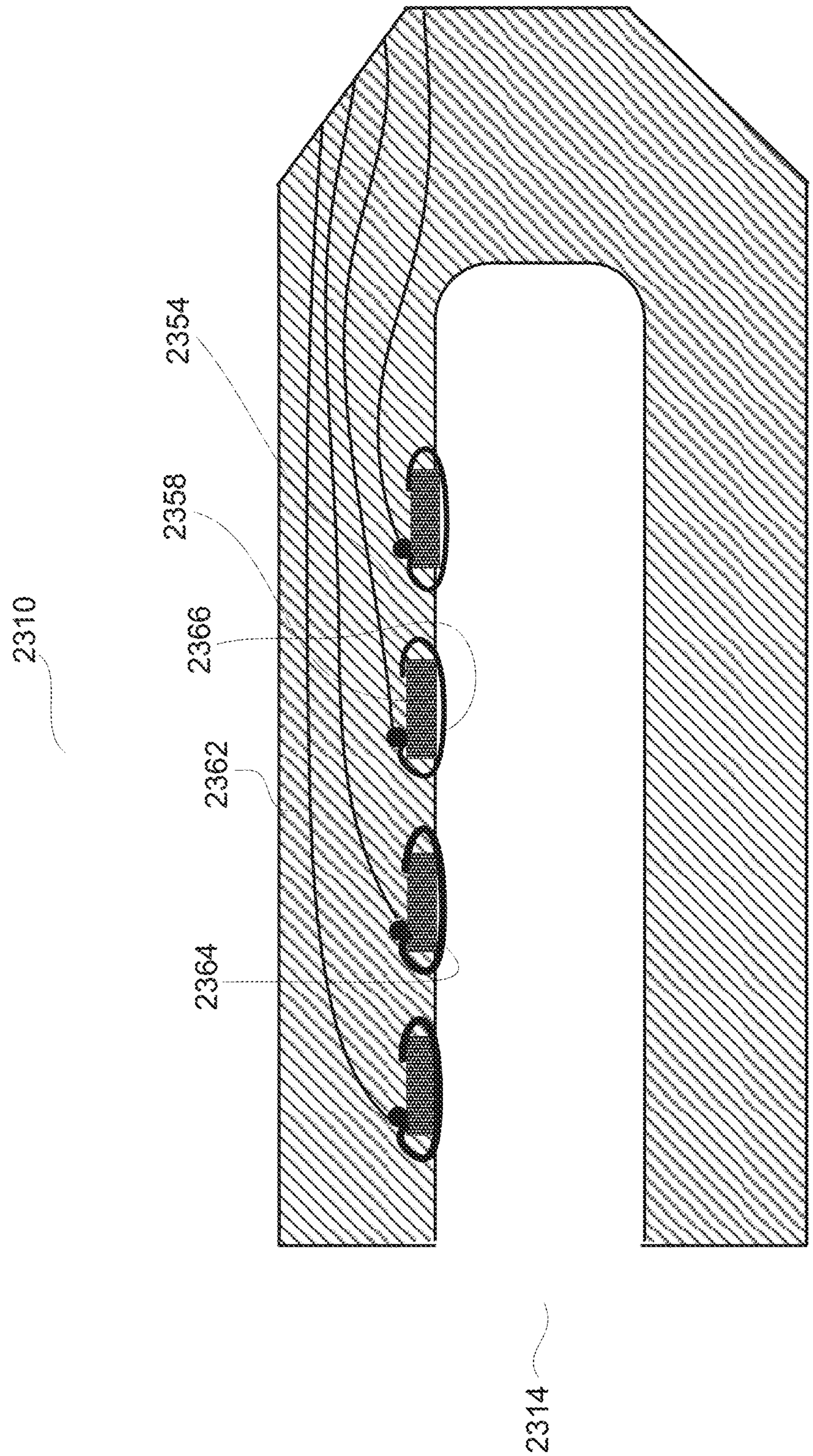

FIGS. 26A-26B illustrate a process to make the non-standard female plug 2310. First, an electrical wire 2354 is attached to a small sheet or piece of metal 2356. FIG. 26A shows a number of such wires, with a number of the metal sheets or pieces crimped to a hard PVC 2358. The figure shows the back side of the crimped board with the wires and with a number of holes, such as 2360. Then the frame is overmolded with a soft PVC. FIG. 26B shows a cross section of the overmoded frame 2362 with the soft PVC. As shown in the figure, a number of the metal sheets, such as 2364 and 2366, are exposed. They are the metal contacts in the female connector 2310. Instead of the above approach, alternatively, a wire can be attached to a sheet of metal by putting the wire between the metal and the plastic as the metal is crimped onto a plastic. When the temple (i.e., male connector 2300) is inserted into the female plug, the soft PVC material stretches slightly, providing a spring-force to keep the contacts connected.

The hard PVC can have a hardness of over 80 durometer, while the soft PVC can have a hardness of less than 50 durometer. The hard PVC can be replaced by other materials, such as Polypropylene or cloth. The soft PVC can be replaced by Silicone, or a thermo-plastic elastomer, such as Kraton®.

Referring to both FIG. 25 and FIG. 26B, when the male connector 2300 is inserted into the slot 2314 of the female connector 2310, the metal pads, 2304 and 2306, will get in contact, or mate, with the metal sheets, 2364 and 2366.

In one embodiment, as long as the male connector 2300 is pushed all the way into the female connector 2310, the pads are aligned correctly to the sheets for electrical connections. In another embodiment, there is an alignment mechanism to guide the position of the temple relative to the female connector so as to ensure the conductive sheets to be in contact with the conductive pads. For example, there can be a registration location to indicate that the male connector is at the appropriate position relative to the female connector. There can be an alignment extension, which can be a partial sphere, close to the end of the temple 2302, such as between the pads 2304 and 2306, at 2316. And, there can be a corresponding alignment notch at the female connector 2310. When the extension is received or caught by the notch, the male connector 2300 is in the appropriate position relative to the female connector 2310. In other words, the alignment is proper, and the pads and the sheets are in contact.

Figure 27:
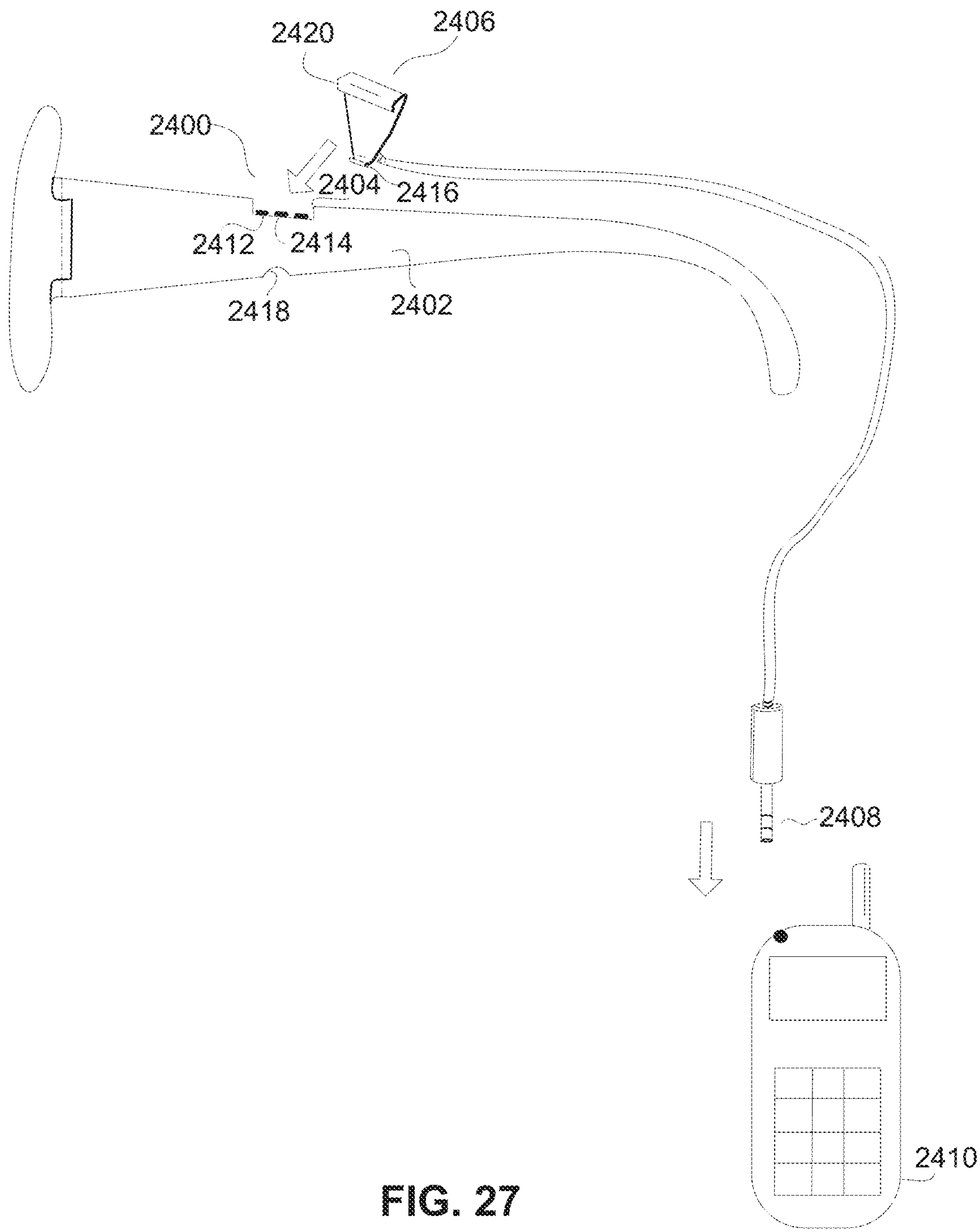
FIG. 27 illustrates another non-standard connector, applicable to clamp onto a temple of a pair of glasses according to an embodiment of the invention.

FIG. 25 shows the non-standard male connector 2300 at one end of a temple of a pair of glasses. In yet another embodiment, a non-standard connector can be at another location. FIG. 27 shows another example of a non-standard connector 2400. The connector 2400 includes one or more conductive pads, 2412 and 2414, on the top side of a temple 2402. The connector 2400 is designed to receive another connector 2406 that grabs onto the side of the temple 2402. There can be an indentation 2404 on the temple 2402 to receive the other connector 2406. The other connector 2406 can include a top 2420 and a bottom 2416 clip. There are a number of conductive pads or sheets inside the other connector 2406. The indentation 2404 provides an alignment to indicate where the top clip 2420 of the other connector 2406 should grab onto the temple 2402 for connection. At that position, the conductive pads at the temple will be in contact with the conductive pads or sheets at the other connector 2406. There can also be another indentation 2418 at the temple 2402 to receive the bottom clip 2416. This can further enhance the alignment process and to secure the connection.

In FIG. 27, the other connector 2406 is coupled to one end of a cord and a plug 2408, which can be inserted into a portable device 2410, can be connected to another end of the cord. The portable device, for example, can be a cell phone. This type of non-standard clip-type connector could be easily applied to the temple with one hand, for example, while the user is driving a car.

A number of non-standard connectors have been described. In another embodiment, the contacts are based on standard connectors, which can be off-the-shelf connectors. FIGS. 28A-28E show a number of examples of such connectors.

Figure 28A:
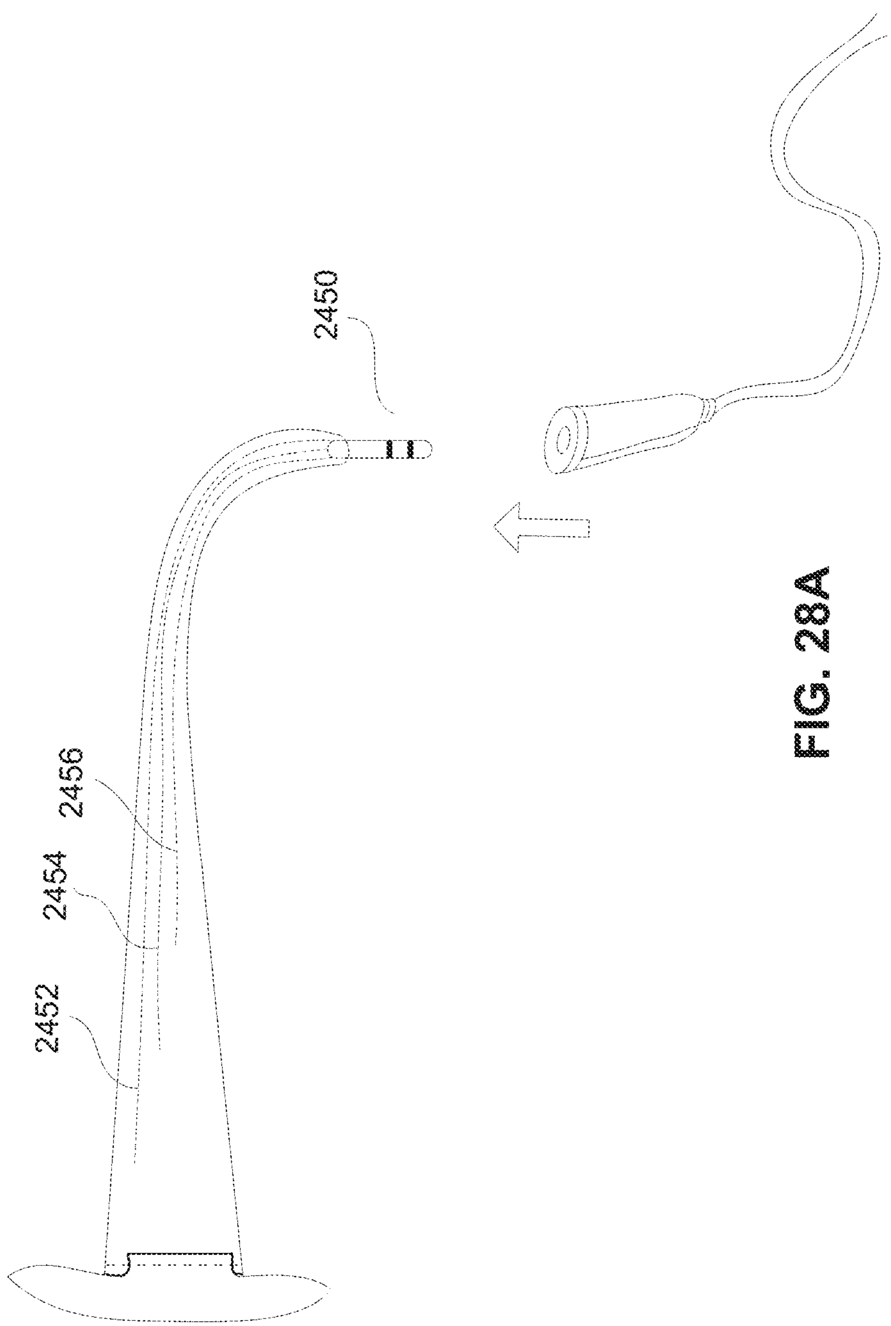
FIGS. 28A-28E shows different embodiments of standard connectors located at different positions on the temple of a pair of glasses according to the invention.

In one embodiment, the standard connector is a standard cylindrical plug located at the end of a temple. From a different perspective, the temple molds around the end of the plug. FIG. 28A shows one such embodiment. The plug 2450 can be a standard audio connector or a 3-wire or three terminal plug, such as a 3.5 mm male stereo mini-phone plug. The 3 wires for such a plug are typically one for ground, the other two applicable for two signals, such as for creating stereo effects. FIG. 28A also shows the three wires, 2452, 2454 and 2456, inside the temple, extended from the plug 2450. These wires are for connection to electrical components of the glasses.

In one embodiment, the cylindrical plug 2450 shown in FIG. 28A can be protected, encapsulated or shrouded. Or, at least a portion of the plug is protected, encapsulated or shrouded. Such protection can, for example, be for esthetic reasons, or to prevent the plug from scratching the face of the user when the user is putting on the pair of glasses. In FIG. 28A, the plug 2450 is partially embedded in a temple.

Instead of a three terminal plug, other types of standard cylindrical plugs applicable to different embodiments of the present invention include a serial connector with 3 pins, typically one for ground, one for transmitting data (Tx) and the third for receiving data (Rx); or (b) a 2-wire connector, one served as ground, the other for carrying, such as power and modulated signals.

In yet another embodiment, instead of a cylindrical plug, the standard connector at the end of a temple of a pair of glasses is a USB or a FIREWIRE connector.

A number of embodiments have been described where the standard connector(s) at the glasses are male connectors. In yet another embodiment, the standard connector(s) in the glasses are female connectors. For example, there can be a 3.5 mm female stereo mini-phone plug at the end of a temple of a pair of glasses. At least a portion of the female connector can be protected, encapsulated or shrouded. For example, the female connector can be recessed within the end of a temple.

Figure 28B:
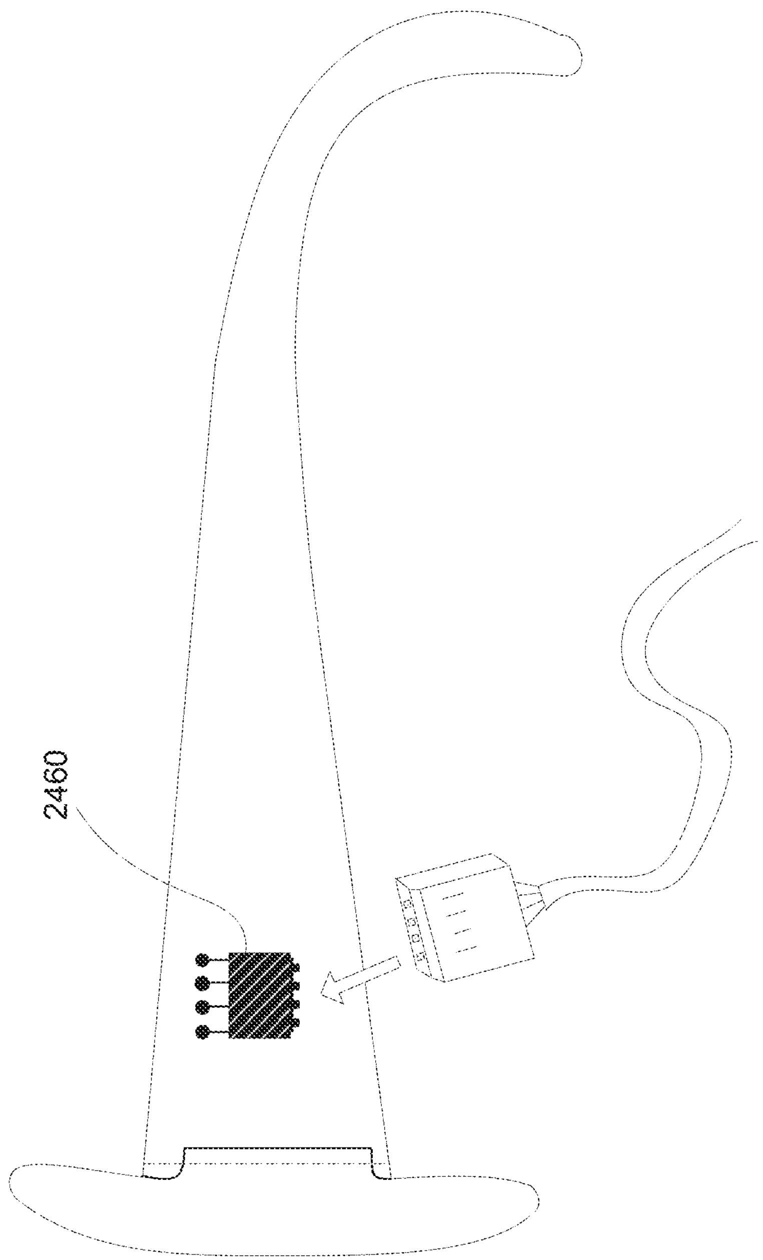
Figure 28C:
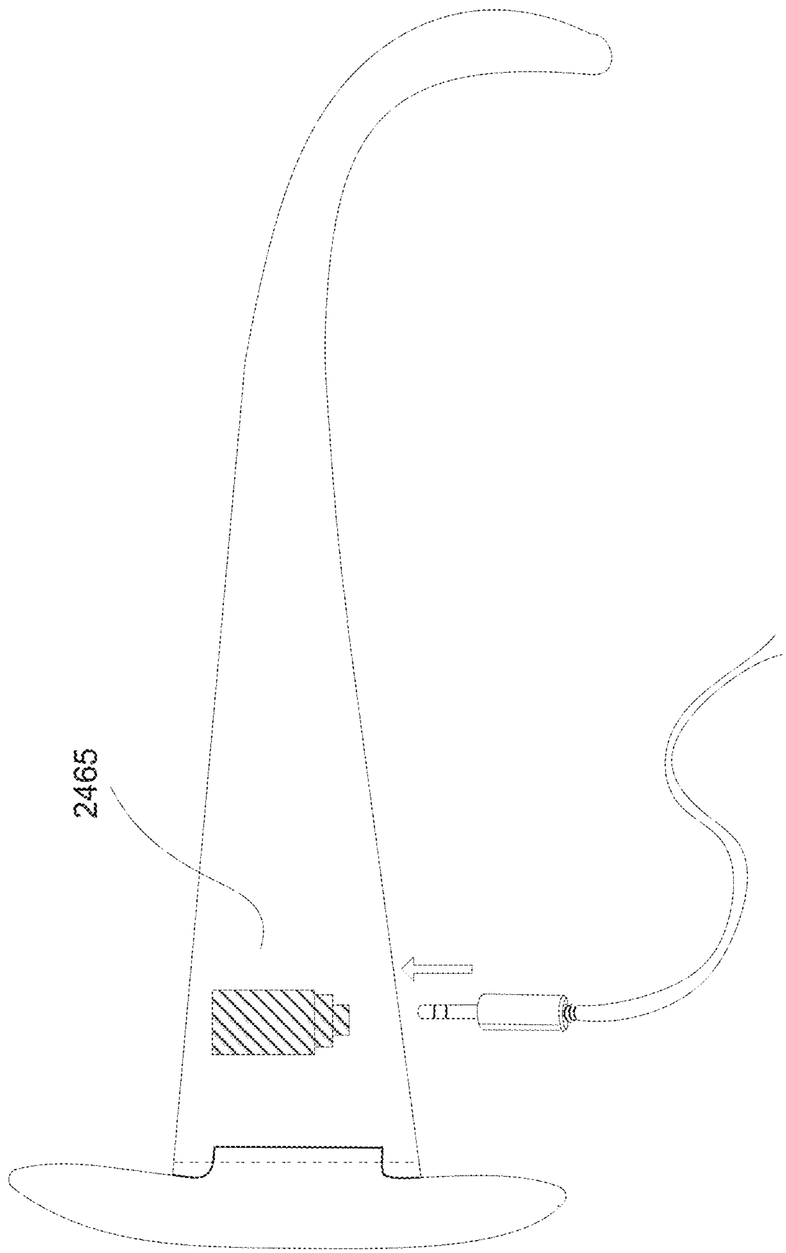
Figure 28D:
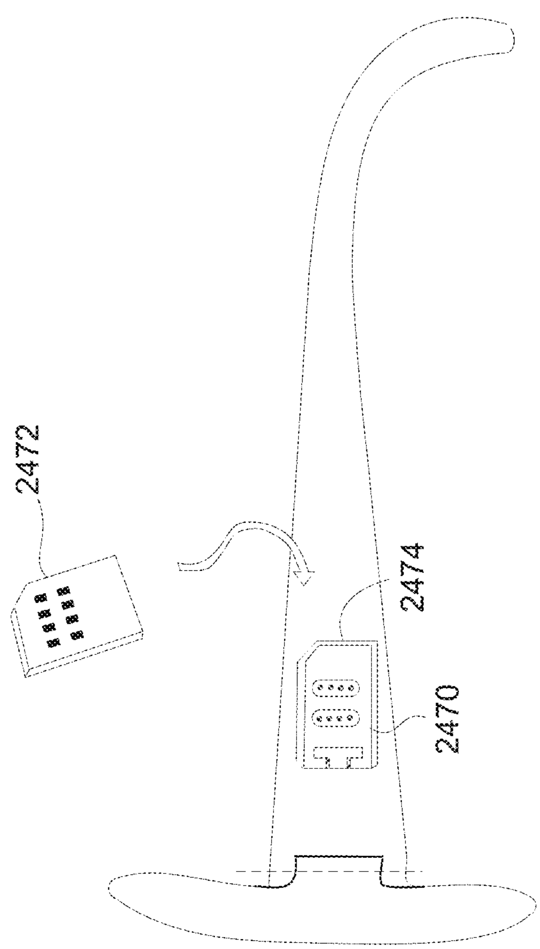
Figure 28E:
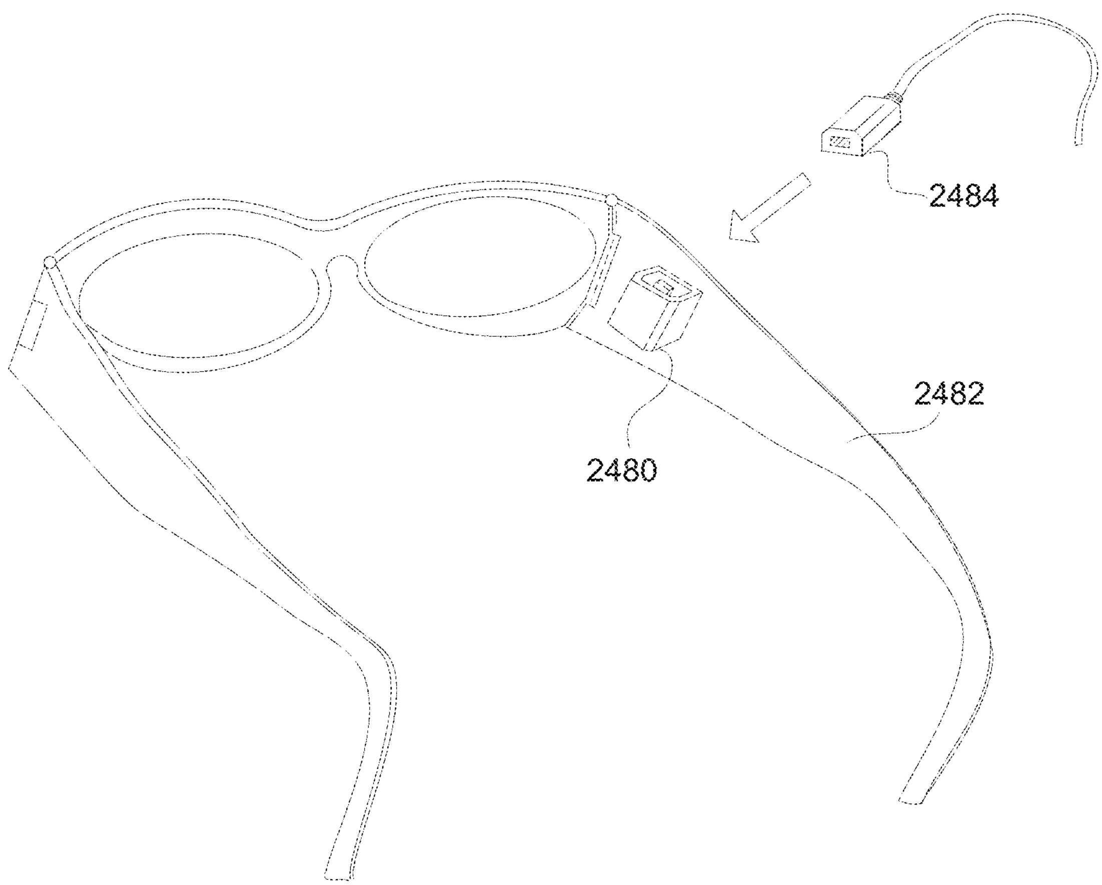

FIGS. 28B-28E show different examples of standard connectors located or partially embedded not at the end of a temple of a pair of glasses, but, for example, on the side of the temple, such as on the inside surface or the outside surface of a temple. FIG. 28B shows a 0.10" header plug 2460, commonly known as a MOLEX connector, on such a surface. FIG. 28C shows a female mini-phone plug 2465 on such a surface. FIG. 28D shows a card connector 2470 to receive a card 2472, such as a removable media card (e.g., memory card). There can be a cover 2474 to secure and/or protect the media card 2472 in place after it is inserted into the card connector 2470. FIG. 28E shows a female USB connector 2480 on the inside surface of a temple 2482 to receive a male USB connector 2484.

Figure 28F:
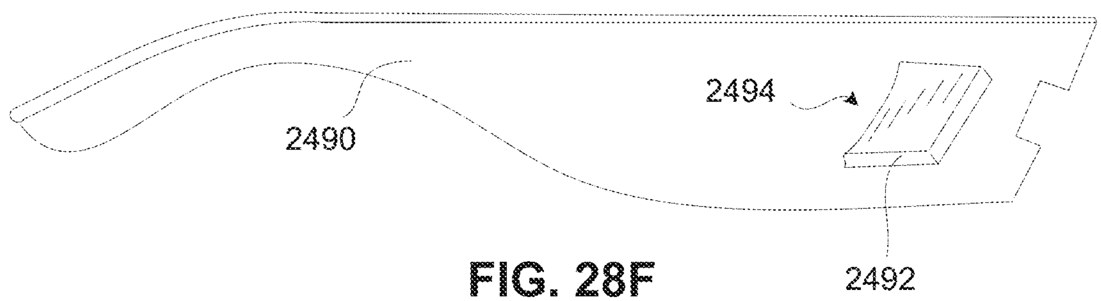
FIGS. 28F-28H are diagrams pertaining to providing a removable electronic device with an eyeglass frame according to one embodiment of the invention.
Figure 28G:
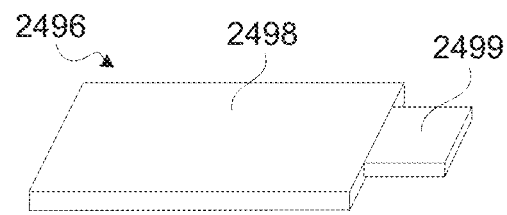
Figure 28H:
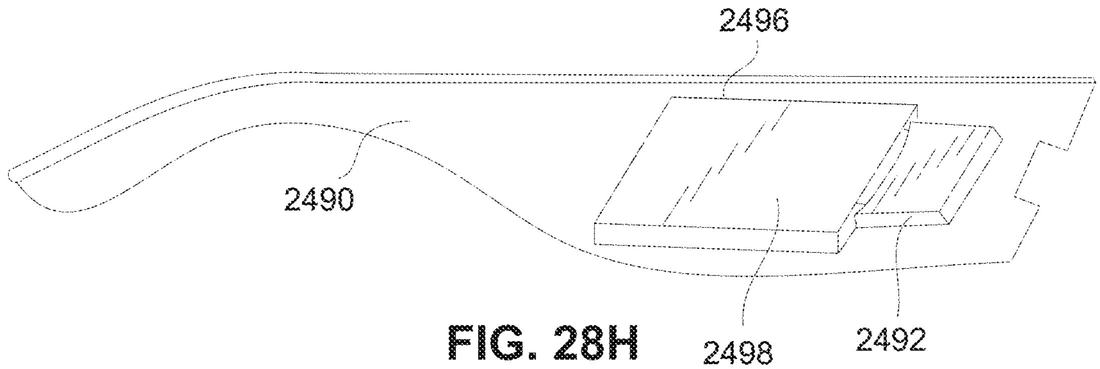

FIGS. 28F-28H are diagrams pertaining to providing a removable electronic device with an eyeglass frame according to one embodiment of the invention. FIG. 28F illustrates a temple 2490 that includes a connector 2492. The connector 2492 includes an opening 2494. A removable electronic device can be coupled to the temple 2490 using the connector 2492. More particularly, FIG. 28G illustrates a removable electronic device 2496 that includes an electronic device housing 2498 and a connector 2499. As an example, the removable electronic device 2496 can be a memory storage device, sometimes referred to as a memory card. FIG. 28H illustrates the removable electronic device 2496 coupled to the temple 2490. The removable electronic device 2496 is coupled to one side of the temple 2490, such side can be either an inside or outside surface of the eyeglass frame. When the removable electronic device 2496 is coupled to the temple 2490, the connector 2499 of the removable electronic device 2496 is inserted into the opening 2494 of the connector 2492. Physical forces between the connector 2499 and the connector 2492 operate to secure the removable electronic device 2496 to the temple 2490, yet permit the removable electronic device 2496 to be removable therefrom.

In one embodiment, the connector 2492 is not electrically connected to any electronic circuitry within the temple 2490 or other parts of the eyeglass frame. In other words, the connector 2492 provides a convenient means by which removable electronic devices can be coupled to the eyeglass frame. In another embodiment, the connector 2492 can be coupled to electrical circuitry within the temple 2490 or elsewhere within the eyeglass frame. Such an embodiment allows the electronic components within the removable electronic device 2496 to be utilized with the electrical circuitry within the temple 2490 or elsewhere within the eyeglass frame. For example, the removable electronic device 2496 can provide data storage and/or other software modules to be utilized by or to utilize the other electrical circuitry within the temple 2490 or elsewhere within the eyeglass frame. In any case, by attaching the removable electronic device 2496 to the temple 2490 (and thus the eyeglass frame), the removable electronic device 2496 is able to be conveniently carried by the user of the eyeglass frame. In one implementation, the eyeglass frame, which includes the connector 2492, becomes a docking station for the removable electronic device 2496. As such, a variety of different removable electronic devices can be interconnected with the eyeglass frame, as desired. For example, the eyeglass frame can thus support different function or operations depending on the removable electronic device that is attached. For example, the eyeglass frame might operate as a camera, data storage device, FM radio, MP3 player, mobile telephone, pedometer, hearing enhancer, sun sensor, time piece, etc.

In one embodiment, the removable electronic device 2496 can align itself with the orientation of the temple 2490, such as shown in FIG. 28H. In FIG. 28G, the electronic device housing 2498 can be said to have an elongated housing. The configuration (e.g., shape) and/or color of the removable electronic device 2496 can also be designed to conform or complement the design of the temple 2490. In one embodiment, the temple 2490 might also have a recessed region to allow the portable electronic device to be less visually perceptible when attached to the temple 2490 or to provide a more consistent contour of the temple 2490.

In one embodiment, the connector 2499 is a male connector, and the connector 2492 is a female connector or a similarly sized structure. In one implementation the connector 2499 is a peripheral bus connector, such as a Universal Serial Bus (USB) connector. In such cases, the connector 2492 can also be a peripheral bus connector (either electrically functional or non-functional as noted above).

Although the embodiment illustrated in FIGS. 28F-28H utilize connectors, namely, electrical connectors, the removable electronic device 2496 could be attached to the temple in other ways. For example, other means to provide physical forces to hold the removable electronic device 2496 in place can be used.

Figure 28I:
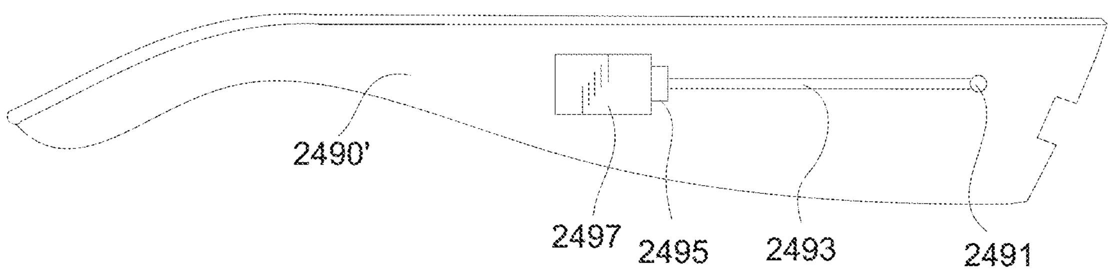
FIG. 28I is a diagram of a temple of an eyeglass frame according to another embodiment of the invention.

FIG. 28I is a diagram of a temple of an eyeglass frame according to another embodiment of the invention. In this embodiment, the temple 2490' includes an opening 2491 through which a cable 2493 extends outward. The cable 2493 has an electrical connector 2495 connected at its end. The electrical connector 2495 is electrically connected to electrical circuits within the temple 2490' or elsewhere within the eyeglass frame such as by way of one or more wires contained within the cable 2493. In one implementation, the length of the cable 2493 is about one to four inches. The temple 2490' shown in FIG. 28I also includes a receptacle 2497. The receptacle 2497 is affixed to or integral with the temple 2490 to receive the electrical connector 2495. Typically, the receptacle 2497 provides a holding mechanism for the electrical connector 2495 when not been utilized. When the electrical connector 2495 is being utilized, the electrical connector 2495 is removed from the receptacle 2497 and coupled to a corresponding counterpart connector of another electrical device. The cord 2493 can provide ease-of-use so that the electrical connector 2495 can be maneuvered to couple to the counterpart connector. In one embodiment, the temple 2490' can provide a recess for receiving the entire cable 2493, with the outer surface of the receptacle 2497 being substantially flush to the surface of the temple 2490. So when the connector 2495 is not in use, the connector 2495 can be in the receptacle 2497, with the cable 2493 in the recess. In one embodiment, when the cable 2493 is in the recess and the connector 2495 inside the receptacle 2497, the cable 2493 has substantially no slack. Also, in another embodiment, the cable 2493 can be retractable into the opening 2491. In the embodiment shown in FIG. 28I, the electrical connector 2495 is a male connector, and the receptacle 2497 is a female connector or a similarly sized structure.

A number of standard and non-standard connectors have been described. Other types of connectors can also be used. In one embodiment, there is a connector adapter, which serves to transform such other type of connectors to a different interface. For example, an adapter can be a cord with one type of connector at one end and a different type of connector at the other end.

In one or more of the above embodiments, the glasses can access audio signals from another device through a connector at the glasses. The another device can be a multimedia asset players or a radio.

In one embodiment of the invention, the glasses have a storage medium (i.e., memory). The memory can be on a printed-circuit board and, for example, store 256 MBs or more. The memory can be a built-in or removable flash memory. The memory can be coupled to a device external to the glasses through one or more connectors at the glasses. As an example, a 256 MB flash memory is in one of the temples of a pair of glasses, and there is a USB connector at the free end of that temple to couple to an external device.

With the embedded storage medium, the glasses can upload information in the memory to or download information into the memory from an external device, such as a computer. A user can plug the glasses into the computer through a connector, either directly, or indirectly, with, for example, an intermediate wire in between. The user can store files in the glasses. Such an embodiment should reduce the chances of the user losing the files because the user has to lose the glasses as well.

Figure 29:
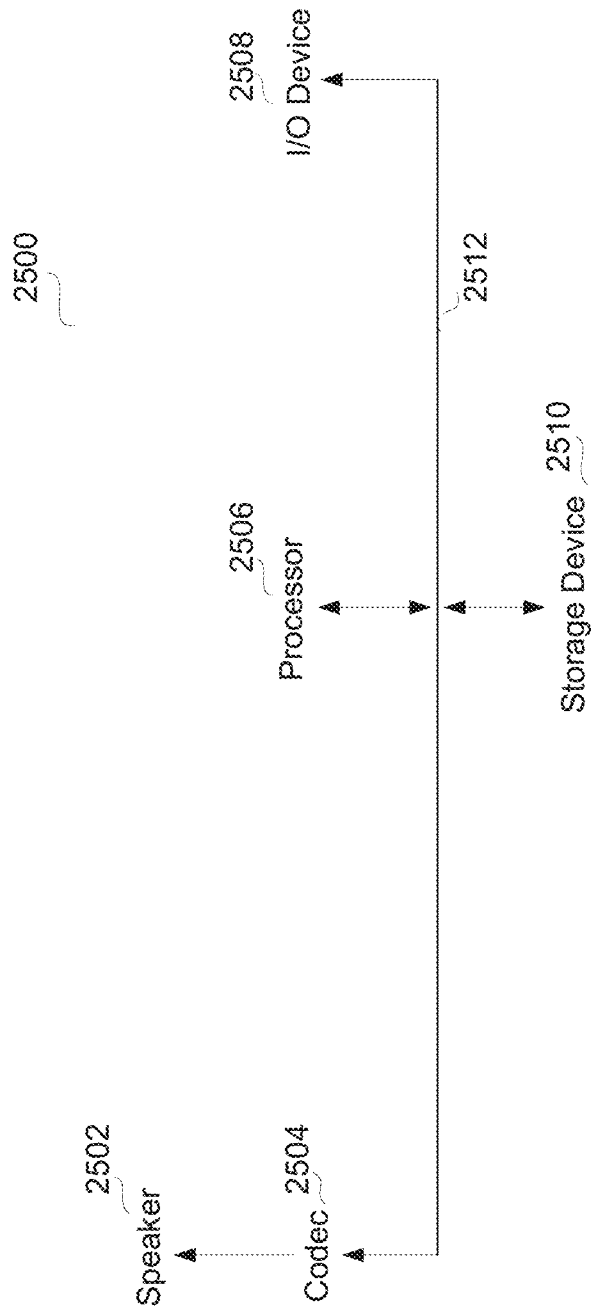
FIG. 29 shows some of the electrical components for a MP3 player according to an embodiment of the invention.

In yet another embodiment of the invention, a pair of glasses includes a multimedia asset player, such as a MP3 player. FIG. 29 shows some of the electrical components for a MP3 player 2500 according to an embodiment of the invention. The player 2500 includes a speaker 2502 and a data bus 2512, which facilitates data transfer among, for example, a processor 2506, a storage device 2510, and a coder/decoder (CODEC) 2504. The processor 2506, which can be a microprocessor or controller, controls the operation of the player 2500. The storage device 2510 stores the multimedia assets, such as MP3 files, or other types of media data that are appropriately formatted. In one example, the MP3 files are digitally encoded songs or other types of audio signals. The storage device 2510 can include a number of separate storage elements. For example, the device 2510 can be a flash memory device, or a minidisk device, and a cache, which can improve the access time and reduce power consumption of the storage device. The storage device 2510 typically also includes a Read-Only Memory (ROM), which stores programs, utilities or processes to be executed in a non-volatile manner. The player 2500 can also include a RAM, such as for the cache.

Once a media asset, such as a song, is selected to be played, the processor 2506 would supply the asset to the CODEC 2504, which decompresses the asset and produces analog output signals for the speaker 2502. In one embodiment, the bus 2512 is also coupled to an input/output device 2508, which would allow a user to upload songs in the glasses to an external instrument, such as a computer, or download songs from the instrument to the glasses.

There are different approaches to select a song. In one embodiment, the songs or the media assets can be categorized in the MP3 player, and the categorization can be hierarchical, with multiple levels in the hierarchy. To illustrate, assume that there are three levels. The top level can be the name of the singer; the second level can be the time period when the asset was produced, and the third level can be the names of the songs. The entries, such as the name of the singer, can be abbreviated. There can be a small display and a control knob to allow a user to scroll down entries in a level. By pushing the knob, the user selects an entry, which can lead the user to a lower level. There can be an entry for moving up a level also. In another embodiment, the display is a touch-screen display, allowing entries to be entered directly on the display. In yet another embodiment, entries can be selected based on voice recognition.

A number of embodiments have been described with the glasses having a connector. In one embodiment, the glasses can have more than one connector. For example, a pair of glasses with two connectors also has a speaker. One connector is, for example, at a broad side of a temple, as in FIG. 28D. The connector can be for coupling to multimedia assets of a MP3 player. Another connector is, for example, at the end of a temple, as in FIG. 28A. That connector can couple power to the glasses. The speaker can play the multimedia assets accessed from one connector, based on power from another connector.

As described, power (e.g., external power source) can be coupled to the glasses through a connector. In one embodiment, the power source is embedded inside or inserted into the glasses. Different types of power sources are applicable. For example, the power source can be a battery, a fuel cell, a solar cell, or a re-chargeable battery. The rechargeable battery can be charged through a connector at the glasses.

In an earlier application, namely, U.S. Provisional Patent Application No. 60/509,631, filed Oct. 9, 2003, and entitled "TETHERED ELECTRICAL COMPONENTS FOR EYEGLASSES," which has been incorporated herein by reference, there can be a base connected to the glasses through a cord. The cord can be just a piece of flexible conductor encapsulated by a flexible insulator. Typically, a cord includes a number of electrical wires or conductors. There can be one or more electrical components in the base, and there can also be one or more electrical components in the cord. The different types of connectors previously described can be located in the base. In one embodiment, a power source is an electrical component in the base tethered to a pair of glasses. In another embodiment, the glasses are tethered to a base that has a connector. The connector is connected to and draws power from an external electronic device. In this embodiment, electrical components in the glasses draw power from the external electronic devices.

Figure 30:
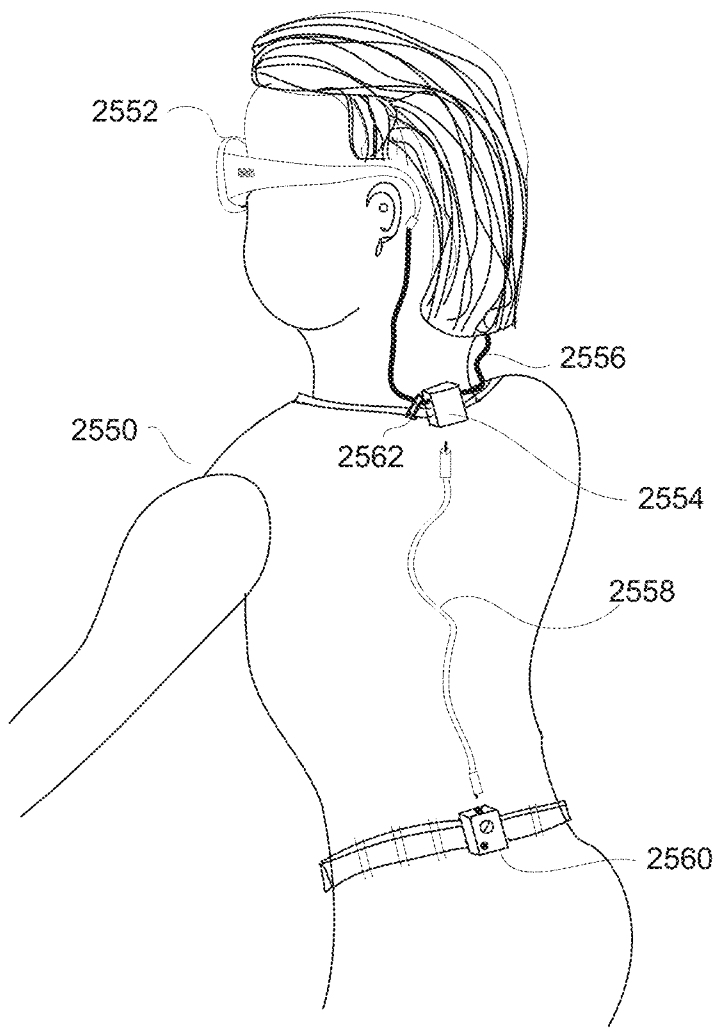
FIG. 30 shows an embodiment of the invention where a user is wearing a pair of glasses with electrical components, tethered to a base, which is connected to a portable device.

FIG. 30 shows an embodiment where a user 2550 is wearing a pair of glasses 2552, which include electrical components. There are also tethered electrical components in a base 2554, which is connected to the glasses 2552 through a cord 2556. In addition, there is a wire 2558 connected to a connector at the base 2554 to a portable electronic device 2560. The portable device 2560 can be (a) a multimedia device, such as a MP3 player/recorder or a minidisk players, (b) a wireless communication device, such as a cell phone, or (c) a personal digital assistant, or other types of portable devices with computing and/or entertaining and/or communication capabilities.

Note that instead of connecting to the portable electronic device 2560 through the base 2554, in another embodiment, the glasses 2552 directly connect to the portable device 2560 through a cord.

In one embodiment, there is an attachment device 2562, such as a pin or clip. The attachment device attaches at least a part of the glasses to the user's clothing. The attachment device 2562 can serve to attach the cord 2556 and/or the wire 2558 and/or the base 2554 to the user's clothing. The attachment can also be through other mechanisms, such as Velcro.

In a number of embodiments, the speaker described is assumed to emit audio signals. In one embodiment, the speaker emits ultrasonic signals. The glasses can be used, for example, as an insect repellant by transmitting ultrasound to repel insects, such as mosquitoes. In this embodiment, the one or more speakers broadcast the ultrasonic signals away from the user. In other words, the speakers face outwards, not inwards towards the user. In this embodiment, the glasses, which can include a base, also has a power source to provide power to the speaker. There can also be a control knob to turn the one or more speakers on/off on the glasses. There will be additional discussions on the control knob below.

In another embodiment, the glasses generating ultrasonic signals can be used to produce audio signals that are more directional. For example, two ultrasonic signals are generated by a speaker in the glasses, with their difference frequencies being the audio signals. The audio signals generated based on mixing the two ultrasonic signals can be much more directional than audio signals directly generated from the speaker.

Referring back to FIG. 21, in one embodiment, the glasses include a microphone 2110. The microphone 2110 can be at the end of a temple 2104 close to a lens holder 2112. Or, the microphone 2110 can be in the lens holder 2112, located directly adjacent to the temple 2104. In yet another embodiment, there can be a small protrusion extending down from the temple to house the microphone.

With glasses having a microphone, one can use the glasses to record voices into, for example, a storage medium. The storage medium can be in the glasses, or can be in a base or a portable device attached to the glasses.

Different types of microphones can be used. For example, they can be electret microphones, crystal microphones, resistance microphones, piezoelectric microphones or moving-coil microphones.

In one embodiment, the glasses with a microphone also include a speaker that can generate directional sound. A user can speak into the microphone and his message can be transmitted from the glasses in a more directional manner.

In another embodiment, the glasses also include a notification electrical component to provide a notification to the user wearing the glasses. The notification can be to notify, alert or display information to the user. There can be a display located at the inside 2114 of the lens holder, or at the vicinity of the junction 2116 or the hinge of a lens holder and its corresponding temple facing the user. Or, there can be a display at the inside surface of a temple, or at other locations on the glasses. The display can be one or more light emitting diodes. To alert the user, one or more diodes can blink. The blinking can be of a specific sequence. Instead of diodes, the display can be a liquid crystal display. The display can provide indications or information to the user. For example, a number or a variable-height bar can be shown. Other than visual indications, the notification or alert can be audio, like a beeper.

In one embodiment, the notification electrical component is for selecting a multimedia asset in a multimedia asset player in a pair of glasses for the multimedia to play. The multimedia asset player can be a MP3 player.

A number of embodiments of the present invention have been described where electrical signals are transmitted to or from a pair of glasses through a physical connection. In one embodiment, electrical signals are wirelessly coupled to a pair of glasses. The coupling can be short range or long range. The coupling can be directly to the glasses, or to a base connected to a pair of glasses. The glasses with wireless coupling capabilities can be used to couple to a Bluetooth network, the Internet, a WiFi network, a WiMax network, a cell-phone network or other types of networks. The coupling can also be through a point-to-point link, such as an infrared link.

Figure 31A:
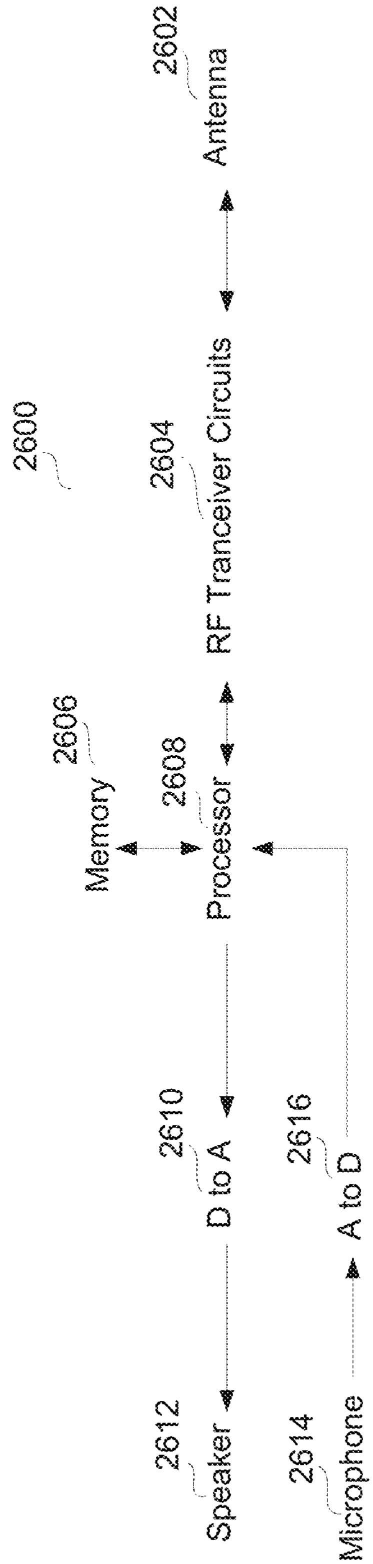
FIGS. 31A-31B show different embodiments of the present invention illustrating some of the electrical components for wireless connections to a pair of glasses.
Figure 31B:
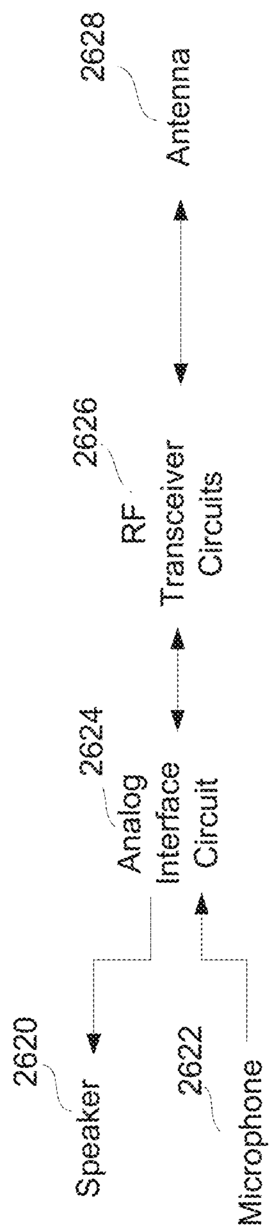

FIGS. 31A-31B show examples of some of the electrical components in or tethered to a pair of glasses for wireless connections, according to embodiments of the present invention. In FIG. 31A, a high frequency or RF antenna 2602 wirelessly captures high frequency or RF signals for RF transceiver circuits 2604. If the transceiver circuits are for a conventional superheterodyne system, the transceiver circuits 2604 mix the RF signals down to IF signals. Then the IF signals are processed by baseband circuits. Digital outputs from the baseband circuits are coupled to a processor 2608 for analysis and synthesis.

Outputs from the processor 2608 are fed to a D-to-A converter 2610 to generate audio signals for a speaker 2612. Similarly, audio analog signals from a microphone 2614 can be fed to an A-to-D converter 2616 to generate digital low frequency signals for the processor 2608 and then to the RF transceiver circuits 2604. The low frequency signals are up-converted by the RF transceiver circuits 2604 and wirelessly transmitted by the antenna 2602.

In another embodiment, digital conversion is moved closer to the antenna. For example, instead of mixing RF into IF signals, the RF transceiver circuits 2604 directly perform digital conversion from the RF signals.

Typically, high frequency filters are used at the front end of the RF transceiver circuits 2604 for the RF signals. In one embodiment, to save space, FBAR (film bulk acoustic resonator) duplexer is employed. A set of piezoelectric filters can be used to separate incoming and outgoing signals. For cell phone operation, such filters can enable a user to hear and speak simultaneously. A number of these electronic devices can be on a circuit board in the glasses. Or, some of the devices are in the glasses, while other in the base tethered to the glasses.

FIG. 31B shows another example of some of the electrical components in or tethered to a pair of glasses for wireless connections according to the present invention. In this embodiment, there does not need to have digital data. A speaker 2620 and a microphone 2622 are connected to an analog interface circuit 2624, which is coupled to a RF transceiver circuit 2626 and an antenna 2628. For the speaker application, the transceiver circuit 2626 mixes the RF signals down into IF signals, which are converted by the analog interface circuit 2624 into analog signals for the speaker 2620. Similarly, for the microphone application, its analog signals are converted into the IF signals by the analog interface circuit 2624 to be up converted by the transceiver circuit 2626 into RF signals for the antenna 2628. These types of circuitry are suitable for, such as, simple radios, analog cell phones, CB radios, walkee-talkees, police radios or intercom systems.

In one embodiment, most of the electrical components are not in the glasses. The pair of glasses includes an antenna to capture the wireless signals, and a connector. The wireless signals captured are transmitted through the connector to electrical circuits external to the glasses.

A number of processors have been described. The processors can use different types of operating systems. In one embodiment, Symbian Operating Systems are used. In another embodiment, operating systems, such as TinyOS, are used. The operating system could be programmed in C++ and then compiled into machine codes.

For privacy protection, signals can be encrypted before transmission. Encryption can take significant computation power, and may generate a fair amount of heat. In one embodiment, encryption capabilities are located in a base tethered to the glasses. There can be a fan inside the base. The fan can be turned on during encryption. In another embodiment, the fan is activated during other high capacity uses for heat dissipation purposes.

In yet another embodiment, there is a fan in the glasses. The fan is located at a temple of the glasses, in the region close to its lens holder. The fan is used to cool the wearer of the glasses.

In one embodiment, a pair of glasses has access to voice recognition software. The software can be embedded in (a) the glasses, (b) a base tethered to the glasses, (c) a portable device wired or wirelessly coupled to the glasses or to the base, or (d) a computing system wired or wirelessly coupled to the glasses. Or, the software or firmware can be in more than one of the above devices.

Glasses that can couple to signals wirelessly can be used in different applications. For example, the glasses can be a cell phone wireless head set, such as a Bluetooth cordless headset. Such short-distance wireless technologies allow the headset to connect to the user's cell phone without a wire. This would allow the user to drive, eat or perform other functions without getting tangled in a pesky wire.

In one embodiment, the cell phone is a VOIP (voice over Internet protocol) phone.

In one embodiment, for the glasses operating as a cell phone head set, the head set includes active noise cancellation mechanism. For example, the glasses include two microphones. One microphone is for capturing the voice of the user. But the microphone captures ambient noise also. It can be embedded in a protrusion extending from the end of the temple close to a lens holder, towards the mouth of the user, as the microphone 2110 in FIG. 21. Another microphone can be located at the top of one of the lens holders pointing away from the mouth of the user. This microphone is for capturing ambient noise. As a first order approximation, outputs from the two microphones could be subtracted from each other to provide voice signals with noise reduced.

In yet another embodiment, the glasses with wireless coupling capabilities also have a multimedia asset player, such as a MP3 player. The glasses can be used to receive music directly in digital format over, for example, a data-capable network of a mobile operator. The music can be received, for example, at a speed of 16 Kbits per second, providing sound quality close to compact disc. If the music is transmitted in a compressed manner, such as in a MP3 format, then the music data can be received at a much lower speed. In one embodiment, the glasses also have a microphone and can serve as a cellular phone or a wireless headset of a cellular phone.

In yet another embodiment, the glasses can serve as a radio, again through electrical components in or tethered to the glasses. In this embodiment, the glasses can include a tuner with one or more control knobs. The knobs can be used to select channels and to set the volume.

In one embodiment, a pair of glasses allows personalization by including a preference indicator. The indicator allows a user to provide his preference, such as on whatever is being output by the glasses. In one example, the glasses also has a radio having a speaker and with electrical components for wireless connection. In this example, the indicator can be used by the user to provide his preference regarding whatever is being played by the radio at that time. This preference can be wirelessly transmitted from the glasses to a third party. To illustrate, when the user is listening to a piece of music, the user can indicate he likes the piece of music by pressing a control knob on the glasses. This piece of preference information is then transmitted and received by a service provider, which is then informed of the user's preference. Instead of a control knob, in another embodiment, the preference indicator is a system with a microphone and voice recognition software. The user can indicate his preference vocally.

In another example regarding the personalization process, the glasses can serve as a multimedia asset player, such as a MP3 player. The song that the user has shown preference can be stored in a storage device, which can be in the glasses.

Figure 32:
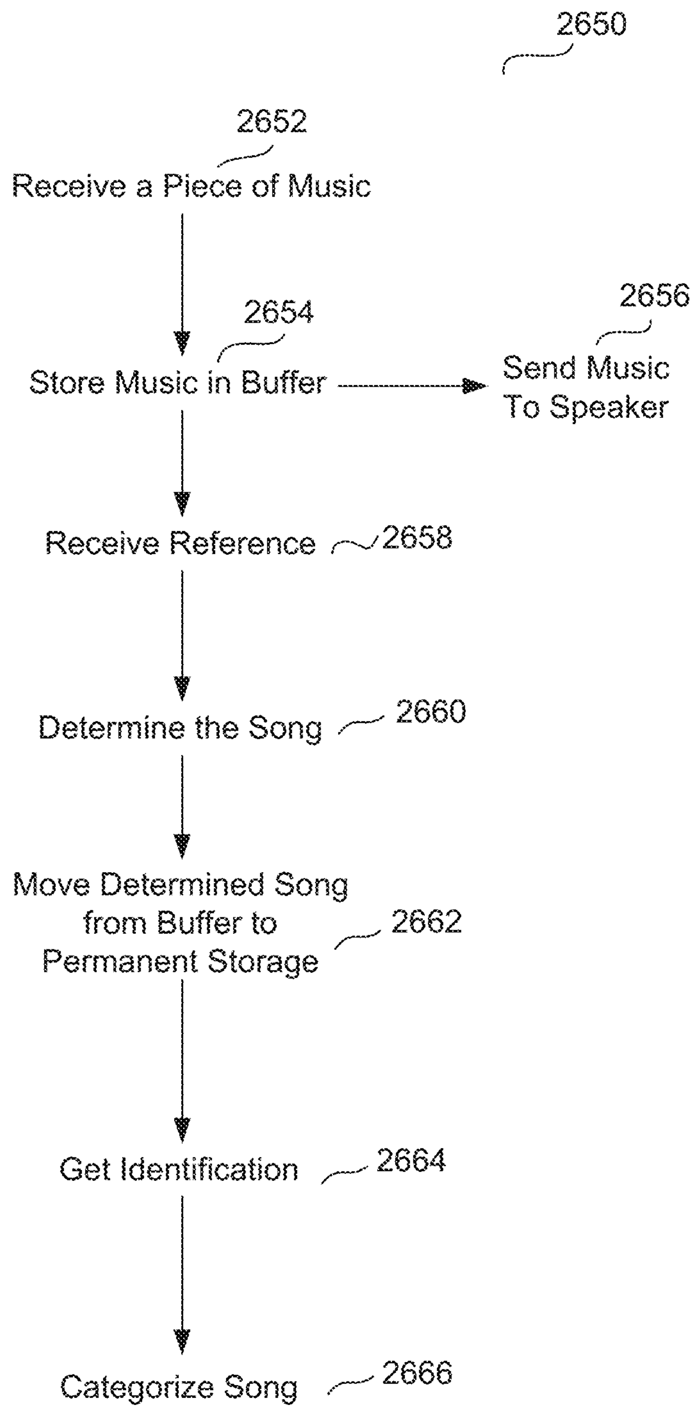
FIG. 32 shows a process for a personalized radio according to one embodiment of the present invention.

FIG. 32 shows a process 2650 according to one embodiment of the present invention for a personalized radio.

Initially, a pair of glasses according to the present invention receives 2652 a piece of music from a radio station. That piece of music is stored 2654 in a buffer or a temporary storage area. This temporary storage area can be in the glasses or tethered to the glasses. The piece of music is also sent 2656 to a speaker in the glasses.

Assume that the user likes the music. Based on the preference indicator, the user shows his preference. After the glasses receive 2658 an indication of the user's preference, the glasses determine 2660 the song corresponding to the indication. That piece of music can then be moved 2662 from the buffer to a permanent storage area, such as into a flash memory. This would then allow the user to subsequently access the piece of music.

There are different ways to determine 2660 the song or the content being played by the radio corresponding to the indication. For example, one rule is that when the user pushes the preference button or voices his preference, the song (or media asset or media file) that is being played is the one the user likes. Since the operating system knows what song is being played at what time, based on the rule, the song of preference is determined. Another rule is that when the user shows his preference, and there is no song being played at that instance, the song immediately preceding the break is the song of preference.

In another embodiment, the glasses can get 2664 an identification for the song of preference. For example, the glasses can ask the user to provide an identification for the piece of music. This identification can be the type of music, the singer, the name of the music or other identification. In another embodiment, there can be meta data embedded, such as in the beginning part of the music (or media asset). Having such meta data embedded is not uncommon for music in digital format. The meta data can include identifications for the music. The glasses can get 2664 such identification. Based on the identification, the song is categorized 2666 accordingly, such as grouped with other songs having the same identification. Such categorization process would enhance the ease of accessing the song by the user at a later time.

Figure 33:
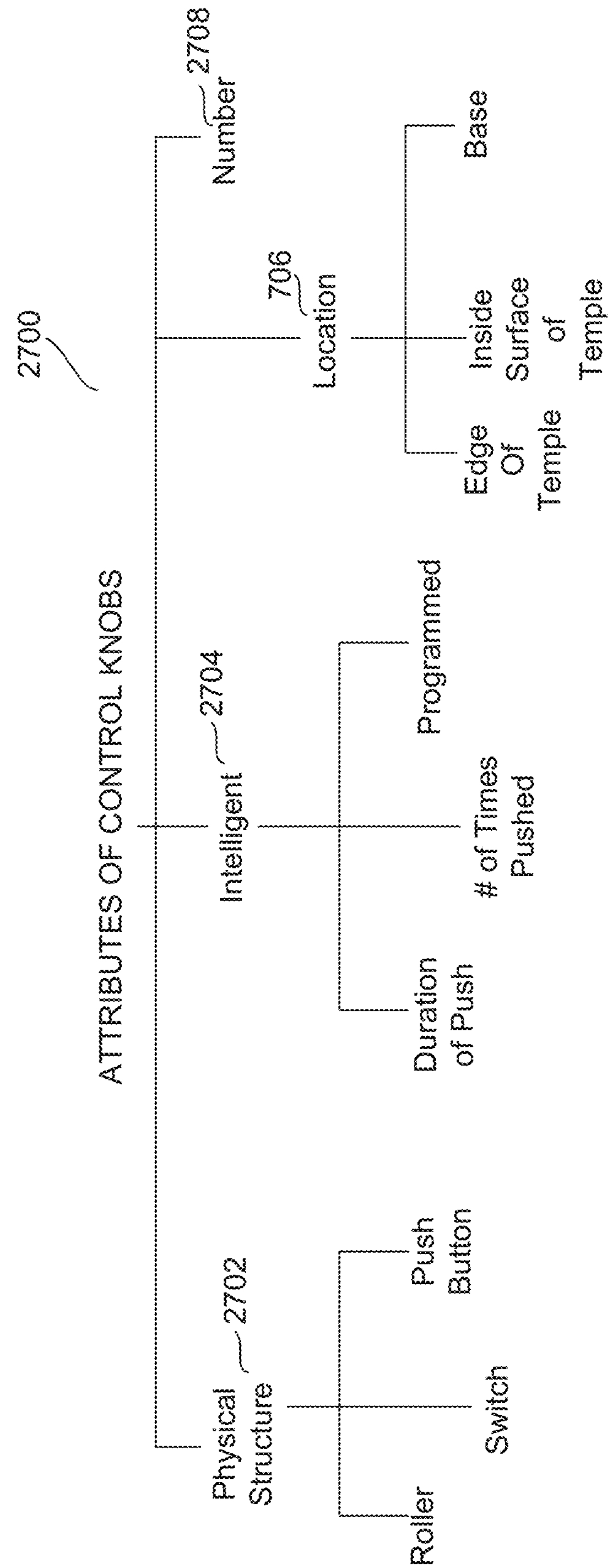
FIG. 33 shows a number of attributes of control knobs according to different embodiments of the present invention.

A number of control knobs have been described. FIG. 33 shows a number of attributes 2700 regarding control knobs according to the present invention. The knobs can be of different physical structure 2702. For example, a control knob can be a roller, a switch or a push-button. A control knob serving as an up/down controller can use two buttons, or a roller.

A control knob can be more intelligent 2704. For example, a push-button control knob can serve different purposes depending on the duration the knob is being pushed. If a user pushes it for more than three seconds, the knob serves as an on-off toggle switch. In another example, a knob can serve multiple purposes, and the specific purpose depends on the number of times the knob is pushed.

A knob can also be programmed. A user can connect the glasses to a computer and program the knob accordingly. For example, one can program a knob such that if the knob is pushed more than three seconds, the knob would serve as an on/off switch for the glasses.

The location 2706 of a control knob can vary for different applications. A control knob can be located on the glasses. A control knob can be on the top, the side or the bottom of the temple. A control knob can be located at the inside of a temple facing the user. Assume that there are a number of control knobs and all of them are on the edges of a temple, except one. By being at a position different from other control knobs, this knob can serve a specific purpose. For example, it can be an on/off control knob. In yet another embodiment, a control knob can be located in a base tethered to the glasses.

The number 2708 of control knobs can vary depending on operations. For example, there is an on/off control knob and a volume up/down control knob. If the glasses are used for cell phone headset application, in one embodiment, there is also an answer/hang-up control knob. If the glasses serve as a radio, in one embodiment, there is also a tuning control knob, which can be two push buttons. If the glasses serve as a CD player, in one embodiment, there is a play control knob, a stop control knob, and a skip forward/backward control knob. If the glasses serve as a multimedia asset player, such as a MP3 player, in one embodiment, there is a save-this-song control knob, a skip-forward/backward-song control knob and a select-song-to-play control knob.

A number of embodiments of the present invention have been described regarding audio signals. In one embodiment, the glasses further serve as a camera.

Figure 34:
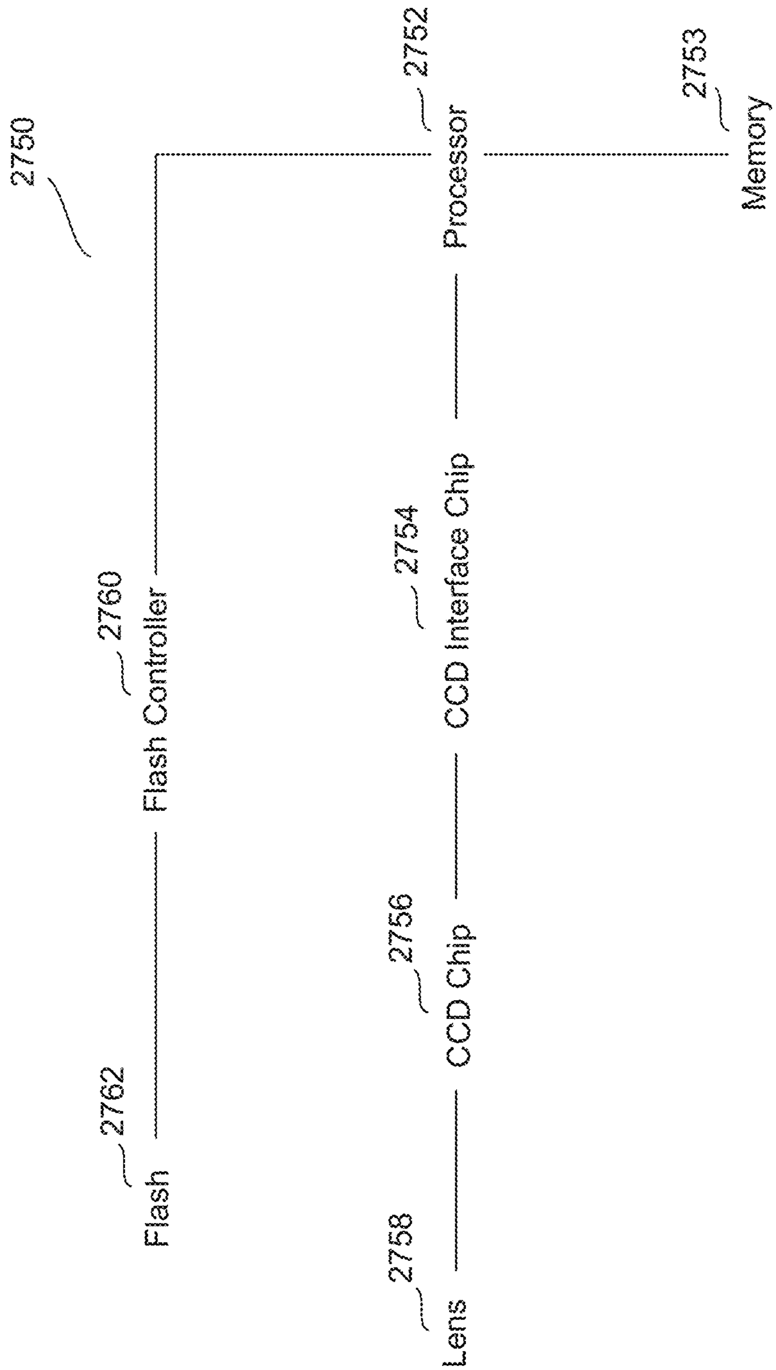
FIG. 34 shows some of the electrical components for capturing images with a pair of glasses according to an embodiment of the present invention.

FIG. 34 shows one embodiment of electrical components in a pair of glasses with image capturing capabilities. A processor 2752 is coupled to a CCD interface chip 2754 and then to a CCD chip 2756. Images focused by a lens 2758 are captured and collected by the CCD chip. In another embodiment, there is also be a flash controller 2760 connected to the processor 2752 to control a flash 2762.

In one embodiment, a number of pixels of the CCD chip 2756 are used as light sensors. The pixels can be used to adjust the sensitivity of the CCD chip 2756 based on the amount of ambient light. For example, if the outside environment is dim, it would take a longer period of time to collect enough charges by the CCD chip 2756 to re-create the image. This implies that the integration time of the CCD chip 2756 should increase.

In yet another embodiment, the camera can pertain to a video camera. The capacity of the memory 2753 increases so as to store the video images.

In one embodiment, the glasses do not offer adjustment on the image distance. The CCD chip 2756 can be located, for example, at the focal point of the lens 2758. In another embodiment, there is an image distance control knob. For example, a mechanical lever can be pre-programmed or pre-set to move the lens to one or more different positions. One position can be for close-up shots, such as objects from 2 to 4 ft, and another for scenic or vista images, such as objects greater than 6 ft.

Depending on the embodiment, electrical components of a camera can be in a pair of glasses, and/or a base tethered to the glasses, and/or a portable device tethered to the glasses or to the base. For example, the memory 2753 can be in the base tethered to the glasses.

The location of the lens 2758 can vary depending on the embodiment. In one embodiment, referring to FIG. 1, one location is at the bridge of the glasses, with the lens of the camera facing forward. In this situation, what the user sees is substantially what the captured image would be. In other words, in a general sense, what the user sees is what the user gets. With such an embodiment, it is relatively easy for a user to take pictures, hands-free. In another embodiment, another location for the lens 2758 are at a side portion adjacent to a lens holder, before the joint of the corresponding temple, such as at 2116 in FIG. 21. Again, the lens of the camera faces forward. Some of the electrical components of the camera can be in that location, and other components in the temple 2104. These components are electrically connected through one of the joints, such as with a flexible pc board. In yet another embodiment, the lens 2758 can face sideways and outwards in a temple of a pair of glasses, towards the left or right side of the user.

Regarding storing the images, in one embodiment, the images are stored locally. One approach to determine which image to store is the first-in-first-out approach. Once the camera is turned on, the camera takes pictures continually in an automatic mode, such as once every few seconds. When the memory becomes full or under other pre-set or pre-programmed condition, the first picture stored will be deleted when the next picture comes in. In another embodiment, the digital content in one picture is compared to the digital content in, for example, the fifth picture further down. If the difference between the two is not more than a pre-set threshold, the four pictures in between will be deleted. One approach to determine the difference is by comparing the total charges collected by the CCD chip for the two images. If the two sets of charges do not differ by more than a certain threshold, the images in between would be deleted.

The images captured can also be stored at a remote site. For example, the glasses can upload the images to a computer, wirelessly or through a wired connection from a connector at the glasses.

Figure 35:
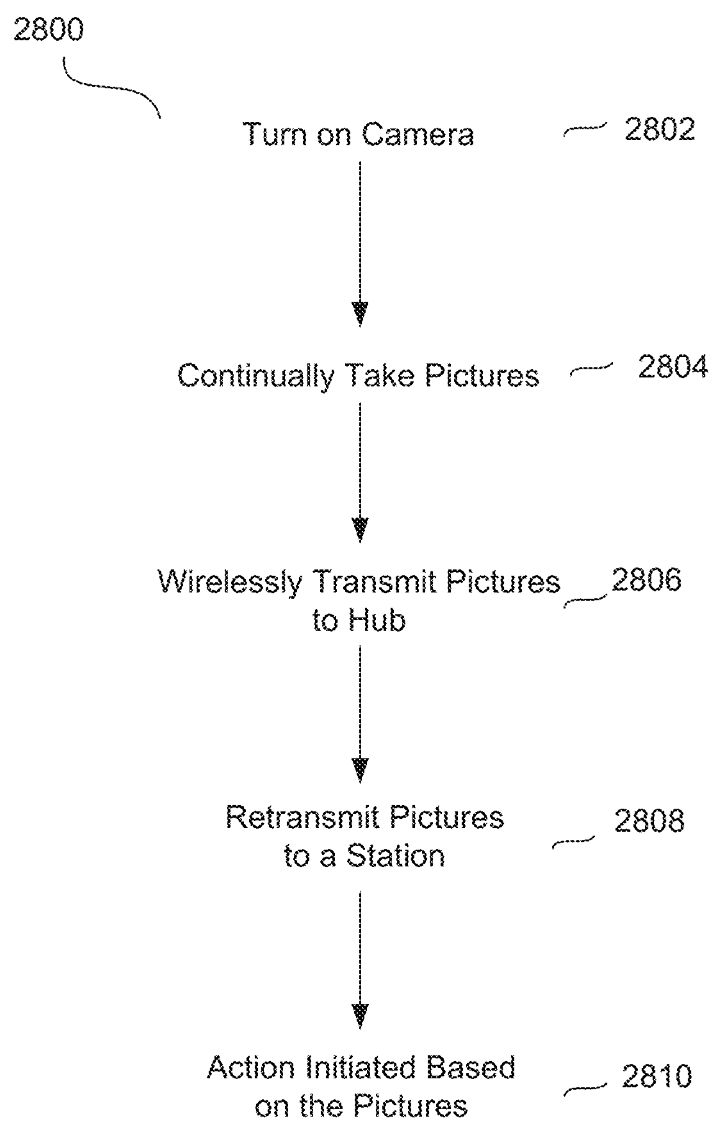
FIG. 35 shows an operation of taking actions based on images captured with a pair of glasses with wireless transceiver capability according to one embodiment of the invention.

FIG. 35 shows an operation 2800 of taking certain actions based on images captured by a pair of glasses with a wireless transceiver, according to one embodiment of the invention. This operation can be used by a police officer on patrol. Before the officer gets out of his patrol vehicle to confront a suspect, the officer can inform the station. At that point, the camera is turned on 2802.

There can be different approaches to turn on the camera. In one embodiment, an operator at the station can remind the officer to turn on the camera. Or, the operator can remotely turn on the camera. In yet another embodiment, the camera can be automatically turned on under certain condition. One such condition is that if the camera is out of the patrol vehicle, the camera is automatically turned on. With the glasses having the capability to wirelessly communicate with the patrol vehicle, one method to detect if the glasses are out of the patrol vehicle is based on the wireless signal strength of the glasses. The patrol vehicle can detect the signal strength of the wireless signals, which depends on the distance between glasses and the vehicle. A threshold can be set. If the signal strength is below the preset threshold, the glasses would be assumed to be out of the car, and the camera would be automatically turned on.

After the camera is turned on 2802, the glasses start to continually take 2804 pictures, such as once every few seconds. The pictures taken are automatically transmitted back 2806 to the patrol vehicle in a wireless manner. In this situation, the patrol vehicle serves as a hub, which stores the pictures. Then, the hub re-transmits 2808 the pictures back to the station. Note that the pictures can be compressed by standard algorithms before they are transmitted. This compression mechanism can be performed by a computer in the patrol vehicle. When the station gets the pictures, they are de-compressed before being viewed, such as by the operator. The pictures enable the operator at the station to see what the officer is confronting. This effectively allows the operator at the station to perform real-time monitoring of or for the officer. If it is a high risk situation, the operator can quickly react 2810, such as by dispatching additional support for the officer. In one embodiment, the glasses can include not only a camera but also a microphone for audio pickup, such as sounds from the officer, suspect, witness or environmental sounds (such as door opening, gun shot, etc.).

Regarding ownership of the glasses, the user can own the glasses. In one embodiment, the user leases the glasses from a provider. For example, the user leases a ski goggle with a camera. After the user turns on the camera, as the user skis, the goggle automatically takes pictures. Later, the user can return the goggle to the provider or a kiosk, where the pictures can be retrieved and/or stored. Alternatively, the goggle can include a wireless transceiver and the images could be uploaded continually or automatically to the provider or the kiosk via a wireless network. The provider or the kiosk can transmit the images to a website, such as a website associated with the user. In another embodiment, the user picks up hardcopies of the images, e.g., a CD with the images or a DVD with the video, from the provider or the kiosk.

In one embodiment, the glasses allow the user to enter his identification. This can be done, for example, through a control knob at the glasses. Such identification is then linked to the images. Based on the identification, the user can return to the provider or kiosk at a subsequent time to pick up the images previously left behind.

Figure 36:
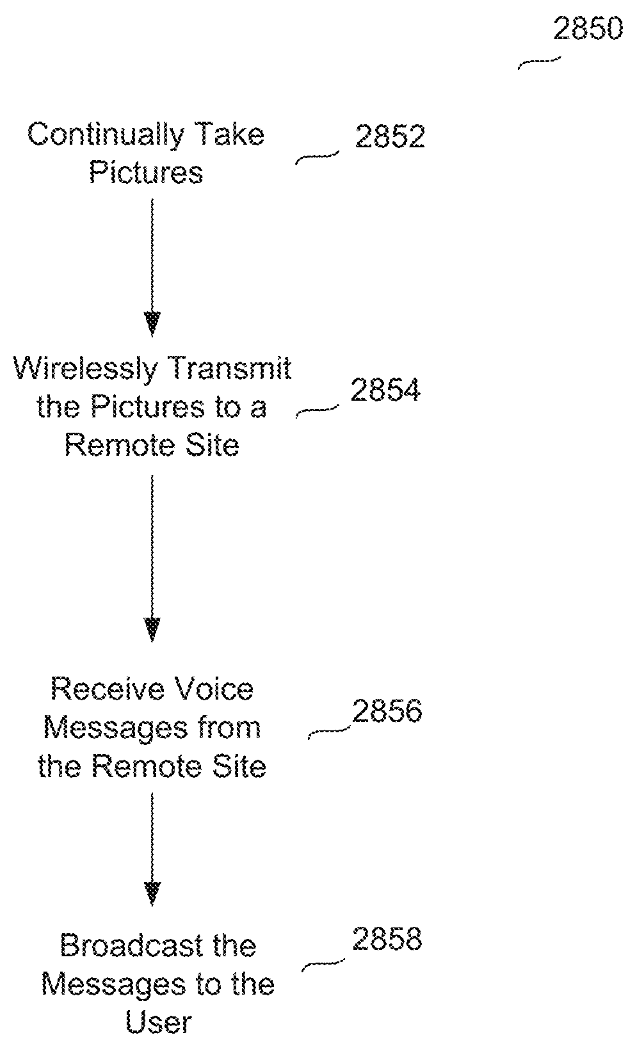
FIG. 36 shows an operation to provide messages to a user based on images captured by a pair of glasses according to an embodiment of the present invention.

In yet another embodiment, the pair of glasses with a camera also has a speaker and a wireless transceiver. It can be used to remotely control or direct the user wearing the glasses. FIG. 36 shows one such operation 2850 according to one embodiment.

To illustrate the operation 2850, assume that the user is a paramedic helping a patient. The glasses continually take pictures 2852 of objects directly in front of the paramedic, such as images around four feet away from the eyes of the paramedic. The pictures are wirelessly transmitted 2854 to a remote site, such as a hospital, to be viewed by a doctor. Again, this transmission can be a two-step process. For example, pictures can be transmitted to the paramedic's ambulance, which can then re-transmit to the remote site. The first transmission from the glasses to the ambulance can be through a low-power, short-range, broadband, wireless transmission protocol. The second transmission from the ambulance to the hospital can be through a much longer-range, higher power, broadband, wireless transmission protocol. Again, compression and de-compression techniques can be used to enhance the rate of transmission by reducing the amount of data to be transmitted.

Based on the images, the doctor sends out voice messages to the paramedic. These messages are wirelessly transmitted to and received 2856 by the glasses. The speaker in the glasses outputs 2858 the messages to the paramedic.

In another embodiment, the glasses also have a microphone, which allows the paramedic to communicate directly with the doctor also.

In one embodiment, the glasses can take pictures and can be a multimedia asset player. Pictures and the multimedia assets can share the same memory storage device. In this situation, the capacity for the multimedia assets and pictures can be interrelated. For example, a user can take more pictures if there are less multimedia assets, such as fewer songs in the storage device.

A number of embodiments have been described regarding electrical components in the temples of glasses. The locations selected are for illustration purposes. In other embodiments, some of the components are embedded fully or partially in other areas of the glasses, such as the lens holders or the bridges of the glasses. For example, there are glasses where there are shields at the edges of the lens holders of the glasses. These shields can wrap around, or better conform to the profile of, the face of the wearer. There can be transparent or translucent windows on these shields also. The shields are not limited to be in primary frames. They can be in, for example, fit-over glasses, auxiliary frames or safety glasses. To illustrate, in fit-over glasses, such shields can go over or cover at least a portion of the primary frames. One or more electrical components can be in such shields.

Note that in one embodiment, a pair of glasses does not have to include lenses. Also, a number of embodiments have been described with a pair of glasses tethered to a base. In one embodiment, a pair of glasses includes a base and a cord connecting the base to the glasses.

Figure 37A:
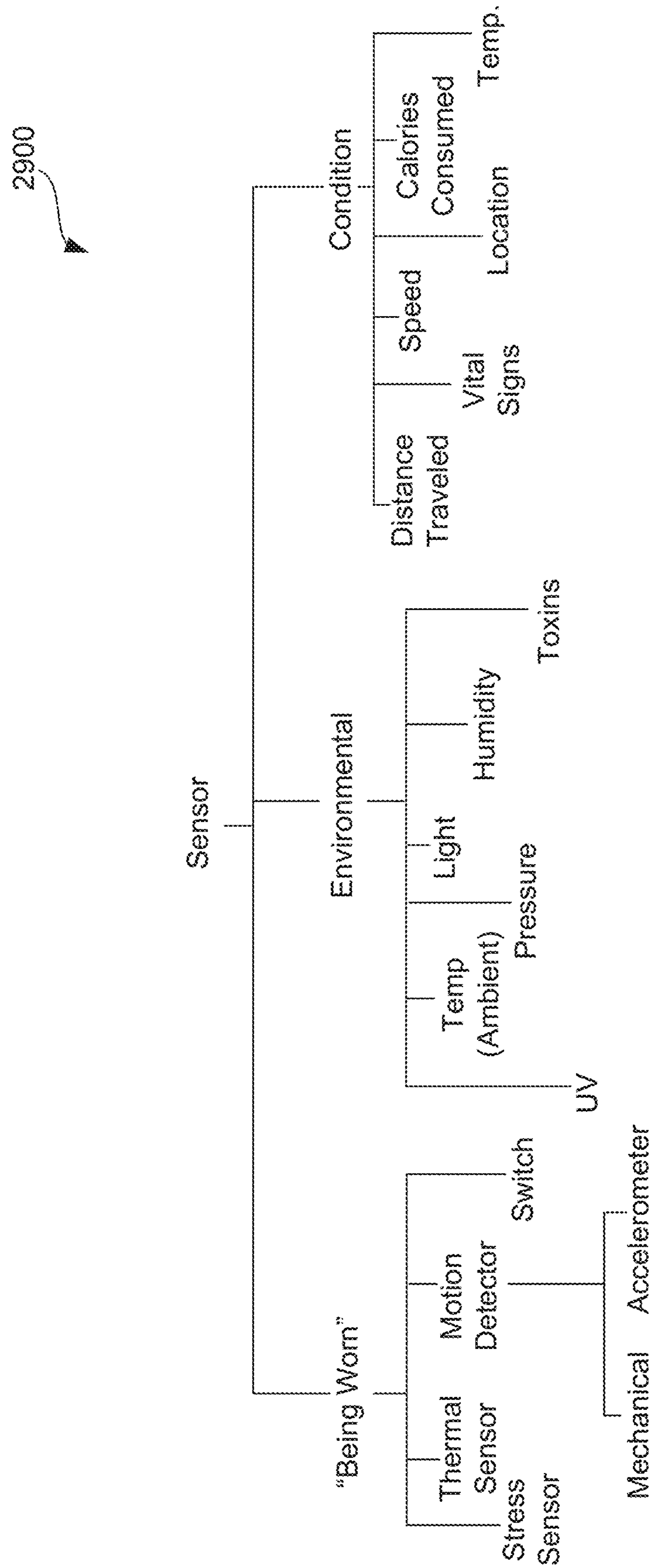
FIG. 37A is a chart that depicts examples of sensors in a pair of glasses according to different embodiments of the present invention.

In yet another embodiment, a pair of glasses also includes a sensor. FIG. 37A is a chart 2900 that depicts examples of sensors in the glasses.

In one embodiment, the sensor is a "being worn" sensor. The "being worn" sensor indicates whether the glasses are being worn by its user. The "being worn" operation can be performed using, for example, a thermal sensor, a motion detector, a stress sensor or a switch.

In one embodiment, a motion detector is used as a "being worn" sensor. A threshold can be set, such that if the amount of motion exceeds the threshold, the eyewear is assumed to be worn. The motion detector can, for example, be achieved by a mechanical means or an accelerometer.

In another embodiment, the "being worn" sensor includes two thermal sensors. One sensor can be at approximately the middle of a temple, such as in a region that touches the head of the user wearing the glasses. The other sensor can be at the end of the temple, close to its hinge. If the temperature differential between the two sensors is beyond a certain preset value, the eyewear would be assumed to be worn. The differential is presumed to be caused by a person wearing the pair of glasses.

In yet another embodiment, the "being worn" sensor includes a stress sensor at the hinge of the temple. The assumption is that when the eyewear is worn, the hinge is typically slightly stretched because typically, the width of the head of the user is slightly wider than the width between the temples when the two temples are in the extended positions. If the value of the stress sensor is beyond a certain preset value, the glasses would be assumed to be worn.

In a further embodiment, the "being worn" sensor can be a switch. For example, at the hinge between a temple and its corresponding lens holder, there is a switch. When that temple is fully extended outwards, the switch is turned on. The switch can be a pin. When the temple is fully extended outwards, the pin is pressed. When both temples are fully extended outwards, in one embodiment, the glasses would be assumed to be worn by the user.

In one embodiment, another type of sensor is an environmental sensor. The environmental sensor can sense environmental conditions, such as one or more of ultraviolet radiation, temperature (e.g., ambient temperature), pressure, light, humidity and toxins (e.g., chemicals, radiation, etc.).

In another embodiment, another type of sensor is a condition sensor. The condition sensor can sense the conditions of the user of the glasses. Examples of physical sensors include sensing one or more of distance traveled, location, speed, calories consumed, temperature and vital signs associated with the user of the glasses. The distance traveled could represent the horizontal distance traveled or the vertical distance (i.e. elevation) traveled. The speed can be the rate of movement along the horizontal distance traveled and/or the vertical distance. In yet another embodiment, the condition sensor can sense the emotional conditions of the user of the glasses.

The sensors can be provided in a redundant or fault-tolerant manner. For example, sensors can come in pairs in the glasses. When one malfunctions, the other one will take over its operation. In another embodiment, the sensor information can be processed in a differential manner to examine changes to the sensor information. The sensors can by powered by a battery, solar energy, or kinetic energy. For reduced power consumption, the sensors can remain in a low-power state unless data is being acquired by the sensors. In yet another embodiment, two or more of the auxiliary sensors can communicate with one another (wired or wirelessly) to exchange data or control information.

A number of embodiments have been described regarding one or more electrical components at least partially embedded in a pair of glasses. In one embodiment, one or more electrical components are at least partially embedded in a temple tip of a pair of glasses. Temple tips are particularly common for wire or metal frames. The pair of glasses has a first and a second lens holders for receiving lenses. Each of the lens holders has a first side and a second side. The pair of glasses has a bridge element that couples the first side of the first lens holder to the second side of the second lens holder. The pair of glasses also includes a first temple and a second temple. The first temple is pivotally secured to the second side of the first lens holder through a joint, while the second temple is pivotally secured to the first side of the second lens holder through another joint. A temple typically has two ends, a first end and a second end. The first end can be the end that is pivotally secured to a lens holder through a joint, and the second end can be the other end of the temple. It is not uncommon that a temple includes a main body and an enclosure that grabs onto the main body of the temple. The second end is typically where the enclosure grabs onto the main body. The enclosure can be made of a different material than the main body of the temple. In one embodiment, such an enclosure is a temple tip, and there is an electrical component, partially or fully, embedded in the tip. There can also be a connector, such as the connector 2300 shown in FIG. 25, at the temple tip. In another embodiment, the temple tip can include a female connector, which can be similar to the female connector 2310 shown in FIG. 26B. As the temple tip grabs onto the main body of the temple, the female connector can make electrical contact with a male connector at the main body of the temple. Typically, particularly before a pair of glasses has been extensively worn, the temple tip can be removed and re-inserted back on to the main body of the temple without a lot of difficulties. Such a temple tip can be an after-market component, with different temple tips having different electrical components to serve different functions.

Figure 37B:
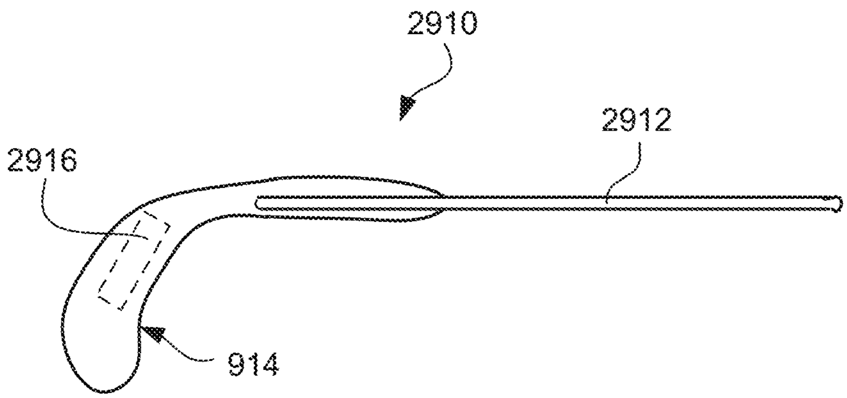
FIG. 37B is a diagram of a temple arrangement according to one embodiment of the invention.

FIG. 37B is a diagram of a temple arrangement 2910 according to one embodiment of the invention. In this arrangement, a temple tip is not considered as a part of the temple. The temple arrangement 2910 includes a temple 2912 that is associated with a pair of eyeglasses. Over the end of the temple 2912 that is opposite the associated lens holder, a temple tip 2914 is provided. The temple tip 2914 can be held to the temple 2912 by frictional forces and/or adhesive. The temple tip 2914 includes at least one electrical component 2916 that is at least partially embedded therein. The temple tip 2914 can be manufactured and delivered to resellers or retailers as such. Alternatively, the temple tip 2914 can be separately provided as an optional replacement temple tip for an existing temple tip. Hence, as after manufacture, upgrade to the eyewear can be had through replacing the existing temple tip with the replacement temple tip. The colors and shapes of the temple tip 2914 can vary widely. In the after manufacturing environment, the reseller or retailer can be provided with a range of different colors and shapes so that a user can receive a replacement tip that reasonably matches the color and shape of the temple or that provides an altered appearance as desired by the user.

Figure 37C:
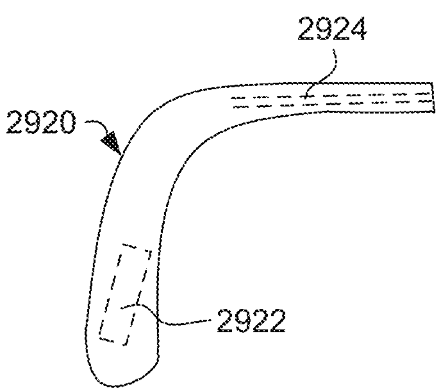
FIG. 37C is a diagram of a cover that at least partially covers a temple according to one embodiment of the invention.
Figure 37D:
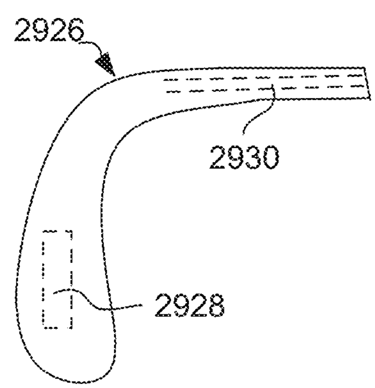
FIG. 37D is a diagram of a fit-over temple that at least partially fits over a temple according to one embodiment of the invention.

Besides a replacement temple tip such as illustrated in FIG. 37B, a temple tip can also be effectively modified by a fit-over temple or temple cover. FIG. 37C is a diagram of a temple cover 2920 that at least partially covers a temple (e.g., temple 2912) according to one embodiment of the invention. As another example, the temple cover 2920 can be a fabric or other material, such as a sock or sleeve, that slides over and at least partially covers a temple tip. The temple cover 2920 can include at one electrical component 2922 that is either attached thereto or at least partially embedded therein. The temple cover 2920 can also include an opening 2924 so as to received a temple or a temple tip. The temple cover 2920 can be held to a temple by frictional forces and/or adhesive. FIG. 37D is a diagram of a fit-over temple 2926 that at least partially fits over a temple according to one embodiment of the invention. For example, the fit-over temple 2926 can at least partial fit-over a temple tip. The fit-over temple 2926 includes at one electrical component 2928 that is either attached thereto or at least partially embedded therein. The fit-over temple 2926 can also include an opening 2930 so as to receive a temple. The fit-over temple 2926 can be held to a temple by frictional forces and/or adhesive. As an example, the fit-over temple 2926 can be plastic or other material. The colors and shapes of the fit-over temple 2926 can vary widely. In the after manufacturing environment, the reseller or retailer can be provided with a range of different colors and shapes so that a user can receive a replacement temple cover or fit-over temple that reasonably matches the color and shape of the temple or that provides an altered appearance as desired by the user.

In one embodiment, a fit-over temple or temple cover according to the invention can further include a connector or cable to facilitate electrical connection with the at least one electrical component that is either attached to a temple or a temple tip or at least partially embedded therein.

In one embodiment, an electrical component is a component of an electrical circuit, and the electrical circuit is for performing at least a desired, intended or predetermined function.

A number of embodiments have been described above for an eyeglass frame, i.e., primary frame, are also applicable to an auxiliary frame. An auxiliary frame can attach to a primary frame through different techniques, such as using clips. Another technique to attach an auxiliary frame to a primary frame is by way of magnets. Examples of using magnets as an attachment technique can be found, for example, in U.S. Pat. No. 6,012,811, entitled, "EYEGLASS FRAMES WITH MAGNETS AT BRIDGES FOR ATTACHMENT."

A number of embodiments have been described where one or more electrical components are at least partially embedded in a pair of glasses. In yet another embodiment, the one or more electrical components are at least partially embedded in an eye mask.

Figure 38:
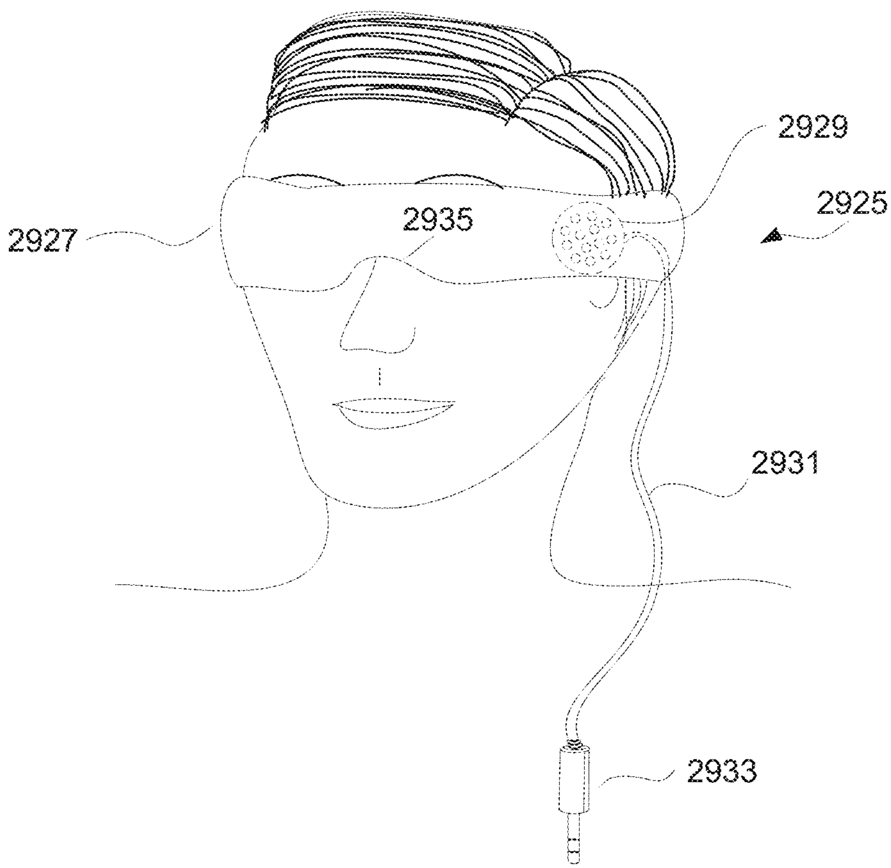
FIG. 38 shows an embodiment including an eye mask according to the invention.

FIG. 38 shows one embodiment 2925 where one or more electrical components are at least partially embedded in an eye mask 2927. The eye mask 2927 includes a piece of fabric that is opaque so that when the mask is worn, the mask wraps around the eyes to block light from entering into the eyes of the user.

The embodiment 2925 includes a wrapping mechanism to hold the fabric onto the head of a user so that when the mask is worn by the user, the mechanism allows the fabric to have a relatively tight and comfortable fit over the face of the user. In one approach the wrapping mechanism is achieved with the fabric in the shape of a band and having a certain degree of elasticity. When the mask is worn by the user, the elasticity of the fabric allows the mask to establish a relatively tight fit over the face of the user. In another example, the fabric is a long piece of material. The wrapping mechanism includes a clip or Velcro at the two ends of the piece of material to tie the two ends together. In another example, the wrapping mechanism includes two elastic pieces of elastic materials at the two ends of the fabric. To wear the mask, each elastic piece of material goes over one of the ears of the user so that the fabric establishes a relatively tight fit over the face of the user. In yet another embodiment, the mask 2927 includes a notch 2935 to accommodate the nose of the user. In another embodiment, there can be additional padding in the vicinity of the one or more electrical components so that if an electrical component is pressed against the user, the padding serves as a buffer or cushion.

In one embodiment, a speaker 2929 can be at least partially embedded in the mask 2927, and can be positioned close to and facing one of the ears of the user. The speaker 2929, through an electrical connector, is electrically connected to a cable 2931. The cable 2931 can also have a connector 2933 at its distal end. The connector 2933 can be plugged into another device, such as a MP3 player or a CD player. After putting on the mask, with the connector 2933 plugged into the another device, the user would be able to hear, for example, audio sounds such as music. The eyemask 2925 can be applied to different areas. For example, the user can be on a plane, and would like to rest. The user can put on the eyemask 2925, and plug the connector 2933 into a media outlet at an armrest of her seat in the plane. Thus, the user can enjoy music while taking a rest. The embodiment 2925 could also include a plurality of speakers, such as one for each of the user's ears.

In another embodiment, the eyemask 2927 includes the speaker 2929 and a battery that is electrically connected to the speaker 2929. The battery can be in a pocket on the eyemask and can be replaceable. The battery can also be a rechargeable battery, such as a lithium-ion battery, and there is a connector at least partially embedded in the eyemask. The connector can be used to recharge the battery.

Figure 39:
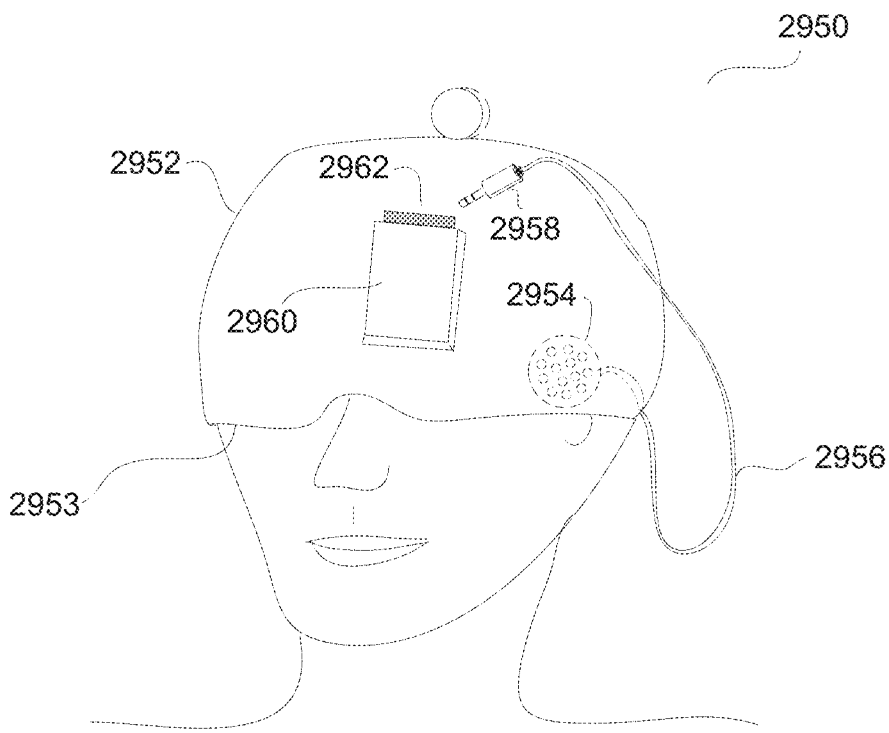
FIG. 39 shows an embodiment including a night cap according to the invention.

FIG. 39 shows another embodiment 2950 where one or more electrical components are at least partially embedded in a night cap 2952. In one embodiment, the cap 2952 is at least partially made of fabric. In another embodiment, the cap 2952 is entirely made of fabric. The cap includes a wrapping mechanism. When the cap is worn, the wrapping mechanism holds the cap onto the head of the user, and allows the cap to have a relatively tight and comfortable fit over the head of the user. Again the wrapping mechanism can be an elastic band at the base 2962 of the cap 2952. Or, the wrapping mechanism can include clips or Velcro as previously described.

The cap can include at least one speaker 2954, which is at least partially embedded in the cap 2952. When the cap 2952 is worn by a user, the speaker 2954 is positioned close to and facing one of the ears of the user. The speaker 2954 can, for example, be electrically connected through a connector to a device 2962 in a pocket 2960 on the cap 2952. The electrical connection can be through a cable 2956 external to the cap 2952. The cable 2956 also can have a connector 2958 to be plugged into the device 2962. In another embodiment, the cable 2956 is embedded in the cap. The device 2962 can be an asset player, such as a MP3 player, with a battery. Through the connector 2958, audio signals from the device 2962 can be received by the speaker 2954 and heard by the user. There can be one or more additional pockets on the night cap for one or more additional electrical components. When worn, the night cap does not have to cover the eyes of the user. In yet another embodiment, when worn, the night cap further covers the eyes of the user, as shown in FIG. 39. In one embodiment, the embodiment 2950 further includes padding in the vicinity of an electrical component to serve as a buffer or cushion between the user and the electrical component.

A number of embodiments have been described involving a speaker in an eyemask or a night cap. In one embodiment, the audio output from the speaker can serve to cancel the environmental sounds in the vicinity of the user. For example, if the user is on an airplane, the surrounding environmental sound has a relatively high level of white noise. This white noise can be detected by a pickup device and cancelled by noise cancellation circuitry provided within the eyemask or night cap. Namely, the audio output from the speaker serves to cancel the white noise of the user's environment. In another embodiment, the electrical component embedded or partially embedded is not a speaker, but can be a sensor, which can sense a physiological function of the user.

Figure 40A:
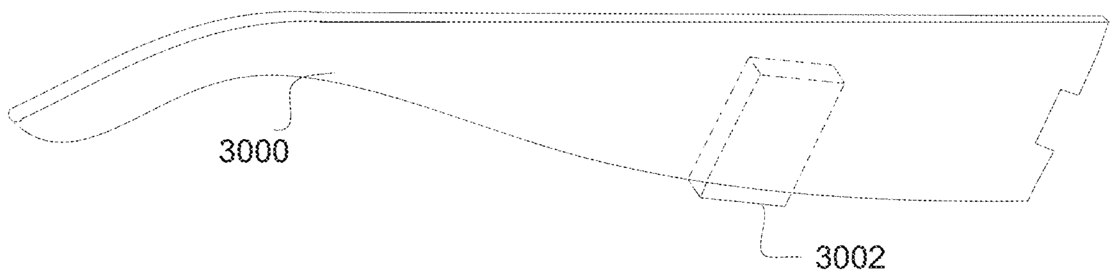
FIG. 40A is a diagram illustrating a temple having a slot for receiving a removable electronic device according to one embodiment of the invention
Figure 40B:
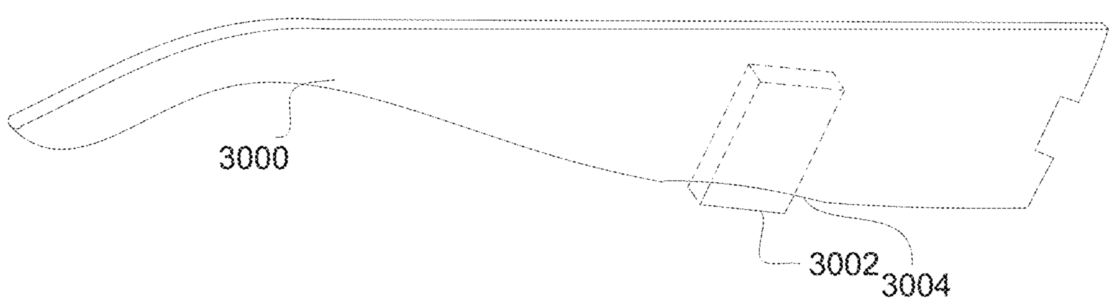
FIG. 40B is a diagram illustrating the temple having a recessed lower portion according to another embodiment of the invention.

FIG. 40A is a diagram illustrating a temple 3000 having a slot for receiving a removable electronic device 3002 according to one embodiment of the invention. In one example, the removable electronic device 3002 can be a memory storage device, sometimes referred to as a memory card. As shown in FIG. 40A, the removable electronic device 3002 is inserted into the slot. Although the slot could be electrically non-functional, typically the slot provides an avenue for the removable electronic device 3002 to be physically and electrically connected to electrical circuitry within the temple 3000 or elsewhere within the eyeglass frame. FIG. 40B is a diagram illustrating the temple 3000 having a recessed lower portion 3004 according to another embodiment of the invention. The recessed lower portion 3004 facilitates the insertion and removal of the removable electronic device 3002. In either embodiment, the removable electronic device can be manually inserted and removed or can use more complicated mechanical mechanisms to assist with the insertion and removal (e.g., spring-based push and release structure).

Figure 41A:
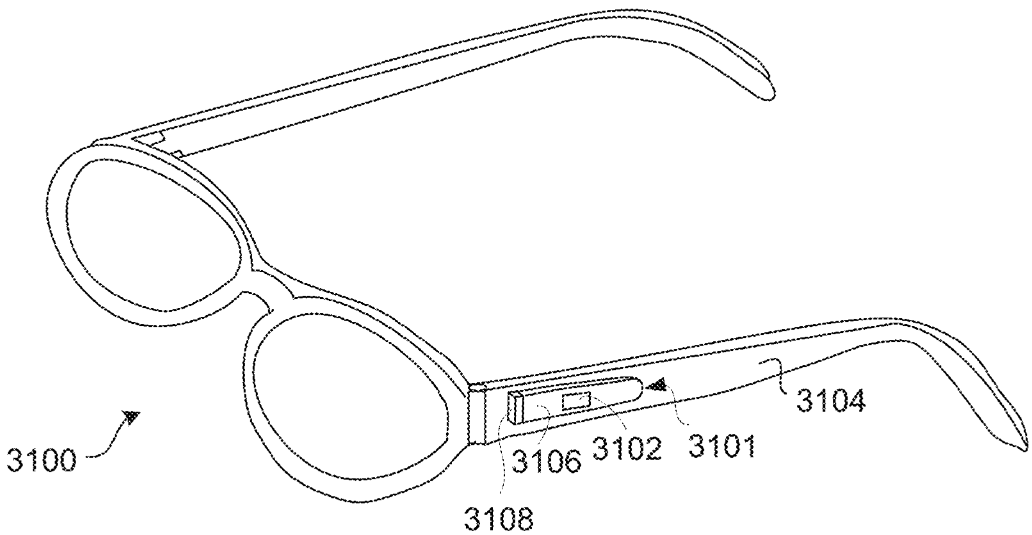
FIGS. 41A and 41B are diagrams illustrating a pair of glasses having a camera coupled thereto, according to one embodiment.
Figure 41B:
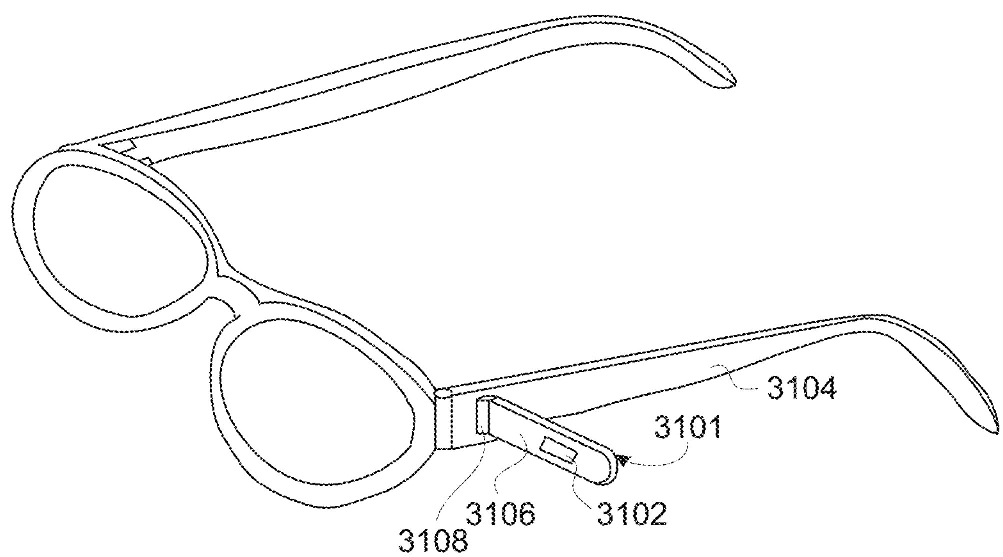

FIGS. 41A and 41B are diagrams illustrating a pair of glasses 3100 having a camera 3101 coupled thereto, according to one embodiment. The camera includes an image sensor 3102 and a camera housing 3106 (also referred to as a camera support arm). In this embodiment, the camera 3101 is rotatably coupled to an exterior surface of a temple 3104 of the pair of glasses 3100. The camera support arm 3106 is attached to the temple 3104. The camera support arm 3106 can couple to the temple 3104 using a hinge 3108. In one implementation, the hinge 3108 can use a spring or cam mechanism so that the camera support arm 3106 is held either against the temple 3104 when not in use or held in an open or extended position when in use. FIG. 41A illustrates one position of the camera support arm 3106 when the camera 3101 is not in use. FIG. 41B illustrates one position of the camera support arm 3106 when the camera 3101 is in use. The presence of the camera 3101 with the pair of eyeglasses 3100 enables a wearer of the pair of eyeglasses 3100 to take pictures of what the wearer is looking at. It should be noted that other supporting circuitry such as data storage for pictures, switches, battery, and electronics for the camera 3101 can be in the temple 3104, in the camera support arm 3106, elsewhere in the pair of glasses 3100, or even tethered thereto. However, in one implementation, the camera 3101 is completely self-contained in the camera housing 3106. In one embodiment, the hinge 3108 can also serve as a switch to turn the image sensor 3102 on or off.

In one implementation, to improve overall appearance of the pair of glasses 3100, the temple 3100 can provide a recess for receiving the camera support arm 3106 when the camera is not being utilized. Such may improve the aesthetic appearance of the pair of glasses 2100.

In another implementation, the pair of glasses 3100 can further provide a viewfinder. The viewfinder can assist the user in directing the image sensor 3102 towards whenever the user desired to photograph. The viewfinder can be a separate apparatus that is extended by user action or can be a viewfinder that is visually present or presented on one of the lenses. In one example, the viewfinder can be an extendable viewer through which the user can look through to determine the field of reference of the image sensor 3102. The viewfinder can be extendible from either of the temples, such as in a telescoping, sliding or flipping action. Additionally, when the camera support arm 3106 is extended, a viewfinder can be automatically initiated. For example, indicators on one of the lens can be visually presented, such as through optical projection from one or more light sources. In another embodiment, the viewfinder can be always present, such as with indicators on one of the lens of the pair of glasses 3100. The indicators can be a few faint dots to define an area on the lens.

In one embodiment, the camera support arm (camera housing) 3106 is removably coupled to the hinge 3108. As such, the camera 3101 can be removed from or attached to the pair of glasses 3100. Indeed, the camera support arm (camera housing) 3106 can be a camera body that houses electronics for the camera 3101. In such case, the camera 3101 can operate as a camera apart from the pair of glasses 3100.

In one implementation, the camera support arm 3106 has a connector and the hinge 3108 has a counterpart connector. In one example, the connectors are peripheral bus connectors, such as USB connectors. In such case, the camera support arm 3106 can be attached and removed from the pair of glasses 3100. Such a connection via the connectors can be electrically functional or non-functional. If functional, electrical components in the pair of glasses 3100 can be electrically connected to electrical components in the camera 3101.

Still further, in one embodiment, the connector at the end of the hinge 3108 enables connection of a variety of different peripheral devices to the pair of glasses 3100. For example, the different peripheral devices (portable electronic devices) can be the camera, a memory card, or a media player. In one embodiment, electrical components integral with the pair of glasses 3100 can be shared by the different peripheral components. The hinge 3108 is not necessary in other embodiments, see FIGS. 28F-28H, where a connector is attached or integral with a temple of a pair of glasses. If desired, the camera 3101 or other peripheral devices can include in its structure a hinge or other mechanism to permit positioning the camera or other peripheral devices.

In still another embodiment, an angled or hinged adapter can be inserted between a connector attached to the pair of glasses 3100 and a connector of the camera 3101 or other peripheral devices. The adapter can be electrically functional or non-functional.

Regardless of the electrical components being utilized with the eyeglass frames, it may be desirable for the eyeglass frames to be substantially balanced in weight. In the event that electrical components are attached and/or at least partially embedded in one of the temples of the eyeglass frame, the other of the temples can include other electrical components or even a counter weight so that the eyeglass frame can be substantially balanced.

A number of embodiments in the invention can be implemented in software, hardware or a combination of hardware and software. A number of embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

The present invention provides different embodiments of glasses that can be applied to multiple functions. With a user wearing such a pair of glasses, it would be more difficult for a third party to know the specific function or reason the user is wearing the glasses for. Regarding the locations of the electrical components for the multiple functions, different embodiments range from all of the components in the glasses to the glasses primarily functioning as a headset.

Figure 42:
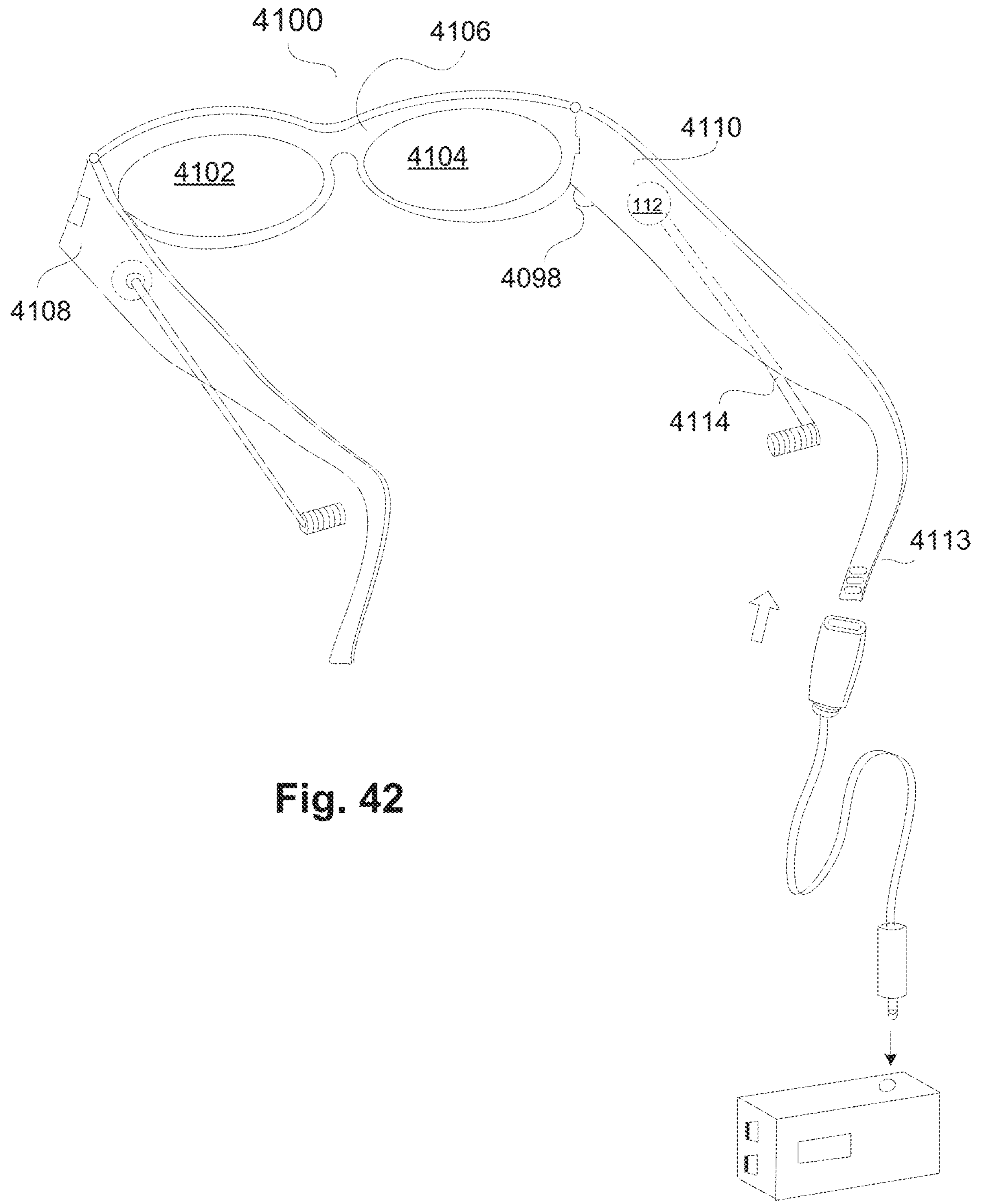
FIG. 42 shows one embodiment of the invention with a pair of glasses having speakers.

FIG. 42 shows one embodiment of the invention with a pair of glasses 4100 having speakers. The glasses 4100 include a first lens holder 4102 and a second lens holder 4104. Both lens holders are for receiving lenses. The first lens holder 4102 has a first side and a second side. The second lens holder 4104 also has a first side and a second side. The pair of glasses has a bridge element 4106. The bridge element 4106 is coupled to the first side of the first lens holder 4102 and the second side of the second lens holder 4104. In one embodiment, the lens holders and the bridge element are not separate pieces, but are an integral piece.

The pair of glasses 4100 also includes a first temple 4108 and a second temple 4110. The first temple 4108 is pivotally secured to the second side of the first lens holder 4102 through a joint. And, the second temple 4110 is pivotally secured to the first side of the second lens holder 4104 through another joint.

In a number of embodiments, the glasses include one or more electrical components partially or fully embedded in the glasses. An electrical component can be a resistor, capacitor, inductor, transistor or other electrical part, other than just a conductor or a wire allowing current to flow between or among electrical components. An electrical component can also be more complicated such as an electrical circuit or an integrated circuit.

FIG. 42 shows one embodiment of the glasses 4100 with electrical components that include two speakers, each at least partially embedded in the glasses. The speakers can be used to enhance the hearing of the user wearing the glasses. In one example, each speaker, such as speaker 4112, is in one of the temples, such as temple 4110, of the glasses 4100. Each speaker is closer to one end of the temple than the other end. In the embodiment shown in FIG. 42, each speaker is closer to the end of the temple that is in the vicinity of the lens holder or the hinge or the joint of the glasses, instead of the end that is typically not attached to a hinge. The end of a temple that is typically not attached to a hinge can be known as the free end of that temple. The speakers can be partially embedded in the glasses. For example, the mouth of each speaker, where audio signals propagate from and where sometimes there are small holes on a sheet of material, can be exposed and not totally covered up by the temple.

In the embodiment shown in FIG. 42, both speakers are embedded in the glasses, and the speakers output audio signals in the outward direction. In another embodiment, the speakers output audio signals in the inward direction. For example, the output of the speakers can be facing inwards, towards the user.

The speakers can be embedded in the glasses in a number of ways. For example, each speaker can be first assembled onto or electrically coupled to a circuit board, which includes additional electrical components for the glasses. The glasses can be made of plastic (e.g., plastic frames). With the corresponding speaker, each circuit board can be shaped to fit, for example, into a temple of the glasses. Each circuit board with a speaker is placed into a mold. Then, hot, molten plastic is injection molded around each circuit board with the speaker to form the two temple pieces of the glasses. To reduce weight, the wall of the glasses can be made relatively thin through injection molding techniques.

In another embodiment, the glasses have metallic frames. For example, the frames can be made of Titanium, which is a relatively light metal. Also, Titanium is relatively non-conductive and strong, and is quite immune to corrosion. Further, Titanium can be anodized or heat colored.

For glasses with metallic frames, to prevent circuits from being shorted or to reduce leakage current, one embodiment provides an insulating layer between a circuit board in the glasses and the corresponding metallic frame. One example of an insulting layer is a tape to encapsulate the electrical components. The tape is non-conducting so as to provide insulation and, to a certain degree, can also provide mechanical stiffness. One way to make such a temple is to have two sheets of the metal die-stamped to form the two halves, or the two faces of a temple piece. A circuit board with a speaker is made to fit into the space between the faces. Then, two die-cut pieces of tape can cover the top and the bottom surfaces of the circuit board. The board and the speaker with the tape are sandwiched between the faces to form the temple. The tape can be double-sided sticky tapes, with one side sticking to the circuit board, and the other side sticking to the temple. An adhesive can be used to glue the two faces of the temple piece together.

In yet another embodiment, the frames are made of hard rubber. The frames can be manufactured in an approach similar to injection molding techniques, with circuit boards and/or speakers inserted into the mold along with the rubber at the time of molding.

Different types of speakers can be used, such as, standard, fixed-magnet/moving coil speakers; speakers with fixed-coil and a steel diaphragm; piezo-electric speakers; and electrostatic speakers.

In one embodiment, the glasses further include a tube, such as a plastic tube, extending from each speaker, such as tube 4114 from speaker 4112. Each tube serves to guide sound generated by its corresponding speaker to one of the ears of the user. In one embodiment, each tube extends from its speaker to the opening of an ear canal of the user.

Figure 43:
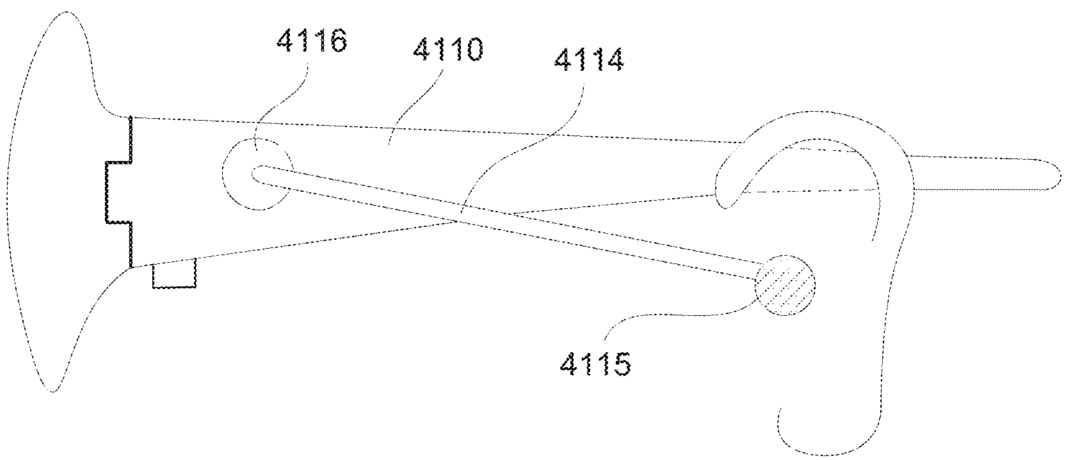
FIG. 43 shows a tube extending from a speaker at a temple of the glasses to guide sound to one of the ears of the user according to one embodiment of the invention.

FIG. 43 shows an embodiment where a tube 4114 is located on the outside of a temple 4110. In another embodiment, the tube can be on the inside of a temple.

In one embodiment, a tube can be rotated, such as from along the temple (behind a temple if the tube is on the inside of the temple) to being downward at an angle towards one of the ears of the user, such as the position shown in FIG. 43. To increase flexibility, the tube can be attached to a rotating disk 4116, which allows rotation about the corresponding speaker.

In another embodiment, the tube is malleable. This allows the tube to be placed in different positions.

Figure 44:
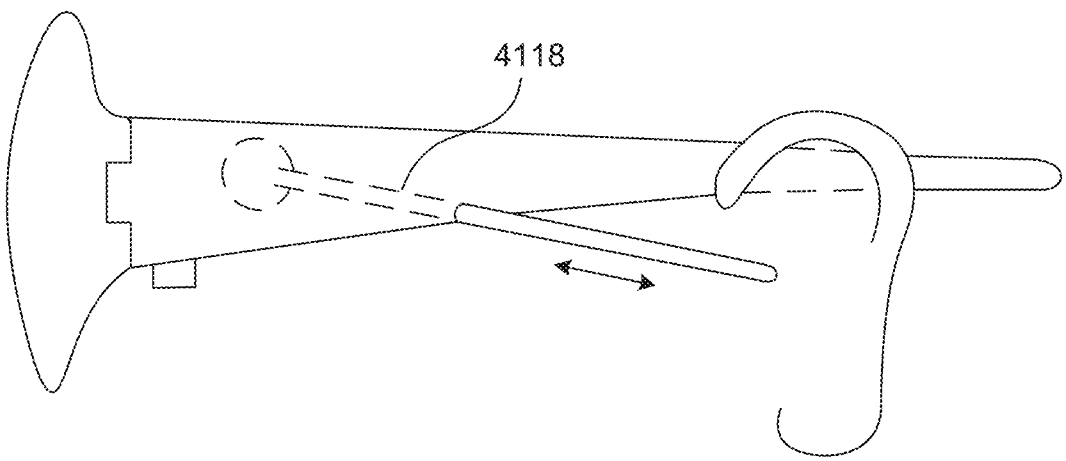
FIG. 44 shows a retractable tube extending from a speaker at one of the temples of the glasses according to one embodiment of the invention.

In one embodiment, the length of the tube is adjustable. FIG. 44 shows such an embodiment of a pair of glasses with a retractable tube 4118. In the figure, the tube is shown to be in its extended position. As an example, the retractable tube 4118 can be retracted into the corresponding temple. As another example, the retractable tube 4118 can retract on itself (e.g., telescoping).

In one approach, there also is a plug 4115 at the end of the tube 4114 for inserting into an ear of the user, as shown in FIG. 43. The plug 4115 can be an ear bud. The plug 4115 can provide a cushion of foam rubber or other materials. Such materials give comfort and/or enhance sound coupling to the ear canal.

In one embodiment, each ear bud is individually made based on an impression of the user's corresponding ear canal. In another embodiment, each ear bud is custom fitted into the corresponding ear of the user.

Figure 45:
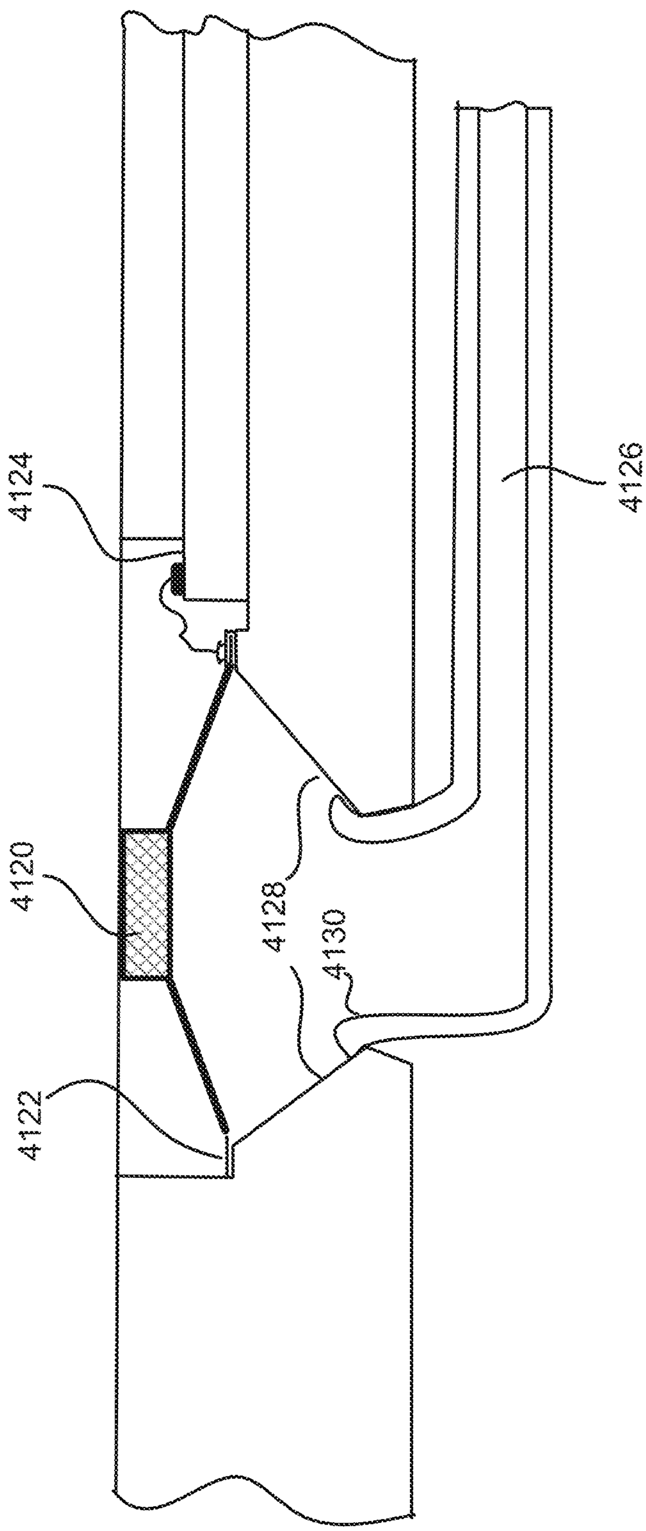
FIG. 45 shows a funnel at the output of a speaker in the glasses according to one embodiment of the invention.

In another approach, there is a funnel at the output of a speaker. FIG. 45 shows the cross section of such a funnel from a speaker 4120 at a temple region of the glasses. As shown in FIG. 45, the speaker 4120 sits on a speaker frame 4122, and the speaker 4120 is electrically connected to a circuit board 4124. As sound is generated from the speaker 4120, the sound propagates to a tube 4126 through a structure in the shape of a funnel 4128. Such a structure can help guide the sound to the tube 4126 (i.e., improved sound coupling). Also, FIG. 45 shows the tube 4126, which can be the tube 4114 shown in FIG. 43, mounted onto the temple region of the glasses with a circular lip 4130. Such a lip 4130 allows the tube 4126 to rotate relative to the glasses. In the embodiment shown in FIG. 45, the speaker 4120 is embedded in the glasses. Also, in FIG. 45, the tube 4126 is at the front side of the speaker 4120. In another embodiment, a tube can extend from the back side of the speaker to couple the sound from the speaker to an ear.

Figure 46A:
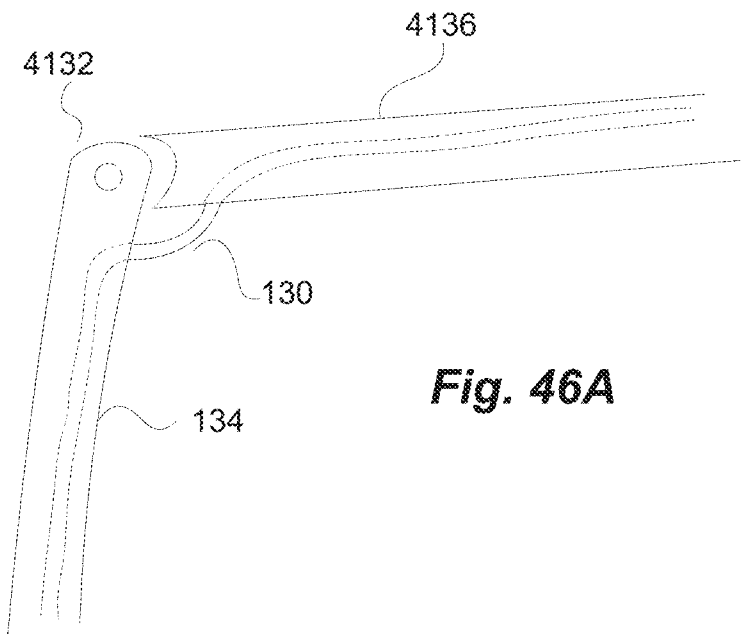
FIGS. 46A-46B show an embodiment of the invention with a wire connecting speakers in the glasses.
Figure 46B:
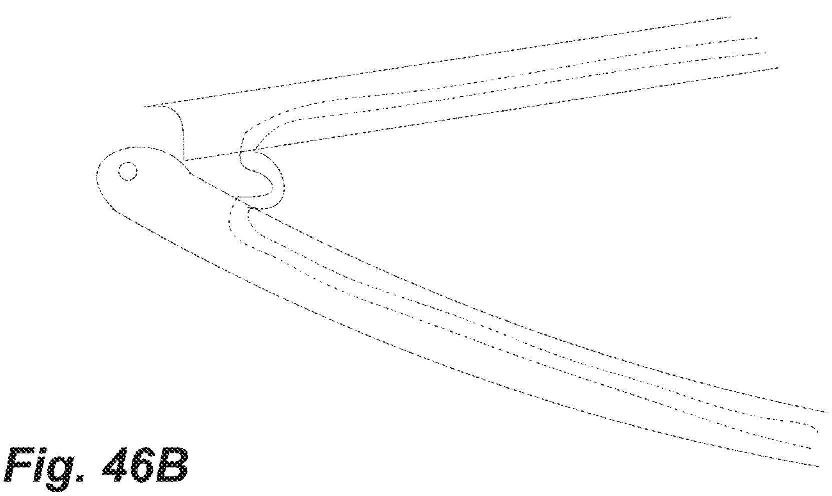

In the embodiment of the glasses with two speakers, the two speakers can also be electrically connected by a conductor or an electrical wire, with the conductor linking the speakers through the glasses, such as through the lens holders of the glasses. FIGS. 46A-46B show an embodiment of the wire 4130, with FIG. 46A illustrating a hinge 4132 of the glasses in the extended position, and FIG. 46B illustrating the hinge 4132 partially closed. As shown in the two figures, the wire 4130 is embedded in a temple 4134 to connect to the speaker in that temple. The wire 4130 extends from the temple 4134 to a lens holder 4136, and then to the other temple of the glasses to connect to the speaker in the other temple.

Referring back to FIG. 42, electrical components in the glasses can also include at least one microphone 4098, which can be located at a temple 4110, closer to the hinge than the free end of that temple 4110. The microphone 4098 receives audio signals. For glasses with hearing enhancement capabilities, the audio signals are modified or enhanced (to be further described below), and then sent to the speaker(s) in the glasses for the user to hear. In the embodiments that do not include plugs or ear buds that plug the ear canals of the user, but may still include tubes guiding sound from speakers to each ear, the user can hear both the enhanced sound based on hearing enhanced electrical components and sound directly from the ambient environment.

In another embodiment, there can be two microphones. Each microphone can, for example, be located close to one hinge of the glasses. The microphone close to the left hinge can be electrically connected to the speaker at the left temple, and the microphone close to the right hinge can be electrically connected to the speaker at the right temple. The one or more microphones can be directional, more preferential towards signals in specific directions. For example, the microphone close to the left hinge can be more preferential towards signals coming from the left, and the microphone close to the right hinge more preferential towards signals from the right.

In one embodiment, to reduce the weight of the glasses and/or to enhance the ease of aesthetic design of the glasses, some of the electrical components are not in the glasses. Instead, they are in a base or a portable device carried or worn by the user. A number of embodiments regarding a base have previously been described in U.S. patent application Ser. No. 10/964,011, entitled "TETHERED ELECTRONIC COMPONENTS FOR EYEGLASSES," and filed Oct. 12, 2004, which is hereby incorporated by reference. In embodiments with the base, the base is tethered, or connected with a wire, to the glasses. In embodiments with the portable device, the portable device is electronically coupled to the glasses or to the base (if there is a base) wirelessly or through a wired connection.

Figure 47:
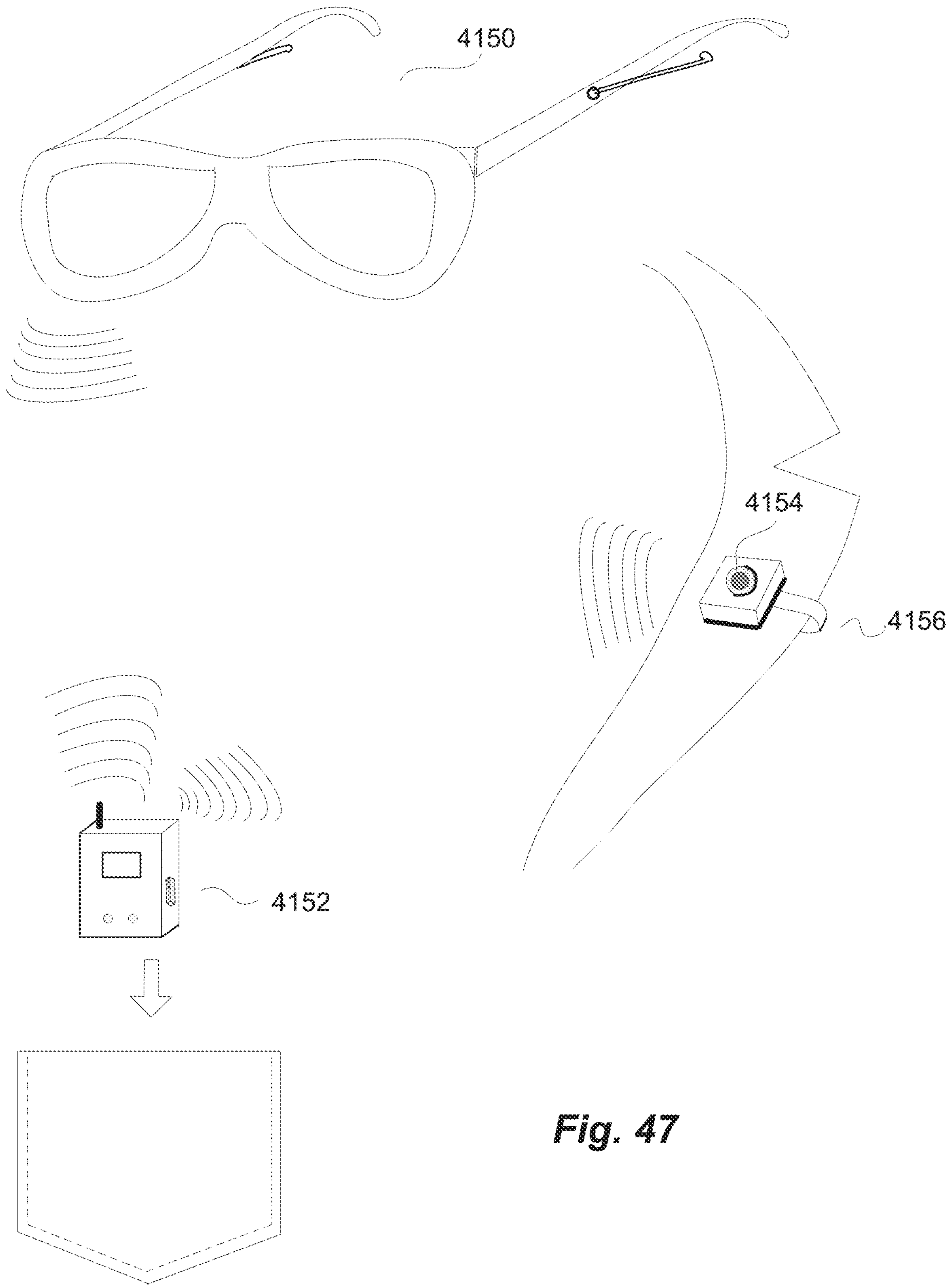
FIG. 47 shows one embodiment of the invention with a pair of glasses having speakers that are wirelessly coupled to a portable device.

FIG. 47 shows one embodiment of the invention with a pair of glasses 4150 having speakers. The glasses 4150 can be wirelessly coupled to a portable device 4152. In this embodiment, there can also be one or more microphones 4154 wirelessly coupled to the glasses. As an example, FIG. 47 shows the microphone 4154 in a package that can include a clip 4156 to attach the microphone 4154 to a piece of clothing of the user, such as to one of the lapels on a jacket of the user. In such a wireless embodiment, the glasses 4150 also include a wireless transceiver for connection to the portable device 4152 and/or the microphone 4156.

Figure 48A:
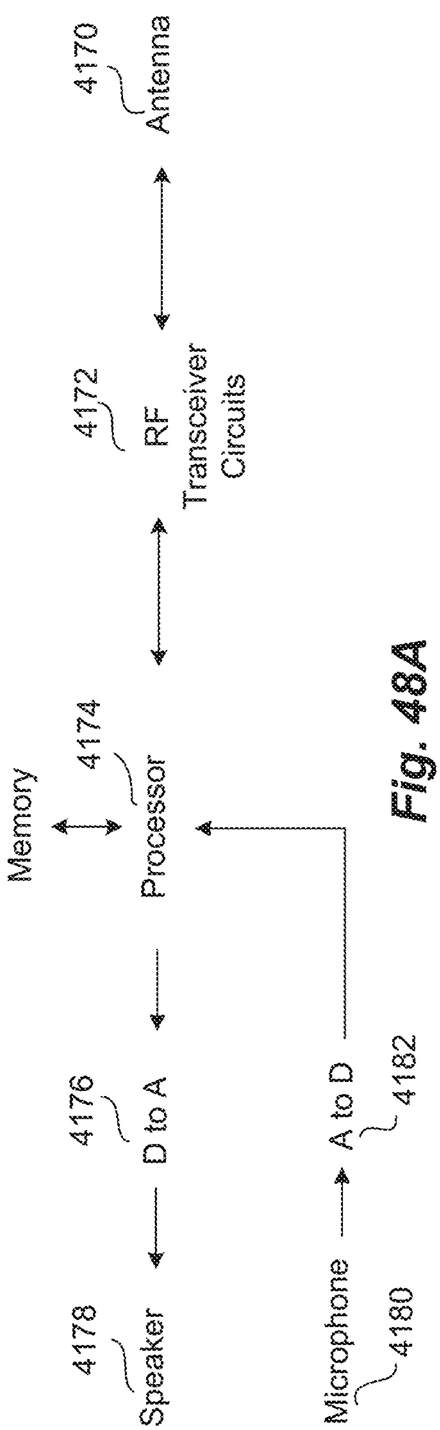
FIGS. 48A-48B show different embodiments of the present invention illustrating some of the electrical components for wireless connections to a pair of glasses.
Figure 48B:
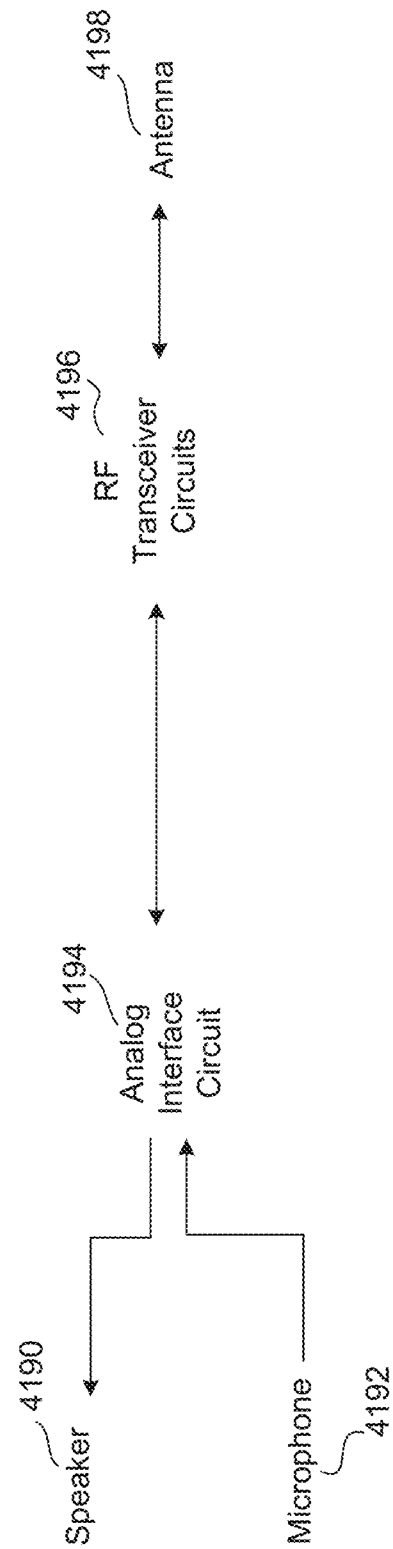

FIGS. 48A-48B show examples of different embodiments illustrating some of the electrical components for wireless connections to, or for a wireless transceiver in, a pair of glasses. In FIG. 48A, a high frequency or RF antenna 4170 wirelessly captures high frequency or RF signals for RF transceiver circuits 4172. If the transceiver circuits are for a conventional superheterodyne system, the transceiver circuits 4172 mix the RF signals down to IF signals. Then the IF signals are processed by baseband circuits to form digital outputs. Digital outputs from the baseband circuits are coupled to a processor 4174 for further processing. The baseband circuits can be incorporated in the processor, or can be separate from and coupled to the processor. Outputs from the processor 4174 are fed to a D-to-A converter 4176 to generate audio signals for a speaker 4178.

Similarly, audio analog signals from a microphone 4180 can be fed to an A-to-D converter 4182 to generate digital signals for the processor 4174 and then to the baseband circuits and the RF transceiver circuits 4172. The digital signals are then up-converted by the RF transceiver circuits 4172 and wirelessly transmitted by the antenna 4170.

In another embodiment, digital conversion is moved closer to the antenna. For example, instead of mixing RF into IF signals, the RF transceiver circuits directly perform digital conversion from the RF signals.

High frequency filters can be used at the front end of the RF transceiver circuits for the RF signals. In one embodiment, to save space, FBAR (film bulk acoustic resonator) duplexer is employed. A set of piezoelectric filters can be used to separate incoming and outgoing signals. For cell phone operation (which will be further described below), such filters can enable a user to hear and speak simultaneously.

FIG. 48B shows another example of some of the electrical components in or tethered to a pair of glasses for wireless connections. This embodiment does not depend on digitizing signals. A speaker 4190 and a microphone 4192 are connected to an analog interface circuit 4194, which is coupled to a RF transceiver circuit 4196 and an antenna 4198. For the speaker application, the transceiver circuit 4196 converts the RF signals down into IF signals, which are converted by the analog interface circuit 4194 into analog signals for the speaker 4190. Similarly, for the microphone application, its analog signals are converted into the IF signals by the analog interface circuit 4194 to be up converted by the RF transceiver circuits 4196 into RF signals for the antenna 4198. These types of wireless connection circuitry are suitable, such as, for simple radios, analog cell phones, CB radios, walkee-talkees, police radios, intercom systems, or hearing enhancement applications.

Note that in the above examples shown in FIGS. 47A-47B, signals from the microphones are transmitted by a wired connection, instead of a wireless connection.

As described above, in different embodiments, some of the electrical components are not in the glasses. Instead they are in a base or a portable device, which can be carried by the user. The portable device can be electrically coupled to the glasses through a wired connection. In such approaches, the glasses also include at least one connector to receive an electrical wire from the base or the portable device. The connector can be at the free end of one of the temples of the glasses, or the connector can be at another location of the glasses. Different types of standard or non-standard connectors can be used and have previously been described in U.S. Provisional Application No. 60/583,169, filed on Jun. 26, 2004, which is hereby incorporated by reference.

Figure 49:
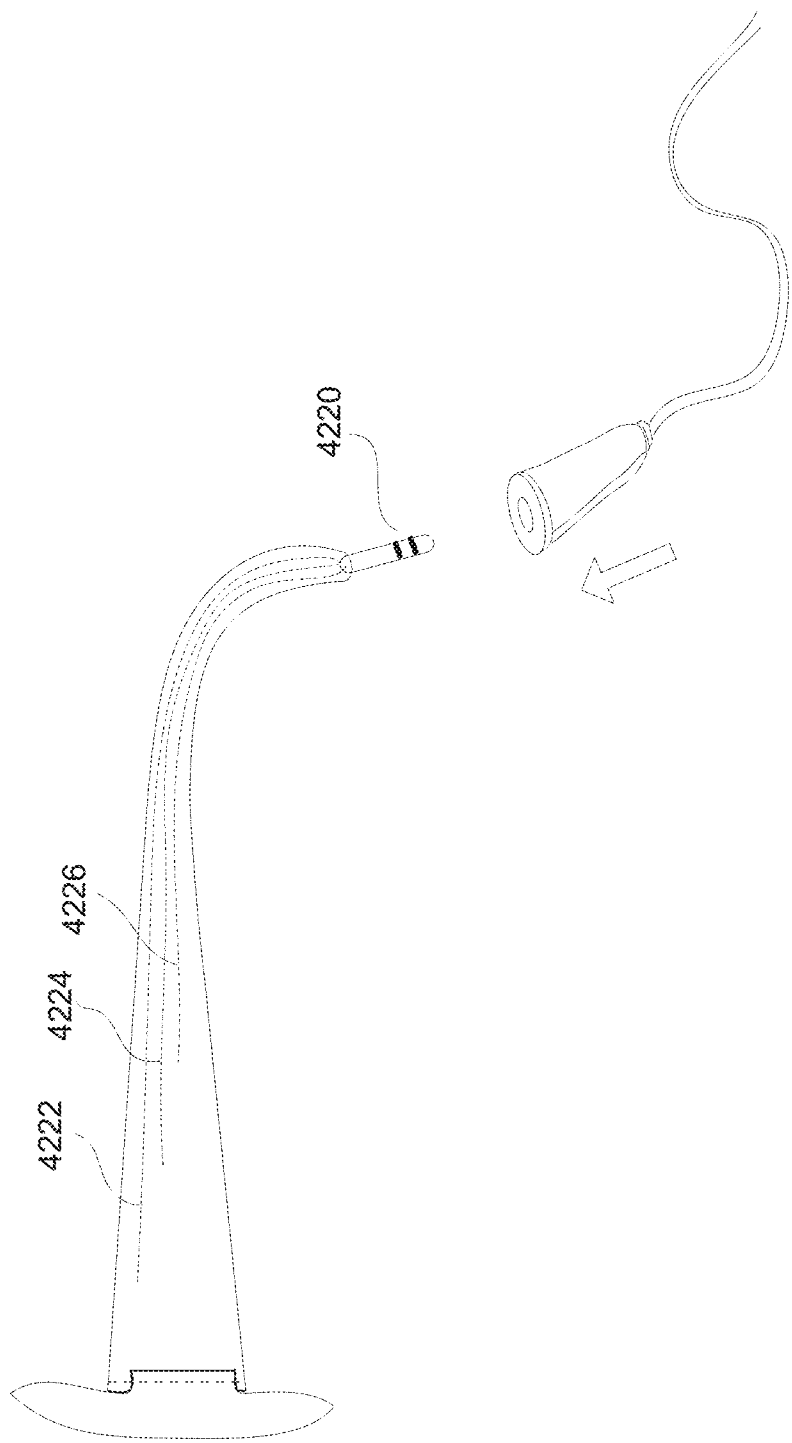
FIG. 49 shows a male stereo connector at the end of a temple according to one embodiment of the invention.

In one embodiment, a standard cylindrical plug connector is located at one end of a temple. From a different perspective, the temple molds around the end of the plug. FIG. 49 shows one such embodiment. The plug 4220 can be a standard audio connector or a 3-wire or three terminal plug, such as a 3.5 mm male stereo mini-phone plug. The 3 wires for such a plug are typically one for ground, the other two applicable for two signals, such as signals for two speakers to create stereo effects. FIG. 49 also shows the three wires 4222, 4224 and 4226, inside the temple, extended from the plug 4220. These wires are for connection to electrical components in the glasses.

In one embodiment, the cylindrical plug 4220 shown in FIG. 49 can be covered, such as with a cap or a cover, to protect, encapsulate or shroud the plug 4220. Or, at least a portion of the plug is covered. Such covering can be for esthetic reasons, or can be to prevent the plug 4220 from scratching the face of the user (if the plug has relatively sharp edges) when the user is putting on the pair of glasses.

Instead of a three terminal plug, other types of standard cylindrical plugs applicable to different embodiments of the present invention include, for example, a serial connector with 3 pins, typically one for ground, one for transmitting data (Tx) and the third for receiving data (Rx); or a 2-wire connector, one served as ground, the other for carrying signals, such as power and modulated signals.

Figure 50:
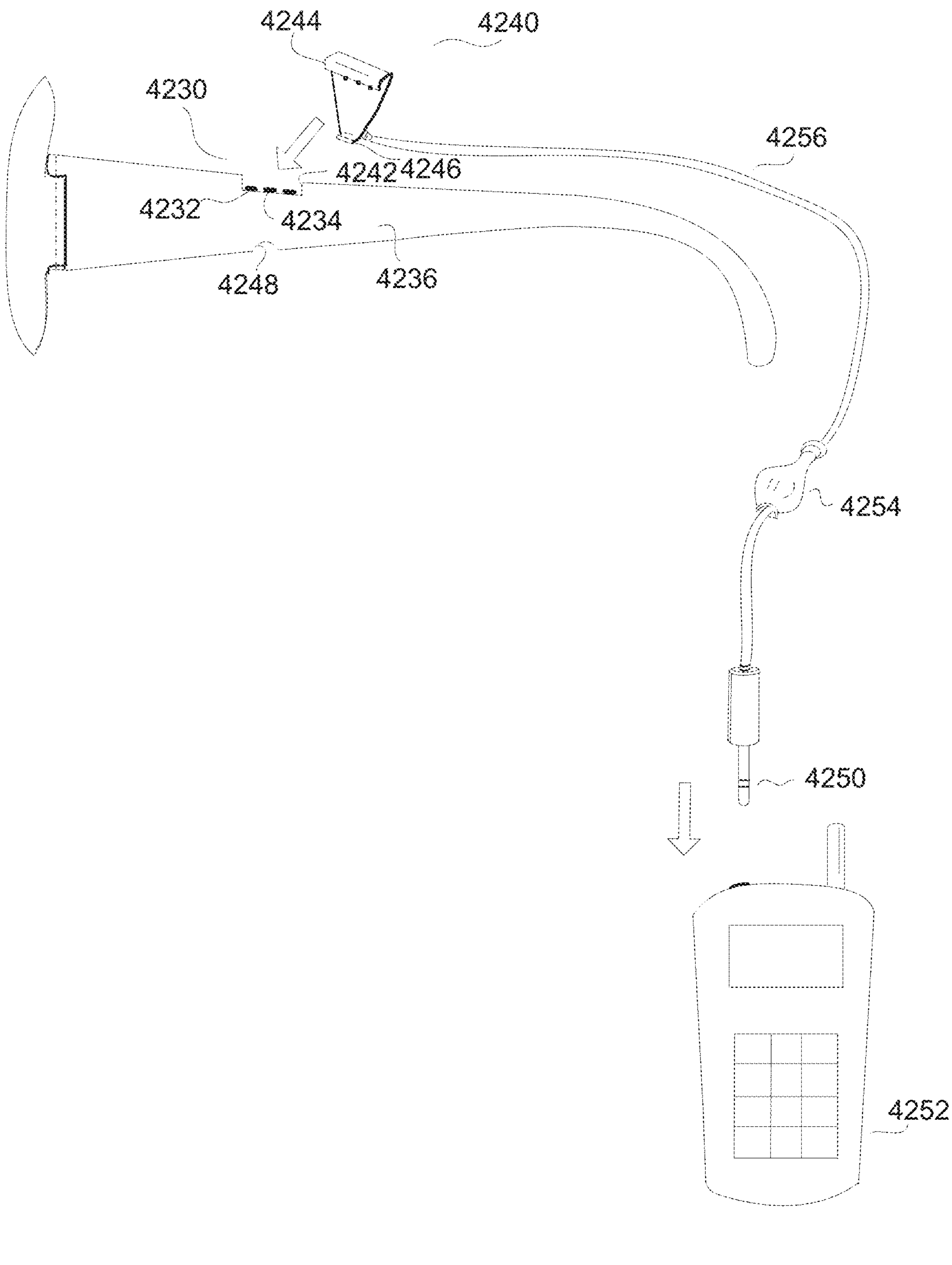
FIG. 50 illustrates a connector applicable to clamp onto a temple of a pair of glasses according to an embodiment of the invention.

Instead of a standard connector, a connector can be a non-standard connector. FIG. 42 shows a non-standard connector 4113 at the free end of one of the temples 4110. Instead of having a connector at the free end of a temple, a connector can be at another location of the glasses. FIG. 50 shows an example of a non-standard connector 4230. The connector 4230 includes one or more conductive pads, 4232 and 4234, on the top side of a temple 4236. The connector 4230 is designed to receive another connector 4240 that grabs onto or attaches around the side of the temple. There can be an indentation 4242 on the temple 4236 to receive the other connector 4240. The other connector 4240 can include a top 4244 and a bottom 4246 clip. There are a number of conductive pads or sheets inside the other connector 4240. The indentation 4242 provides alignment for connection. When attachment is at the indentation 4242, the conductive pads, 4232 and 4234, at the temple 4236 will be in contact with the conductive pads or sheets in the other connector 4240. There can also be another indentation 4248 at the temple 4236 to receive the bottom clip 4246. This can further enhance the alignment process and assist with securing the connection.

In FIG. 50, the other connector 4240 is tethered to a plug 4250, which can be inserted into a portable device 4252. The portable device 4252, for example, can be a cell phone. The portable device can include personal digital assistant (PDA) functionalities. This type of non-standard clip-type connector could be relatively easily applied to the temple with one hand, for example, while the user is driving a car.

In the wired embodiment shown in FIG. 50, a microphone does not have to be in the glasses. As shown in FIG. 50, a microphone 4254 can be attached to the wire 4256 that connects the glasses to the portable device 4252.

Figure 51:
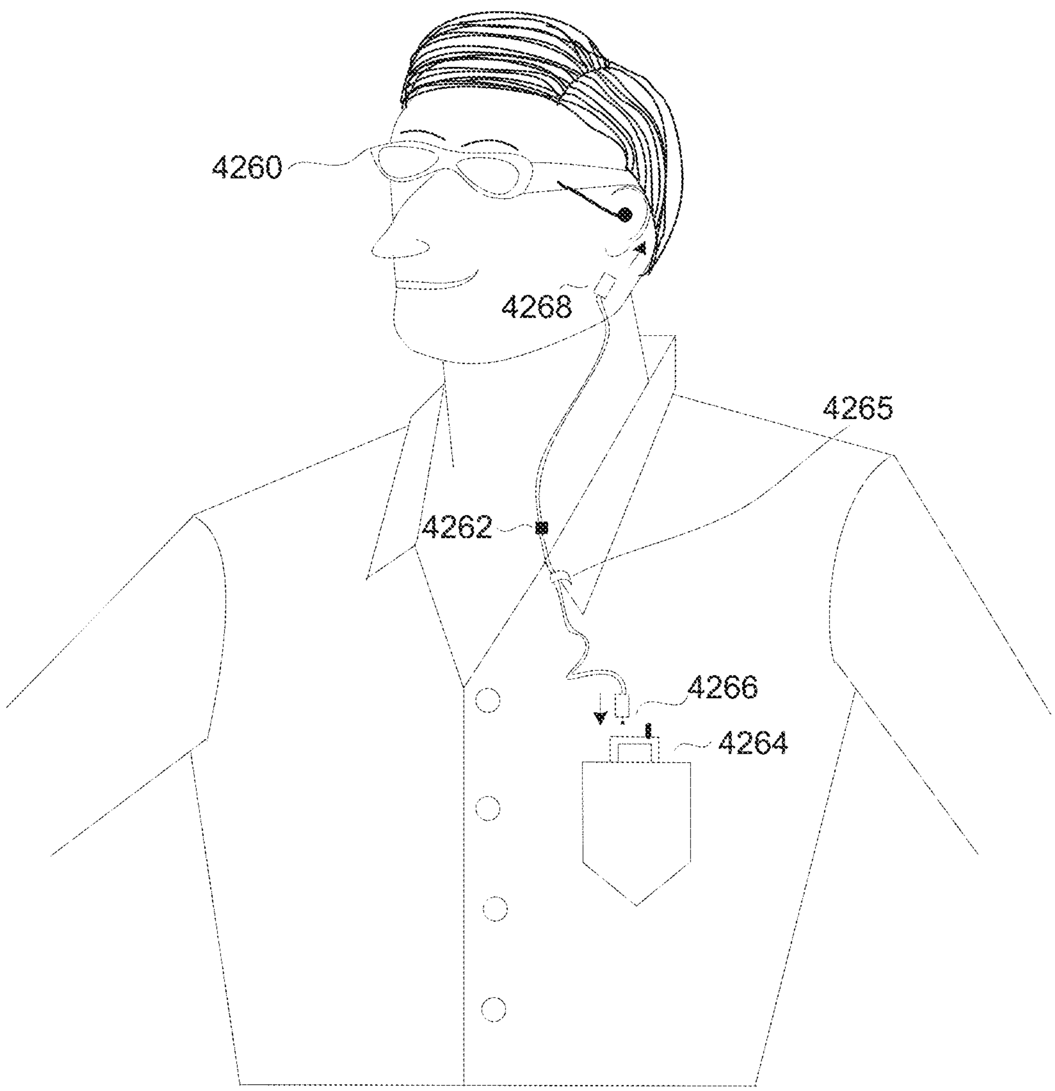
FIG. 51 shows one embodiment of the invention with a pair of glasses having a microphone coupled to the wire connected to a portable device.

FIG. 51 shows one embodiment of the invention with a pair of glasses 4260 having a microphone 4262 coupled to a wire. The wire is connected to a portable device 4264 through a plug 4266, and to the glasses 4260 through a jack 4268. The portable device 4264 can be in a shirt pocket as shown. There can also be a clip 4265 to attach the wire to an article of clothing worn by the user.

In one embodiment, the glasses include electrical components for hearing enhancement functionalities. The electrical components enhance audio signals, such as audio signals received by a microphone at the glasses. Then the enhanced signals are sent to the speakers for the user to hear. In one embodiment, the hearing-enhancing electrical components include a processor. The processor can be the processor 4174 shown in FIG. 48A. In this embodiment, the hearing-enhancing functionalities are performed through digitizing the corresponding audio signals. Then the processor, using digital signal processing techniques, operates on the digitized signals, such as boosting specific frequency bands.

In another embodiment, the hearing enhancing functionalities are provided by analog filter circuits. For example, analog filter circuits, using analog processing techniques, operate on the audio signals, such as boosting specific frequency bands.

Figure 52:
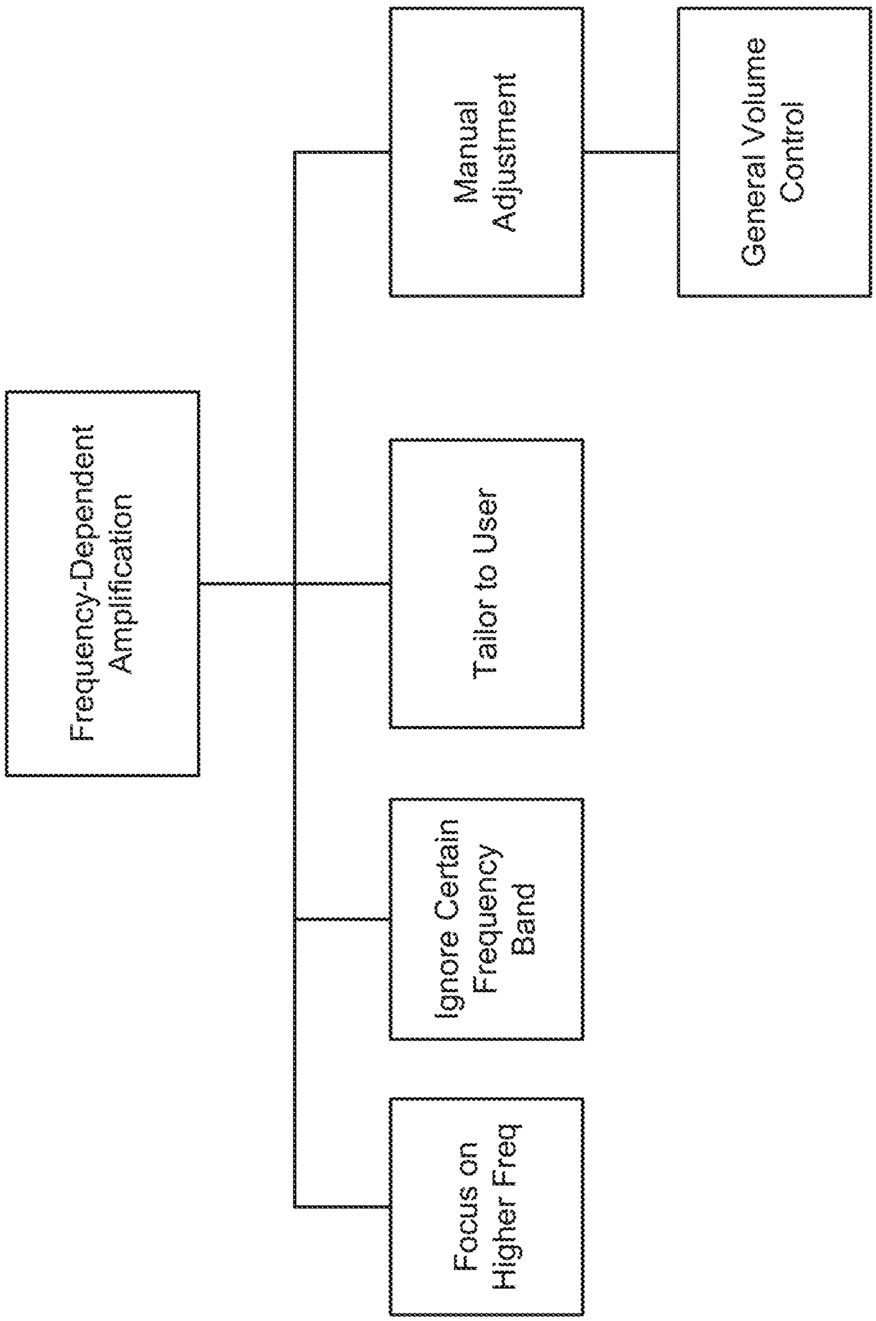
FIG. 52 shows different embodiments regarding frequency-dependent amplification of the present invention.

In one embodiment, one hearing enhancement function includes amplifying the audio signals received in a frequency range between 500 Hz to 8 kHz. Typically, a user's hearing impairment is not the same across all audio frequencies. For example, in English, the user might be able to easily pick up the sound of vowels, but not the sound of consonants, such as "S" and "P". FIG. 52 shows a number of embodiments regarding frequency-dependent amplification of the received audio signals.

One approach for frequency-dependent amplification focuses on amplifying the higher audio frequency ranges. This approach assumes that hearing degradation typically starts at the higher audio frequencies, such as above 2 to 3 kHz. Hearing may need more assistance at the higher audio frequency range. For example, the audio signals received by a microphone can be amplified by 30 dB in the frequency range from 2 kHz to 4 kHz. Or around the entrance of the ear, the audio signals in that frequency range can be amplified to reach sound pressure level ("SPL") to about 80 dB. For lower audio frequencies, such as below 2 kHz, the amplification can be lower, such as 10 dB. Or for frequencies lower than 500 Hz, the maximum SPL does not have to be higher than 55 dB.

Another frequency-dependent amplification approach focuses on amplifying an audio frequency range that typically contains most of the information in everyday communication. For example, about 70% of the information in everyday human communication can be within the frequency range of 1 to 2 kHz. The frequency range that is selected to be amplified can be such a frequency range. Other frequency ranges are not selected for amplification.

There are benefits in embodiments where the ear canal remains open, with no plug inserted into the ear. For example, the user can be hearing the audio signals directly from the sender (i.e., without assistance provided by the hearing enhancement electrical components). If the embodiments further implement frequency-dependent amplification, for frequencies not within the ranges selected for amplification, the user can hear those signals directly from the sender. Lower frequencies, such as those below 2 kHz, are typically louder. Also, frequencies in the range, such as from 2000-3000 Hz, are typically in the natural resonance of the ear canal, which is typically around 2700 Hz. As a result, the intensity of these frequencies would be increased by about 15 dB. Further, with no plug inserted into the ear, there is typically no occlusion effect due to, for example, the user's own voice.

However, in embodiments with the ear canal not plugged/blocked/covered, signal processing speed of the frequency enhancement electrical components can be important. In such embodiments, the user can be hearing the audio signals both from the sender and the glasses' speakers. To prevent echoing effect, signal processing speed for hearing enhancement cannot be too low. Typically, the user would not be able to distinguish two identical sets of audio signals if the difference in arrival times of the two signals is below a certain delay time, such as 10 milliseconds. In one embodiment, the hearing enhancement signal processing speed is faster than such a delay time.

In one embodiment, the user has the option of manually changing the amplification of the system. The system can have a general volume controller that allows the user to adjust the output power of the speaker. This adjustment can also be across certain frequency bands. For example, there can be three volume controls, each for a selected frequency band.

Figure 53:
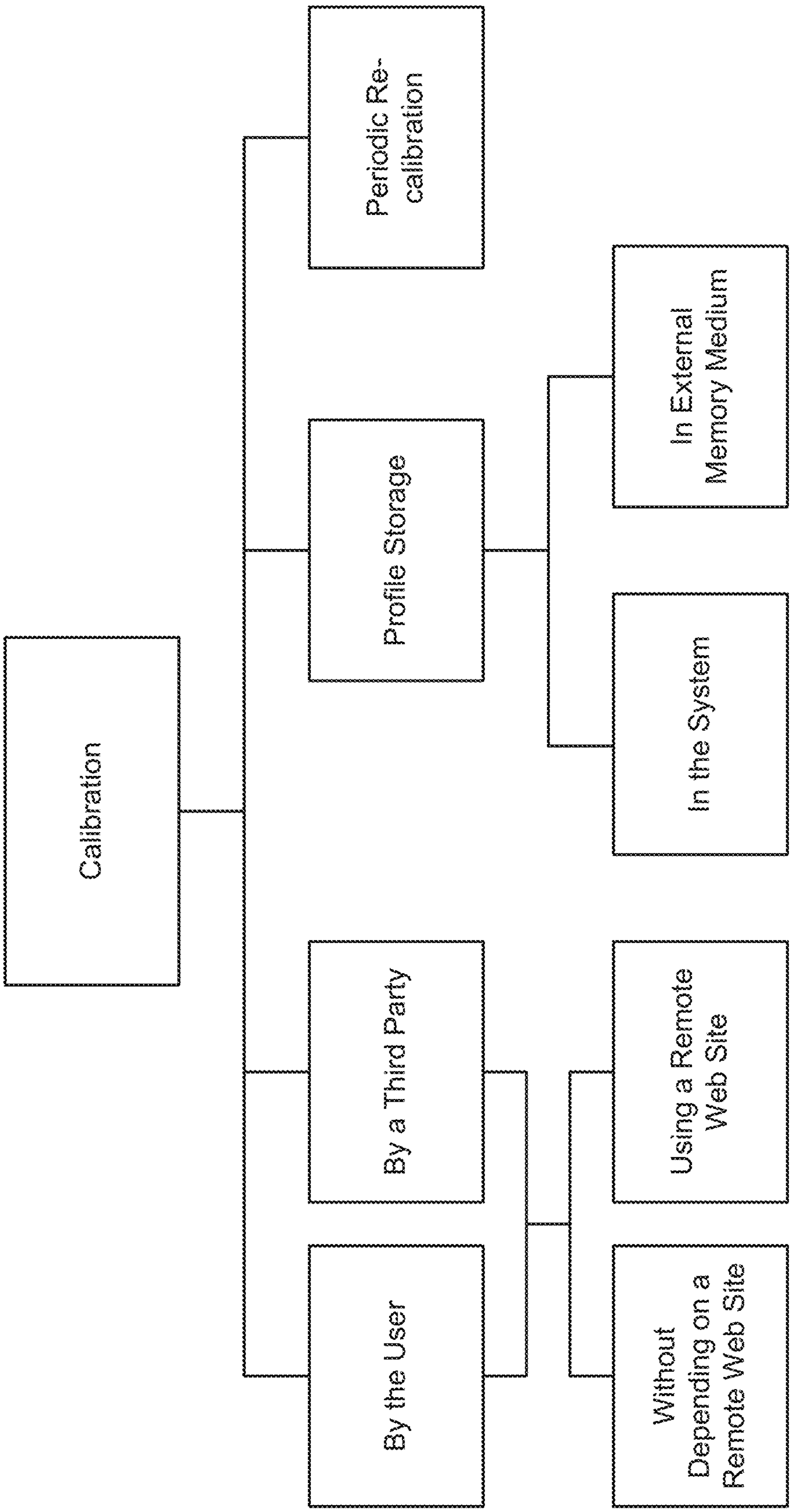
FIG. 53 shows a number of embodiments regarding hearing calibration of the present invention.

In another approach, amplification across frequencies is tailored to the hearing needs of the user. This tailoring can be performed through calibration. FIG. 53 shows a number of embodiments regarding calibration of a user's hearing, for example, across various frequencies and/or for different amount of amplification. Calibration enables the glasses to determine (e.g., estimate) the hearing sensitivity of the user. Through calibration, the user's hearing profile can be generated.

The user can perform the calibration by himself/herself. For example, the audio frequencies are separated into different bands. The glasses generate different SPL at each band. The specific power level that the user feels most comfortable would be the power level for that band. Alternatively, the glasses could generate different tones in different frequency bands. The user could compare the tones and rate the perceived loudness. In this process, the glasses can prompt the user and lead him through the process interactively. Based on the measurements, the glasses could create a calibration curve, which becomes the personal hearing profile for that user. After calibration, signals received in different bands, such as by a microphone in the glasses, will be amplified or attenuated according to the hearing profile.

In another embodiment, calibration can be done through a web site. The web site can guide the user through the calibration process. The user can be sitting in front of a computer terminal that is connected through the Internet to the web site. The terminal includes a headset that produces audio sounds. Alternatively, the user could be wearing the glasses that are connected through a cable to the sound card of the computer. The headset (or the glasses) generates different SPL at different frequency bands to test the user's hearing. The specific power level that the user feels most comfortable would be the power level at that band for the user. After testing is done for all of the bands, based on the power levels for each band, the web site creates and stores the user's personal hearing profile. Alternatively, the calibration procedure could be done off-line, with software provided on a storage device, such as a disc. The software could be installed on the user's computer. After installation, the software can guide the user through the calibration process.

Note that the different calibration processes can also be done by a third party, such as an audiologist, for the user.

The user's hearing profile, which typically is represented as digital data, can be stored in the glasses, in a base, or in a portable device. After calibration, the hearing profile can be downloaded, from, for example, the above described terminal, into the glasses wirelessly, such as through Bluetooth, infrared or other wirelessly interconnection technologies, or through a wired connection. The hearing profile can alternatively be stored in a portable media storage device, such as a memory stick. The memory stick could be inserted into the glasses, the base, the portable device, or some other audio generating device, which desires to access the hearing profile and personalizes the amplification across frequencies for the user.

The glasses (or the base, or the portable device) can also periodically alert the user for re-calibration. The period can be, for example, once a year. Also, the calibration can be done in stages so that it is less onerous and/or less obvious that the user is wearing a hearing enhancing device.

In another embodiment, there can be many pairs of glasses. Each pair amplifies the received audio signals in a preset frequency range by a preset amount. For example, two pairs amplify two respectively different preset frequency ranges by 20 dB. In another set, each pair provides different amount of amplification for the received audio signals in the same preset frequency range. For example, the different amount of amplification ranges from 20 to 40 dB at 5 dB intervals for the preset frequency range of 2500 to 4000 Hz. At a store, a consumer can try out different glasses with different preset amplifications at the same or different preset frequency ranges, before buying the one the consumer prefers.

In another embodiment, there is an assortment of standard hearing profiles, such as 20 or so. The user would just pick the one that sounds best.

If the glasses include hearing enhancement capabilities, the hearing enhancement functions might be on continuously for a long duration of time, power consumption can be an issue. In yet another embodiment, the glasses also include electrical components that are for managing power consumption of other electrical components in the glasses, such as the components to enhance hearing or other functionalities in the glasses. The electrical component can be a power controller, a microprocessor, or the processor 4174 in FIG. 48A. Such glasses can include power management software applications/processes to manage power consumption of the glasses.

Figure 54:
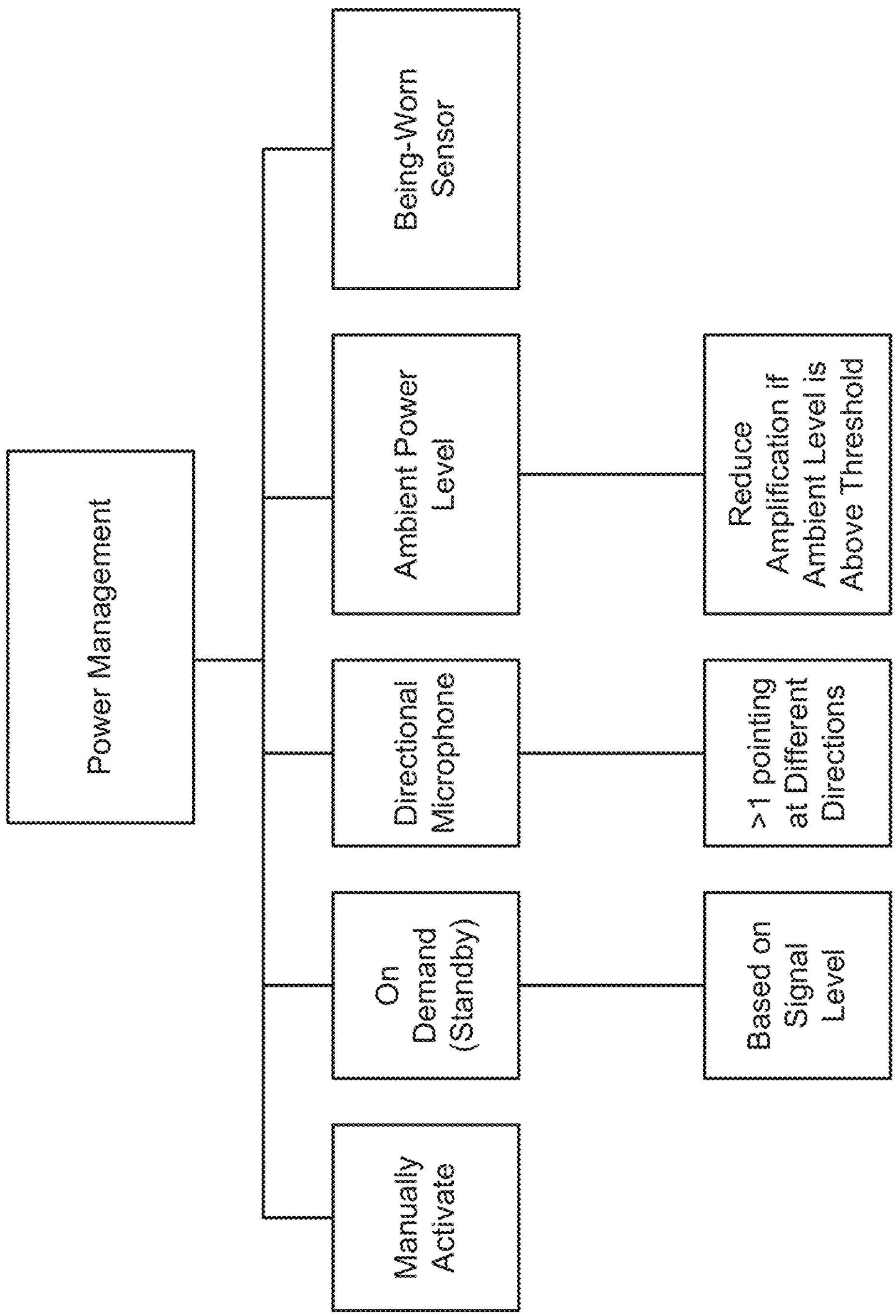
FIG. 54 shows a number of embodiments regarding power management of the present invention.

FIG. 54 shows a number of embodiments for managing power consumption of the glasses. One embodiment includes a manual on/off switch, which allows the user to manually turn off the electrical components in the glasses as he desires. The on/off switch may not have to be on the glasses. It can be on a base or a portable device tethered to the glasses.

The operation of the electrical components can be on-demand. For example, the on/off switch can be voice activated. The glasses are trained to recognize specific recitation, such as specific sentences or phrases, and/or the user's voice. To illustrate, when the user says sentences like any of the following, the hearing enhancement capabilities would be automatically turned from the sleep mode to the active mode: What did you say? Louder. You said what?

In another embodiment of on-demand power management, the glasses can identify noise (e.g., background noise), as opposed to audio signals with information. To illustrate, if the audio signals across broad audio frequency ranges are flat (not deviate more than a preset threshold amount), the glasses could assume that the received audio signals are noise. In another approach, if the average SPL of the received audio signals is below a certain level, such as 40 dB, the glasses would assume that there are no audio signals worth amplifying. In yet another embodiment, when the amplitude or the power level of the received audio signals is below a certain threshold for a duration of time, at least some of the electrical components in the glasses can be deactivated. This duration of time can be adjustable, and can be, for example, 10 seconds or 10 minutes. In another approach, only when the signal-to-noise ratio of the audio signals in the ambient is above a preset threshold, would the deactivated electrical components be activated (i.e., awakened from the sleep mode, the reduced power mode or the standby mode).

In any case, to deactivate, the glasses or the hearing enhancement capabilities can be placed into a sleep mode, a reduced power mode or a standby mode.

Another approach to manage power consumption can make use of a directional microphone. This approach can improve the signal-to-noise ratio. The gain at specific directions of such a microphone can be 20 dB higher than omni-directional microphones. The direction of the directional microphone can vary with application. However, in one embodiment, the direction of the directional microphone can be pointing forward or outward away from the user. The assumption is that the user typically faces the sender of the message, and thus it is the audio signals in front of the user that should be enhanced.

In yet another embodiment of power management, the amplification of the glasses on at least a range of frequencies depends on the ambient power level, or the noise level of the environment of the glasses. One approach to measure the noise level is to measure the average SPL at gaps of the audio signals. For example, a person asks the user the following question, "Have you left your heart in San Francisco?" Typically, there are gaps between every two words or between sentences or phrases. The glasses measure, for example, the root mean square ("rms") value of the power in each of the gaps, and can calculate another average among all of the rms values to determine the noise level. In one embodiment, the glasses increase the amplification so as to ensure that the average power of the output audio signals by its speaker(s) is higher than the noise level by a certain degree. For example, the average SPL of the output audio signals from the glasses is 20 dB above the noise level.

In another embodiment, if the average power level of the environment or the ambient noise level is higher than a preset threshold value, signal amplification is reduced. This average power level can include all the audio signals received by, such as the microphone(s) of the glasses. The rationale is that if the environment is very noisy, it would be difficult for the user to hear the audio signals from the other person anyway. As a result, the glasses should not keep on amplifying the audio signals independent of the environment. To illustrate, if the average power level of the environment is more than 75 dB, hearing enhancement amplification is reduced, such as to 0 dB.

In yet another embodiment, the glasses further include automatic activation/deactivation mechanism controlled by a sensor that determines whether the user is wearing the eyeglasses. A number of such being-worn sensor embodiments have previously been described, such as in U.S. patent application Ser. No. 11/078,855, filed Mar. 11, 2005, entitled, "EYEWEAR WITH RADIATION DETECTION SYSTEM," which is hereby incorporated by reference.

Figure 55:
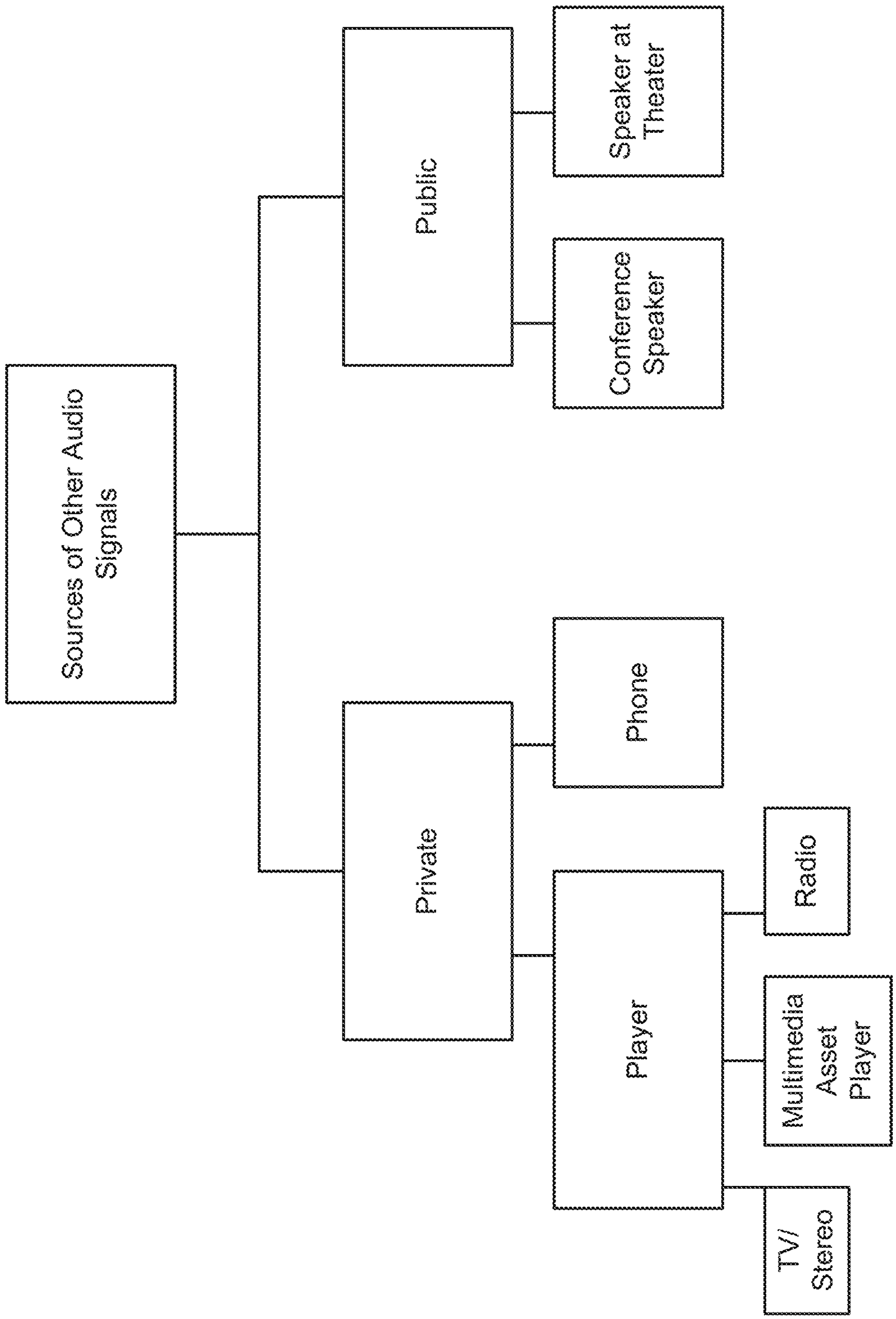
FIG. 55 shows different embodiments of sources of other audio signals generated by the glasses according to the present invention.

A number of embodiments have been described on hearing enhancement. In other embodiments, at least one electrical component in the glasses is for generating audio signals that do not originate from signals captured by the microphone(s) in the glasses. These audio signals can be known as other audio signals. FIG. 55 shows different embodiments of the sources of such other audio signals. These signals can originate from relatively private sources or public sources.

In one example of signals from private sources, the other audio signals originate from a phone call received by the glasses. Such a pair of glasses can include wireless communications electrical components of a phone. The phone can be a mobile telephone, a cordless phone, a speaker phone, a CB radio, a walkee-talkee, an intercom system or other types of phone. The wireless communications electrical components can be located in at least one of the temples of the glasses. Some of the electrical components of the phone can be in a base or in a portable device wired or wirelessly coupled to the glasses. The glasses can pick up signals from a caller, and the speaker(s) in the glasses produce the audio signals, or a representation of the audio signals, from the caller.

There can be an operation indicator on the frame of the glasses to indicate that there is an incoming call. The indicator can be based on, for example, sound, light or vibration. In one embodiment, the indication is based on light, and is located on the inside of a temple close to the hinge of that temple. Such an operation indicator can be implemented in a variety of ways, such as with a light emitting diode (LED). There can be one LED coupling to more than one optical fiber, with each optical fiber guiding the light from the LED to different areas of the frame. In the case of a LED, the operation indicator is a light source, and can produce light of the color of the LED. In another embodiment, the operation indicator could represent a small text display, such as a liquid crystal display (LCD). The indicator can also be a signal light.

In one embodiment, activation/deactivation of the phone is based on whether an incoming call is present. For example, on receiving an incoming call, the glasses can automatically activate (or wake-up) to engage in wireless communication. Activation/deactivation can also be triggered by a button provided on the frame of the glasses. The button can serve to accept or drop a call. One advantage of providing activation/deactivation is that the glasses are able to be power managed so that power consumption is reduced and the life of power sources, such as battery life, is extended.

Figure 56:
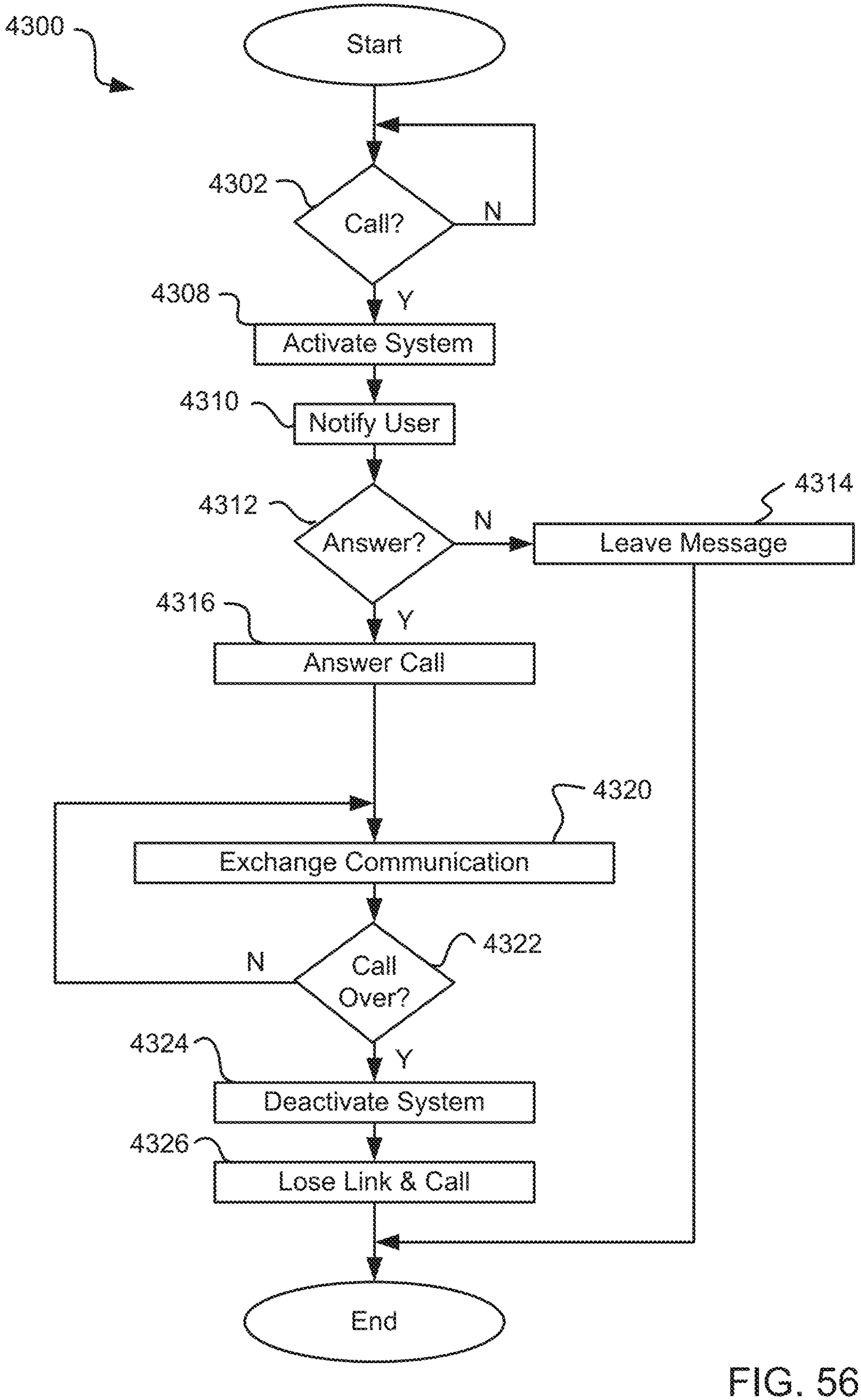
FIG. 56 is a flow diagram of call processing according to one embodiment of the invention.

FIG. 56 is a flow diagram of call processing 4300 according to one embodiment of the invention. The call processing is performed using glasses disclosed in different embodiments that have wireless communication capabilities. For example, the glasses can be based on the glasses shown in FIG. 42 or 50.

The call processing begins with a decision 4302 that determines whether a call is incoming. When the decision determines that a call is not incoming, then the call processing waits for such a call. Once the decision 4302 determines that a call is incoming, the glasses are activated 4308. Here, the wireless communications capability of the glasses is activated (e.g., powered-up, enabled, or woken-up). The user of the glasses is then notified 4310 of the incoming call. In one embodiment, the notification to the user of the incoming call can be achieved by an audio sound, such as a ringer, produced by the glasses (via a speaker). Alternatively, the user of the glasses could be notified by a vibration (such as by a base tethered to the glasses), or a visual (e.g., light) indication provided by the glasses.

A decision 4312 then determines whether the incoming call is to be answered. For example, the user can push a button to indicate that the user wants to answer the call. When the decision 4312 determines that the incoming call is not to be answered, the glasses can activate a voice message informing the caller to leave a message 4314 or instructing the caller as to the unavailability of the recipient.

On the other hand, when the decision 4312 determines that the incoming call is to be answered, the call can be answered 4316 at the glasses. The user of the glasses is accordingly able to communicate 4320 with the caller by way of the glasses and, thus, in a hands-free manner.

A decision 4322 then determines whether the call is over (completed). When the decision 4322 determines that the call is not over, the call processing returns to repeat the operation 4320 and subsequent operations so that the call can continue. On the other hand, when the decision 4322 determines that the call is over, then the glasses can be deactivated 4324, and the call is ended. The deactivation 4324 of the glasses can place the glasses in a reduced-power mode. For example, the deactivation 4324 can power-down, disable, or sleep the wireless communication capabilities (e.g., circuitry) of the glasses. Following the operations, the call processing for the particular call ends.

In an embodiment where the glasses operate as a wireless headset of a portable device (e.g. a cell phone), a wireless link can be established between the headset and the portable device if the incoming call is to be answered. The wireless link is, for example, a radio communication link such as utilized with Bluetooth or Wi-Fi networks. Thereafter, communication information associated with the call can be exchanged over the wireless link. The portable device receives the incoming call, and communicates wirelessly to the glasses such that communication information is provided to the user via the glasses. When the decision determines that the call is over and the glasses are deactivated, the wireless link is also ended 4326.

Regarding the hearing enhancing capabilities described, in one embodiment, when there is an incoming call, hearing enhanced capabilities are deactivated, and the glasses receives the incoming call. In another embodiment, when the user wants to receive the incoming call, one or more embodiments of the hearing enhanced capabilities enhance the audio signals from the incoming call.

One advantage of cell phones is that you can make calls anywhere you can get a signal. However, one disadvantage is that you might be making a call in a noisy environment. In one embodiment, the glasses also include electrical components for noise cancellation. Such noise cancellation functionalities can be activated during a phone conversation.

In one approach, noise cancellation is achieved through a first and a second directional microphones. The first one points at the user's mouth, and the second one points away. For example, the first one can be at one of the hinges as shown in FIG. 42, whose directionality favors sound arriving from the user. There can also be a tube from the first microphone to or towards the mouth of the user, to guide the sound from the mouth to the microphone. The second microphone can be in the vicinity of the other hinge, whose directionality favors sound arriving in front of or outside of the user. Signals received from the second microphone are subtracted from signals received from the first microphone before the audio signals are further processed for transmission as the message from the user.

Referring back to FIG. 55, other examples of audio signals originating from private sources include the other audio signals originating from different types of audio players, such as televisions, stereo systems, media asset players, or radios. The audio players can be in the glasses. In other embodiments, at least some of the electrical components of the audio players can be in a base tethered to the glasses, or in a portable device wired or wirelessly coupled to the glasses. For example, the other audio signals can originate from a portable device, which might produce, receive or play audio content. The audio content is then transmitted to the eyeglasses in a wired or wireless manner. The eyeglasses serve as a receiver of the audio content from the portable device and reproduce the audio signals for the user.

The glasses with the call processing ability perform two-way communications. In the embodiments of the glasses operating as audio players, the glasses perform one-way communications (or at least substantially one-way communications).

As an example of audio player being a stereo system, a pair of glasses includes electrical components of a headset for wirelessly receiving audio signals. Assume the user is working in the backyard and the stereo system is in the living room. The music from the stereo can be wirelessly transmitted to the glasses or to a portable unit carried by the user, which can re-transmit the music to the glasses wired or wirelessly. The speakers in the glasses can generate the music for the user to enjoy. Based on this technique, the user can enjoy the music without the need to crank up the volume of the stereo system.

In another example of an audio player, a pair of glasses includes a multimedia asset player, such as a MP3 player.

Figure 57:
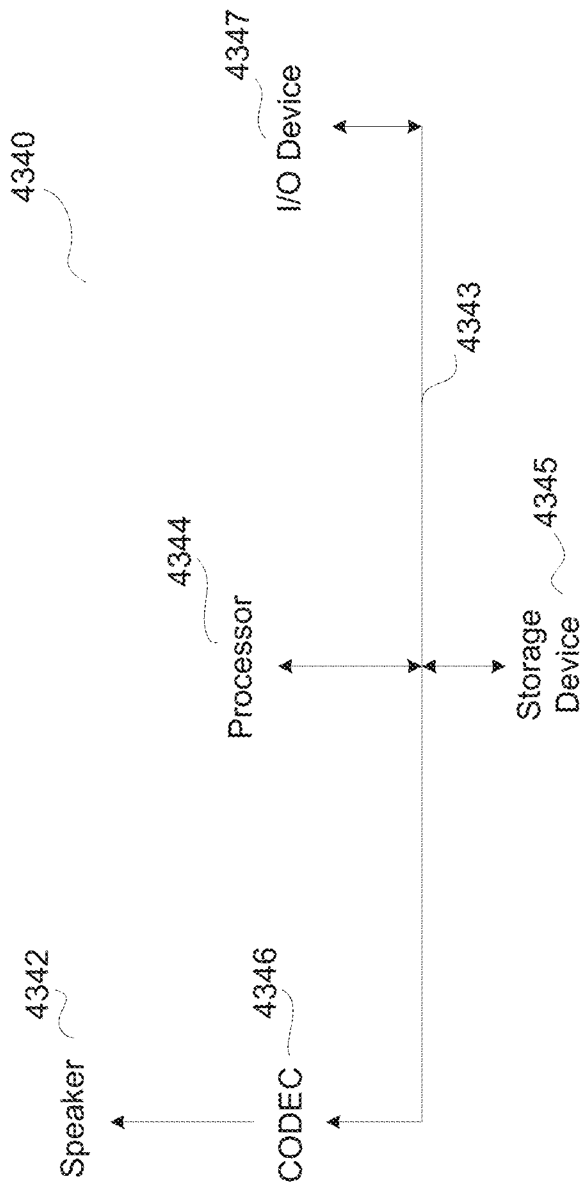
FIG. 57 shows some of the electrical components for an MP3 player according to an embodiment of the invention.

FIG. 57 shows some of the electrical components for an MP3 player 4340 according to one embodiment of the invention. The player 4340 includes a speaker 4342 and a data bus 4343, which facilitates data transfer among, for example, a processor 4344, a storage device 4345, and a coder/decoder (CODEC) 4346. The processor 4344, which can be a microprocessor or controller, controls the operation of the player 4340. The storage device 4345 stores the multimedia assets, such as MP3 files, or other types of media data that are appropriately formatted. In one example, the MP3 files are digitally encoded songs or other types of audio signals. The storage device 4345 can include a number of separate storage elements. For example, the device 4345 can be a flash memory device, or a minidisk device, and a cache, which can improve the access time and reduce power consumption of the storage device 4345. The storage device 4345 typically also includes a Read-Only Memory (ROM), which stores programs, utilities or processes to be executed in a non-volatile manner. The player 4340 can also include a RAM, such as for the cache.

Once a media asset, such as a song, is selected to be played, the processor 4344 supplies the asset to the CODEC 4346, which decompresses the asset and produces analog output signals for the speaker 4342. In one embodiment, the bus 4343 is also coupled to an input/output device 4347, which could, for example, allow a user to upload songs in the glasses to an external instrument, such as a computer; or download songs from the instrument to the glasses.

There are different approaches to select a song. In one embodiment, the media assets/songs can be categorized in the asset player. The categorization can be based on the names of artists, albums and/or songs. The categorization can be hierarchical, with multiple levels in the hierarchy. To illustrate, assume that there are three levels. The top level can be the name of a singer; the second level can be the time periods when the assets were produced, and the third level can be the names of the songs. The entries, such as the name of the singer, can be abbreviated. There can be a small display and a control knob to allow a user to scroll down entries in a level. By pushing the knob, the user selects an entry, which can lead the user to a lower level. There can be an entry for moving up a level also. In another embodiment, the display is a touch-screen display, allowing entries to be entered directly on the display. In yet another embodiment, entries can be selected based on voice recognition.

Figure 58:
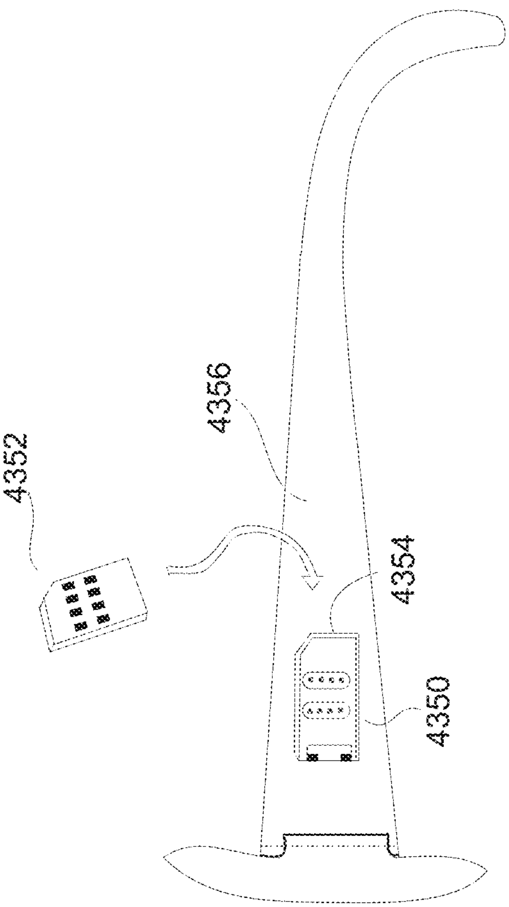
FIG. 58 shows one embodiment of the invention that has a card with electrical components coupled to a pair of glasses through a connector at a temple of the glasses.

All of the electrical components of the asset player, such as the MP3 player, do not have to be fully embedded in the glasses. In one embodiment, at least a portion of the MP3 player can be coupled to the glasses through a connector at the glasses. FIG. 58 shows a card connector 4350 to receive a card 4352, such as a removable media card (e.g., memory card). There can be a cover 4354 to secure the media card in place after it is inserted into the card connector. The cover 4354 can also protect the card once the card is in the card connector. The connector 4350 can be, for example, at a broad side of a temple 4356, as shown in the figure. The card can be for an MP3 player. It can be a memory card for a MP3 player, with the speaker of the player in the temple 4356. The speaker can play the multimedia assets accessed from the card through the connector. In another embodiment, some of the electrical components of the different types of audio players can be in a portable device, wired or wirelessly coupled to the glasses.

FIG. 42 shows two speakers, one speaker at one of the temples. In embodiments regarding generating other audio signals, the two speakers can provide stereo effects. There can also be more than one speaker at each temple. The glasses can provide four or more speakers to give a high fidelity sound or a surround sound effect. For example, each temple can include one speaker close to the hinge, and one speaker close to the tip of that temple or its temple tip. In one embodiment, a temple tip is separable from its temple. In other words, the temple tip is a replaceable part. In another embodiment, a temple tip is an integral part of its temple. The different speakers can generate different portions or sections of the sound. Further, if a base or a portable electronic device is coupled to the glasses, the base or the portable electronic device can contain another speaker, such as a base or woofer speaker. Such embodiments enable the glasses to provide a personal high-fidelity sound or a surround-sound environment.

In one embodiment, the audio player can be a radio. The glasses include the electrical components of a radio. There can also be switches on the glasses to control the operation of the radio. For example, one switch is an on/off switch, which can also change the volume of the radio. This switch can be a roller switch or can be based on two switches (one for moving up and the other moving down). Another switch can be a push button, which when pushed will reset the radio to a specific station, such as 88 MHz. A third switch is another push button, which when pushed will scan up to the next station, relative to the previous station. Different types of control knobs or switches will be further described below.

Figure 59:
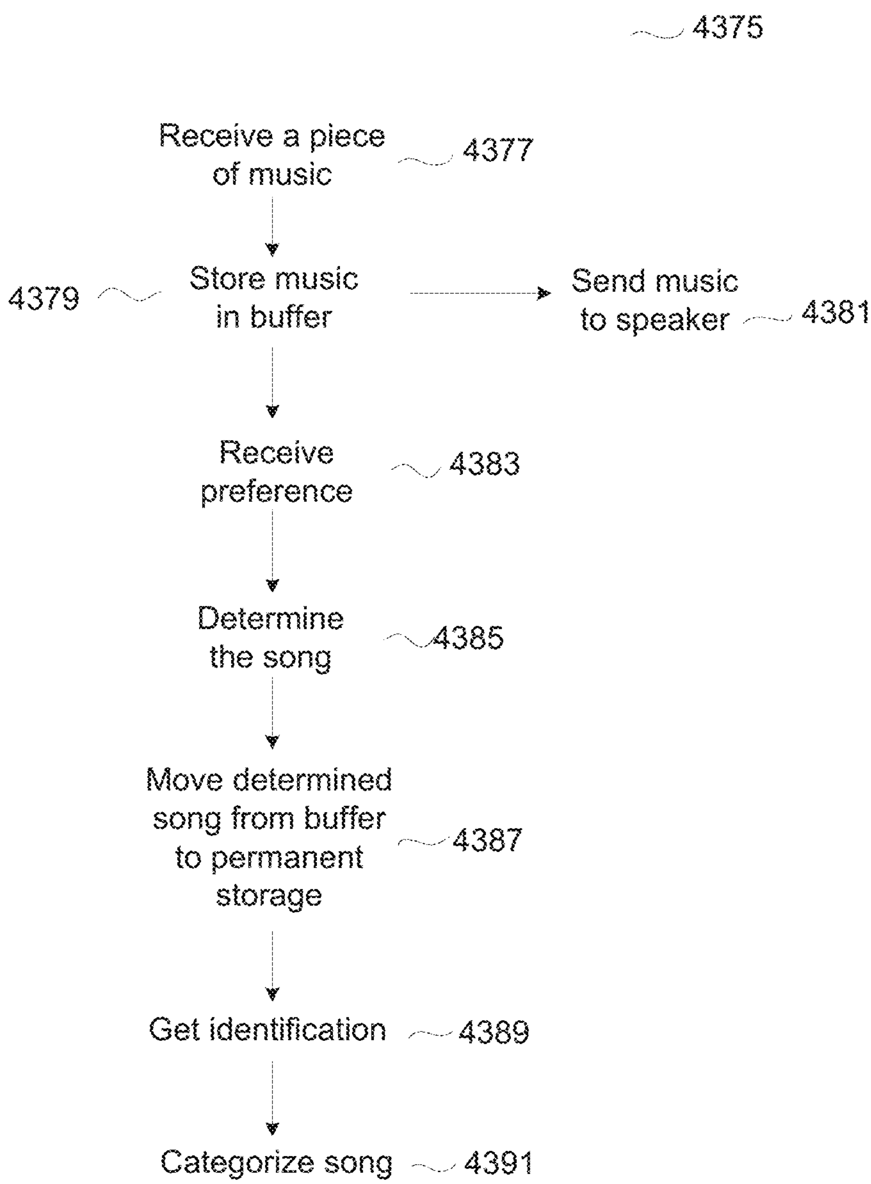
FIG. 59 shows a process for a personalized radio according to one embodiment of the present invention.

In one embodiment, the radio is a personalized radio that is personalized to the user. For example, the radio keeps track of at least one preference of the user regarding audio signals from the radio received by the user. FIG. 59 shows a process 4375 according to one embodiment for a personalized radio. Initially, a pair of glasses according to the invention receives 4377 a piece of music from a radio station. That piece of music is stored 4379 in a buffer or a temporary storage area. This temporary storage area can be in the glasses or tethered/coupled to the glasses. The piece of music is also sent 4381 to a speaker in the glasses.

Assume that the user likes the music. Based on a preference indicator, the user shows his preference. After the glasses receive 4383 an indication that the user likes the music, the glasses determine 4385 the song corresponding to the indication. That piece of music can then be moved 4387 from the buffer to a permanent storage area, such as into a flash memory. The beginning and the end of the piece of music can be identified based on additional information embedded with the piece of music. There can be meta data tied to the music keeping such additional information. With the piece of music stored in the permanent storage, the user can subsequently access it as desired.

There are different ways to determine the song or the content being played by the radio being the one preferred by the user. For example, one way/rule is that when the user pushes a specific button (a preference button) on the glasses or voices his preference, the song (or media asset or media file) that is being played at that point in time is the one the user likes. Since an operating system can be responsible to send the music to the speaker, the operating system knows what song is being played at that time. Based on the rule, the song of preference is determined when the button is pushed. Another rule is that when the user shows his preference, and there is no song being played at that instance, the song immediately preceding the break is the song of preference.

In another embodiment, the glasses can get 4389 an identification for the song the user likes. For example, the glasses can ask the user to provide an identification for the piece of music. This identification can be the type of music, the name of the singer/artist, the name of the music, the name of the album or other identification. In another embodiment, there can be meta data embedded, such as in the beginning part of the music (or media asset). Having such meta data embedded is not uncommon for music in digital format. The meta data can include identifications for the music. The glasses can get such identification. Based on the identification, the song is categorized 4391 accordingly, such as grouped with other songs having the same identification. Such categorization process would enhance the ease of accessing the song by the user at a later time.

In one embodiment, when the user activates the different types of audio players, the hearing enhancement mode is deactivated. In another embodiment, when the user activates the different types of audio players, one or more features of the hearing enhancement capabilities operate on the audio signals from the audio players. In other words, different embodiments of the hearing enhancement capabilities previously described can be activated or deactivated on the audio signals from the different types of audio players.

Referring back to FIG. 55, regarding public use, the audio signals generated by the speakers can originate from a public source. The public source can be a source that generates the audio signals for many people, or for people in a public environment. For example, the user can be at a conference or a theater. In one embodiment, the glasses can be coupled to the conference microphone or the theater speaker wirelessly, and are capable of capturing the audio signals therefrom. Again, the coupling can be through a portable device wired or wirelessly connected to the glasses. Then the glasses re-generate the corresponding audio signals for the user. Again, different embodiments of the hearing enhancement capabilities previously described can be activated or deactivated on the audio signals from the public sources.

Figure 60:
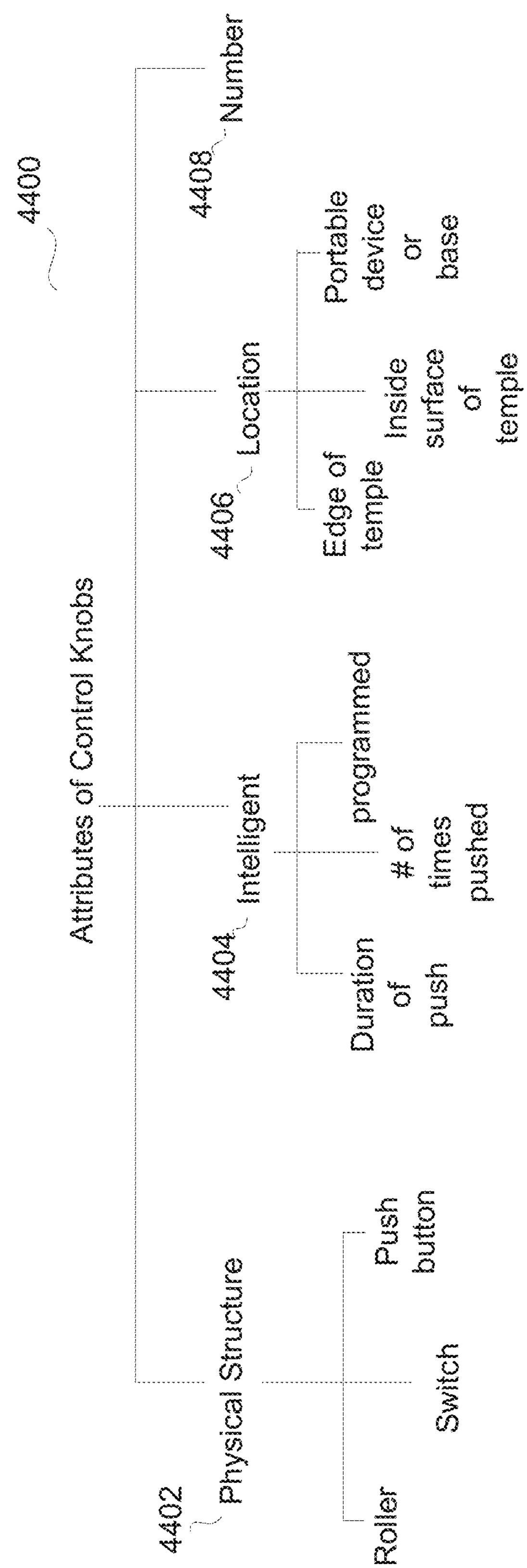
FIG. 60 shows a number of attributes of control knobs according to different embodiments of the present invention.

There can be one or more control knobs or switches at the glasses for controlling the operation(s) of the glasses. FIG. 60 shows a number of attributes 4400 regarding control knobs. The knobs can be of different physical structure 4402. For example, a control knob can be a roller, a switch or a push-button. A control knob serving as an up/down controller can use two buttons (one for up and the other for down), or a roller (rolling in one direction being up and the other direction being down).

A control knob can include additional intelligence 4404. For example, a push-button control knob can serve different purposes depending on the duration the knob is being pushed. If a user pushes it for more than three seconds, the knob serves as an on-off toggle switch for the glasses. In another example, a knob can serve multiple purposes, and the specific purpose depends on the number of times the knob is pushed non-stop.

A knob can also be programmed by a user. A user can connect the glasses to a computer and program the knob accordingly. For example, one can program a knob such that if the knob is pushed for more than three seconds, the knob would serve as an on/off switch for the glasses.

The location 4406 of a control knob can vary for different applications. A control knob can be located on the glasses. A control knob can be on the top, the side or the bottom of a temple of the glasses. A control knob can be located at the inside of a temple facing the user.

Assume that there are a number of control knobs and all of them are on the edges of a temple, except one. By being at a position substantially different from other control knobs, this knob can serve a specific purpose. For example, it can be an on/off control knob for all of the electrical components in the glasses.

In yet another embodiment, a control knob can be located in a portable device wired or wirelessly coupled to the glasses, or in a base tethered to the glasses.

The number 4408 of control knobs can vary depending on operations. For example, there is an on/off control knob and a volume up/down control knob. If the glasses are used for cell phone headset applications, in one embodiment, there is also an answer/hang-up control push-button. If the glasses serve as a radio, in one embodiment, there is also a channel selection control knob, which can be an up/down controller, like two push buttons. If the glasses serve as a CD player, in one embodiment, there is a play control knob, a stop control knob, and a skip forward/backward control knob. If the glasses serve as a multimedia asset player, such as a MP3 player, in one embodiment, there is a skip-forward/backward-song control knob and a select-song-to-play control knob.

In a number of embodiments described, a pair of glasses can serve different applications. For such embodiments, a switch on the glasses (a base or a portable device coupled to the glasses) can also serve different functions, depending on the application.

Different types of switches are applicable for different applications. Additional disclosures on switches are in U.S. Provisional Application No. 60/583,169, filed on Jun. 26, 2004, which is hereby incorporated by reference.

Figure 61A:
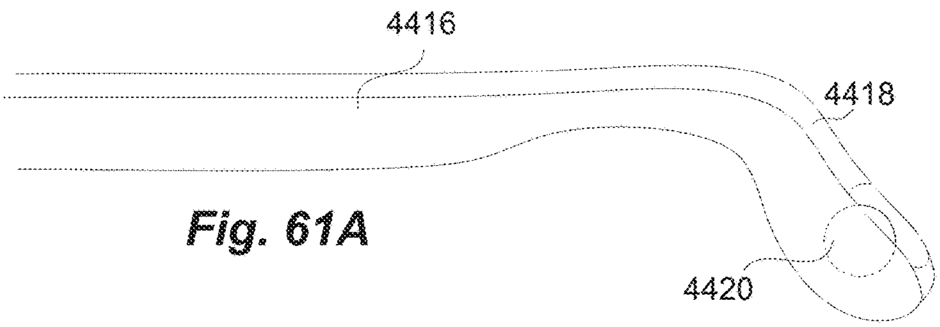
FIGS. 61A-61C illustrate different embodiments of power sources for a pair of glasses according to the invention.
Figure 61B:
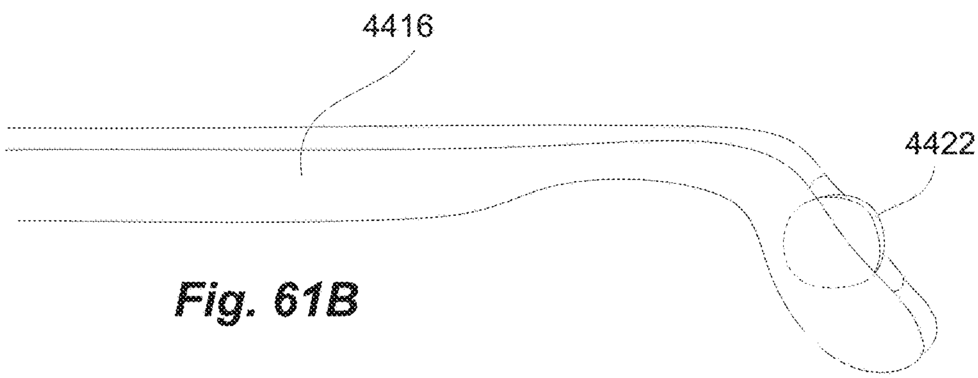
Figure 61C:
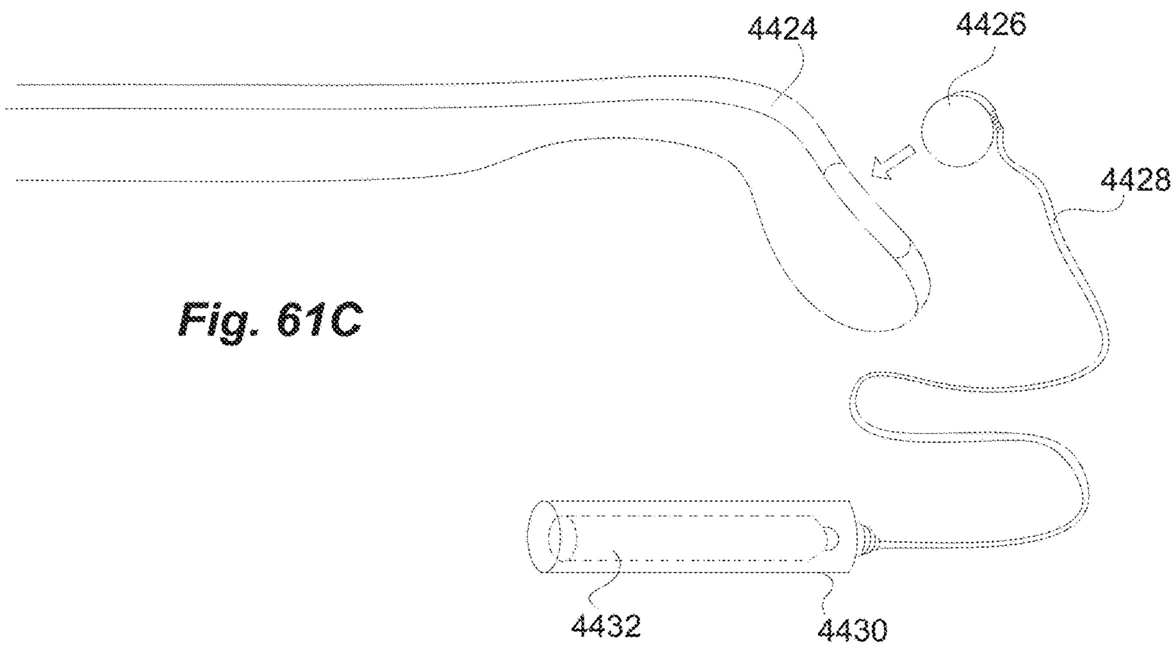

Regarding power sources for electrical components, in one embodiment, the power sources, which can be batteries and/or solar cells, are in the glasses. In another embodiment, one or more batteries can be inserted into the glasses. The batteries can be of various sizes and types. For example, as shown in FIG. 61A, a coin battery 4420 (e.g. CR1025) can be inserted into the tip section or the free end of one of the temples 4416. FIG. 61B shows the embodiment shown in FIG. 61A with a bigger coin battery 4422 (e.g. CR2032) inserted into the slot. Since the size of the battery is bigger than the size of the slot, a portion of the battery 4422 sticks out of the slot. FIG. 61C shows another embodiment of the glasses that include a slot/cavity to receive a battery adapter 4426. The slot 4418 in FIG. 61A can be the same as the slot 4424 in FIG. 61C. The adapter 4426 can be the same size and shape of the battery shown in FIG. 61A, and with two terminals, just like the battery. However, the adapter, by itself, is not an energy source. The adapter is connected to a cable 4428, with at least two wires inside, one for each terminal of the adapter. The adapter 4426 is inserted into the cavity 4424 of the glasses, and is coupled through the cable 4428 to a case or a capsule 4430 that holds a battery 4432. The two wires in the cable 4428 are for the two terminals of the battery 4432. The size and capacity of the battery held by the capsule can be bigger than the coin battery, and could be less expensive than the coin battery. In one embodiment, the capsule 4430 holds an AA battery. Note that in one approach, the temple in FIG. 61C is the same as the temple in FIG. 61A. In yet another embodiment, the power sources are in a base or a portable device connected to the glasses through a wire connection, and the power sources can be rechargeable.

In a number of embodiments, some of the electrical components for hearing enhancement and/or for generating other audio signals are in a base tethered to the glasses. In other embodiments, some of the electrical components are in a portable device, wired or wirelessly coupled to the glasses. In yet other embodiments, all of the electrical components are in the glasses.

In different embodiments, the glasses can be a pair of sunglasses, auxiliary frames, fit-over glasses, prescription glasses, reading glasses, safety glasses, swim masks, or goggles, such as ski goggles.

In a number of embodiments, the frames of the glasses have more surface area than frames with minimal structure, such as those frames with lenses connected together by wires. For example, the temples of the glasses can have a taper profile. Each of the temples can be wider or broader when it is close to its corresponding joint. In one embodiment, the temple is wider or broader by spanning across a wider or broader area longitudinally down, creating a bigger surface somewhat parallel to the face of the user. FIG. 42 shows an example of such an embodiment.

In another embodiment, there can be a shield at least at one of the edges of each of the lens holders of the glasses. These shields can wrap around, or better conform to the profile of, the face of the wearer. The shields can be opaque. There can be transparent or translucent windows on these shields. To illustrate, in fit-over sunglasses, when worn over a pair of prescription glasses, such shields can go over or cover at least a portion of the pair of prescription glasses. Note that in one embodiment, a pair of glasses does not have to include lenses.

A number of embodiments have been described with electrical components in the temples of the glasses. In yet another embodiment, at least one electrical component is in other parts of the glasses, such as in a shield, the bridge or a lens holder of the eyeglasses.

A number of embodiments of glasses have been described where the glasses include hearing enhancement capabilities and can generate one or more types of other audio signals. Note that electrical components for such functionalities can be shared. For example, different functionalities can share the same power source, or the same processor/controller.

Though a number of embodiments of glasses have been described where the glasses with hearing enhancement capabilities also generate other audio signals, different embodiments of the glasses only have hearing enhancement capabilities. In yet other embodiments, the glasses do not have hearing enhancement capabilities, but generate other audio signals.

In one embodiment, the glasses function as a headset and are adaptable for different applications, such as hearing enhancement, communication (e.g. phone operation) or listening to other audio signals (e.g. MP3 operation). The user initially can use the glasses as the headset for a phone or an MP3 player. Later, as the user's hearing degrades, the user can use the glasses as the headset for hearing enhancement or hearing boosting. In any event, when a person is using the headset, a third party may not be able to tell whether the person is having his hearing enhanced, or listening to other audio signals.

With the glasses functioning as a headset, in one embodiment, the glasses can include a connector and two speakers, one at each temple, both electrically connected through a conductor embedded in the glasses. The conductor can be a wire, similar to the embodiments shown in FIGS. 46A-46B. The connector can be located at the free end of one of the temples, such as the embodiment shown in FIG. 49. The connector can be a standard connector, such as a 3-wire or three terminal plug, or a 3.5 or 2.5 mm male stereo miniphone plug. The three terminals can be for the two speakers and ground, with both speakers sharing the same ground. In one approach, the positive terminal of the left speaker is connected at the first terminal of the plug, the positive terminal of the right speaker is connected to the second terminal of the plug, and the ground terminals of the speakers are connected to the third terminal of the plug.

The plug at the glasses can be used to receive stereo signals for the two speakers. The stereo signals can be from a separate audio source, such as an MP3 player or a radio. There can be an audio cord that has a male stereo connector at one end and a female stereo connector at the other. The female connector of the cord is for receiving the plug at the glasses, while the male connector of the cord is for inserting into the headset jack of the player or the radio.

Figure 62A:
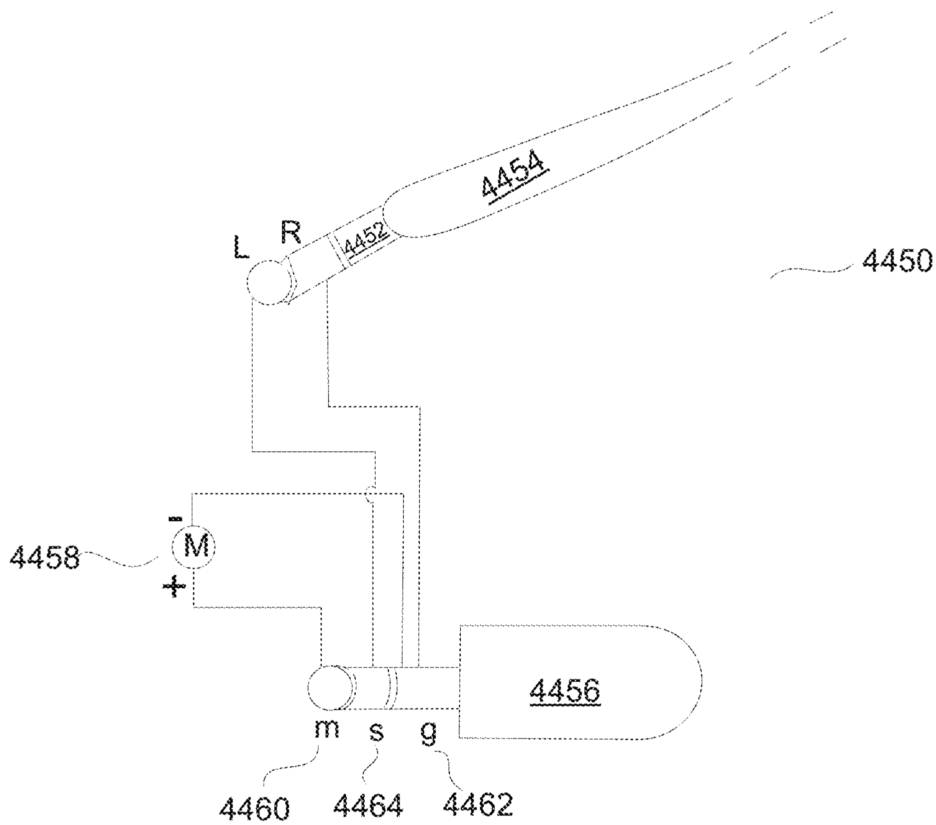
FIGS. 62A-62B show different embodiments of headset-to-phone cords according to the present invention.
Figure 62B:
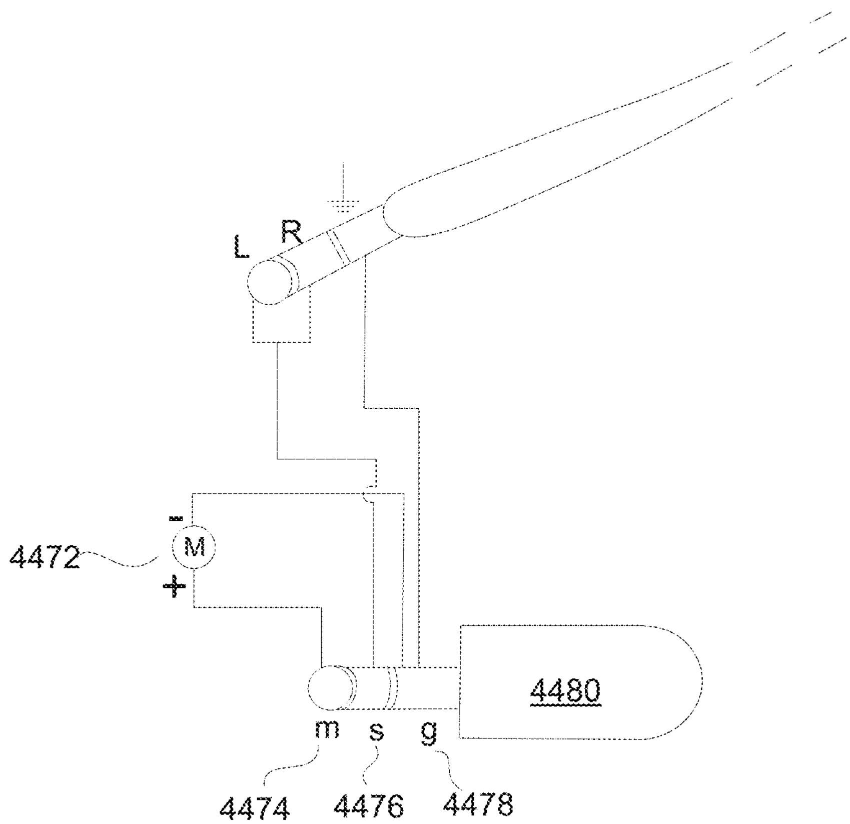

The headset can be used as the headset for a cell phone. Phone calls can be made with the headset using a headset-to-phone cord. FIGS. 62A-62B show two embodiments of such a cord. The cord includes a female stereo mini-phone jack at one end and a male stereo mini-phone plug at the other end. The three terminals at the stereo mini-phone plug can be designated as the m (microphone), s (speaker), and g (ground) terminals.

FIG. 62A shows one approach 4450 for the wiring connections in a headset-to-phone cord. One end of the cord can have a female stereo mini-phone jack for connection to the plug 4452 at a temple tip 4454 of a pair of glasses. The female jack is not shown in FIG. 62A. The other end of the cord 4450 has a stereo plug 4456, with three terminals, the m 4460, the s 4464 and the g 4462 terminals. The plug 4456 is for inserting into the headset jack of the phone. In the approach shown in FIG. 62A, the two speakers in the glasses are connected in series, and the microphone 4458 for the phone is attached to the cord, similar to the microphone 4254 shown in FIG. 50.

Regarding wiring connections in the cord 4450, the microphone 4458 is connected with wires between the m 4460 and the g 4462 terminals for the user to speak into. Note that in this embodiment, the negative terminal of the microphone 4458 is extended through a wire to connect to the ground terminal 4462 within the plug 4456. The positive terminal for one speaker is connected to the s 4464 terminal, and the positive terminal for the other speaker to the g 4462 terminal. The two negative terminals of the two speakers are connected together (such as inside the glasses) to complete the circuit. In this embodiment, both speakers are connected in series and the audio signals of the caller go through both of them.

FIG. 62B shows another approach 4470 for the wiring connections in a headset-to-phone cord. In this approach, the two speakers in the glasses are connected in parallel. A microphone 4472 is connected between the m 4474 and the g 4478 terminals. The negative terminal of the microphone 4472 is extended through a wire to connect to the g 4478 terminal at a location within the plug 4480. The positive terminals for both speakers are connected to the s 4476 terminal, and the negative terminals of both speakers to the g 4478 terminal. Again, the microphone 4472 is external to the glasses and is attached to the cord 4470.

Based on such headset-to-phone cords, the glasses can be used as the headset of a telephone, such as a cell phone. Also, based on the headset-to-phone cords, the headset can be used for hearing enhancement, with the microphone in the cord, external to the glasses.

Figure 63:
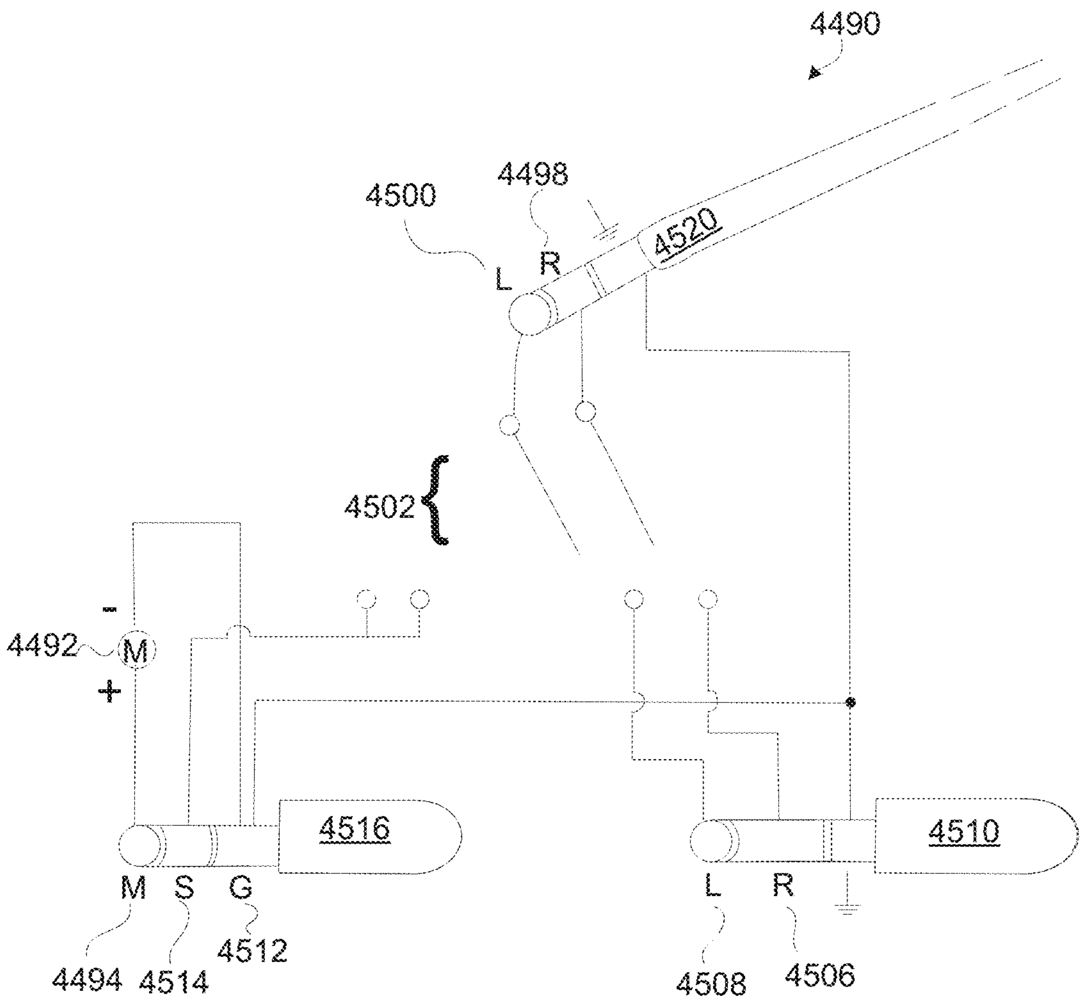
FIG. 63 shows an embodiment of the invention of a cord with a switch for both a cell phone and a player.

Note that the audio cord and the headset-to-phone cord can be combined. FIG. 63 shows a combined cord 4490 that can perform both functions. The example shown in FIG. 63 assumes the two speakers in the glasses being connected in parallel. Again the microphone is attached to the cord, external to the glasses.

As shown in FIG. 63, one end of the cord can have a female mini-phone jack to be connected to the plug 4520 at a temple tip 4522 of a pair of glasses. That female jack is not shown in FIG. 63. The combined cord 4490 includes a switch 4502. One switch position is to connect the speakers to a stereo plug 4510. This is the position where the cord 4490 functions as an audio cord. The other switch position is to connect the speakers to a stereo plug 4516. This is the position where the cord 4490 functions as a headset-to-phone cord.

With the switch 4502 in the audio cord position, the right 4498 and left 4500 speaker terminals of the plug 4520 are connected to the right 4506 and the left 4508 terminals of the male stereo connector 4510.

With the switch 4502 in the headset-to-phone cord position, the right 4498 and left 4500 speaker terminals are connected to the s 4514 terminal of the male stereo connector 4516. The microphone 4492 is connected between the m 4494 and the g 4512 terminals of the stereo plug 4516. When the plug 4516 is inserted into a phone jack, the negative terminal of the microphone 4492 is connected to the ground of the phone.

Figure 64:
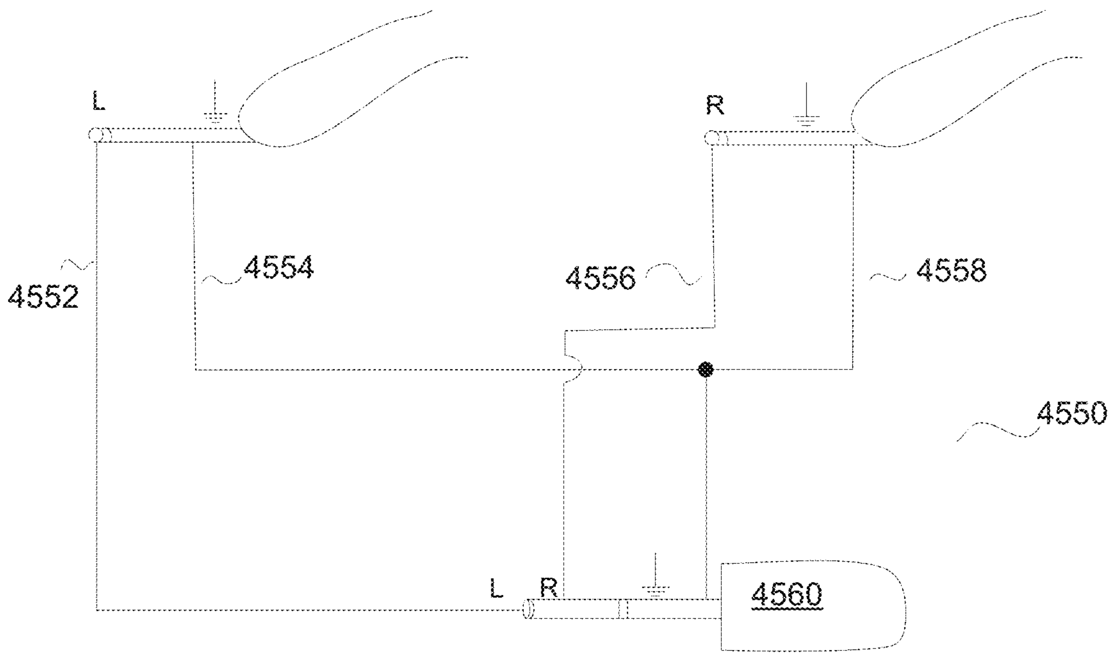
FIG. 64 shows one embodiment of a mono-plugs-to-stereo-plug adapter cord according to the invention.

Instead of having just one connector at the glasses, there can be two connectors. Each connector can be located at one of the temple tip, and each connector can be connected to the speaker at that temple through, for example, a conductor (e.g. a wire) in the temple. In one embodiment, the connectors are standard 2.5 or 3.5 mm male mono mini phone plugs. Such glasses can be used to listen to stereo music based on a mono-plugs-to-stereo-plug adapter cord. FIG. 64 shows one embodiment of the wiring connections of such an adapter cord 4550. At one end of the adapter cord, there are two female mono mini phone plugs. These plugs are not shown in the figure. Each plug connects to two wires, one signal wire and the other the ground wire. For example, a first female plug includes signal wire 4552 and ground wire 4554; and the second female plug includes the signal wire 4556 and ground wire 4558. Each pair of wires can be embedded inside a cable, with both cables forming part of a lanyard. The other side of the cord 4550 is a male stereo mini phone plug 4560. Of the 3 connections at the male stereo mini phone plug 4560, one can be connected to both of the ground wires 4554 and 4558, and for the other two, one to each signal wires 4552 and 4556. The male stereo plug 4560 can be used to receive stereo signals for the two speakers, or can be used as a plug to receive a telephone call, similar to the stereo plugs at the temples shown in FIGS. 62A-62B. In this example, the male stereo plug is not at the glasses, but is external to the glasses, such as at the lanyard.

In the above examples on cords, the microphone, such as for a phone or for hearing enhancement, is external to the glasses. In other embodiments, the microphone is in the glasses. With the microphone in the glasses, in the embodiments shown in FIGS. 62A-62B, the plugs at the temple tips are five terminal plugs, with the five terminals being the positive or the signal terminal for the left speaker, the positive or the signal terminal for the right speaker, the ground for both speakers, the microphone and the ground for the microphone. In the embodiment shown in FIG. 62A, the ground for the microphone 4458 is connected to the positive terminal of the right speaker 4462 at the g 4462 terminal of the male stereo plug 4456 within the plug 4456. In the embodiment shown in FIG. 62B, the grounds of speakers and the ground of the microphone are all connected together at the g 4478 terminal of the male stereo plug 4480.

With the microphone in the glasses, as for the embodiment shown in FIG. 64, the plugs at the temple tips are four terminal plugs, with the four terminals being the signal terminal for a speaker, the ground for the speaker, the signal terminal for a microphone and the ground for the microphone. The male stereo plug 4560 is replaced by a five terminal plug, with the five terminals being the signal terminal for the left speaker, the signal terminal for the right speaker, the ground for both speakers, the signal terminal for the microphone and the ground for the microphone.

In the above examples of the glasses functioning as a headset, one microphone is described. However, there can be more than one microphone. As described, additional microphones can provide additional benefits. For example, two microphones can be used for noise cancellation purposes. In another example, two microphones can be for stereo reception purposes with one microphone on the left side and the other on the right side of the user. For users with significant hearing loss in one of the ears, signals received from that ear can be routed to the speaker in close vicinity to the other ear. In any event, if there are two microphones, with both microphones in the glasses, and if there is just one connector at the glasses, the connector can have six terminals. The six terminals can be for the signal terminal for each of the speakers and the signal terminals for the two microphones, the ground for both speakers, and the ground for both microphones. If there are two connectors at the glasses, one at each of the temple tips, again with the microphones in the glasses, the two connectors can be four terminal connectors. Each set of the four terminals includes the signal terminal of the microphone and the signal terminal for the speaker at that temple, and their separate grounds. In these embodiments with more than one microphone, again, one can use a combined cord that has a switch so that the glasses with the combined cord are applicable as a headset for, such as, a phone, a hearing booster and an audio player.

Figure 65:
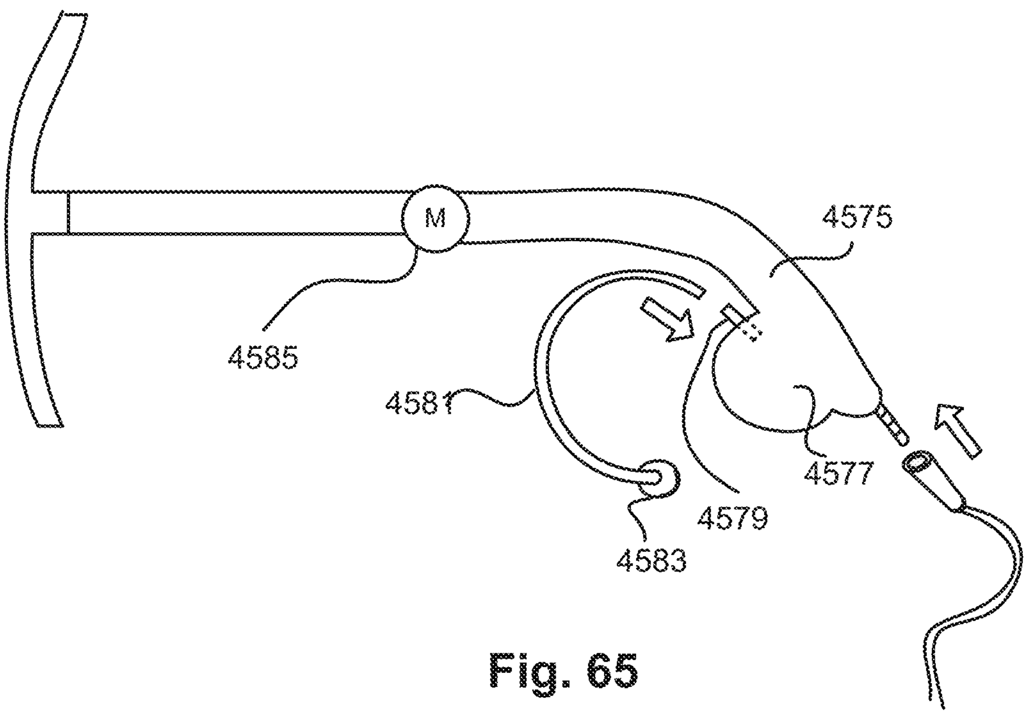
FIG. 65 shows an embodiment of the invention with a speaker at a temple tip with an extension for attachment to a tube.

Regarding the locations of the speakers, the speakers can be in the temples, similar to the embodiment shown in FIG. 42. In another embodiment, as shown in FIG. 65, a speaker 4577 can be in one 4575 of the temple tips.

In a number of embodiments, one or more speakers are embedded or partially embedded in the glasses. In one embodiment, instead of in the main body of the glasses, a speaker is, for example, at the end of a stub or an extension, extended from the main body of the glasses. The stub can extend from one of the temples of the glasses. There can be electrical wires inside the stubs to connect the speakers to other electrical component(s) in the main body of the glasses. The stubs can replace a number of the tube embodiments described by bringing the speakers closer to, or allowing the speakers to be inserted into, the ear canal of the user. In such embodiments, there may not be separate ear buds because the speakers themselves can be in structures that also serve as ear buds. Such ear buds with speakers can also be custom fitted into the ears of the user. Such ear buds can include venting structures to reduce to a certain degree the effects of occlusion.

In a number of embodiments with speakers embedded in the glasses, each speaker can have a tube extending towards an ear to guide the audio signals. The tubes can be permanently attached to the glasses. In another embodiment, the tubes are detachable from the glasses. There can be an extension 4579 with a hole at the glasses for a speaker 4577, as shown in FIG. 65. An external tube 4581 can be attached to or inserted into the extension 4579 for sound coupling into an ear. In the embodiment shown in FIG. 65, the external tube 4581 extends from the back of an ear, over the top of the ear, and curls back towards the opening of the ear. Again, there can be an ear bud 4583 at the end of the external tube 4581 to further enhance sound coupling to an ear. Also, in this embodiment, a microphone 4585 can be in the glasses at a position further away from the lens holders of the glasses.

Figure 66:
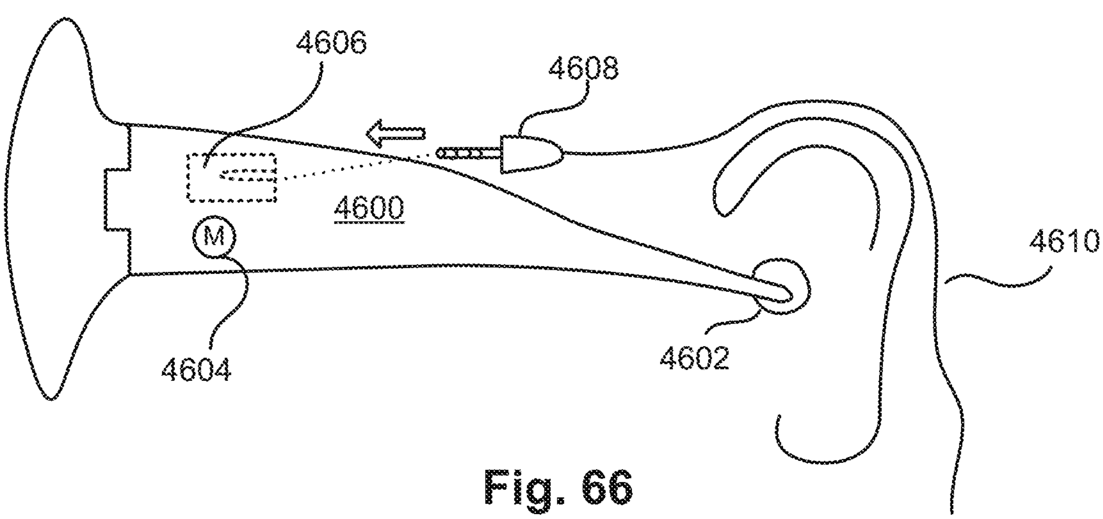
FIG. 66 shows an embodiment of the invention with the temples not extending behind the ears.

With ear buds in the ears, it may not be necessary to have temples extend behind the ears. FIG. 66 shows an embodiment with each of the free ends of the temples, such as the temple 4600, having an ear bud 4602. The speaker for the ear bud 4602 can be in the structure of the ear bud 4602. The speaker can be away from the ear bud, such as inside the temple 4600 close to the hinge of the temple 4600, but is audibly coupled to the ear bud. For example, the temple includes a tube or a tubular structure inside the temple 4600 to guide the audio signals from the speaker to the ear bud 4602 for the ear. In this embodiment, a microphone 4604 can be located in one of the temples further away from the free end of that temple. The pair of glasses can also function as a headset. If the headset is connected to a portable device through a cord 4610, the glasses include at least one connector to receive the cord 4610. In one embodiment, the connector 4606 at the glasses is a female connector. The cord 4610 for the portable device ends with a male connector 4608 to be inserted into female connector 4606 at the glasses. When the glasses are worn, both ear buds are inserted into the ears of the users. Together with the bridge (directly or indirectly through the nose pads) on the nose, and the ear buds inserted into the ears of the user, the glasses can be stably held on the head of the user. In the embodiment of a wired headset with one connector, when worn, the cord 4610 can drape behind one of the ears.

Regarding embodiments with ear buds at the free ends of the temples, in yet another embodiment, the ends of the temples are small and are made of soft materials. If the user chooses to wear such glasses, but does not want to use the speakers, the user has the option to comfortably wear the glasses with the ear buds positioned above his ears.

In one embodiment, the length of the tubes or the stubs is not fixed, but is adjustable. The tubes or the stubs are retractable and extendable, for example, similar to the embodiment shown in FIG. 44. The positions of the tubes or the stubs also can be changed, for example, similar to the embodiment shown in FIG. 42. Alternatively, the temples can be made of malleable materials to allow some adjustment to fit different users. Glasses with such flexibilities, if applied to the embodiments with ear buds at the free ends of the temples, are even easier to adjust to fit different users, for example, because one may only need to adjust the distance between the ear buds and the lens holders of the glasses.

Figure 67:
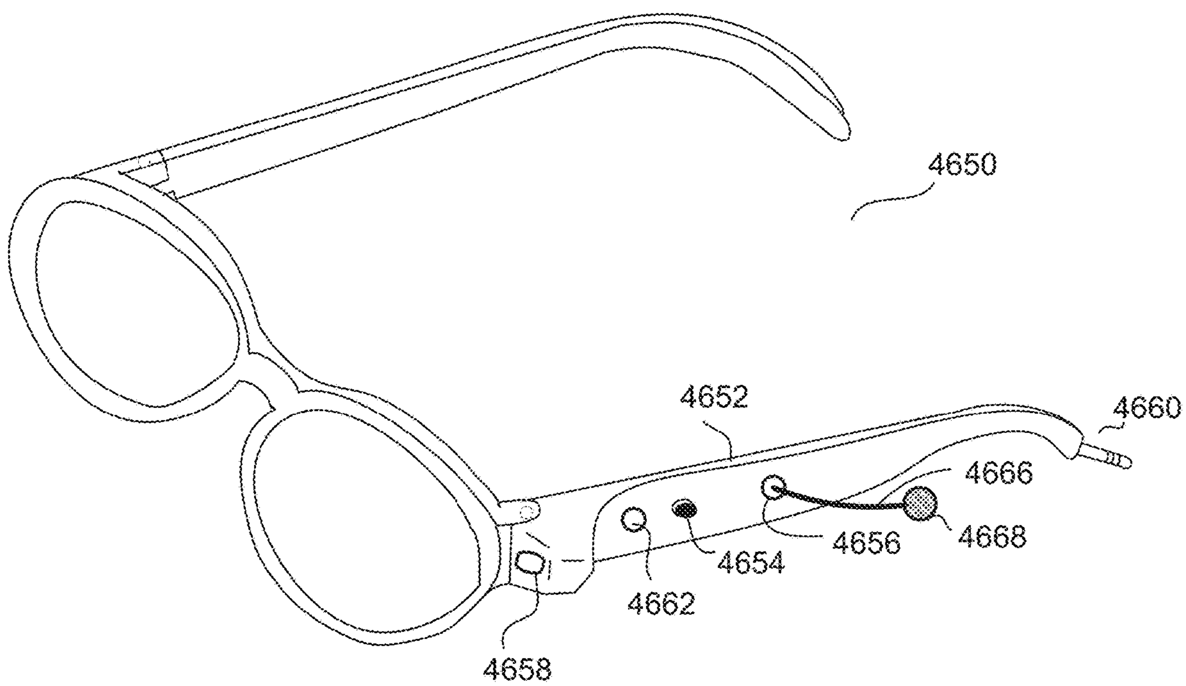
FIG. 67 shows an embodiment of the invention with a pair of eyeglasses functioning as a headset that has a camera, a microphone and a speaker.

In yet in another embodiment, a pair of glasses functioning as a headset with a speaker and a microphone further includes a camera, as shown in FIG. 67. The glasses 4650 include a temple 4652 that has a microphone 4654, a speaker

4656 and a camera 4658 with a connector 4660. The connector 4660 is for connecting, for example, to a portable device that includes at least the power source for the glasses.

The camera 4658 is preferably a digital camera with an on/off switch 4662. For example, the camera 4658 is a CCD camera with a CCD controller coupled to a CCD chip, a CCD memory device and a lens.

In one embodiment, with the connector 4660 connected to the portable device, when the switch 4662 is pushed on, the CCD chip takes a picture. The charges in the CCD chip are digitized and transmitted through the connector to the portable device, under the management of the controller. At least some of the charges can be temporarily stored in the CCD memory device, for example, to accommodate the differences in speed in taking pictures and sending the pictures to the portable device through the connector. In this embodiment, images are permanently stored at the portable device.

In one embodiment, the glasses do not offer focusing capability. The CCD chip can be located, for example, at the focal point of the lens. In another embodiment, there is an image distance control knob. For example, a mechanical lever can be pre-programmed or pre-set to move the lens to one or more different positions. There can be just two positions. One position can be for close-up shots and another for distance shots, such as close-up being about 2 ft from the lens and the distant being about 6 ft away; or close-up being about 8 inches away and distant being about 2 ft away.

FIG. 67 shows one embodiment regarding the location of the camera 4658 at the end of the temple or arm 4652 of the glasses next to the hinge of the temple. The lens of the camera faces forward. In this situation, what the user sees is substantially what the captured image would be. In other words, in a general sense, what the user sees through the glasses is what the user gets, without the need for an additional view finder. With such an embodiment, it is relatively easy for a user to take pictures, hands-free, without the need for an additional strap for holding the camera.

The connector 4660 at the end of the glasses 4650 can be, for example, a 4-terminal connector, one for ground, one for power and the other two for transmit and receive signals. In another embodiment, the connector 4660 can be a 3-terminal connector, with the power line and one of the signal lines sharing one terminal.

Regarding the embodiment shown in FIG. 67, the speaker 4656 can be in the glasses, with a tube 4666 and an ear bud 4668, to help bring audio signals to the user. In one embodiment, the tube 4666 can be rotated at its end where it connects to the glasses.

In one embodiment, the CCD with the CCD memory device and the CCD controller are on the same integrated circuit.

The embodiment shown in FIG. 67 also includes a microphone 4654. In one embodiment, the CCD memory device also stores audio signals from the microphone. For example, the memory device stores the last 15 seconds of audio signals. When the user takes a picture, the previous 15 seconds of audio signals can be coupled to the picture. The next 10 seconds of audio signals can also be coupled to the picture. The audio signals or the digitized version of the audio signals can also be transmitted to the portable device with the corresponding picture. In the future, if the user wants to view the picture, the audio signals can be played with the picture at the same time.

The electrical components in the portable device for the glasses with a camera can be incorporated in the glasses. For example, the power sources can also be in the glasses and the glasses do not have to include a connector. In one embodiment, the glasses include non-volatile memory to store at least a number of pictures. In another embodiment, the glasses further include a connector to receive a memory card, such as a flash memory device. One embodiment of such a removable card on a pair of glasses is shown in FIG. 58, where the card 4352 can be a removable memory card. The card can be a standard memory card with a USB connector. Pictures taken can be stored in the removable memory card.

In yet another embodiment for the glasses with a camera, the glasses do not include a speaker or a microphone. The glasses include a temple that has a CCD controller coupled to a CCD chip, a CCD memory device and a lens. The temple also includes an on/off switch with a connector. The connector is for connecting, for example, to a portable device that includes at least the power source for the camera.

Additional disclosure on camera in glasses can be found in U.S. Provisional Application No. 60/583,169, filed on Jun. 26, 2004, which is hereby incorporated by reference.

A number of electrical components have been described. They can be on circuit boards, which can be made of flexible materials. They can be on a substrate. They can also be integrated into one or more integrated circuits.

Although a number of embodiments have been described of glasses with hearing enhanced and/or other audio signal generation capabilities, in one embodiment, the hearing enhanced and/or other audio signal generation capabilities are in another apparatus. When a person is using that apparatus, a third party again would not be able to tell whether the person is having his hearing enhanced, or listening to other audio signals. This again may be able to remove the stigma of wearing a hearing aid.

In a number of embodiments, the invention pertains to eyewear having an activity monitoring capability. Activity, such as motion, steps or distance, can be measured by an activity detector. The measured activity can then be used in providing activity-related information to a user of the eyewear. Advantageously, the user of the eyewear is able to easily monitor their degree of activity, without the need to carry a separate electrical device. In other embodiments, the invention can provide activity monitoring capability to products other than eyewear.

In one embodiment, the activity monitoring is provided by a pedometer. A pedometer can also herein be referred to as a pedometer system.

In one embodiment, all components for activity monitoring can be integrated with eyewear (e.g., eyeglasses), such as a frame (e.g., a temple of the frame) of the eyewear. As an example, the eyewear normally includes a pair of temples, and the components for activity monitoring can be embedded within one or both of the temples. In one implementation, all components for activity monitoring are integrated into a single temple of the frame of the eyewear. As an example, these components can be formed together on a substrate. The substrate with the components mounted and interconnected can be referred to as a module. Embedding such a module into the eyewear can thus provide the eyewear with activity monitoring capability with minimal disturbance to design features of the eyewear.

A first aspect of the invention pertains to eyewear having a pedometer (or pedometer system). The pedometer provides the eyewear with an activity monitoring capability.

Figure 68:
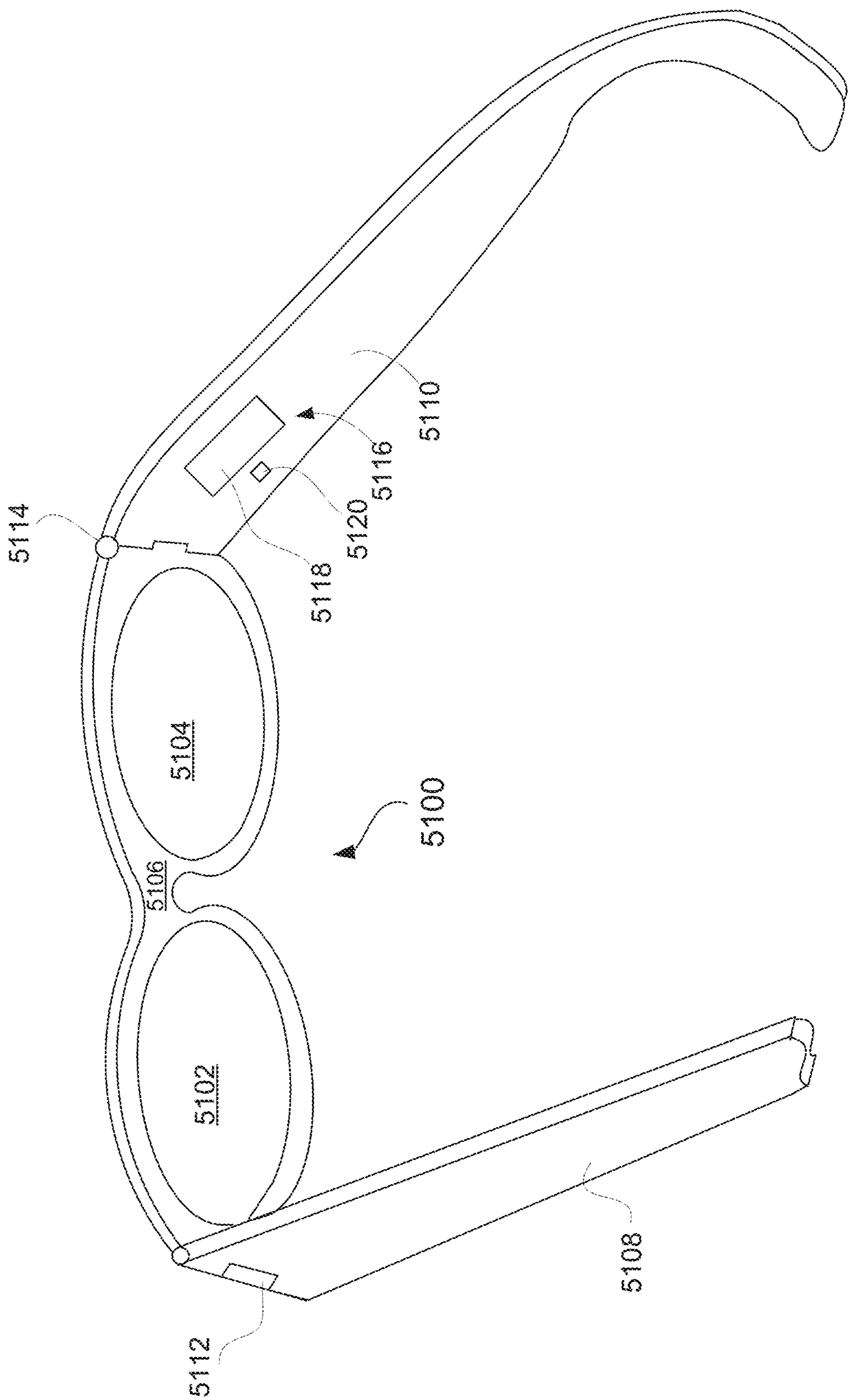
FIG. 68 illustrates a pair of glasses according to one embodiment of the invention.

FIG. 68 illustrates a pair of glasses 5100 according to one embodiment of the invention. The pair of glasses 5100 include a first lens holder 5102 and a second lens holder 5104. The lens holders 5102 and 5104 are capable of receiving lens. The lens can be prescription lens or non-prescription lens. The first lens holder 5102 has a first side and a second side. The second lens holder 5104 has a first side and a second side. The pair of glasses 5100 also has a bridge 5106. The bridge 5106 is coupled to the second side of the first lens holder 5102 and the first side of the second lens holder 5104. The lens holders 5102 and 5104 and the bridge 5106 can be separate pieces or a single integral piece. The glasses 5100 can also be referred to as eyeglasses.

In addition, the pair of glasses 5100 includes a pair of temples, namely, a first temple 5108 and a second temple 5110. The first temple 5108 is pivotally secured to the first side of the first lens holder 5102 by way of a joint (or hinge) 5112. The second temple 5110 is pivotally secured to the second side of the second lens holder 5104 by way of another joint 5114.

Moreover, the pair of glasses 5100 further includes a pedometer 5116. In this embodiment, the pedometer 5116 is embedded in the temple 5110. As illustrated in FIG. 68, the pedometer 5116 includes a display 5118 and a switch 5120 that are exposed at the inside surface of the temple 5110. The display 5118 displays a visual indication of an output produced by the pedometer 5116. In one implementation, the display 5118 is a liquid-crystal display. The switch 5120 can serve different functions depending on the embodiment. In general, various different types of switches can be used as the switch 5120. In one implementation, the switch 5120 is a push-button switch that serves as an on/off button. In another implementation, the switch 5120 can be a slider switch. Different types of switches have previously been described in the related patent applications mentioned above and incorporated by reference.

In general, the pedometer 5116 is at least partially embedded in the temple 5110. In the embodiment shown in FIG. 68, the pedometer 5116 is embedded in the temple 5110 with the display 5118 and the switch 5120 being exposed. Other components of the pedometer 5116, including various electrical components, are embedded in the temple 5110 and not exposed.

In the embodiment shown in FIG. 68, the pedometer 5116 is in the temple 5110 of the pair of glasses 5100 at a region close to its corresponding joint 5114. The pedometer 5116 faces the user when the user is wearing the pair of glasses 5100. With the pedometer 5116 in that position, in some cases, the wearer (user) may be able to see the pedometer information being output by the display 5118 without the need to take the pair of glasses 5100 off.

Although this embodiment provides the pedometer 5116 in the temple 5110, the pedometer 5116 could alternatively be embedded in other parts of the eyeglass frame. With proper design, the overall appearance of the pair of glasses 5100 can remain aesthetically pleasing, particularly when the pedometer 5116 is substantially embedded in the eyeglass frame (e.g., the temple 5110).

Figure 69:
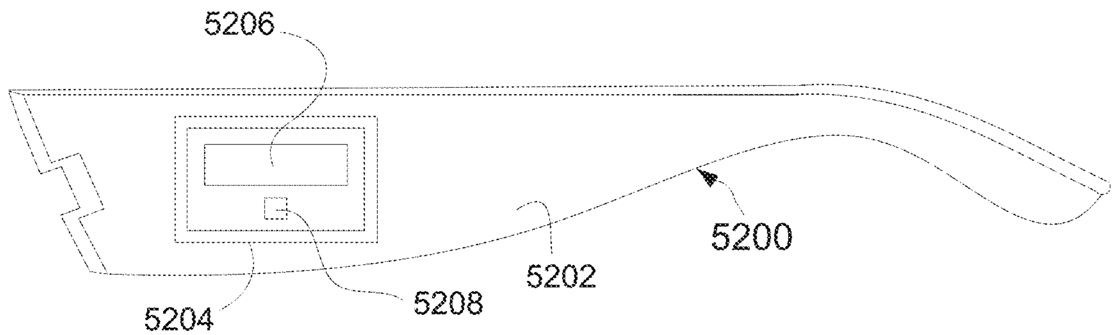
FIG. 69 illustrates a temple according to one embodiment of the invention.

FIG. 69 illustrates a temple 5200 according to one embodiment of the invention. The temple 5200 can, for example, represent another embodiment for the temple 5110 of FIG. 68. In any case, the temple 5200 includes an inside surface 5202. The inside surface 5202 has a removable cover 5204. The removable cover 5204 serves to cover a cavity within the temple 5200 that includes electrical components associated with a pedometer. The removable cover 5204 has a display opening 5206 that aligns with a display of the pedometer, and a switch opening 5208 that aligns with a switch. When the removable cover 5204 is removed, the pedometer can be inserted into the cavity within the temple 5200. However, with the removable cover attached, the pedometer is held within the cavity, yet the display of the pedometer can remain exposed because of its alignment with the display opening 5206 and the switch can remain accessible because of its alignment with the switch opening 5208.

FIG. 68 shows an embodiment with a pedometer facing inward towards the wearer when the glasses are being worn. Alternatively, the pedometer could be facing out and the user can temporarily remove the glasses to read pedometer output.

There are a number of benefits of having a pedometer with a pair of glasses. For one, if the pedometer is in the glasses, one does not need to separately carry a pedometer. Also, with the pedometer in the glasses, a user may be able to see his progress just by moving his eyes. For example, the pedometer can have a display and the display can be located close to a hinge of a temple, facing the user when the glasses are worn. In such case, the user does not have to move his hands or other parts of his body to monitor his progress; he only has to move his eyes to see the display and to track his progress while exercising. Similarly, in an embodiment with the pedometer and a speaker in the glasses, a user can hear his progress without the need for the volume of the audio signals to be high because the speaker can be relatively close to the user's ear.

Figure 70:
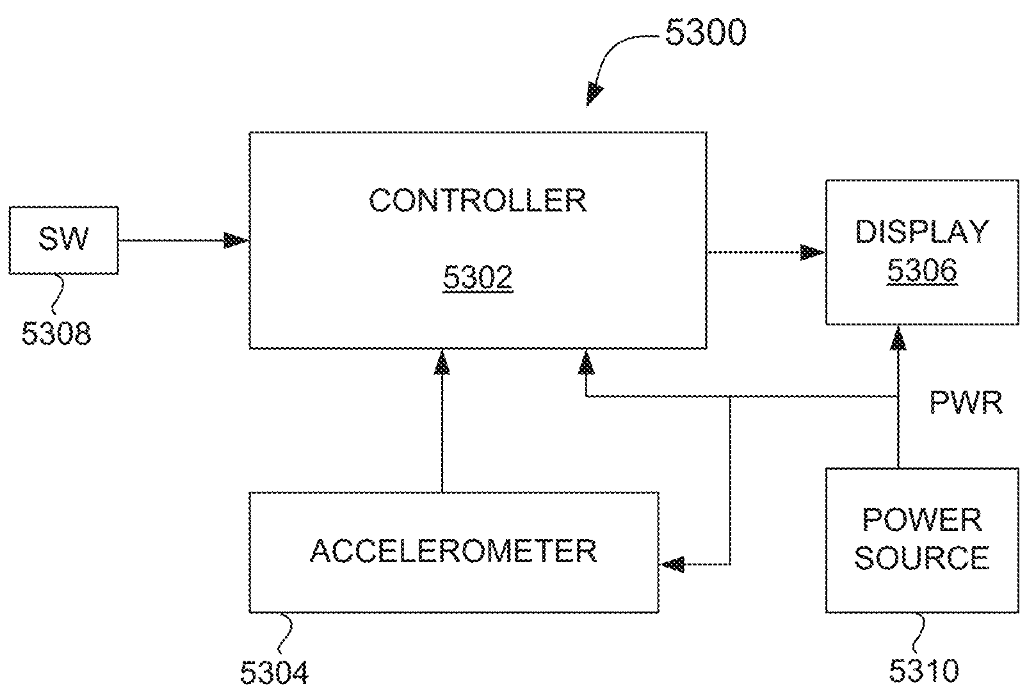
FIG. 70 is a block diagram of a pedometer system according to one embodiment of the invention.

FIG. 70 is a block diagram of a pedometer system 5300 according to one embodiment of the invention. The pedometer system 5300 can also be referred to as a pedometer. The pedometer system 5300 is suitable for use as one implementation of the pedometer 5116 illustrated in FIG. 70. The pedometer system 5300 includes a controller 5302 that controls overall operation of the pedometer system 5300. An accelerometer 5304 provides an input data signal to the controller 5302. The controller 5302 receives the input data signal from the accelerometer 5304 and determines whether the output information produced on a display 5306 should be altered or whether there should be an output on the display 5306. The pedometer system 5300 also includes a switch 5308 and a power source 5310. The switch 5308 provides an input control signal to the controller 5302. In one embodiment, the switch 5308 can serve as an on/off switch. In another embodiment, the switch 5308 can provide a reset operation for the output of the pedometer system 5300. In still another embodiment, the switch 5308 can be a light switch to provide light (e.g., back light) when activated so as to better illuminate the display 5306. The display 5306 can, for example, be a Liquid Crystal Display (LCD) type display. The power source 5310 provides power to any or all of the controller 5302, the accelerometer 5304 and the display 5306. The power source 5310 can be implemented by a battery, kinetic energy device or solar cell, or some combination thereof. Although the switch 5308 is not shown as being coupled to the power source 5300, in another embodiment, the switch 5308 could be interposed between the power source 5310 and the other electrical components of the pedometer system 5300 so as to provide a power-off mechanism.

More generally, the display 5306 can be an output mechanism for the pedometer system 5300. An alternative output mechanism is a speaker. In one embodiment, the glasses (e.g., glasses 5100) can include a speaker to provide an output of the pedometer system 5300. The speaker can be attached to or substantially internal to one of the glasses (e.g., a temple of the glasses). The glasses can also include more than one speaker. The speaker(s) can provide an audio output for the benefit of the user of the glasses. The audio output can be a speech output corresponding to a pedometer output (e.g., distance, calories, etc.). The audio output could alternatively be a sound, such as a sound effect. For example, a first sound could be output to indicate a $10^{th}$ of a mile increment, and a second sound could be output to indicate a mile increment.

In one embodiment, the pedometer is powered by a battery. The battery can, for example, be rechargeable by way of coupling to a charger through a connector at the glasses or by way of a solar cell. The solar cell can be coupled to or partially embedded in the pair of glasses. In one embodiment, the pair of glasses includes a hatch (e.g., removable cover) that can be opened to replace the battery which is embedded in the pair of glasses.

Figure 71D:
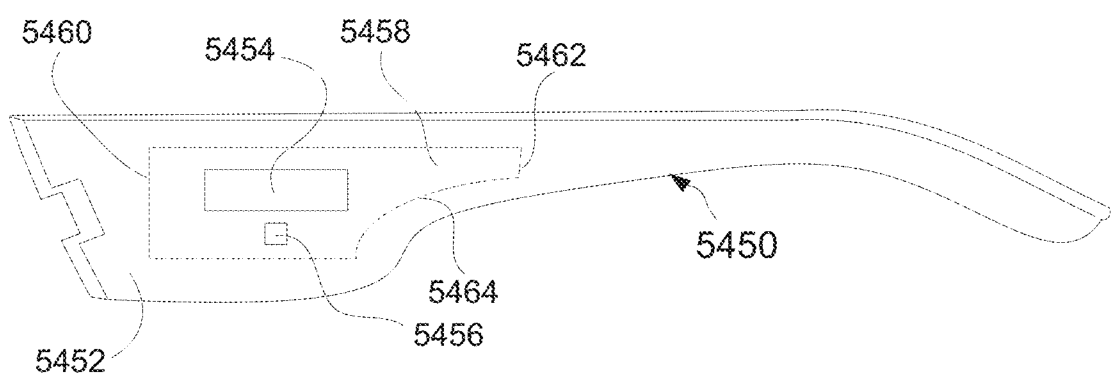
FIG. 71D illustrates a temple according to one embodiment of the invention.
Figure 71A:
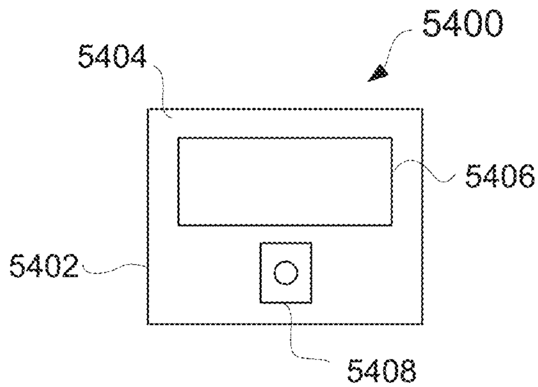
FIG. 71A illustrates a first side of an electrical system module according to one embodiment of the invention.

FIG. 71A illustrates an electrical system module 5400 according to one embodiment of the invention. The electrical system module 5400 in this embodiment operates as a pedometer system (pedometer). The electrical system module 5400 includes a substrate 5402. Mounted on a first side 5404 of the electrical system module 5400 is a display 5406 and a push-button switch 5408. The electrical system module 5400 can, for example, be designed to be placed internal to a cavity within the frame of a pair of glasses.

Figure 71B:
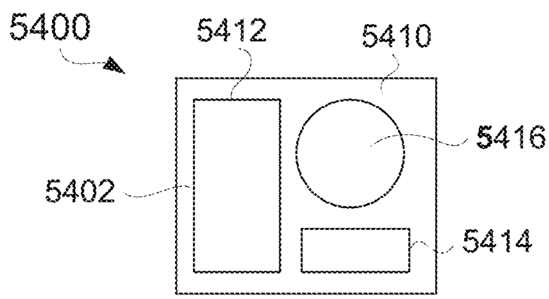
FIG. 71B illustrates a second side of the electrical system module illustrated in FIG. 71A.

FIG. 71B illustrates a second side 5410 of the substrate 5402 of the electrical system module 5400. The second side 5410 of the substrate 5402 includes a controller chip 5412, an accelerometer 5414, and a battery 5416.

Figure 71C:
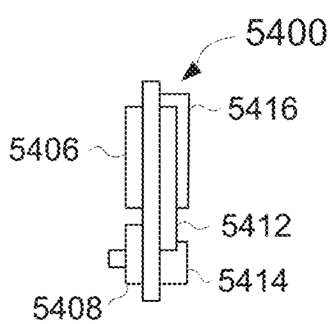
FIG. 71C illustrates a side view of the electrical system module illustrated in FIG. 71A.

FIG. 71C illustrates a side view of the electrical system module 5400. The electrical system module 5300 is generally small so as to fit within an eyeglass frame, as discussed above with reference to FIGS. 68 and 69. In this embodiment, the electrical system module 5300 has electronic components on both sides of the substrate 5402; however, it should be understood that all the electrical components could be on a single side, which could provide a profile with reduced thickness. The substrate 5402 is for example, a Printed Circuit Board (PCB) or a tape for holding integrated circuits. In one example, the substrate 5402 can be made of epoxy and glass, and in another example, the substrate 5402 can be made of Kapton®, a brand of polyimide.

Further, in some embodiment, the substrate (e.g., PCB) can conform to the size and shape of the temple. FIG. 71D illustrates a temple 5450 according to one embodiment of the invention. The temple 5450 can, for example, represents another embodiment for the temple 5110 of FIG. 68 or the temple 5200 illustrated in FIG. 69. In any case, the temple 5450 includes an inside surface 5452. The inside surface 5452 has a display opening 5454 that aligns with a display of the pedometer (e.g., display 5406), and a switch opening 5456 that aligns with a switch. Both the display and the switch are mounted on a substrate. In this embodiment, a substrate 5458 for the pedometer is housed internal to the temple 5450. Moreover, in this embodiment, the substrate 5458 is not rectangular but instead conforms to the configuration of the temple 5450. In particular, the substrate 5458 has a forward end 5460 and a back-end 5462. In this embodiment, the back-end 5462 has a substantially reduced height as compared to the forward end 5460. There is also a curved region 5464 of the substrate 5408 to transition between the forward end 5460 and the back-end 5462. A cavity is provided internal to the temple 5450. In one embodiment, the cavity is designed to receive the substrate 5460. Hence, in one embodiment, the cavity also has a non-rectilinear configuration. Since temples are often small and have a low profile, the substrate needs to likewise be small and have a low profile. However, a substrate with a rectangular configuration may not have enough surface area for all the electrical components to be provided on the substrate. However, by using a non-rectangular configuration for the substrate, there can be more surface area for the substrate. Additionally, in this way, an electrical system module (e.g., pedometer system) can be provided within the glasses with reduced impact on aesthetic design.

Figure 72A:
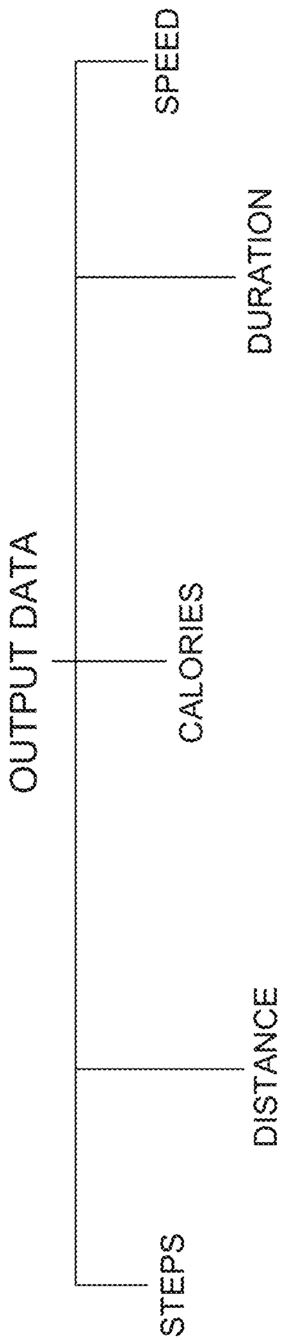
FIG. 72A illustrates representative output data for a pedometer system (pedometer) according to one embodiment of the invention.

FIG. 72A illustrates representative output data for a pedometer system (pedometer) according to one embodiment of the invention. The output data can, for example, pertain to one or more of: steps taken, distance traveled, calories consumed, duration of activity, and speed of travel. The output data can be presented in a visual manner on a display of a pedometer system, such as the display 5118, 5206, 5306 or 5406 noted above. Alternatively, the output data can be presented in an audio manner via a speaker. The display and/or the speaker can be attached to or at least partially embedded within the pair of glasses having the pedometer system.

Figure 72B:
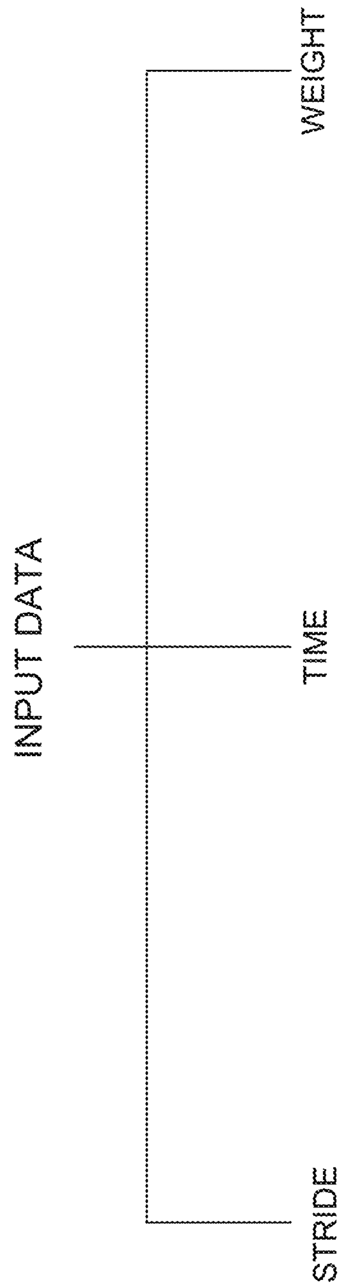
FIG. 72B illustrates representative input data for a pedometer system (pedometer) according to one embodiment of the invention.

FIG. 72B illustrates representative input data for a pedometer system according to one embodiment of the invention. The input data can, for example, pertain to data that is input to the pedometer system to facilitate its operation. For example, the input data can include one or more of: stride information, time (i.e., current time), and/or weight of user. Although providing input data to the pedometer system is not necessary, for some embodiments, it is helpful to producing output data that is more accurate.

As noted above, the pedometer system can provide different types of outputs. For example, the display can show step count, i.e., a count for the number of steps taken by the user. The glasses can have an on/off switch to activate/deactivate the pedometer system. When the pedometer system is turned on, it can keep track of the number of steps taken by the user.

Another type of output can be distance traveled. The pedometer system can include a switch for stride-length adjustment. The switch can have three (3) positions—a long, a medium and a short stride, each with its corresponding distance. The user can set the switch at one of the positions. The pedometer system (e.g., controller 5302) can then multiplied that distance by the step count to generate the distance traveled. In another embodiment, the user can enter his average stride distance into the glasses to provide a more accurate distance calculation. This can be done directly (e.g., inches, feet or centimeters) or indirectly (e.g., steps per $10^{th}$ of a mile or steps per kilometer).

Another type of output is time elapsed (i.e., duration). The pedometer system can include a timer to show time elapsed. With the timer, the controller can also divide distance traveled by time elapsed to provide a speed output or an average speed output.

The distance traveled could represent the horizontal distance traveled or the vertical distance (i.e. elevation) traveled. As one example, a pedometer can provide an estimate of distance traveled The speed can be acquired or determined, such as the rate of movement along the horizontal distance and/or the vertical distance traveled. In one embodiment, the pedometer system can further include an altimeter to measure vertical distance traveled. As another example, calories consumed can be determined (e.g., estimated) based on various physical and/or environmental conditions that can be measured or determined.

In one embodiment, the person can enter his weight into the pedometer. Based on the weight and the distance traveled, the pedometer can measure the number of calories burned, which are proportional to the weight and the distance traveled.

Figure 73:
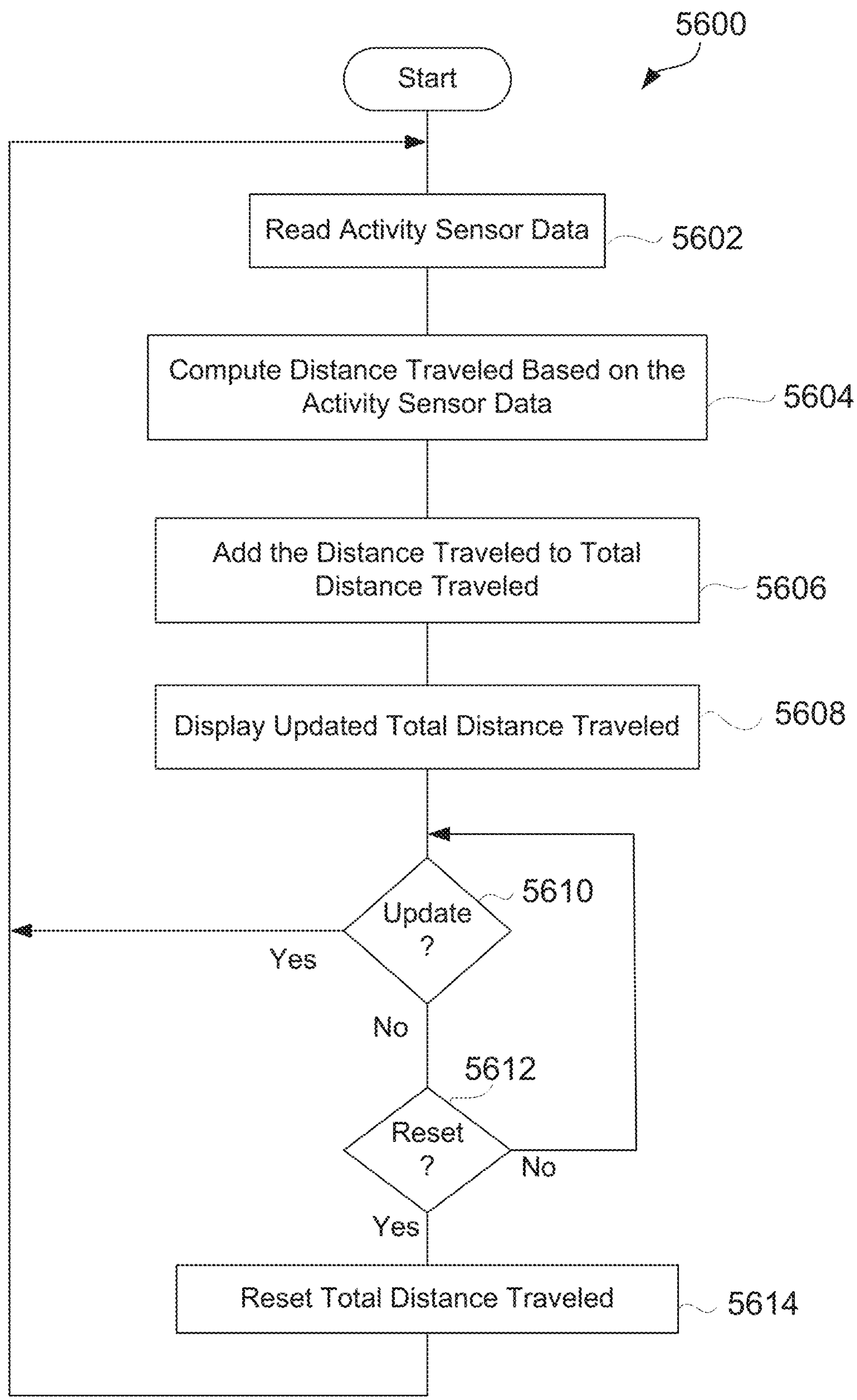
FIG. 73 is a flow diagram of a distance output process according to one embodiment of the invention.

FIG. 73 is a flow diagram of a distance output process 5600 according to one embodiment of the invention. The distance output process 5600 is, for example, performed by a pedometer system, such as the pedometer 5116 or the pedometer system 5300. The distance output process 5600 operates to determine and then output a distance amount associated with a user of the pedometer (pedometer system). As noted above, a pedometer can output a distance traveled by the user of the pedometer.

The distance output process 5600 initially reads 5602 activity sensor (e.g., accelerometer) data. A distance traveled is then computed 5604 based on the activity sensor data. Next, the distance traveled is added 5606 to the total distance traveled. As a result, the total distance is updated to include the incremental distance that the user has traveled since the last instance of the distance output process 5600. The updated total distance traveled is then displayed 5608.

Next, a decision 5610 determines whether to update the distance being monitored by the distance output process 5600. When the decision 5610 determines that an update is needed, the distance output process 5600 returns to repeat the operation 5602 and subsequent operations so that a next distance travel can be computed and processed in a similar manner. It should be noted that the distance traveled being displayed 5608 can be rendered in any sort of units, including steps, miles, feet, meters, etc.

On the other hand, when the decision 5610 determines that an update is not yet needed, a decision 5612 determines whether a reset has been requested. When the decision 5612 determines that a reset has not been requested, then the distance output process returns to repeat the decision 5610 to again evaluate whether an update is needed. Here, the activity monitoring hardware can be inactive for a period of time (e.g., a delay time). This inactive period can provide low power operation of the activity monitoring hardware. In general, the less often updates occur, the less power consumed. Alternatively, when the decision 5612 determines that a reset has been requested, the total distance traveled is reset 5614 (i.e., cleared or set to zero). Following the operation 5614, the distance output process 5600 again returns to repeat the operation 5602 and subsequent operations.

Pedometer designs can have various different structures. In one embodiment, an advantage to have a pedometer in the glasses can be due to the structure of one type of pedometer. In one approach, a pedometer includes a weight and a spring. In one embodiment, the pedometer can also include an LED, a photodetector and a controller. The weight is at the end of the spring, which can be a leaf spring. The weight with the spring have a resonant frequency that can be in the range of normal walking pace, such as 60-120 steps/minute. At that frequency, the weight with the spring will resonate. The resonance can be critically damped, such as by allowing the weight to go up and down beyond a threshold, but only once per step of the user. Normally, the photodiode receives light from the LED. When the weight goes beyond the threshold, it can block the light from the LED from reaching the photodiode. By measuring (e.g., counting) the number of times light is blocked and unblocked, a controller would be able identify the number of steps the user has walked. Based on such a structure, in one embodiment, for optimal performance, the orientation of the up-down motion of the weight should be substantially vertical. If a pedometer is a device you can clip onto a piece of clothing, a user can clip it on such that the orientation of the up-down motion of the weight is horizontal, which causes the performance of the pedometer to be substantially degraded. Glasses are usually worn in a standard position. The position, including the orientation, of the pedometer can thus be fixed relative to the glasses. Then, the orientation of the up-down motion of the weight can be fixed to be substantially vertical when the glasses are worn, or be substantially perpendicular to the orientation of the bridge of the glasses. This is another advantage of having a pedometer in the glasses in a number of embodiments.

In another embodiment, the pedometer can be automatically adjusted based on the types of exercise the user is engaging in, such as whether she is walking or jogging. For example, the resonance frequency, stride, or other parameter can be changed to provide a more accurate correspondence to whether the person is walking or jogging. There could alternatively be a switch that allows the person to change the pedometer from the walking mode to the jogging mode.

The activity monitoring can but need not be performed by a pedometer (pedometer system). That is, other activity monitoring systems besides pedometer systems can be used. In other words, a pedometer system can be replaced by an activity monitor. An activity monitor is a monitor of general activity. For example, the activity being monitored can correlate to movement of its user. Such movement may or may not correspond to distance traveled. For example, a pedometer system measuring steps taken by a user while working out at the gym would typically imply that the user is nevertheless active, albeit in a relatively confined area. In contrast, an activity monitor could better understand that the user is getting up and down many times and otherwise involved in a substantial amount of movement while at the gym. Similarly, homeowners cleaning the house engages in a lot of activity, but perhaps not requiring a comparable number of steps, as a jogger.

In one embodiment, the activity monitor can be partially or completely embedded in a pair of eyeglasses. Typically, the activity monitor includes an activity sensor and electronic circuitry in the pair of eyeglasses that monitors the activity, manipulates the monitored signals and provides an output of an activity indication to the user or interested party.

The activity sensor can sense user activity level. As an example, the user activity level can be used to provide a lifestyle indication. For example, a lifestyle indication can indicate to the user whether the user was active today or, alternatively, lazy today. The lifestyle indication can be displayed as a text or graphic symbol to inform the user or others of the activity level. For example, the lifestyle indication can be displayed by an output device (e.g., a LCD or LED display). The output device can be integrated with an eyeglass frame (e.g., at a temple portion of the eyeglass frame).

The activity level can pertain to a period of time, such as last 5 minutes, last hour, last 8 hours or last 24 hours. In one embodiment, within the time period, electronic circuitry can measure (e.g., count) motion (e.g. vibrations), such as via an accelerometer or other motion indicators. When motion exceeds a threshold, a count can be increased. The count total for the period of time can then be compared to an index. The index can then provide an activity level, which can be numeric (e.g., 1-10 rating), textual (e.g., lazy, slow, moderate, active) or graphical. For example, in a given day, a count can be accumulated, and then the activity level can be re-determined based on the accumulated count at the end of each day. The following table is representative of the correspondence between count value, thresholds (TH), and activity level.

| Count | Activity Level |
|---|---|
| < or = TH1 | Lazy |
| >TH1 but < or = TH2 | Slow |
| >TH2 but < or = TH3 | Moderate |
| >TH3 | Active |

These activity levels can also be linked to numerical or graphical indicators which can be displayed on an output device. The output via the output device can provide a current activity and/or a cumulative activity level, which can be a cumulative daily activity level. The output can also be displayed relative to one or more benchmarks.

When there is no motion or essentially no motion, the monitoring system can power-off or enter a low-power mode, and thus stop performing activity processing or providing any activity indication at an output device.

In one embodiment, the activity sensor can be implemented using an accelerometer or a vibration sensor. In another embodiment, the activity sensor can be implemented using a pedometer, which can be either a mechanical or electrical pedometer. In yet another embodiment, the activity can be implemented using a GPS receiver. In still other embodiment, the activity sensor can be implemented using a combination of any of the foregoing. In yet another embodiment, a plurality of activity sensors can be utilized. Such multiple activity sensors can be processed separately or in combination.

In one embodiment, the activity sensor can be used to measure distance traveled. In another embodiment, the activity sensor can acquire a position. The relative change in position over time can be used to determine a distance traveled. Then, the distance traveled over time can be used to correlate to an activity level. The activity level can then be displayed in any of the various ways noted above. In other embodiment, the activity sensor can be used to measure minimum activity (e.g., sleeping). In still another embodiment, the activity sensor can be used to measure velocity or acceleration.

In one embodiment, an activity monitoring system which provides monitoring and display of activity information can be at least partially embedded in a pair of eyeglasses. In another embodiment, the activity monitoring system can be at least partially embedded in at least one temple of a pair of eyeglasses. Optionally, the pair of glasses can further include one or other sensors discussed herein or in related applications. At least one of the sensors can be remote from the pair of eyeglasses (and utilizes wireless or wired communication to interact).

In yet still another embodiment, the activity monitor can operate as a calorie counter. In such case, data from an activity sensor can be converted into estimated calories consumed by, for example, the wearer of the glasses. The glasses may permit a user to enter his weight, or there can be a series of glasses each being utilized for different weight ranges. An output device provided with a pair of such glasses can inform the user of the calories consumed, such as throughout the day. The glasses can also include a reset button or on/off switch so that calorie count can be cleared. The glasses might also store calorie information for a plurality of days and permit uploading such data to a computer (wirelessly or via a connector provided with the glasses).

There can also be a memory device to keep track of the activity information for a number of days. The activity monitoring system can include or couple to a controller that controls storage and retrieval of the information to and from the memory device.

In one embodiment, the activity monitoring system (e.g., pedometer) has an automatic off feature that allows a controller to automatically turn off or deactivate the activity monitoring system if the activity monitoring system does not sense any steps taken by the user for a predetermined period of time, such as two (2) minutes.

In different embodiments, the glasses can be more geared towards sports. The glasses can be a pair of sports glasses, swimming goggles, or protective goggles for playing different types of sports, such as racquetball.

In still another embodiment, a pair of eyeglasses can include or utilize a sensor to serve as a stress monitor. For example, stress can be estimated in view of blood pressure which can be evaluated with a blood pressure sensor and/or in view of pulse rate which can be evaluated with a pulse rate sensor. As another example, blood pressure or pulse rate sensors together with activity can be used to estimate stress.

The activity monitoring system can also include one or more switches with the eyewear. The switches can, for example, facilitate user input or control with respect to the activity monitoring system. For example, the switches can provide one or more of on/off, reset, on, on (and reset), and calibration. The activity monitoring system can also provide a user with an indication of whether the system is currently on or off, such as by a graphical image on a display device or by a LED. The one or more switches can also be used to change operational settings, such as threshold levels, output type, user preferences, user physical characteristics (e.g., stride, weight), operational mode, or activation/deactivation of auxiliary sensors, if any.

The activity monitoring system can have a “being-worn” switch. In one embodiment, the “being-worn” switch enables the activity monitoring system to automatically determine when to monitor activity and when not to monitor activity. In particular, the activity can be monitored when an eyeglass frame having the activity monitoring system is “being-worn” and not when the eyeglass frame is not “being-worn.” The “being-worn” switch can be positioned in the temple portion with the other components of the activity monitoring system. In one embodiment, the activity monitoring system is provided, as a module as noted above, and which further includes a switch. The switch can, for example, be a “being worn” switch. By having the switch integral with the module, the manufacture and assembly of the end-product having the activity monitoring system can be simplified. As examples, the “being-worn” switch can be an optical, magnetic or mechanical switching device.

The “being-worn” switch can make use of the situation that the temples are in an open position when the eyeglass frame is being worn, and in a closed position when not being worn. In one embodiment, the “being-worn” switch can be positioned at a temple proximate to a region that couples the temple to its corresponding lens holder. For example, the activity monitoring system (e.g., module) can be provided within the temple region near the end of the temple so that the “being worn” switch is adjacent the lens portion of the eyeglass frame.

The “being worn” switch can also be used by a user to signal the activity monitoring system to provide its output at an output device, such as a display device. For example, when the “being worn” switch is initially closed (i.e., being worn), the activity monitoring system can output its text or graphical output to the display device. Typically, the displayed output would be displayed only for a limited period of time (e.g., 10 seconds). Such an approach is typically more power efficient, yet permits the user to obtain the output information when desired. Alternatively, another switch (e.g., dedicated output switch) could be used to cause the output to be displayed for a limited period of time or while the switch is depressed.

Figure 74:
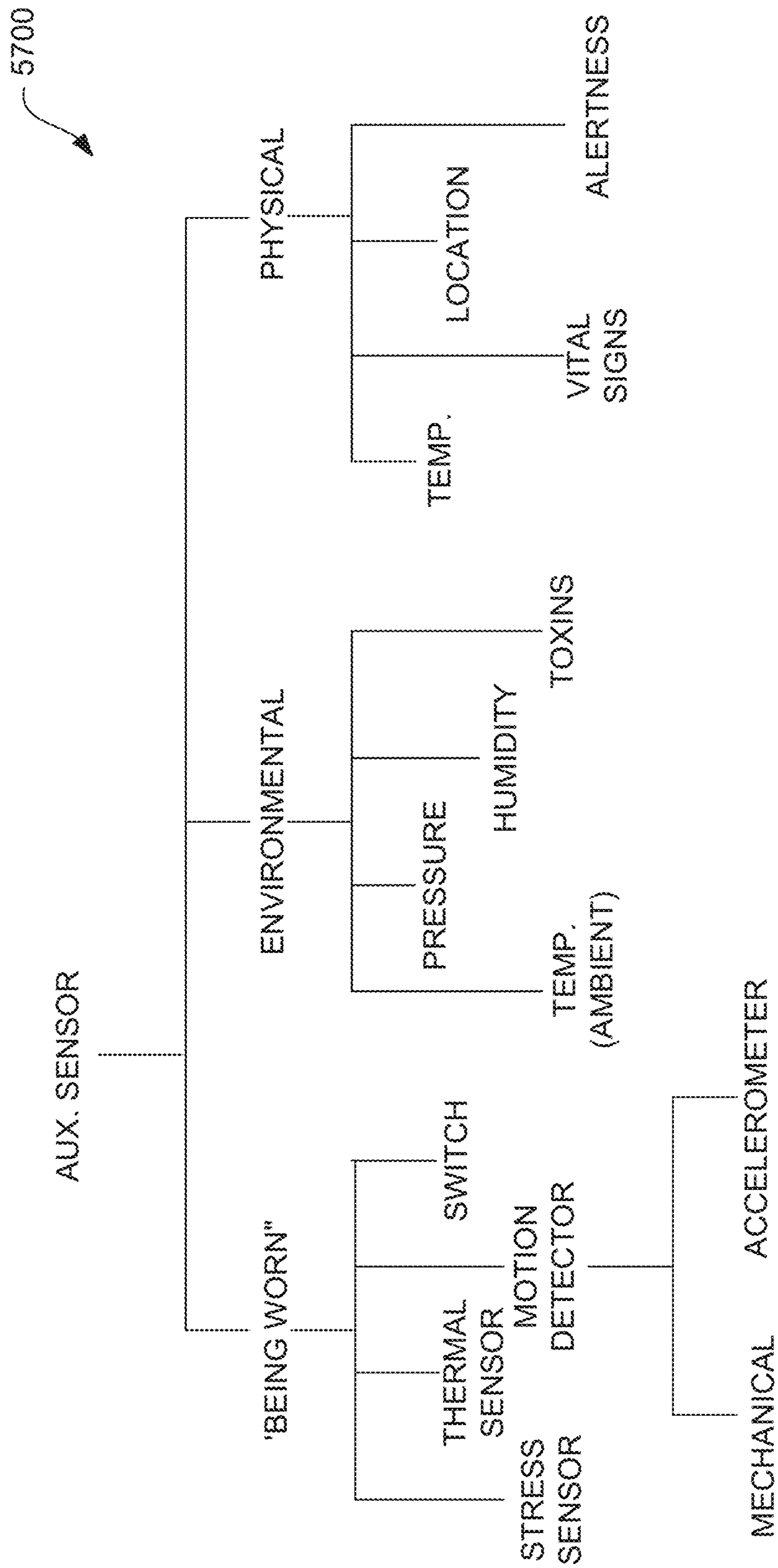
FIG. 74 is a chart that depicts examples of auxiliary sensors that can be utilized with the eyewear.

In one embodiment, the eyewear including the activity monitoring system can further include one or more auxiliary sensors. FIG. 74 is a chart 5700 that depicts examples of auxiliary sensors that can be utilized with the eyewear.

The chart 5700 indicates that one type of auxiliary sensor is a "being worn" sensor. The "being worn" sensor would indicate whether the glasses are being worn by its user. The "being worn" sensing mechanism can be performed using, for example, a thermal sensor, a motion detector, a stress sensor or a switch.

In one embodiment, a motion detector is used as a "being worn" sensor. A threshold can be set, such that if the amount of motion detected exceeds the threshold, the eyewear is assumed to be worn. The motion detector can, for example, be achieved by a mechanical means or an accelerometer.

In another embodiment, the "being worn" sensor includes one or more thermal sensors. In the case where two sensors are used, one sensor can be at approximately the middle of a temple, such as in a region that would receive heat from the head of the user wearing the glasses, and the other sensor can be positioned at the end of the same temple close to the hinge. If the temperature differential between the two sensors is beyond a certain preset value, the eyewear would be assumed to be worn.

In yet another embodiment, the "being worn" sensor includes a stress sensor at the hinge of the temple. The assumption is that when the eyewear is worn, the hinge is typically slightly stretched because typically the width of the head of the user can be slightly wider than the width between the temples when the two temples are in the extended positions. If the value of the stress sensor is beyond a certain preset value, the glasses would be assumed to be worn.

In still yet another embodiment, the "being worn" sensor can be implemented as a switch. For example, the switch can utilize optical, magnetic or mechanical means. In one embodiment, the switch can be positioned at the temple of the eyewear, such as a forward end of the temple proximate to a corresponding lens holder. Different embodiments of such sensors is also described in U.S. Provisional Patent Application No. 60/583,169, filed Jun. 26, 2004, entitled "ELECTRICAL COMPONENTS FOR USE WITH EYEWEAR, AND METHODS THEREFOR," which has been incorporated herein by reference, see, e.g., section entitled "EYEGLASSES WITH USER INPUT CAPABILITY."

Another type of auxiliary sensor is an environmental sensor. The environmental sensor can sense environmental conditions, such as one or more of temperature (e.g., ambient temperature), pressure, humidity and toxins (e.g., chemicals, radiation, etc.).

Still another type of auxiliary sensor is a physical sensor. The physical sensor can sense physical conditions of the user of the glasses. Examples of physical sensors include sensing one or more of location, temperature, alertness, and vital signs (e.g., heart rate, blood pressure, etc.) associated with the user of the glasses. Still other physical sensors can sense emotions of the user. For example, the physical sensor could sense whether the user is calm, excited, happy, sad, angry, etc. In one embodiment, the physical sensor can also more generally sense user activity level. As an example, the user activity level can be used to provide a lifestyle indication. For example, a lifestyle indication might show that the user was active today or, alternatively, lazy today. Such a lifestyle indication can be displayed as a text or graphic symbol to let the user or others aware of the activity level.

In one embodiment, one particular type of physical sensor is a heart-beat sensor. The heart-beat sensor measures the heart beat of the wearer of the eyewear. One implementation for the heart-beat sensor utilizes an infrared emitter and an infrared detector as components. The infrared emitter can be an infrared LED and the infrared detector can be an infrared photodiode (or a non-infrared photodiode with a separate infrared filter). The components can be located at a temple of the eyewear, with both the emitter and the detector facing the user when the eyewear is worn. In operation, the infrared emitter shines infrared radiation towards the user, and the detector captures the infrared signals reflected back by the skin of the user. The magnitude of the reflected signals depends on the amount of blood flowing below the skin, which, in turn, depends on (i.e., fluctuates with) the heart beat. The rate of emission by the emitter and reception by the detector can be modulated (e.g., amplitude modulate) in a frequency range much higher than the heart beat, such as three Kilohertz. And the signals from the detector can be low-pass filtered before they are measured to identify the heart beat of the user. For example, the low-pass filter can have a cutoff frequency at about 1 Hertz (Hz).

It should be understood that the sensors might rely on more than one measured criteria. The one or more measured criteria might be used to determine the sensor output. The determination of the sensor output can involve estimation or prediction.

The auxiliary sensors can be provided in a redundant or fault-tolerant manner. For example, sensors can be provided in pairs. When one sensor of a pair malfunctions, the other one can replace it. In another embodiment, any of the auxiliary sensor information can be processed in a differential manner to examine changes to the auxiliary sensor information. The auxiliary sensors can by powered by a battery, solar energy, or kinetic energy. For reduced power consumption, the auxiliary sensors can remain in a low-power state unless data is being acquired by the auxiliary sensors. In yet another embodiment, two or more of the auxiliary sensors can communicate with one another (wired or wirelessly) to exchange data or control information.

In general, the auxiliary sensors can be fully or partially embedded in the eyewear or a base tethered to the eyewear. Alternatively, one or more of the auxiliary sensors can be separate from the eyewear, or any base tethered thereto, and wirelessly communicate with the eyewear or base.

An output (e.g., notification to the user) can vary in content and type. The type can be visual and/or audio. The content can be numerical, graphical, musical, textual, synthesized text, etc. The output can also be predetermined, dynamically determined or configurable. Still further, the output can be dependent on user preferences, user physical characteristics, auxiliary sensor information (e.g., location), or degree of health risk.

An activity monitoring system can also include one or more connectors with the eyewear. The connectors can, for example, facilitate electrical or mechanical interconnection with an external electrical device (e.g., computing device, media player, headset, power source). Although the format and size of the connectors can vary, in one embodiment, the connector is a standard audio connector or a peripheral bus connector (e.g., USB connector).

An activity monitoring system can also include one or more switches with the eyewear. The switches can, for example, facilitate user input or control with respect to the activity monitoring system. For example, the switches can provide one or more of on/off, reset, on, on (and reset), and calibration. The activity monitoring system can also provide a user with an indication of whether the system is currently on or off, such as by a graphical image on a display device or by a LED.

An activity monitoring system can also include a memory. The memory can be volatile or non-volatile. The memory can also be removable or non-removable with respect to the eyewear. If the memory is volatile, the activity monitoring system, if solar powered, could also include a battery to provide power to the memory so that stored data (e.g., user preferences, etc.) can be retained even when adequate solar energy is not available. As an example, the presence of a memory can allow storage of activity information for an extended period of time to acquire a historical understanding of activity information.

In one embodiment, an eyeglass frame can include memory that can store acquired activity information. Such stored activity information can be subsequently uploaded to a computer, in a wired or wireless manner. The activity information can then be analyzed by the computer.

An activity monitoring system can also include a communication module. The communication module would allow data transmission to and from the activity monitoring system (namely, the eyewear) and an external device. The data being transmitted can, for example, be activity information, configuration data, user preferences, or auxiliary sensor data. The data transmission can be wireless or wireline based. The eyewear can further include a connector operatively connected to the activity monitoring system. Such a connector can facilitate data transmission with respect to the activity monitoring system or the eyewear.

A temple of a pair of glasses can be removable from the remainder of the frame. Such facilitates replacement of temples. For example, a convention temple could be removed from a frame and replaced with a temple having at least one electrical component at least partially embedded therein.

An activity monitoring system can be partially or fully contained in a temple arrangement associated with a temple of a pair of glasses. In one embodiment, the temple arrangement can be removable from the temple. A temple arrangement can be a temple tip, a temple cover or a temple fit-over.

In one implementation, an activity monitoring system (e.g., pedometer) can alternatively be provided in a temple arrangement. Referring back to FIG. 68, each temple 5108, 5110 has two ends, the first end and the second end. The first end is the end that is pivotally secured to its corresponding hinge 5112, 5114. In one arrangement, the second end of one or both of the temples 5108, 5110 has a temple arrangement. In one embodiment, at least a portion of the electrical components of an activity monitoring system (e.g., pedometer) is in a temple arrangement, and another portion of the electrical components of the activity monitoring system is in a temple arrangement.

For some glasses, particularly when a pair of glasses has not been extensively worn, a temple arrangement, such as a temple tip, can be relatively easily removed and re-inserted into the glasses. As a result, temple arrangements of different color and/or shape and/or having different electrical components can be applied to the same frame of a pair of glasses. Retailers or distributors can then provide after-market modification or enhancement to a pair of glasses, at the preference of their consumers. This, for example, can be done by replacing existing temple tips with replacement temple tips. Alternatively, a consumer can identify the preferred temple arrangements to be sold with the glasses. Different embodiments on after-market enhancement and/or modification of glasses have previously been described in the related patent applications mentioned above.

An activity monitoring system can be partially or fully tethered to a pair of glasses. For example, some of the components for monitoring activity or one or more auxiliary sensors can be tethered to the eyewear. In one embodiment, the tethered components can be tethered at the neck or upper back region of the user. Tethering components can allow for increased design freedom with the eyewear as well as additional area with which to house the components. For example, an activity monitoring system could be partially or completely within a device or a base that can be tethered to eyewear.

Still further, an activity monitoring system could be partially or completely within a device or a base that can be tethered to eyewear.

In another embodiment, an eyeglass frame can have openings (e.g., holes) at the ends of the temple tips so as to facilitate attachments of straps, holders, etc.

Although much of the above discussion pertains to providing activity monitoring capabilities in eyewear, it should be understood that any of the various embodiment, implementations, features or aspects noted above can also be utilized in other or on end products besides eyewear. Examples of other such end-products can include: hats (e.g., soft hats, hard-hats, helmets), watches or watch bands, bracelets, bracelet accessories, necklaces, necklace accessories, rings, shoes (e.g., sandals, athletic shoes, beach shoes), shoe accessories, clothing (e.g., tee-shirt, swimming-suit, ties, pants, jackets, etc.), belts, belt accessories, zippers, key rings, purses, beach-tags, containers (e.g., cups, bottle, tube—such as a sun tan lotion bottle or tube); container holders (e.g., can holders, coasters, coolers, etc.), and other consumer products.

A number of embodiments have been described above for an eyeglass frame, i.e., primary frame. Such embodiments are also applicable to an auxiliary frame. An auxiliary frame can attach to a primary frame through different techniques, such as using clips or magnets.

In the event that electrical components, such as an activity monitoring system, are at least partially embedded in one of the temples of an eyeglass frame, the other of the temples can include other electrical components or even a counter weight. It is desirable for the eyeglass frame to be substantially balanced. Hence, the implementation of the eyeglass frame should offset any weight imposed by activity or other monitoring. For example, if five (5) grams of electrical components are added to one temple, the other temple should also have approximately five (5) grams added thereto.

Certain aspects of the invention can be implemented in software, hardware or a combination of hardware and software. Certain aspects of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. One advantage of the invention is that a pedometer or other activity monitor can be added to or coupled to eyewear. Another advantage of the invention is that pedometer or other activity monitoring capabilities can be provided for eyeglasses without substantial interference to style or design choices, and thus without being apparent that the eyeglasses support such capabilities.

Figure 75:
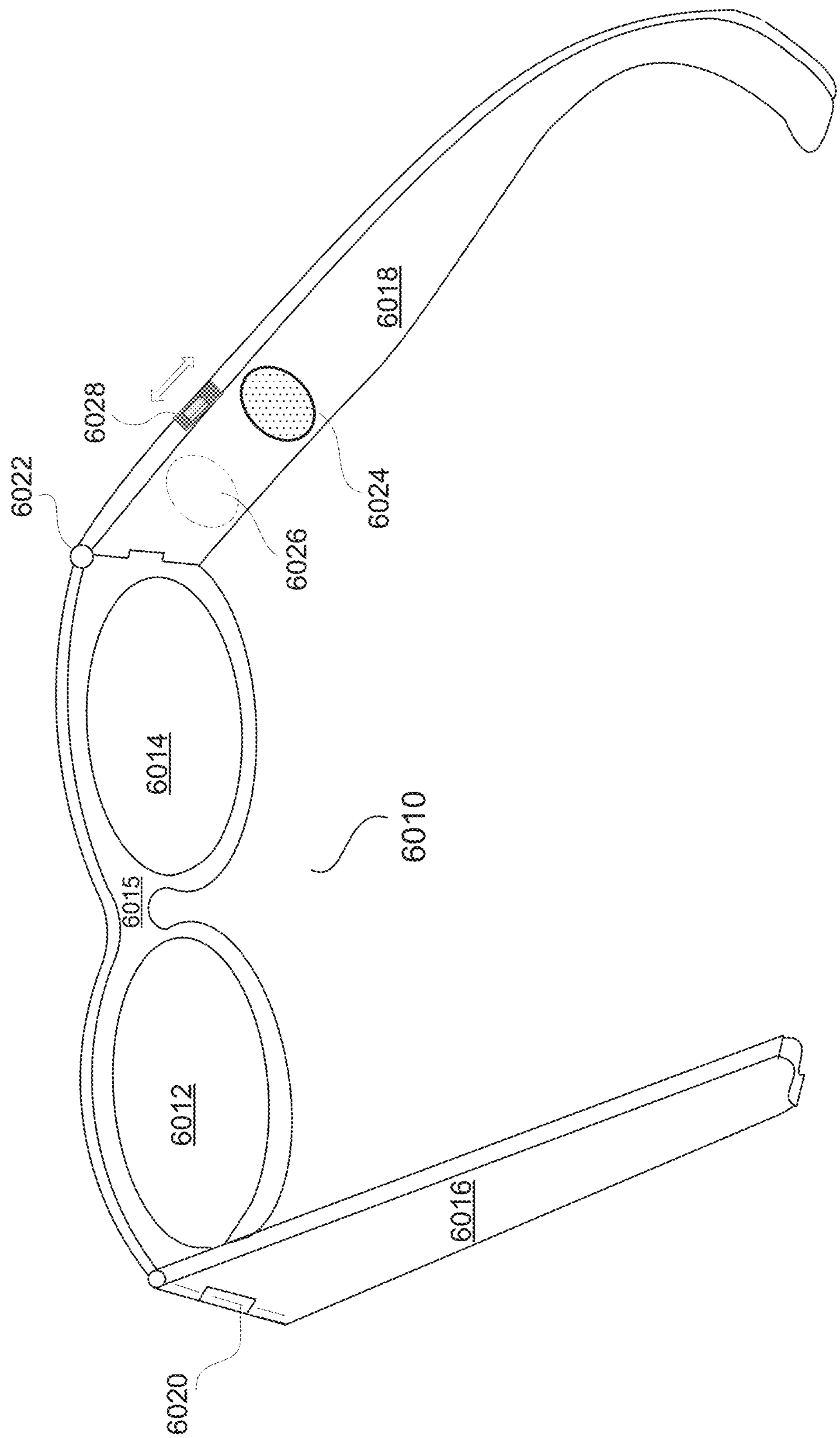
FIG. 75 shows one embodiment of the invention with a speaker in one of the temples of a pair of glasses.

FIG. 75 shows one embodiment of the present invention. The embodiment includes a pair of glasses 6010 with a first lens holder 6012 and a second lens holder 6014. Both lens holders are for receiving lenses. The first lens holder 6012 has a first side and a second side. The second lens holder 6014 also has a first side and a second side. The pair of glasses has a bridge element 6015. The bridge element is coupled to the first side of the first lens holder 6012 and the second side of the second lens holder 6014. In one embodiment, the lens holders and the bridge element are not separate pieces, but are an integral piece.

The pair of glasses 6010 also includes a first temple 6016 and a second temple 6018. The first temple 6016 is pivotally secured to the second side of the first lens holder 6012 through a joint 6020. And, the second temple 6018 is pivotally secured to the first side of the second lens holder 6014 through another joint 6022. The glasses 6010 further include a speaker 6024, a power source 6026 and a switch 6028. The speaker 6024 is powered by the power source 6026, and the switch 6028 is used to turn the speaker 6024 on and off. The pair of glasses 6010 can deliver information through the speaker 6024 to the wearer or user of the glasses 6010. In one embodiment, the information is available for a duration of time. With the speaker 6024 close to at least one of ears of the wearer of the glasses 10, the information provided to the user can be provided in a relatively private manner.

In different embodiments, the glasses 6010 can be a pair of sunglasses, fit-over glasses, prescription glasses or other types of glasses. In a number of embodiments, the frames of the glasses have more surface area than frames with minimal structure, such as those frames with lenses connected together by wires. For example, the temples of the glasses can have a tapered profile. Each of the temples is wider or broader when it is close to its corresponding joint. In one embodiment, the temple is wider or broader by spanning across a wider or broader area longitudinally downward, creating a bigger surface in an orientation generally parallel to the side of the user's head. FIG. 75 shows an example of such an embodiment.

In another embodiment, there can be a shield at least at one edge of each of the lens holders of the glasses. These shields can wrap around, or better conform to the profile of, the face of the wearer. The shields can be opaque. There can be transparent or translucent windows on these shields. To illustrate, in fit-over sunglasses, when worn over a pair of prescription glasses, such shields can go over or cover at least a portion of the pair of prescription glasses. Note that in one embodiment, a pair of glasses does not have to include lenses.

In one embodiment, a pair of glasses is for an event. An event can be viewed from the perspective of one or more organizations sponsoring or organizing the event. These events can be, for example, a basketball game, a concert, or a trade show. These events are provided or sponsored by one or more organizations or companies. In a number of embodiments where information is available from a speaker at a pair of glasses and the glasses are for an event, the information made available from the speaker is related to the event. In such embodiments, the information can be available for only a limited duration of time and the duration is associated with the event, which can include some time (such as buffer time) before the event and some time after the event. When the event is over, which can include any post-event buffer time, the information will generally not be available.

In another embodiment, an event can be viewed from the perspective of the person at the event. From the perspective of the person, an event can be buying a product from a store. This can be considered an event from the point of view of the person at the event. Typically, it has a beginning, it has an end, and there is a purpose or a theme. The information is available to the person when the person is at or proximate to a location associated with the event, such as a building. When the person is away from the location, the information will not be available.

In one embodiment, the duration of an event is not more than a week. In another embodiment, the duration is not more than a day. In yet another embodiment, the duration of an event is not more than a few hours, such as nine hours.

In one embodiment, there is advertising or promotional material on a pair of glasses, and the material is related to an event. The material can be on the surface area provided by temples, shields or other areas on a pair of glasses. For example, if the event is about dinosaurs in the Jurassic period provided by an organization, there can be a Brachiosaurus printed on the glasses. The organization can use the surface area on the glasses as places for advertisement of not only the event, but also the organization itself. The organization can also sell such surface area to other companies, which can provide additional promotional material on the glasses.

Referring back to FIG. 75, it shows one embodiment of the invention where there is a speaker 6024 in one of the temples 6018 of the glasses 6010.

In one embodiment, the information is available for a duration of time, which can be short. For example, the power source 6026, which can be a battery, may not have enough power to run the speaker 6024 in its full capacity for a long duration. To illustrate, the battery 6026 only has enough power to run the speaker continuously for a short duration of time, which can be less than a few hours with the speaker 6024 at its highest volume possible, when it is turned on by the switch 6028 in the glasses 6010. The battery 6026 can be encapsulated in the glasses 6010, such as in one of the temples 6018 of the glasses 6010. The battery 6026 can be a coin battery or a AAA battery, or other types of batteries. In one implementation, the glasses are designed such that the battery 6026 is not easily replaceable by the user. The battery 6026 can be inside a temple and the temple can be sealed so that the battery 6026 is typically not replaceable without breaking the temple.

Figure 76:
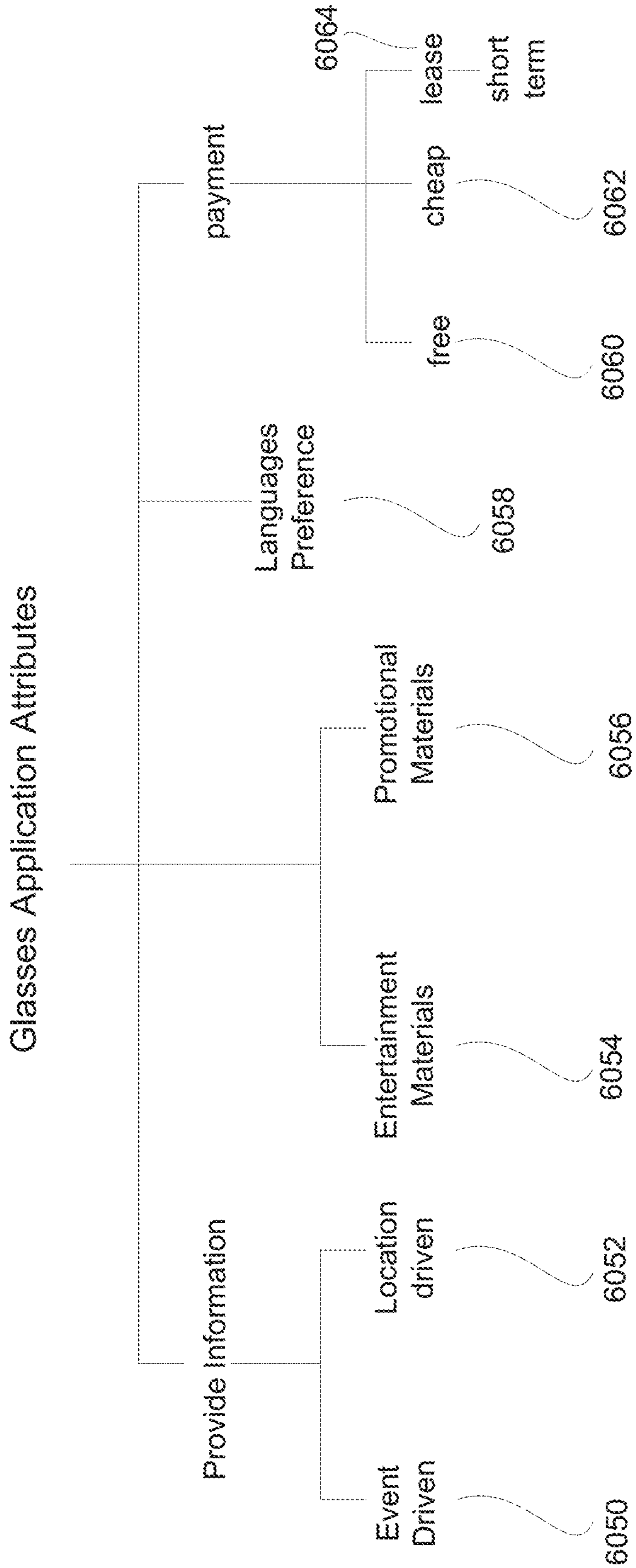
FIG. 76 shows a number of attributes regarding a number of applications of glasses according to different embodiments of the invention.

FIG. 76 shows a number of attributes regarding the applications of the glasses, such as the glasses shown in FIG. 75, according to different embodiments of the invention.

In one embodiment, the information provided by the glasses can be driven by an event organized by an organization 6050. For example, the user is at a football game in a stadium. The information can be related to a star player, such as his statistics, or other interesting information regarding the team. The information can be for an event related to the event at the stadium. For example, the user is at the Stanford Stadium watching the game between the Stanford and the Berkeley football teams. However, periodic update information or other types of information, such as play-by-play information, from a game at the UCLA Stadium between UCLA and USC can be provided to the user. All four teams are vying for the PAC 10 title. The user at the Stanford Stadium, who might be an UCLA fan, can hear about how the UCLA team is performing, while watching the Stanford/Berkeley game.

In the embodiments where information is available from the glasses, the information is available hands-free. This allows the user to use both of his hands totally freely, for whatever other purposes the user prefers, including providing different gestures.

In the embodiments where information is available, such as through a radio, the information can be available almost instantaneously when the electrical components in the embodiments are activated or turned on. This can be important during high intensity games. If it takes 30 seconds to start the system before information is available, such down time may not be available or tolerable during the games.

The user in an event may not be the audience or the observer of the event. In one embodiment, the user using a pair of glasses in the present invention not only attends the event, the person also helps to produce the event. For example, the event is a game, and the person is a coach of one of the teams playing in the game. Additional embodiments will be described where a pair of glasses is coupled to a handheld device. The glasses provide information to the coach, who can use the handheld device for a number of purposes, such as to track plays or calls.

In one embodiment, the information available at a pair of glasses can be advertising materials available during the break time of a game. The advertising materials can, for example, be from a company organizing or sponsoring the event, or from one of the teams in the event.

As another example, the event is an indoor event, such as an indoor concert.

The information can be location driven 6052, which in one embodiment can be considered as an event attended by a user when the user is at the location. For example, the user is in a store, with many products. The products can be services. As the user moves around the store, he looks at different products. In one approach, each product is designated by a number. By entering the specific number into the glasses or into a portable device coupled to the glasses, such as through a switch, information pertinent to the corresponding product will be available to the user. As another example, the user can be in an exhibit hall, a trade show or in a museum. As the user strolls in the hall, information of different exhibits is available to him. Or, the user can be walking around a botanical garden, and is given a virtual, unguided tour by the glasses of the different type of plants in the garden. When the user moves away from such locations, the information will not be available.

The user can be at places where he is alone, or he does not know anybody. He might be bored. For example, he can be in a dental office having his teeth cleaned. Or, he can be in a bank waiting for his turn. Different types of information can be available to him. For example, if the bank has a new home loan program, such information is available to him. Again, when the user moves away from such location, the information will not be available.

The information can be for entertaining 6054 the user. Or, the information is primarily promotional 6056 in nature. The promotion can be related to the event the user is participating, or the promotion can be related to the location, such as the company associated with the user's location.

The information can be in different languages 6058. For example, glasses with a red dot provide information in English, while glasses with a white dot provide information in Spanish. Or, there can be a switch on the glasses that allows setting the language to that preferred by the user.

The glasses can be given away 6060. They can be sold at a relatively low price 6062. Or, the glasses can be for temporarily use, such as the user can borrow, rent or lease 6064 the glasses for a short duration of time. To track such glasses after they have been rented, each pair of glasses can have an identifier, such as a bar code. The bar code can be located on the inside of the glasses, such as on the inside of a temple of the glasses. In another embodiment, each pair of glasses can also or alternatively have a RFID tag, which can be wirelessly tracked. The tag can be in a temple, such as in the vicinity of the tip of the temple, or its temple tip. A temple tip is, in general, in a region of the temple substantially furthest away from the hinge of that temple. The organization responsible for renting out the glasses can ask for the user's identity card, which can be the user's driver's license. The card is then linked to the bar code, the RFID tag or other identifier of the glasses. When the user returns the glasses, the user can reclaim the corresponding identity card.

Referring back to FIG. 75, the embodiment 6010 includes a speaker 6024 that is at least partially embedded into the glasses. There are different approaches to embed an electrical component, such as a speaker, into different types of glasses. A number of approaches are described, for example, in the various related patent application noted above.

In one embodiment, the pair of glasses 6010 shown in FIG. 75 includes a radio, and the speaker is a part of the radio. All the electronics for the radio are at least partially embedded in the glasses. For example, the electronics can be on a printed circuit board, and the board is in one of the temples of the glasses. Information is provided to the user through the radio. The radio can be an AM or a FM receiver. In one embodiment, the receiver is pretuned to the frequencies of the transmitter of the information. Or, before the glasses are distributed, the radio is set to receive signals from a specific frequency band. Also the radio may not include an external tuner or switch on the glasses for the user to tune the radio to listen to another frequency band. In another embodiment, the receiver is tunable by a switch on the glasses to one or more frequencies.

The information can be information captured by a microphone or other pickup device, and transmitted over radio frequency waves to the radio.

As to the transmitted frequencies, typically government agencies, such as the FCC in the United States, regulate the availability of frequency ranges, particularly when the power of transmission is not low. In one embodiment, the transmitted frequencies can be on either side of the standard FM radio bands. They can be within the television VHF frequency range of 50 megahertz to 150 megahertz, or 49 to 88 MHz, or 108 to 220 MHz. Selecting such frequencies can have the advantage of having receiver components more readily available and less expensive. But, the frequencies selected may vary depending on costs, performance and/or FCC or other government agency requirements.

In another embodiment, the transmitted frequencies are in the CB (Citizen Band) radio band.

In yet another embodiment, the transmitted frequencies are FM-sidebands. This would allow the use of FM sideband receivers. Using such sidebands typically would require a lease from radio stations.

In one embodiment, information is transmitted to the glasses through a Wi-Fi network, or a WiMax network.

Also, the frequencies transmitted could be based on spread spectrum techniques. In other words, though the frequencies would constantly change, the transmitter and the receiver would be synchronized following the changing frequencies. In a number of countries, such embodiments do not require government license.

Information can typically reside within a few MHz. In one embodiment, the radio in the glasses is a narrow-band receiver, with a bandwidth of 3-6 MHz.

In yet another embodiment, the radio can receive signals from one of multiple and proximate AM modulated frequencies. For example, in a museum, information from adjacent artwork can be transmitted based on frequencies centered at the different frequencies. The radio receiver is a broader band AM receiver, which can be a receiver non-tunable by the user. Depending on proximity, the radio will adjust automatically to capture the frequency of the carrier for information regarding the particular artwork and excludes cross-talks from information regarding its immediate adjacent artworks.

Another embodiment considers the power level of the transmitted signals. If the power level of the transmitted signals is low, signals do not travel an excessive distance beyond the transmitter of the signals. For example, the low power level can be between ¼ to ½ watts. Or, the low power level is not more than 50 milliwatts. If the transmitted power level is low, it is relatively easier to meet government agencies, such as the FCC's, guidelines. Cost and complexity of the circuitry are usually also reduced. High power transmission typically requires special government approval.

In one embodiment, the transmission path between the transmitter and the receiver is primarily line of sight, and the information can be transmitted via, for example, infrared.

In yet another embodiment, there can be multiple transmitters. This can then keep transmission power low even if a large or unusually shaped area is to be covered. The corresponding radio will capture its signals from the transmitters based on proximity.

In one embodiment, the frequency of the radio cannot be tuned at the glasses by the user. The frequencies are fixed upon distribution of the glasses. In another embodiment, the frequencies of interest can be changed. For example, there can be an EPROM in the glasses that can be programmed. Or, one can replace a chip in the glasses to adjust the frequencies. In yet another embodiment, there can be one or more switches at the glasses to change the frequencies.

A number of embodiments have been described where the glasses include a radio to receive broadcast information. In another embodiment, the information to be received is previously programmed or recorded within a memory device. The glasses include a player to play the information stored in the memory device, and the player includes a speaker. The player is at least partially embedded in the glasses. In one embodiment, the glasses can include the memory device with the recorded information.

The memory can be on a printed-circuit board and, for example, can store up to 256 MB. The memory can be a built-in or removable flash memory. In one embodiment, the glasses include one or more connectors. The memory embedded in the glasses can be coupled to a device external to the glasses through the one or more connectors. As an example, a 256 MB flash memory is in one of the temples of a pair of glasses, and there is a USB connector at, for example, the end of that temple (close to the ear) to couple to an external device or instrument.

With the storage medium embedded, the glasses can upload information in the memory to or download information into the memory from an external device, such as a computer. A user can couple the glasses into the computer through a connector, either directly or indirectly. For example, indirect coupling might use an intermediate wire between the computer and the glasses.

In yet another embodiment, the memory device is external to the glasses. The memory device is coupled to the glasses through a connector at the glasses. If such removable memories are deployed for an event, the memories can be rented out during the event. Again, such memories can be tracked based on, for example, identifiers stored in the memories, or attached to the memories.

Figure 77:
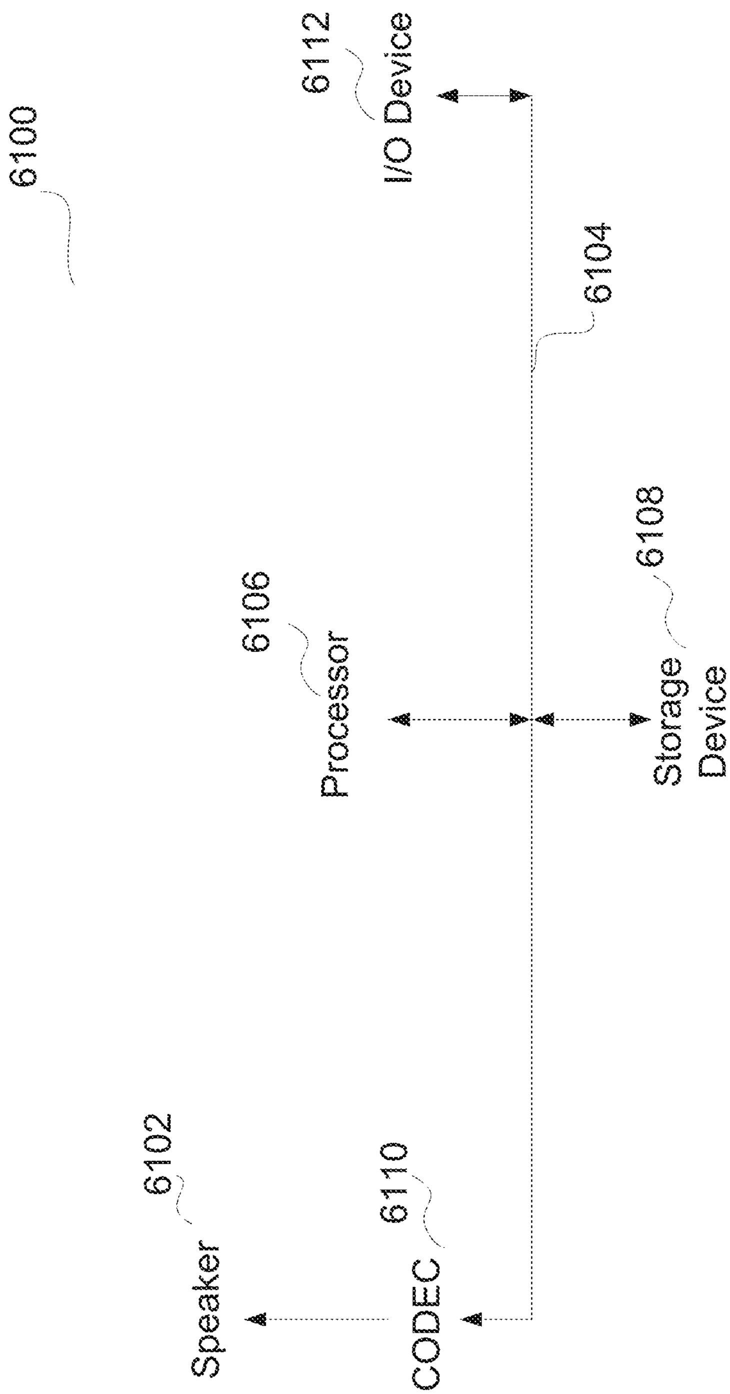
FIG. 77 shows some electrical components of a player according to an embodiment of the invention.

FIG. 77 shows some of the electrical components for a player 6100 in a glasses according to an embodiment of the invention. The player includes a speaker 6102, a data bus 6104 to facilitate data transfer among, for example, a processor 6106, a storage device 6108, and a coder/decoder (CODEC) 6110. The processor 6106, which can be a microprocessor or controller, controls the operation of the player 6100. The storage device 6108 stores the information, which can be different types of appropriately-formatted media data. In one example, the information is digitally encoded audio signals. The storage device 6108 can include a number of separate storage elements. For example, the device can be a flash memory device, or a minidisk device, and a cache, which can improve the access time and reduce power consumption of the storage device 6108. The storage device 6108 typically also includes a Read-Only Memory (ROM), which stores programs, utilities or processes to be executed in a non-volatile manner. The player 6100 can also include a RAM, such as for the cache.

Once a piece of information is selected to be played, the processor 6106 would supply the piece of information to the CODEC 6110, which decompresses the media data and produces analog output signals for the speaker 6102. In one embodiment, the bus 6104 is also coupled to an input/output device 6112, which would allow information to be downloaded from an instrument to the glasses.

There are different approaches to identify a piece of information to be played. In one embodiment, different pieces of information in the storage device 6108 can be categorized, and the categorization can be hierarchical, with multiple levels in the hierarchy. To illustrate, assume that there are three levels. The top level can be the name of the football team; the second level can be the names of the players on the team, and the third level can be scoring statistics or other attributes of the players. The entries, such as the name of the players, can be abbreviated. There can be a control knob or switch to allow the user to scroll down entries in a level. By pushing the knob, the user selects an entry, which can lead the user to the next level. There can be an entry for moving up a level also. In one embodiment, once an entry is selected, the identity of that entry will be announced. For example, a selected entry is about the statistics of Joe Smith. Once that entry is selected, the speaker will state, "Joe Smith statistics." If that is the one the user wants, the user can signal his preference by, for example, pushing a switch.

In another embodiment, the information can be searched. The search can be based on one or more key words. As an example, the information is related to songs. A user can search by the name of the song, the name of the artists or music genre. Entry for the search term can be through voice recognition applications in the glasses. Based on the term verbalized by the user, a song will be selected. The glasses can ask the user if that is the song the user has selected. If the response is positive, the song will be played. If not, the glasses will ask the user to verbalize the term again. In another embodiment, entering the search terms is through the key pad of a portable device, wired or wirelessly, coupled to the glasses. Additional descriptions regarding having a portable device linked to a pair of glasses will be further discussed below.

With the speaker relatively close to at least one ear of the user, the volume of the speaker does not have to be very high. In one embodiment, the volume of the speaker is limited, such as the maximum sound level is not more than 60 dB. If the glasses are powered by a battery, limiting the volume of the speaker would extend the lifetime of the battery. Such a limit can also reduce the chance of the speaker generating audio signals that might disturb people in the vicinity of the user. This, in turn, helps to provide information to the user in a relatively private manner.

In one embodiment, the glasses are powered by a battery. To extend its lifetime, the glasses include a timer. For example, if the glasses have a radio, after the radio is turned on for a preset amount of time, the timer will turn the radio off automatically. In another embodiment, the glasses include a speaker and the timer would turn the speaker off after the speaker has been turned on for a preset amount of time. The preset time can be determined by the timer.

In another embodiment, the glasses are powered by other types of sources, such as a solar cell or a fuel cell. Such other type of sources can be at one of temples of the glasses.

As explained, in a number of embodiments, the glasses include a switch, which typically is at least partially embedded in the glasses. For example, the switch can be used to turn the speaker on, or to tune the frequency of a radio. If the glasses have two speakers, such as one on each of the temples, there can be two switches, one on each temple to control the corresponding speaker. The two speakers can be for generating stereo audio signals for the user. There can also be one control switch for both speakers.

The switch in the glasses can have different attributes. It can be activated by different type of forces, including mechanical, radiation, magnetic, electrical, and temperature. The switch can also be activated remotely by a remote device. The switch can be based on one or more detectors. The switch can have different degrees or ranges of control, such as binary, multiple discrete steps or incremental control. The switch can be placed at different position on the glasses, such as on the side or top surface of a temple or at a joint. The control can take perception into consideration, such as based on texture, height and lateral position of multiple switches.

Figure 78:
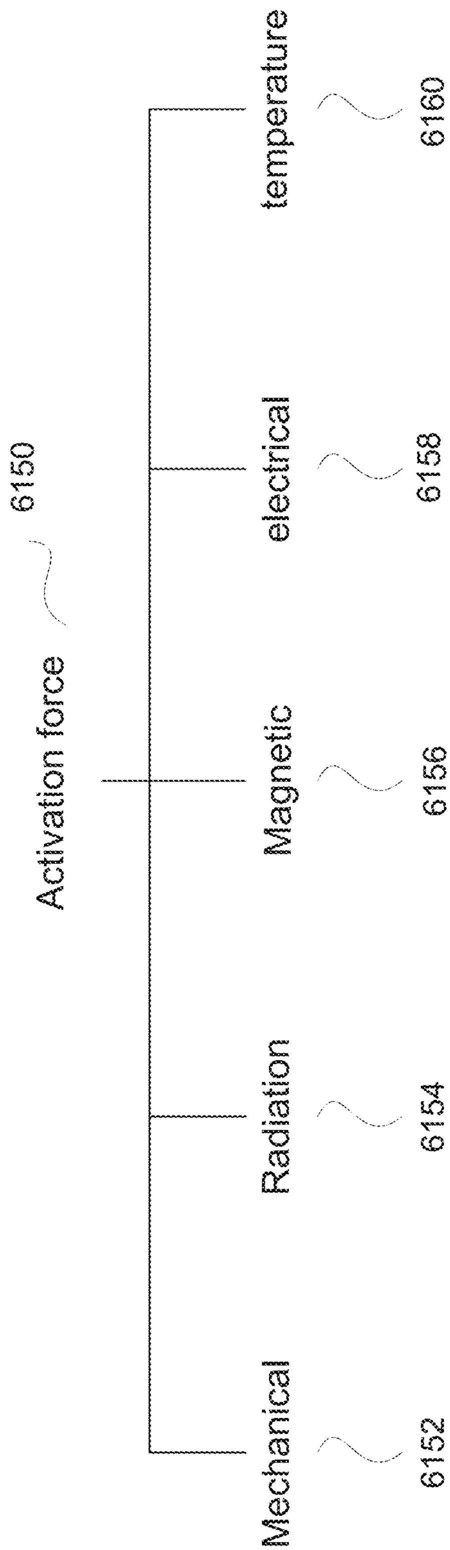
FIG. 78 illustrates a number of forces activating a switch according to a number of embodiments of the invention.

FIG. 78 illustrates a number of forces 6150 activating the switch according to different embodiments of the invention. They can be based on, for example, mechanical 6152, radiation 6154, magnetic 6156, electrical 6158, and temperature 6160.

Figure 79:
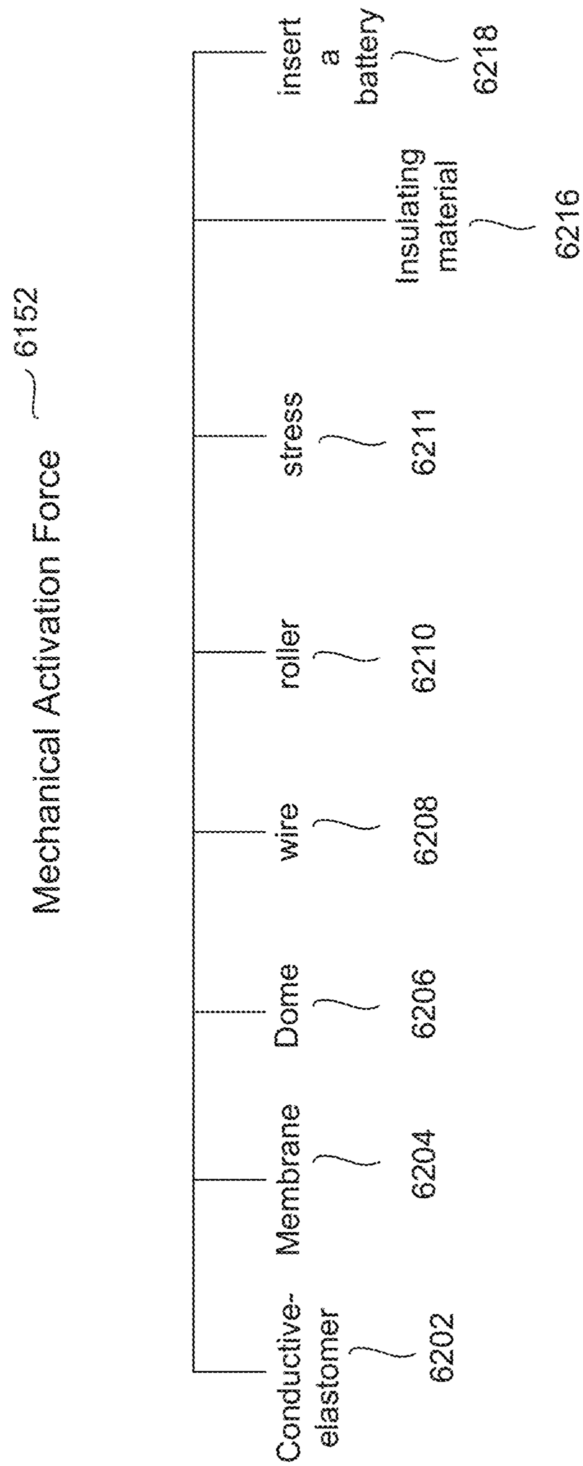
FIG. 79 illustrates a number of mechanical forces activating a switch according to a number of embodiments of the invention.

FIG. 79 illustrates a number of mechanical forces 6152 activating the switch according to different embodiments of the invention. The mechanical switch or sensor can be a conductive-elastomer switch 6202, a membrane switch 6204, a dome switch 6206, a relatively simple wire switch 6208, and a roller switch 6210, such as a switch including a wheel. Another type of mechanical force can be based on stress 6211, such as a switch based on piezoelectric force or a piezoelectric device.

In yet another embodiment, the mechanical switch is made so that the electrical circuitry in the glasses can be activated but not deactivated by the user. In other words, once activated, the switch is designed not to be deactivated by the user, and the circuit will remain on till the power source inside the glasses is depleted. One approach to implement such a switch is based on a piece of insulating material 6216 between a terminal of, for example, a battery and its contact with the circuit embedded in the glasses. When the battery is installed, at least one of its terminals is separated from its circuit contact. There can be a thin, flexible, insulating material, 6216, such as a ribbon, positioned between the terminal and the contact. Though the circuit is embedded in the glasses, the insulating material 6216 extends outwardly from inside the glasses through a hole, such as a small hole, in the side wall of, for example, a temple of the glasses. In one embodiment, the hole or slot is located above or below the terminal and the contact, or the hole is not directly inline with the terminal and the contact. By pulling the insulating material out from the glasses, the terminal will establish electrical connection with the contact, activating the circuit and turning the speaker on.

In another embodiment of a switch based on mechanical force 6154, the mechanical force is the force that is used to insert 6218 a battery into the glasses. Once the battery is inserted, the speaker in the glasses will be activated. The speaker will remain on until the battery is removed, or until the power in the battery is drained.

The switch can also be activated by radiation 6154, or energies in a type of radiation, according to a number of embodiments of the invention. The radiation 6154 can be in the optical, or infrared or ultraviolet range. For example, the switch includes a photodiode or photo sensor in the glasses, and there is an opening above the photodiode. In one embodiment, the diode is activated by light getting to the diode through the opening. In another embodiment, the circuit is activated if the opening is covered to prevent light from getting to the diode.

Figure 80:
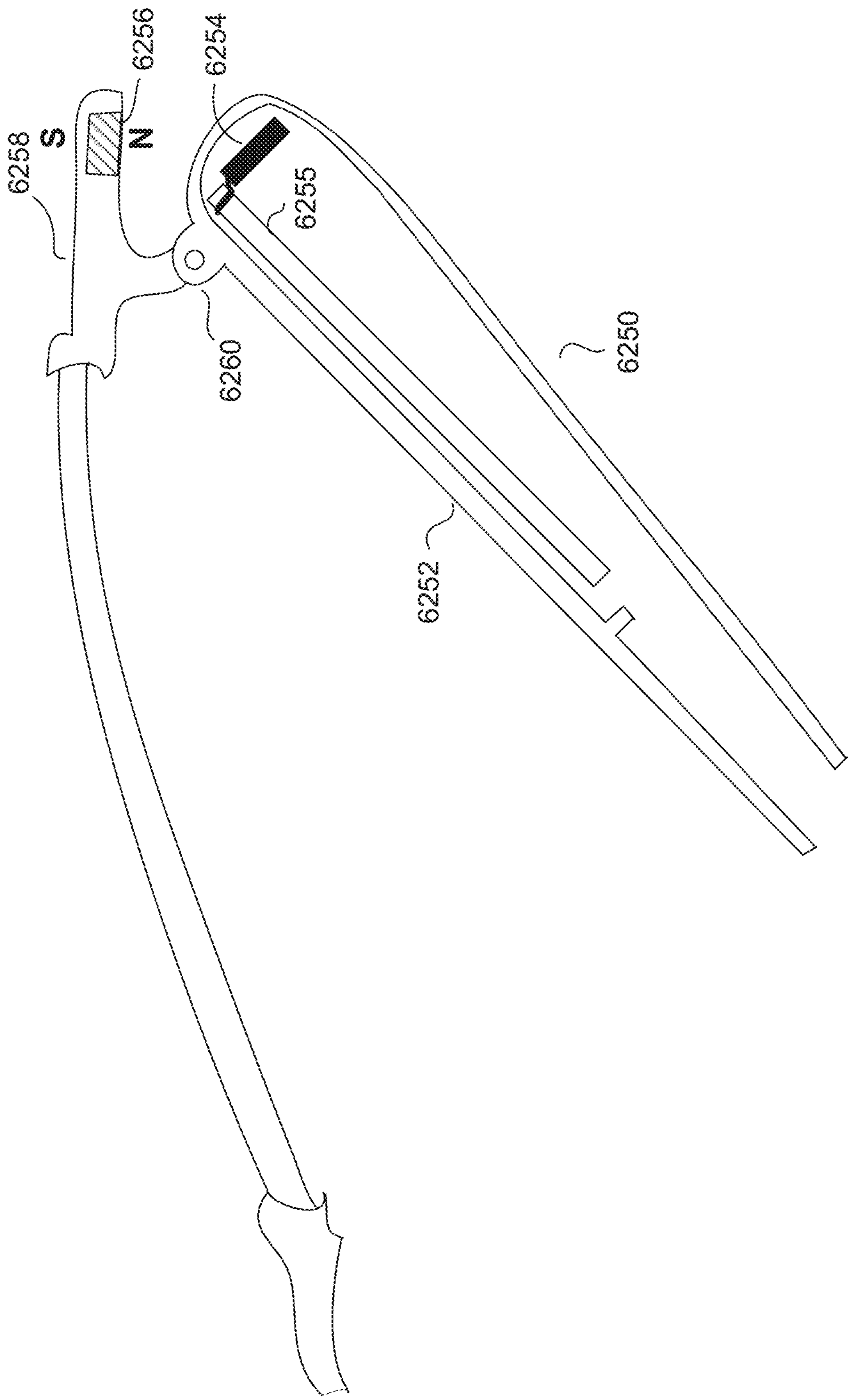
FIG. 80 shows a Hall-effect detector at a joint of a pair of glasses according to an embodiment of the invention.

The switch can be activated by magnetic forces 6156. For example, there can be a magnetic sensor or a Hall effect detector inside a temple proximate to a joint of a pair of glasses. FIG. 80 shows a section of a pair of glasses 6250 with such a detector 6254. The detector 6254 is electrically connected to a printed circuit board 6255. When the temple 6252 is in its extended position, as when the glasses 6250 are ready to be worn, the detector 6254 will be directly adjacent to a magnet 6256 inside a lens holder 6258 at the corresponding joint 6260. The magnet 6256 would activate the Hall effect detector 6254. In another embodiment, a magnetic switch is activated based on changing the inductance of a coil. For example, the switch includes a steel rod that can be positioned in or out of a coil. The switch's range of control is based on the position of the rod with respect to the coil.

The switch can be activated depending on electrical forces 6158. In one embodiment, the electrical force depends on capacitive effect. By changing the capacitance, the switch is turned on and off. For example, the capacitance is changed by placing one's finger over a metallic pad. In another example, by changing the amount of overlap between two metallic sheets that are not in contact, the capacitance between the two metallic sheets will change. This then changes the range of control of the switch.

In another embodiment, the electrical force 6158 is based on resistive effect. For example, the switch is made up of a slide or a rotary potentiometer. By changing the amount of coupling, the amount of resistance is changed to reflect the range of control of the switch.

In one embodiment, the switch's activation can depend on temperature 160. For example, the switch includes a temperature sensor. When the temperature reaches a certain point, the switch is activated.

In yet another embodiment, the switch is controlled by a remote controller. For example, the glasses include an infrared detector. The remote controller can generate infrared radiation. By aiming the controller at the detector, the infrared radiation can activate the infrared detector and the switch is activated. Or, if the user moves into the vicinity of a corresponding infrared transmitter, circuits in the glasses would be activated.

The switch can include one or more previously-described sensor or detector of different types of forces. For example, the switch can use two photo sensors. One sensor is exposed to light on the outside surface of the temple and the other is exposed to light on the inside surface of the temple, such as close to the ear. Based on their differential output, the switch is activated. As another example, there are two temperature sensors in the glasses. One is located close to a joint and the other is at the temple close to the ear. Again, the switching action depends on their differential outputs. In yet another embodiment, the glasses include more than one type of switch. There can be one type of switch, such as a mechanical switch, acting as an on/off switch, and another, such as a switch using electrical forces, as an incremental switch to change frequency.

As described, in a number of embodiments, the switch can provide different degrees or ranges of control. In one embodiment, there are two degrees of control, such as in an on/off switch. In another embodiment, there can be multiple discrete degrees, steps or positions. For example, the switch is a roller with discrete notches to indicate different discrete positions. Or, there can be two mechanical switches, placed side-by-side. Pushing one switch will increment one step, and pushing the other will decrement one step.

Figure 81A:
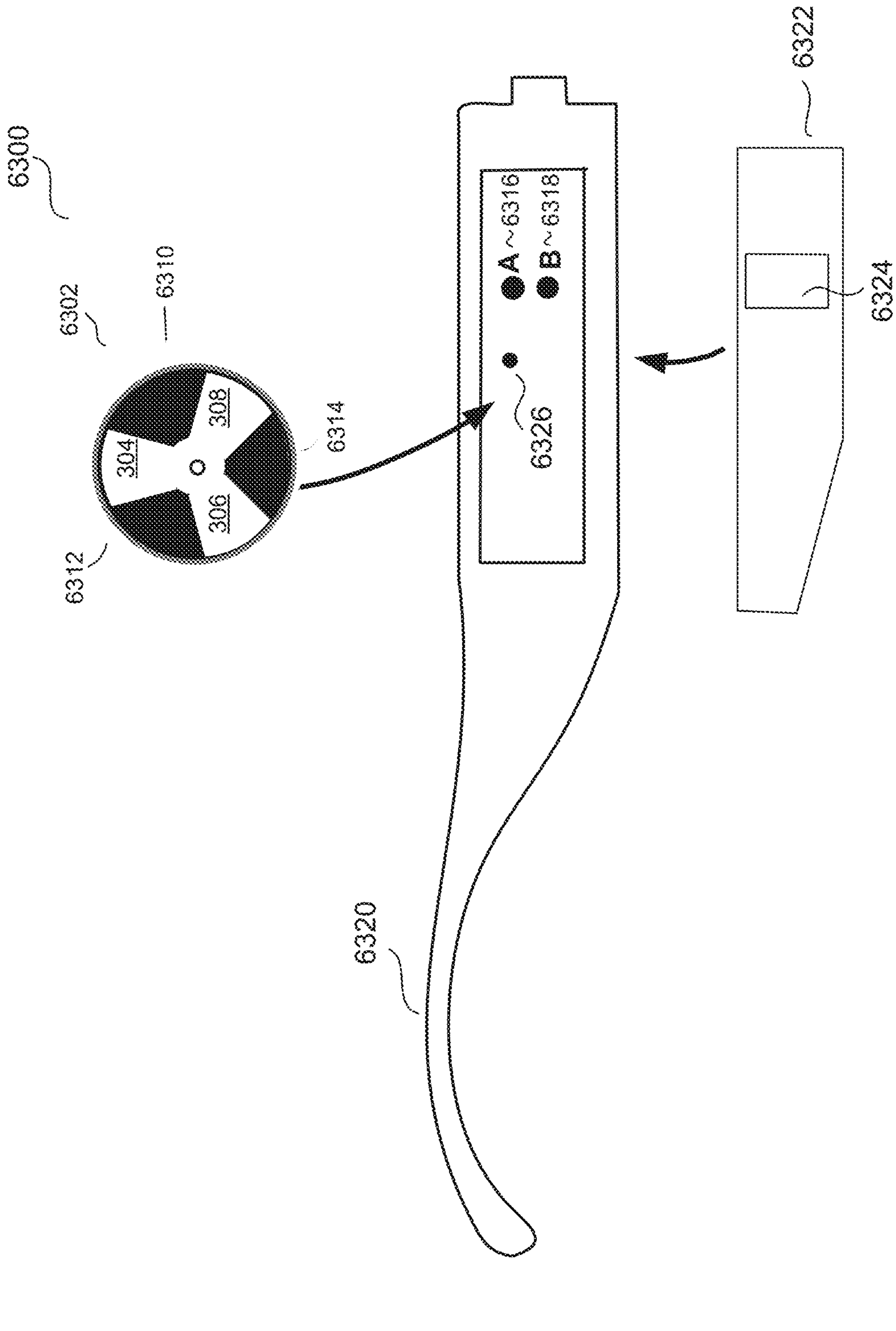
FIGS. 81A-81C illustrate different embodiments of a quadrature sensor according to the invention.
Figure 81B:
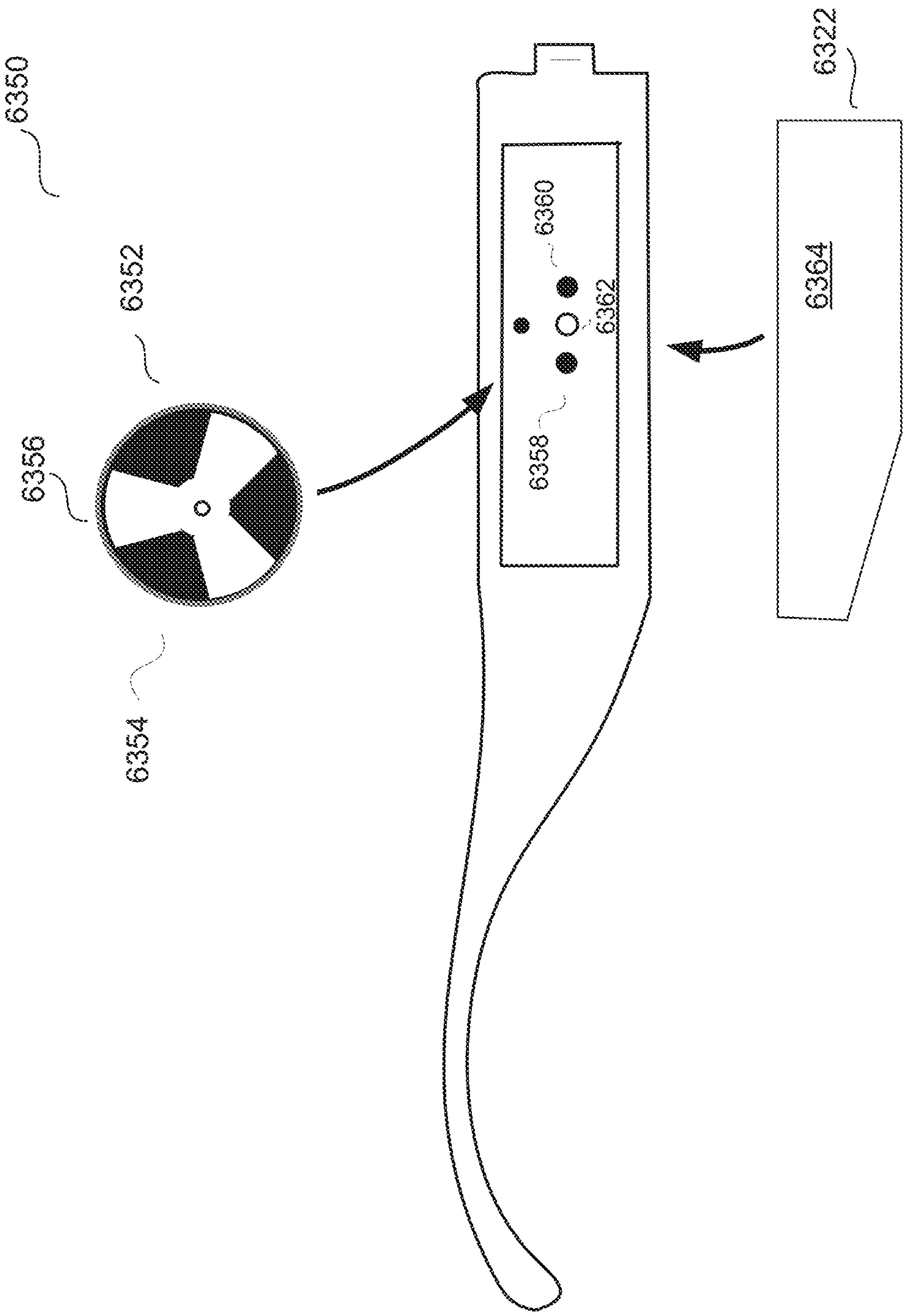
Figure 81C:
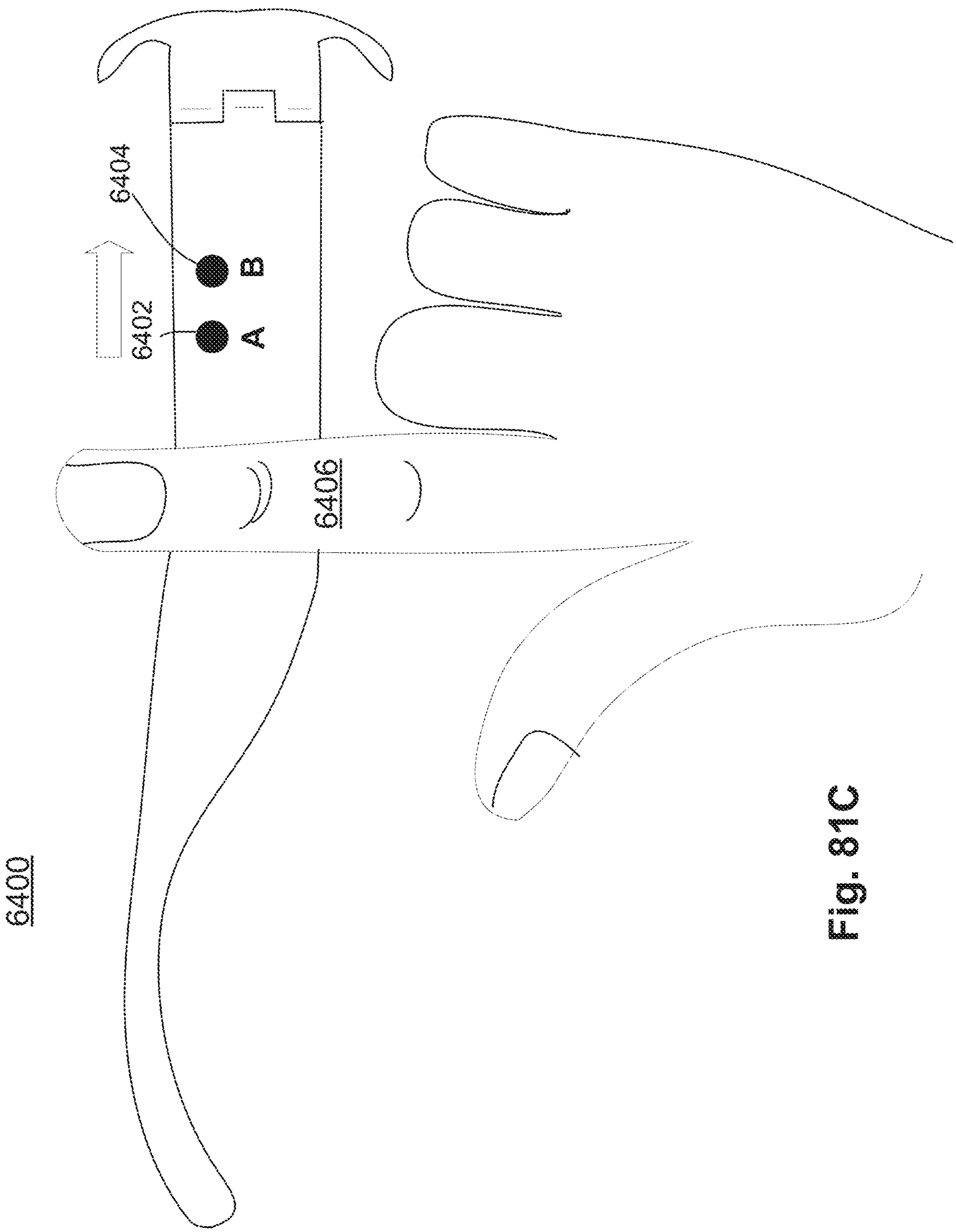

In yet another embodiment, the change from one degree to the next is gradual and not noticeably discrete. This can be achieved with two (2) sensors arranged in quadrature. FIGS. 81A-81C show examples of different embodiments of such a switch based on two photodiodes or photo detectors.

FIG. 81A shows an embodiment 6300 with a wheel 6302 (roller) having clear strips, 6304, 6306 and 6308, alternating with black strips, 6310, 6312 and 6314, and two photodiodes, 6316 and 6318. Most of the wheel 6302 and the two diodes, after incorporated into the temple 6320, are covered by a piece of material 6322. The two diodes, 6316 and 6318, are exposed to ambient light through a clear window 6324. A part of the wheel 6302 is extended out of the temple 6320, allowing the wheel 6302 to be turned about its axis 6326. The wheel 6302 can have teeth for friction turning. As the wheel 6302 rotates about the axis 6326, based on the differential outputs from the diodes, the direction of movement of the wheel 6302—clockwise or counterclockwise—is determined. For example, if the wheel 6302 is rotated clockwise, the top diode 6316 senses light before the bottom 6318 senses light. On the other hand, if the wheel 6302 is rotated counterclockwise, the bottom diode 6318 senses light before the top 6316. Based on the signals from the two diodes, one would be able to tell if the wheel is being turned clockwise or counterclockwise. Clockwise can denote increase and counterclockwise can denote decrease. This embodiment can be used, for example, to change frequency. By turning the wheel 6302 clockwise, the frequency of the radio goes up. And, by turning the wheel 6302 counterclockwise, the frequency goes down. Such a wheel 6302 is also applicable for other purposes, such as controlling the volume of a speaker.

FIG. 81B shows an embodiment 6350 with a wheel 6352 having black 6354 and reflecting 6356 strips, two photodiodes, 6358 and 6360, and a LED 6362. Again, most of the wheel, the two diodes and the LED are covered by a sheet of material 6364. If a reflecting strip 6356, instead of a black strip 6354, goes over a diode, more light from the LED will be reflected back and received by the diode. If a black strip 6354 goes over a diode, output from the diode will be significantly reduced. Again based on the signals from the diodes, the direction of rotation can be determined, which, in turn, can be used to indicate incrementing or decrementing outputs.

FIG. 81C shows an embodiment 6400 again using two photodiodes, 6402 and 6404, but without a wheel. The two diodes, 6402 and 6404, are exposed to ambient light unless they are covered. In this embodiment, whether the finger 6406 or another object is moving from the first diode 6402 to the second diode 6404, or from the second diode 6404 to the first diode 6402 can be determined based on the signals from the diodes. For example, the finger 6406 sliding in a forward direction would trigger a signal from the first diode 6402 before the second diode 6404. On the other hand, sliding the finger in a backward direction would trigger a signal from the second diode before the first diode. Thus, the outputs from the two diodes can show the direction of movement of the finger. One can then, for example, assign forward movement (from the first 6402 to the second 6404) as increment, and backward movement (from the second 6402 to the first 6402) as decrement.

A switch can be placed at different location on a pair of glasses. In one embodiment, the switch is positioned on one of the side surfaces of one of the temples, such as the side that is not facing the face of the user when the glasses are worn. In another embodiment, the switch is positioned on a top surface of one of the temples. The switch 6028 shown in FIG. 75 falls under this category. In yet another embodiment, the switch is positioned at one of the joints or hinges of the glasses. For example, there is a mechanical switch at a joint. If the corresponding temple is extended, as in the position when the glasses are worn, the switch will be pressed, which can indicate that the switch has been activated.

In one embodiment, the user can be using a switch when the glasses are worn. Depending on the position and the type of switch, the user may not be able to see the switch when he is manipulating it. In one embodiment, the design of the switch takes into consideration perception. To illustrate, there are two mechanical switches on the glasses. The top surfaces of the two switches have different texture. One switch has a smooth surface and the other has a rough surface. Pushing the rough surface implies incrementing one step and pushing the smooth surface implies decrementing one step. This type of perception design is based on tactile effect. In another example, the heights of the two switches are different. The taller switch is for one effect and the shorter is for another. In yet another embodiment, the lateral position of the two switches has significance. For example, the two mechanical switches are on the top surface or edge of a temple. By pushing the switch closer to the lens holder, the volume of the speaker in the glasses goes up; and by pushing the switch further away from the lens holder, the volume of the speaker goes down. In another example, the two switches are under the two ends of a piece of materials, such as a rocker-lever, which can be plastic. Rocking the plastic piece forward is an increment motion, and rocking the plastic piece backwards is a decrement motion.

A number of embodiments have been described where information is available only for a relatively short duration of time. In one embodiment, the information is available for a longer duration of time. For example, after the short duration of time, the battery in the glasses is drained. In order to continue on running the electronics inside the glasses to get the information, the user can replace the battery in the glasses with a new battery. In this embodiment, the glasses are designed so that the battery is replaceable by the user. Or, in another embodiment, the battery is rechargeable through a connector at the glasses.

A number of embodiments have been described regarding the glasses with a speaker for providing information to the user. In one embodiment, the glasses also include one or more light emitting diodes. The LEDs can be for entertaining purposes. For example, the information provided to the user is music. If the audio signals received are beyond a certain threshold, one or more of the LEDs will be activated. The activation of the one or more LEDs can then be synchronized to the sound of the speaker. In another example, a number of LEDs could be arranged as an array on the outside surface of one of the temples. The array could display graphics, pictures, or scrolling text. The array could also be located at other locations on the glasses, such as across the front surface or the top surface of the bridge or the lens-holders of the glasses.

One embodiment of the glasses includes a specially-designed surface texture, such as on the outside surface of a temple of the glasses. By scratching the surface texture, depending on its design, one can generate specific audio tones.

A number of embodiments have been described regarding electrical components in a temple of a pair of glasses. All of the electronic components can be self-contained inside the temple of the glasses. The components can be coupled to a printed circuit board. In other embodiments, some of the components are embedded fully or partially in other areas of the glasses, such as the lens holders or the bridge of the glasses. Or, one or more electrical components can be in a shield of the glasses.

A number of embodiments have been described regarding information available for a pair of glasses. In one embodiment, a pair of glasses also includes an information input mechanism that allows its user to input information into the glasses. Such information allows the user to provide inputs or feedbacks.

The information input mechanism can be implemented by a switch at the glasses, such as one of the switches previously described. The user input can be stored in the glasses if the glasses include memory storage electrical components. The input can be wirelessly transmitted from the glasses to a remote device if the glasses include wireless transceiver electrical components. For example, the user is at a football game, and the referee has made a controversial call. A broadcaster at the event can instantaneously use such glasses to perform a simple polling. This can be done by the broadcaster as part of the wireless transmission of information (e.g., event information) to the wearer of the glasses. Alternatively, the broadcaster can transmit a message to the user. In one embodiment, there can be an indicator on the glasses to indicate that there is a message for the wearer of the glasses. The indicator can be a LED light flashing for a few seconds, a ringing tone that rings for a few seconds, or other types of indication at the glasses. In any case, if desired, the wearer can receive the message. The message asks the wearer to push a button (an information input mechanism) at the glasses one time, if the wearer believes the call was correct, and two times otherwise. Such input information from the glasses is then wirelessly transmitted from the glasses and received by the broadcaster. Statistics on the responses can then be automatically performed. Such statistics can be provided almost instantaneously to, for example, the referee.

In one embodiment, each pair of such glasses also includes an identifier that identifies the glasses, such as an identification number. When input information is transmitted from such a pair of glasses, such as back to the broadcaster, its identifier can also be transmitted together with the corresponding input information.

Organizers of an event or a company affiliated with or related to the event also can use the glasses to gather other information from the wearers of the glasses, such as the audience of the event. For example, the audience can be electronically polled regarding ways to improve on the services they received.

The information input mechanism can include a microphone at the glasses. The organizers again can send a message to a user of a pair of such glasses. The message can be as follows: "If you like the ways we take food orders, say yes. If not, say no." The voice response from the user is transmitted to the organizers. Such simple yes/no responses can be automatically deciphered based on voice recognition mechanisms and then automatically tabulated for the organizers.

In one embodiment, not all of the electrical components in a number of the glasses previously described are in the glasses. Instead, at least one of the electrical components, such as its power source, is in a portable device, which can also be carried by the user of the glasses. In another embodiment, a pair of glasses can function as a headset and are wired or wirelessly coupled to a portable device. The portable device can provide additional areas for user input, or outputs to the user.

As an example of wireless coupling for a pair of glasses functioning as a headset, the glasses include a wireless transceiver that is based on, for example, Bluetooth, UWB, Zigbee, or other types of short-distance wireless transmission standards. Based on the transceiver, the glasses are wirelessly coupled to a corresponding portable device. Information from long distances can be received by the portable device, which can then re-transmit such information to the glasses.

As an example of wired coupling for a pair of glasses functioning as a headset, the glasses include a connector. The connector can be used to electrically connect to a portable device through, for example, a wire. In one embodiment, the connector at the glasses is a male connector and is located at the tip of one temple of the glasses, such as at the tip position 6019 of the second temple 6018, shown in FIG. 75. When the male connector is not inserted into a female connector, the male connector can be covered, such as with a cap or a cover, to protect, encapsulate or shroud the connector. In one embodiment, at least a portion of the connector is covered.

Different embodiments of glasses functioning as a headset have been described in copending patent application, entitled, "EYEGLASSES WITH HEARING ENHANCED AND OTHER AUDIO SIGNAL-GENERATING CAPABILITIES", which was incorporated by reference above, and can be used with the various embodiments described herein.

A number of embodiments have been described regarding glasses with a number of structural elements. In one embodiment, the glasses can be rimless frames. The glasses can include two lenses held together by a bridge. A temple can be attached to each lens through a joint that is connected to the corresponding lens by one or more screws. For example, there can be two screws at each lens to hold onto a temple piece, which includes a joint for a corresponding temple. One or more electrical components can be fully or partially embedded in the glasses, such as in a temple of the glasses.

A number of embodiments have been described with glasses. In one embodiment, a device, which is not a pair of glasses, can provide information to a user, where the information can be directly relevant to an event attended by the user. There can also be a user input mechanism at the device to allow the user to provide user input, including user feedback. Different embodiments of electrical components previously described can be in the device. Advantageously, in one embodiment, the different embodiments of components have minimal impact on the design of the end product and no tedious wiring is required. For example, in the case in which the end product is an eyeglass frame, a temple of the eyeglass frame can have an opening, cavity or container to hold or encompass the different embodiments of components, whereby no other changes or complications to the eyeglass frames need be imposed. Other such end-products can include: hats, shoes, watches, tee-shirt, swimming-suit, key-ring, purse, beer can holder, and other consumer products.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

A number of embodiments in the invention can be implemented in software, hardware or a combination of hardware and software. A number of embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to “one embodiment” or “an embodiment” means that a particular feature, structure, or characteristic described in connection with the embodiment can be included in at least one embodiment of the invention. The appearances of the phrase “in one embodiment” in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. Eyewear, comprising:

an eyewear frame having a front section, a first temple and a second temple, the first temple having a forward end and a rearward end, the forward end of the first temple being coupled to a first side of the front section, the second temple having a forward end and a rearward end, and the forward end of the second temple being coupled to a second side of the front section;

a circuit board internal to the first temple, the circuit board supporting at least an integrated circuit and an electronic component, the integrated circuit and the electronic component being physically attached to the circuit board, and the integrated circuit being electrically connected to the electronic component;

a first speaker in the first temple;

a second speaker in the second temple;

a first opening in the first temple;

a second opening in the second temple;

a first channel in the first temple, the first channel configured to guide sound from at least one of the first plurality of speakers to at least the first opening in the first temple; and a second channel in the second temple, the second channel configured to guide sound from the second speaker to at least the second opening in the second temple.

2. Eyewear, comprising:

an eyewear frame having a front section, a first arm and a second arm, the first arm having a forward end and a rearward end, the forward end of the first arm being coupled to a first side of the front section, the second arm having a forward end and a rearward end, and the forward end of the second arm being coupled to a second side of the front section;

a circuit board internal to the first arm, the circuit board supporting at least an integrated circuit and an electronic component, the integrated circuit and the electronic component being physically attached to the circuit board, and the integrated circuit being electrically connected to the electronic component;

a first speaker in the first arm;

a second speaker in the second arm;

a first opening in the first arm;

a second opening in the second arm;

a first channel in the first arm, the first channel configured to guide sound from the first speaker to at least the first opening in the first arm; and a second channel in the second arm, the second channel configured to guide sound from the second speaker to at least the second opening in the second arm.

3. Eyewear as recited in claim 2, wherein the eyewear comprises:

a memory in at least one of the first arm or the second arm, the memory configured to store audio data, wherein the audio data is retrieved from the memory and presented to a user of the eyewear as audio sound via at least one of the first speaker and the second speaker.

4. Eyewear as recited in claim 2, wherein the eyewear comprises:

a memory in at least one of the first arm or the second arm, the memory configured to store audio data, wherein the audio data is retrieved from the memory and presented to a user of the eyewear as audio sound via the first speaker and the second speaker, and
wherein the audio data is music.

5. Eyewear as recited in claim 2, wherein the eyewear comprises:
a user input device at least partially on or in the first arm of the eyewear frame, the user input device being configured to at least in part sense a directional user input.

6. Eyewear as recited in claim 5, wherein the directional user input causes the eyewear to initiate performance of a function carried out at least in part by the eyewear.

7. Eyewear as recited in claim 5,
wherein the integrated circuit comprises a controller,
wherein the user input device produces an electrical response to the directional user input, and
wherein the electrical response is provided to the controller.

8. Eyewear as recited in claim 5, wherein the directional user input includes at least a sliding of a finger action with respect to the user input device.

9. Eyewear as recited in claim 8, wherein the eyewear is configured to detect that the directional user input with respect to the user input device is a forward sliding action or a backward sliding action with respect to the user input device.

10. Eyewear as recited in claim 5,
wherein the user input device is based on capacitive effect,
wherein the user input device is configured to detect a capacitive change in response to the directional user input, and
wherein the user input device producing an electrical response to the directional user input.

11. Eyewear as recited in claim 2,
wherein the eyewear comprises:
a user input device at least partially on or in the first arm of the eyewear frame, the user input device being configured to receive a user input;
wherein the user input device is based on capacitive effect,
wherein the user input device is configured to detected a capacitive change in response to the user input, and
wherein the user input device producing an electrical response to the user input.

12. Eyewear as recited in claim 11, wherein the user input device is configured to distinguish at least a direction of the user input with respect to the user input device.

13. Eyewear as recited in claim 2, wherein the eyewear comprises:
a visual indicator configured to signal, to a person, information concerning at least an operational status pertaining to at least one electrical component of the eyewear.

14. Eyewear as recited in claim 13, wherein the visual indicator is at least partially internal to the eyewear frame, and wherein the visual indicator, when activated, produces light that is visible external to the eyewear.

15. Eyewear as recited in claim 14, wherein the visual indicator comprises a light-emitting diode.

16. Eyewear as recited in claim 15, wherein the visual indicator is provided at the front section of the eyewear frame.

17. Eyewear as recited in claim 15, wherein the visual indicator is provided at an inside surface of the eyewear frame.

18. Eyewear as recited in claim 17, wherein the visual indicator provides at least a notification to a user of the eyewear by outputting a blinking light.

19. Eyewear as recited in claim 18, wherein the inside surface of the eyewear frame where the visual indicator is provided is an inside surface of the first arm.

20. Eyewear as recited in claim 18, wherein the inside surface of the eyewear frame where the visual indicator is provided is proximate to a region in which the forward end of the first arm is coupled to the first side of the front section.

21. Eyewear as recited in claim 2, wherein the eyewear comprises:
a visual indicator configured to produce a visual notification for notifying a person at least that an electrical component of the eyewear is in use, the visual indicator including at least a light-emitting diode, and the visual indicator being provided at the front section of the eyewear.

22. Eyewear as recited in claim 21, wherein the visual indicator is at least partially internal to the eyewear frame at the front section, and wherein the visual indicator, when activated, produces light that is visible external to the eyewear.

23. Eyewear as recited in claim 2, wherein the eyewear comprises:
a visual indicator configured to signal, to a person, information concerning at least an operational status pertaining to at least one electrical component of the eyewear, the visual indicator including at least a light-emitting diode, and the visual indicator being provided at an inside surface of the eyewear frame.

24. Eyewear as recited in claim 23, wherein the visual indicator is at least partially internal to the eyewear frame, and wherein the visual indicator, when activated, produces light that is visible to a user wearing the eyewear.

25. Eyewear as recited in claim 24, wherein the light produced by the visual indicator provides at least a notification to the user wearing the eyewear by outputting a blinking light.

26. Eyewear as recited in claim 25, wherein the inside surface of the eyewear frame providing the visual indicator is proximate to a coupling interface between the first side of the front section and the forward end of the first arm.

27. Eyewear as recited in claim 25, wherein the inside surface of the eyewear frame providing the visual indicator is at an inner surface of the first arm.

28. Eyewear as recited in claim 2, wherein the eyewear comprises:
a visual indicator configured to signal, to a person, information concerning at least an operational status pertaining to at least one electrical component of the eyewear, the visual indicator including at least a light-emitting diode, and the visual indicator being provided at the first arm of the eyewear frame.

29. Eyewear as recited in claim 28, wherein the visual indicator is at least partially internal to the eyewear frame, and wherein the visual indicator, when activated, produces light that is visible external to the eyewear.

30. Eyewear as recited in claim 29, wherein the light produced by the visual indicator provides at least a notification to the user of the eyewear by outputting a blinking light.

31. Eyewear as recited in claim 2, wherein the eyewear comprises a magnetically-assisted switch for providing electrical connection.

32. Eyewear as recited in claim 31, wherein the magnetically-assisted switch is secured to the eyewear frame and positioned proximate to a connection point where the forward end of the first arm couples to the first side of the front section.

33. Eyewear as recited in claim 2, wherein the forward end of the first arm movably and mechanically couples directly or indirectly to the first side of the front section, wherein the forward end of the second arm movably and mechanically couples directly or indirectly to the second side of the front section, and wherein the eyewear comprises a switch component secured to the eyewear frame and positioned proximate to a connection point where the forward end of the first arm couples to the first side of the front section.

34. Eyewear as recited in claim 33, wherein the switch component comprises at least one electrical contact.

35. Eyewear as recited in claim 33, wherein the eyewear comprises a magnetic element secured to the eyewear frame and positioned proximate to the connection point where the forward end of the first arm couples to the first side of the front section.

36. Eyewear as recited in claim 35, wherein the switch component comprises at least one electrical contact, and wherein the at least one electrical contact comprises at least one conductive pad.

37. Eyewear as recited in claim 33, wherein the switch component is at least partially exposed when the eyewear is not being worn, and at least partially concealed when the eyewear is being worn.

38. Eyewear as recited in claim 33, wherein the switch component detects whether the corresponding first or second arm is in an open or closed position.

39. Eyewear as recited in claim 2, wherein the eyewear comprises a switch component provided at the first or second arm, the switch component including at least one electrical contact, and wherein the eyewear comprises a magnetic element provided at the first or second arm.

40. Eyewear as recited in claim 39, wherein the switch component is secured to the first or second arm, wherein at least a portion of the at least one electrical contact is exposed external to the eyewear frame, and wherein at least a portion of the magnetic element is exposed external to the eyewear frame.

41. Eyewear as recited in claim 40, wherein the at least one electrical contact comprises at least one conductive pad.

42. Eyewear as recited in claim 2, wherein the eyewear comprises:

a battery in the first arm or the second arm of the eyewear frame; and a charging circuit electrically connected to the battery, the charging circuit being in the first arm or the second arm of the eyewear frame.

43. Eyewear as recited in claim 42, wherein the eyewear frame comprises a magnetically-assisted electrical component at least for supporting an electrical operation.

44. Eyewear as recited in claim 43, wherein the magnetically-assisted electrical component is positioned proximate to a connection point where the first or second arm couples to the front section.

45. Eyewear as recited in claim 43, wherein the magnetically-assisted electrical component is positioned at the first arm or the second arm.

46. Eyewear as recited in claim 43, wherein the eyewear further comprises:

a connector that is electrically connected with the charging circuit, the connector being at least partially internal to the first arm while being at least partially exposed external to the first arm, the connector including at least a conductive pad.

47. Eyewear as recited in claim 43, wherein the electrical operation being supported is at least electrical detection or connection.

48. Eyewear as recited in claim 42, wherein the eyewear comprises:

at least one conductive element that facilitates electrical coupling with the battery and/or the charging circuit, wherein the at least one conductive element is at least partially internal to the eyewear frame proximate to the forward end of the first arm or the second arm of the eyewear frame but remains at least partially exposed external to the eyewear frame.

49. Eyewear as recited in claim 48, wherein the at least one conductive element comprises at least one conductive pad or conductive pin.

50. Eyewear as recited in claim 2, wherein the eyewear comprises a magnetic element provided proximate to the forward end of the first arm.

51. Eyewear as recited in claim 2, wherein the forward end of the first arm is mechanically coupled to the first side of the front section via a first hinge, and wherein the eyewear comprises a magnetic element provided proximate to the first hinge.

52. Eyewear as recited in claim 2, wherein the eyewear comprises:

a battery in the first arm or the second arm of the eyewear frame; and at least one conductive element that facilitates electrical coupling with the battery, wherein the at least one conductive element is at least partially in the first arm of the eyewear frame but remains at least partially exposed external to the first arm of the eyewear frame, and wherein the at least one conductive element comprises at least one conductive pad.

53. Eyewear as recited in claim 52, wherein the eyewear comprises a magnetic element secured to the eyewear frame and configured to support an electrical operation.

54. Eyewear as recited in claim 2, wherein the eyewear is configured to be worn by a user, wherein the eyewear comprises a first microphone and a second microphone, wherein the first microphone is configured to pick up at least audio input from at least the user, wherein the second microphone is configured to pick up at least environmental audio input associated with an environment in the vicinity of the eyewear, wherein the eyewear includes at least a processing unit in the eyewear frame, and wherein the processing unit is configured to process the audio input from at least the user via the first microphone to remove at least a portion of the environmental audio input associated with the environment picked up via the second microphone.

55. Eyewear as recited in claim 54, wherein the audio input from at least the user via the first microphone includes at least a voice input, and wherein the environmental audio input associated with the environment includes at least ambient noise.

56. Eyewear as recited in claim 54, wherein the processing unit is configured to process the audio input from at least the user via the first microphone to remove at least a portion of the environmental audio input from the second microphone.

57. Eyewear as recited in claim 54, wherein the first microphone is at least partially in the eyewear frame and is positioned so as to be directed towards the user of the eyewear, and wherein the second microphone is at least partially in the eyewear frame so as to be directed away from the user of the eyewear.

58. Eyewear as recited in claim 57, wherein the processing unit is configured to process the audio input from at least the user via the first microphone to remove at least a portion of the environmental audio input from the second microphone.

59. Eyewear as recited in claim 58, wherein the audio input from at least the user includes at least a voice input, and wherein the environmental audio input includes at least ambient noise.

60. Eyewear as recited in claim 2, wherein the eyewear is configured to be worn by a user, wherein the eyewear comprises at least two microphones, wherein the at least two microphones are configured to pick up (i) at least audio input from at least the user and (ii) at least environmental audio input associated with environmental sound in the vicinity of the eyewear, and wherein the eyewear includes at least a processing unit, the processing unit being configured to:

determine an environmental sound level based on the environmental audio input; and amplify at least a portion of the audio input from the first microphone, with the amplification being at least in part dependent on the environmental sound level.

61. Eyewear as recited in claim 2, wherein the eyewear is configured to be worn by a user, wherein the eyewear comprises a first microphone and a second microphone, wherein the first microphone is configured to pick up at least audio input from at least the user, wherein the second microphone is configured to pick up at least ambient noise input associated with an environment in the vicinity of the eyewear, and wherein the eyewear includes a processing unit, the processing unit being configured to:

determine a noise level based on the ambient noise input; and amplify at least a portion of the audio input from the first microphone, with the amount of amplification being at least in part dependent on the ambient noise level.

62. Eyewear as recited in claim 2, wherein the first channel guides sound towards a first ear of a wearer of the eyewear, and wherein the second channel guides sound towards a second ear of a wearer of the eyewear.

63. Eyewear as recited in claim 2, wherein one or both of the integrated circuit and the electronic component support or provide audio output from the eyewear via the first speaker and the second speaker.

64. Eyewear as recited in claim 2, wherein the front section of the eyewear frame includes one or more lens holders to hold one or more lenses, the one or more lenses permit a wearer who wears the eyewear to view its physical environment through at least a portion of the one or more lenses.

65. Eyewear as recited in claim 64, wherein the one or more lenses are replaceable with one or more prescription lenses.

66. Eyewear as recited in claim 2, wherein the eyewear comprises:

additional electronics within the eyewear frame, the additional electronics being electrically connected to the integrated circuit or the electronic component.

67. Eyewear as recited in claim 66, wherein the additional electronics comprise at least a motion sensor provided in the eyewear frame.

68. Eyewear as recited in claim 2, wherein the eyewear is a pair of sunglasses.

69. Eyewear as recited in claim 2, wherein the eyewear frame comprises:

an antenna at least partially in the eyewear frame.

70. Eyewear as recited in claim 2, wherein the electronic component comprises a camera, and wherein the camera is at least partially internal to the eyewear frame and positioned to face forward.

71. Eyewear as recited in claim 2, wherein the electronic component comprises a camera, and wherein the camera is at least partially internal to the front section of the eyewear frame and positioned to face outward from the front section.

72. Eyewear as recited in claim 2, wherein the eyewear comprises:

an additional electrical component at least partially internal to the eyewear frame but not in the first arm or the second arm, wherein the additional electrical component is electrically connected to one or more of the integrated circuit or the electronic component.

73. Eyewear as recited in claim 2, wherein the eyewear comprises:

a camera at least partially in the eyewear frame; and a microphone at least partially in the eyewear frame;

wherein the eyewear is configured to receive a voice input via the microphone, determine a requested operation from the voice input using voice recognition, and control an operation by the eyewear based on the requested operation.

74. Eyewear as recited in claim 2, wherein the eyewear comprises:

a display at least partially in the eyewear frame; and a camera at least partially in the eyewear frame;

wherein in view of at least an image received by the camera, the eyewear is configured to present information regarding the image on the display.

75. Eyewear as recited in claim 2, wherein the eyewear is configured to provide location-based information to a user that is wearing the eyewear based on location of the eyewear.

76. Eyewear as recited in claim 75, wherein the location of the eyewear is based on a location sensor in the eyewear configured to identify the location of the eyewear, and wherein, when a location of the eyewear as determined by at least the location sensor corresponds to a location for an event, then the location-based information provided to the user includes at least information related to the event.

77. Eyewear as recited in claim 75, wherein the location of the eyewear is based on a location sensor in the eyewear configured to identify the location of the eyewear, and wherein the location-based information is regarding a product in a store at least based on the eyewear being located at the store.

78. Eyewear as recited in claim 1, wherein the eyewear comprises:

a memory in at least one of the first temple or the second temple, the memory configured to store audio data; and a microphone at least partially in the eyewear frame, the microphone configured to pick up at least a voice input, wherein the audio data is retrieved from the memory and presented to a user of the eyewear as audio sound via at least one of the first speaker and the second speaker, and wherein the eyewear is configured to receive the voice input via the microphone to control an operation of the eyewear.

79. Eyewear as recited in claim 78, wherein the operation being controlled pertains to initiating playing of a song.

80. Eyewear, comprising:

an eyewear frame having a front section, a first arm and a second arm, the first arm having a forward end and a rearward end, the forward end of the first arm being coupled to a first side of the front section, the second arm having a forward end and a rearward end, and the forward end of the second arm being coupled to a second side of the front section;

a circuit board internal to the first arm, the circuit board supporting at least a first integrated circuit and a second integrated circuit, the first integrated circuit and the second integrated circuit being physically attached to the circuit board, and the first integrated circuit being electrically connected to the second integrated circuit or another electronic component;

a first speaker in the first arm;

a second speaker in the second arm;

a first opening in the first arm;

a second opening in the second arm;

a first channel in the first arm, the first channel configured to guide sound from the first speaker to at least the first opening in the first arm;

a second channel in the second arm, the second channel configured to guide sound from the second speaker to at least the second opening in the second arm; and a user input device at least partially on or in the first arm of the eyewear frame, the user input device being configured to receive a user input, the user input device is based on capacitive effect, the user input being configured to induce at least a capacitive change with respect to the user input device, and the user input device produces an electrical response to the user input.

81. Eyewear as recited in claim 80, wherein the eyewear comprises:

a visual indicator configured to signal information concerning at least an operational status pertaining to at least one electrical component of the eyewear, the visual indicator is at least partially internal to the eyewear frame, and the visual indicator, when activated, produces light that is visible external to the eyewear.

82. Eyewear as recited in claim 81, wherein the eyewear comprises:

a battery in the first arm or the second arm of the eyewear frame;

at least one conductive element that facilitates electrical coupling with the battery, the at least one conductive element is at least partially in the first arm of the eyewear frame but remains at least partially exposed external to the first arm of the eyewear frame, and the at least one conductive element comprises at least one conductive pad; and a magnetic element secured to the eyewear frame and configured to support an electrical operation.

83. Eyewear as recited in claim 82, wherein the eyewear is configured to be worn by a user, and wherein the eyewear comprises:

a first microphone configured to pick up at least audio input from at least the user, the first microphone being at least partially in the eyewear frame and is positioned to be directed towards the user when the eyewear is being worn; and a second microphone configured to pick up at least ambient sound input associated with an environment in the vicinity of the eyewear, the second microphone being at least partially in the eyewear frame to be directed away from the user of the eyewear when the eyewear is being worn.

84. Eyewear as recited in claim 83, wherein the first integrated circuit includes at least a processing unit, the processing unit being configured to at least process the audio input from at least the user via the first microphone to remove at least a portion of the ambient sound input from the second microphone.

85. Eyewear as recited in claim 84, wherein the user input device is configured to distinguish at least a direction of the user input with respect to the user input device.

86. Eyewear as recited in claim 84, wherein the light produced by the visual indicator provides at least a notification to the user at least by outputting a blinking light.

87. Eyewear as recited in claim 84, wherein the processing unit is configured to:

determine an ambient sound level based on the ambient sound input; and adjust amplification of sound being output from the first speaker and the second speaker based at least in part on the ambient sound level, whereby the sound output from the first speaker and the second speaker is impacted by the amplification provided to the sound being output.

88. Eyewear as recited in claim 84, wherein the processing unit is configured to:

determine an ambient sound level based on the ambient sound input; and amplify an audio output being supplied to the first speaker and the second speaker dependent at least in part on the ambient sound level, whereby the sound output from the first speaker and the second speaker is impacted by the amplification provided to the audio output.

89. Eyewear as recited in claim 80, wherein the eyewear is configured to be worn by a user, and wherein the eyewear comprises:

a first microphone configured to pick up at least audio input from at least the user, the first microphone being at least partially in the eyewear frame and is positioned to be directed towards the user when the eyewear is being worn; and a second microphone configured to pick up at least ambient sound input associated with an environment in the vicinity of the eyewear, the second microphone being at least partially in the eyewear frame to be directed away from the user of the eyewear when the eyewear is being worn.

90. Eyewear as recited in claim 89, wherein the processing unit is configured to:

determine an ambient sound level based on the ambient sound input; and amplify an audio output being supplied to the first speaker and the second speaker dependent at least in part on the ambient sound level.

91. Eyewear as recited in claim 89, wherein the eyewear comprises:

a battery in the first arm or the second arm of the eyewear frame;

at least one conductive element that facilitates electrical coupling with the battery, the at least one conductive element is at least partially in the first arm of the eyewear frame but remains at least partially exposed external to the first arm of the eyewear frame, and the at least one conductive element comprises at least one conductive pad; and a magnetic element secured to the eyewear frame and configured to support an electrical operation.

92. Eyewear as recited in claim 80, wherein the processing unit is configured to:

determine an ambient sound level based on the ambient sound input; and amplify an audio output being supplied to the first speaker and the second speaker dependent at least in part on the ambient sound level.

93. Eyewear, comprising:

an eyewear frame having a front section, a first arm and a second arm, the first arm having a forward end and a rearward end, the forward end of the first arm being coupled to a first side of the front section, the second arm having a forward end and a rearward end, and the forward end of the second arm being coupled to a second side of the front section;

a circuit board internal to the first arm, the circuit board supporting at least a first integrated circuit and a second integrated circuit, the first integrated circuit and the second integrated circuit being physically attached to the circuit board, and the first integrated circuit being electrically connected to the second integrated circuit or another electronic component;

a first opening in the first arm;

a second opening in the second arm;

a first speaker in the first arm, the first speaker being configured to produce sound that is at least in part output from at least the first opening in the first arm;

a second speaker in the second arm, the second speaker being configured to produce sound that is at least in part output from at least the second opening in the second arm; and a user input device at least partially on or in the first arm of the eyewear frame, the user input device being configured to receive a user input, the user input device is based on capacitive effect, the user input being configured to induce at least a capacitive change with respect to the user input device, and the user input device produces an electrical response to the user input.

94. Eyewear as recited in claim 93, wherein the first integrated circuit includes at least a processing unit, and wherein the processing unit is configured to:

determine an ambient sound level based on the ambient sound input; and amplify an audio output being supplied to the first speaker and the second speaker dependent at least in part on the ambient sound level, whereby the sound output from the first speaker and the second speaker is impacted by the amplification provided to the audio output.

95. Eyewear as recited in claim 94, wherein the eyewear is configured to be worn by a user, and wherein the eyewear comprises:

a first microphone configured to pick up at least audio input from at least the user, the first microphone being at least partially in the eyewear frame and is positioned to be directed towards the user when the eyewear is being worn; and a second microphone configured to pick up at least ambient sound input associated with an environment in the vicinity of the eyewear, the second microphone being at least partially in the eyewear frame to be directed away from the user of the eyewear when the eyewear is being worn.

96. Eyewear as recited in claim 95, wherein the eyewear comprises:

a visual indicator configured to signal information concerning at least an operational status pertaining to at least one electrical component of the eyewear, the visual indicator is at least partially internal to the eyewear frame, and the visual indicator, when activated, produces light that is visible external to the eyewear.

97. Eyewear as recited in claim 96, wherein the eyewear comprises:

a battery in the first arm or the second arm of the eyewear frame;

at least one conductive element that facilitates electrical coupling with the battery, the at least one conductive element is at least partially in the first arm of the eyewear frame but remains at least partially exposed external to the first arm of the eyewear frame, and the at least one conductive element comprises at least one conductive pad; and a magnetic element secured to the eyewear frame and configured to support an electrical operation.

98. Eyewear as recited in claim 97, wherein the user input device is configured to distinguish at least a direction of the user input with respect to the user input device.

99. Eyewear as recited in claim 98, wherein the user input device is configured to distinguish at least whether the user input pertains to a forward sliding action or a backward sliding action with respect to the user input device.

100. Eyewear as recited in claim 99, wherein the eyewear comprises:

a camera at least partially in the eyewear frame; and a microphone at least partially in the eyewear frame;

wherein the eyewear is configured to receive a voice input via the microphone, determine a requested operation from the voice input using voice recognition, and control an operation by the eyewear based on the requested operation.

101. Eyewear as recited in claim 100, wherein the light produced by the visual indicator provides at least a notification to the user at least by outputting a blinking light.

* * * * *